US010732144B2

(12) United States Patent
Glas et al.

(10) Patent No.: US 10,732,144 B2
(45) Date of Patent: Aug. 4, 2020

(54) ELECTROCHEMICAL GAS SENSOR AND ELECTROLYTE FOR AN ELECTROCHEMICAL GAS SENSOR

(71) Applicant: Dräger Safety AG & Co. KGaA, Lübeck (DE)

(72) Inventors: Petra Glas, Stockelsdorf (DE); Peter Tschuncky, Lübeck (DE); Marie-Isabell Mattern-Frühwald, Bargteheide (DE); Susanne Kassa, Lübeck (DE); Christoph Bernstein, Lübeck (DE)

(73) Assignee: Dräger Safety AG & Co. KGaA (DE)

( * ) Notice: Subject to any disclaimer, the term of this patent is extended or adjusted under 35 U.S.C. 154(b) by 76 days.

(21) Appl. No.: 15/551,967

(22) PCT Filed: Feb. 19, 2016

(86) PCT No.: PCT/EP2016/000286
§ 371 (c)(1),
(2) Date: Aug. 18, 2017

(87) PCT Pub. No.: WO2016/131549
PCT Pub. Date: Aug. 25, 2016

(65) Prior Publication Data

US 2018/0031516 A1 Feb. 1, 2018

(30) Foreign Application Priority Data

Feb. 20, 2015 (DE) ........................ 10 2015 002 008

(51) Int. Cl.
*G01N 27/413* (2006.01)
*G01N 27/404* (2006.01)

(52) U.S. Cl.
CPC ....... *G01N 27/413* (2013.01); *G01N 27/4045* (2013.01)

(58) Field of Classification Search
CPC ...... G01N 27/406–4118; G01N 27/403–4045; G01N 27/28–32;
(Continued)

(56) References Cited

U.S. PATENT DOCUMENTS 5,041,204 A * 8/1991 Kuhn ................ G01N 27/4045 204/415
6,280,883 B1 8/2001 Lamanna et al.
(Continued)

FOREIGN PATENT DOCUMENTS

CA 2 124 113 C 11/2003
CN 1191629 A 8/1998
(Continued)

OTHER PUBLICATIONS

Triton X-100 SDS (Year: 2019).*
(Continued)

*Primary Examiner* — Bach T Dinh
(74) *Attorney, Agent, or Firm* — Design IP

(57) ABSTRACT

An electrochemical gas sensor (10) includes a housing (20) and with at least one electrode (21, 22). The housing (20) has a gas inlet (23). An at least strongly acidic, liquid electrolyte (30) is present in the gas sensor (10). The electrolyte (30) partly wets the electrode (21, 22). Provisions are made in such a gas sensor (10) for the electrolyte (30) to contain an additive that contains at least one surfactant. An electrolyte (30) is also provided for a gas sensor (10), which electrolyte (30) contains at least one surfactant as an additive.

9 Claims, 8 Drawing Sheets

(58) Field of Classification Search
CPC ........... G01N 27/33; G01N 27/34–401; G01N 27/413; G01N 27/4162; G01N 27/4166–419
USPC ................. 204/400–402, 409–429, 431–435
See application file for complete search history.

(56) References Cited

U.S. PATENT DOCUMENTS

| | | | | |
|---|---|---|---|---|
| 2002/0121438 A1* | 9/2002 | Saffell | G01N 27/404 | 204/415 |
| 2003/0064258 A1* | 4/2003 | Pan | H01M 8/04186 | 429/2 |
| 2007/0272553 A1* | 11/2007 | Gambert | G01N 27/404 | 204/431 |
| 2011/0318543 A1* | 12/2011 | Goto | B41M 5/0017 | 428/195.1 |

FOREIGN PATENT DOCUMENTS

| | | | |
|---|---|---|---|
| CN | 101803100 | A | 8/2010 |
| CN | 103515118 | A | 1/2014 |
| DE | 10 2005 020 719 | B3 | 9/2006 |
| DE | 10 2006 024 022 | A1 | 11/2007 |
| DE | 10 2009 017802 | A1 | 10/2010 |
| JP | 2010238598 | A | 10/2010 |
| WO | 96/38867 | A1 | 12/1996 |

OTHER PUBLICATIONS

Triton QS-44 (Year: 2019).*
O'Halloran G M et al: "The effect of additives on the adsorption properties of porous silicon", Sensors and Actuators A, Elsevier Sequoia S.A., Lausanne, CH, vo1. 61 No. 1-3, Jun. 1, 1997 (Jun. 1, 1997), pp. 415-420.
Jean-Louis Salager: "Laboratory of Formulation, Interfaces Rheology and Processes Mérida-Venezuela Version #2 (2002) FIRP Booklet # E300-A Surfactants Types and Uses FIRP Booklet # E300-A", Nanoparticles, Dec. 15, 2002 (Dec. 15, 2002), pp. 1-50.
Razaq M et al: "Perfluorosulfonimide as an Additive in Phosphorig Acid Fuel Cell",Journal of the Electrochemical Society, Electrochemical Society, Bd. 136, Nr. 2, 1. Feb. 1989 (Feb. 1, 1989), pp. 385-390, XP000174574,1SSN: 0013-4651.

* cited by examiner

ELECTROCHEMICAL GAS SENSOR AND ELECTROLYTE FOR AN ELECTROCHEMICAL GAS SENSOR

CROSS REFERENCE TO RELATED APPLICATIONS

This application is a United States National Phase Application of International Application PCT/EP2016/000286, filed Feb. 19, 2016, and claims the benefit of priority under 35 U.S.C. § 119 of German Application 10 2015 002 008.0, filed Feb. 20, 2015, the entire contents of which are incorporated herein by reference.

FIELD OF THE INVENTION

The present invention pertains to an electrochemical gas sensor with a housing and with at least two electrodes, wherein the housing has a gas inlet, wherein an acidic, liquid electrolyte is present in the gas sensor, and wherein the electrolyte partly wets the electrode and to an electrolyte for use in such an electrochemical gas sensor.

BACKGROUND OF THE INVENTION

Electrochemical gas sensors are generally known. They are typically used to detect various chemical components of gas mixtures.

The electrolyte used in the sensor is an essential component of such an electrochemical sensor. The electrolyte is in conductive contact with at least one anode and one cathode (electrodes). If the gas to be detected enters into the electrochemical sensor, a reaction typically takes place between the gas, the electrolyte and the material of the electrodes (electrode material). This reaction leads to a measurable current flow between the anode and the cathode of the sensor. This reaction takes place in electrochemical gas sensors at a so-called three-phase boundary, which is formed at the respective electrode (anode and/or cathode) from a solid phase, a liquid phase and a gaseous phase. The solid phase is typically the material of the electrode. The liquid phase is formed by the usually aqueous electrolyte. The gaseous phase is the gas mixture to be analyzed.

For example, DE 10 2005 020 719 B3 proposes in this connection an electrochemical gas sensor in which the electrodes are wetted with an electrolyte layer. The electrode surface is covered here with the electrolyte extensively but not completely. It is important in this connection that the respective electrode is neither flooded completely by electrolyte, nor does it dry out completely. However, in addition to the difficult manufacturability of such a system, a relatively high susceptibility to fluctuations in the humidity of the air also often arises as a problem in this connection. For example, relatively high humidity of the air may thus lead to an increase in the electrolyte layer thickness. This may even lead to a change in the conductivity of the electrolyte, for example, due to the absorption of water. Such a change in the conductivity is infrequently accompanied by a fluctuation in the measurement performance. The three-phase boundary necessary for the reaction may also increase or decrease now, which in turn may be associated fluctuations in the sensitivity of the sensor.

Wick systems, which make it possible to transport and store the electrolyte, are frequently used to avoid this. Excess electrolyte on the electrode surfaces can be removed here from the electrodes through the pore system of the wick. Conversely, additional electrolyte can be made available from the wick system in case of an electrolyte deficiency for the formation of an optimal three-phase boundary.

However, another problem is in this connection that the absorption of the electrolyte may be greatly inhibited by the frequently hydrophobic properties of the electrode surfaces or even of the wick material. The measurement properties of such a system are possibly greatly limited in certain areas of the surrounding area. The wetting of electrode surfaces plays a role in other technical fields as well. Thus, to improve the wetting of electrode surfaces in tetraethylammonium batteries, U.S. Pat. No. 6,280,883 B1 proposes the use of an electrolyte composition that contains a conductive salt, on the one hand, and a compound called surfactant salt, on the other hand. However, the goal is to cover the electrodes with electrolyte as rapidly and completely as possible during the manufacture.

SUMMARY OF THE INVENTION

Based on this, an object of the present invention is therefore to provide an improved electrochemical gas sensor. In particular, an improved electrolyte shall be provided for such an electrochemical gas sensor. Both the electrochemical gas sensor and the electrolyte shall be able to be manufactured as cost-effectively and simply as possible.

To accomplish this object, the present invention provides an electrochemical gas sensor as well as an electrolyte.

According to the invention, an electrochemical gas sensor is provided with a housing and with at least two electrodes. The housing has a gas inlet. An acidic, liquid electrolyte is present in the gas sensor. The electrolyte partly wets the electrode. The present invention makes provisions for the electrolyte to contain an additive, wherein the additive contains at least one surfactant.

An electrochemical gas sensor is typically an electrochemical cell according to the invention. The electrochemical cell has a housing, in which at least one working electrode and a counterelectrode are typically arranged. It is, of course, conceivable that the gas sensor also has more than two electrodes. The housing is filled at least partly with an electrolyte. The electrolyte may be contained either directly in the housing or in a wick system. The working electrode and the counterelectrode are arranged in the housing such that they are at least partly covered with the electrolyte. It is conceivable, for example, that the electrodes are part of the wick system or are directly in connection with same. It is also conceivable in an especially simple embodiment variant without wick system that the electrolyte is filled directly into the housing and the electrodes are at least partly dipped into the electrolyte. In any case, the gas inlet in the housing is used to enable the gas to be analyzed to enter into the gas sensor and to reach the electrode. It is frequently useful if the gas sensor has, in addition, a gas outlet, through which gases formed during the reaction or excess gases can again leave the housing. A pneumatic connection of the gas sensor to a pump system, which pumps a gas sample to be analyzed through the gas sensor, is also conceivable. It is, however, obviously also conceivable that excess gases can leave the gas sensor again through the gas inlet as well.

In addition, the electrochemical gas sensor may also have a wick system, which is used to transport the electrolyte to the electrodes as optimally as possible, so that it is ensured that the electrodes are always correspondingly wetted with the electrolyte. It is conceivable in this connection that the electrolyte is in contact exclusively with the wick system and with the wetted part of the electrode surfaces. It is favorable in this connection if the major part of the electrolyte is arranged in the wick system. The electrolyte is arranged indirectly in the housing in this case, namely, in the wick system, which is, in turn, arranged in the housing.

An electrolyte is typically a liquid medium (a liquid), which can develop an electrolytic conductivity based on the ions contained in the electrolyte. If a corresponding chemical reaction takes place in the electrochemical cell, an electrically conductive connection can be established between the electrodes by means of this electrolyte. Typical components of such an electrolyte are a solvent and a conductive salt. It is especially favorable if the electrolyte is an acidic liquid, i.e., an acidic, liquid medium. An acidic liquid (an acidic, liquid medium) is a liquid that can act as a proton donor. In a preferred embodiment variant, the electrolyte is an at least strongly acidic, liquid medium (at least strongly acidic liquid). An at least strongly acidic, liquid medium is defined here such that the liquid medium is either strongly acidic or very strongly acidic. It is thus seen that the electrolyte may be both a strongly acidic liquid and a very strongly acidic liquid. A strongly acidic liquid (strongly acidic, liquid medium) is typically a liquid with a pKs value of <3.75. A very strongly acidic liquid (very strongly acidic, liquid medium) is typically a liquid with a pKs value of <0. The electrolyte may be selected, for example, from the group containing $HClO_4$, HCl, $H_2SO_4$, $HNO_3$, $H_3PO_4$, HCOOH, preferably $HClO_4$ or $H_2SO_4$, as well as aqueous solutions with different concentrations and mixtures thereof. It is also conceivable that the electrolyte is selected from the group containing sulfurous acid, nitric acid and nitrous acid. In other words, the electrolyte may be selected from the group containing sulfuric acid, perchloric acid, sulfurous acid, hydrochloric acid, nitric acid, nitrous acid, phosphoric acid, as well as mixtures of the aforementioned acids. In a preferred embodiment variant, the electrochemical gas sensor is an electrochemical gas sensor with a housing and with at least two electrodes, wherein the housing has a gas inlet and a gas outlet, wherein an acidic—preferably strongly acidic or very strongly acidic—liquid electrolyte is present in the gas sensor, wherein the electrolyte wets the electrodes at least partly and wherein the electrolyte contains an additive, wherein the additive contains at least one surfactant. It is especially preferred if the liquid electrolyte is either sulfuric acid ($H_2SO_4$) or perchloric acid ($HClO_4$).

The electrodes may consist, for example, of a metallic material or of a carbon compound. It is also conceivable that the electrodes are applied to one or more polymer materials or to glass fibers or to ceramic compounds or the like, but polymer materials are preferred. The wick system may also consist of a polymer material. These polymer materials often have hydrophobic surfaces. It is especially advantageous if both the wick system and the electrodes and/or the carrier material of the electrodes have a certain porosity. The electrolyte may completely or partly fill the pores of the respective material.

It is especially favorable if the electrolyte partly wets the electrodes. A partial wetting is defined in connection with the present invention such that the electrolyte wets the surface of the electrode such that a three-phase boundary can form between the electrolyte, the electrode and a gas to be analyzed. In other words, the material of the electrode represents the solid phase of the three-phase boundary, and a section of the electrode surface, which is covered (wetted) with the liquid electrolyte adjoins a section of the electrode surface that is not covered with the liquid electrolyte but is directly in contact with the gas sample. The three-phase boundary will then develop at precisely the location at which these two sections of the electrode surface adjoin one another. It is thus seen that it is especially advantageous if the electrode is neither covered completely by a liquid film nor does to dry out completely.

A special advantage of the present invention is that the formation of the desired three-phase boundary can be facilitated and supported by the additive according to the present invention. The additive may also contribute to the three-phase boundary to remain stable after its establishment even under fluctuating ambient conditions. The loss of the electrolytic contact of the electrode with the electrochemical cell can be prevented, on the one hand, from being lost when the gas sensor is exposed, for example, to a very dry environment and/or when the electrolyte slightly dries up or dries out. On the other hand, it can be ensured that the analyte (the gas sample to be analyzed) can always come into sufficient contact with the electrode and with the electrolyte, so that the electrochemical reaction can take place reliably. Fluctuations in the environmental effects—for example, high temperatures or high humidity of the air—thus affect the stability of the three-phase boundary and hence the measuring quality of the electrochemical sensor to a very low extent. Another advantage of the additive according to the present invention is that an especially good transport of the electrolyte is also made possible within a wick system, if such a system is present, in the electrochemical sensor by means of the surfactant or surfactant contained in the additive.

An additive is defined in the sense of the present invention as a substance or a mixture of substances that is added to the electrolyte. The additive may either consist entirely of a single substance or be a mixture of a plurality of different substances. The additive is preferably suitable for mediating and regulating the wetting of the electrode surface. It is especially favorable in this connection if the additive contains a surfactant. A surfactant is typically an amphiphilic compound containing at least one hydrophobic moiety and a hydrophilic moiety, the hydrophobic group (hydrophobic moiety) is usually a hydrocarbon chain. As an alternative, the hydrophobic moiety may also be a dimethylsiloxane chain or a perfluorinated carbon chain. The hydrophilic group is typically either a negatively or positively charged (hydratable) head group. It is also conceivable that the head group is a neutral, polar head group.

It is favorable in this connection if the additive is not active electrochemically, i.e., the additive does not itself participate in the redox processes in the electrochemical cell. It is preferably neither oxidized nor reduced, and no current flow is triggered by it over the electrode. In particular, the surfactant does not participate in the electrochemical reaction that takes place in the electrochemical cell, i.e., the gas sensor. In addition, it is favorable if the additive and especially the surfactant is chemically inert. The surfactant is advantageously configured such that it can influence the viscosity and the surface tension of the electrolyte and can thus modify the creeping capacity—i.e., the ability to penetrate into pores—of the electrolyte in question. The surfactant can be used in this manner, for example, to improve the creeping of the electrolyte into pores of the electrode material and of the wick system.

It is conceivable in a first embodiment variant that the additive consists entirely of the surfactant. As an alternative, it is also conceivable that the additive is a mixture of a plurality of components, wherein at least one component is a surfactant. Such a mixture may also contain various other substances in addition to the surfactant. It is also conceivable that the mixture contains a plurality of different surfactants.

It is, of course, also conceivable that the mixture contains both a plurality of different surfactants and additional other substances, which cannot be classified as belonging to the surfactants.

It is conceivable in another embodiment variant that at least one surfactant is a halogenated surfactant, preferably a fluorinated surfactant. A halogenated surfactant is a surfactant that contains at least one atom from the seventh main group of the Periodic Table, especially at least one atom that is selected from the group containing F, Cl, Br, and I. Especially preferred are fluorinated surfactants, i.e., surfactant that contains at least one fluorine atom. However, chlorinated surfactants are, of course, also conceivable. For example, the surfactant may contain at least one polyfluorinated or perfluorinated alkyl chain. A perfluorinated alkyl chain is defined in the sense of the present invention as an alkyl chain in which all hydrogen atoms are replaced by fluorine atoms. A polyfluorinated alkyl chain is defined in the sense of the present invention as an alkyl chain in which two or more, but not all hydrogen atoms are replaced by fluorine atoms. It is also conceivable that the fluorinated surfactant contains a monofluorinated alkyl chain, i.e., an alkyl chain in which a hydrogen atom is replaced by a fluorine atom. It is preferred if the fluorinated surfactant is a surfactant with a polyfluorinated or monofluorinated alkyl chain. Polyfluorinated surfactants are especially favorable. For example, the hydrophobic moiety of the surfactant may be configured as a polyfluorinated alkyl chain. If the surfactant is a fluorinated surfactant, for example, the chemical inertness of the electrolyte additives to concentrated acids and to oxidative stress can be ensured especially well. It is necessary, especially if the electrolyte consists, for example, of sulfuric acid, that the additive have this inertness and not be decomposed or reacted by the electrolyte.

It is conceivable in another embodiment variant that at least one surfactant is a halogen-free surfactant, preferably a fluorine-free surfactant. A special advantage of halogen-free, especially fluorine-free surfactants is that they frequently have better biodegradability than, for example, fluorinated compounds. A halogen-free surfactant is a surfactant that contains no atoms of the seventh main group. A fluorine-free surfactant is a surfactant that contains no fluorine atoms.

If the additive is a mixture of different surfactants, or if the additive contains a plurality of different surfactants, it is also conceivable in one variant that the additive contains both halogenated and halogen-free surfactants.

In any case, it is advantageous if at least one surfactant contains a counterion, which is selected from among heterocyclic cations, ammonium ions, $H^+$ ions, alkali or alkaline earth ions, $HSO_4^-$ ions or $H_2PO_4^-$ ions, $CF_3—SO_3^-$ ions, $C_2F_4HSO_3^-$ ions, $CF_3—COO^-$ ions, and $(F_3C—SO_2)_2N^-$ ions. It is favorable in this connection that the counterion be selected from the group containing hydrogen sulfate ($HSO_4^-$ ions) and dihydrogen phosphate ($H_2PO_4^-$ ions), if the surfactant is a cationic surfactant. It is further advantageous that the counterion be selected from the group containing heterocyclic cations, ammonium ions, alkali or alkaline earth ions if the surfactant is an anionic surfactant. For example, the counterion to an anionic surfactant may be selected from among pyridinium ions, $H^+$ ions, $NH_4^+$ ions, primary ammonium ions, secondary ammonium ions, tertiary ammonium ions, quaternary ammonium ions, $Na^+$, $K^+$ or $Li^+$ ions. It is thus seen that the ammonium ions used as counterions may be both ammonium ions in the strict sense, i.e., compounds according to the formula $NH_4^+$, and primary, secondary, tertiary or quaternary ammonium ions. Primary ammonium ions are preferably mono-alkylammonium ions. Secondary ammonium ions are preferably di-alkylammonium ions. Tertiary ammonium ions are preferably tri-alkylammonium ions. Quaternary ammonium ions are preferably tetraalkylammonium ions. The alkyl groups of the respective ammonium ions may have—independently from one another—a length of 1, 2, 3, 4, 5 or 6 carbon atoms. For example, tetraethylammonium ($(CH_3—CH_2)_4N^+$) is thus conceivable as a quaternary ammonium ion. Tetramethylammonium, trimethylammonium, dimethylammonium, tetrapropylammonium, tripropylammonium, tetrabutylammonium and/or tributylammonium are also conceivable, as an alternative, but, of course, not exhaustively. In any case, ammonium ions according to the present invention correspond to the general formula $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. A primary ammonium ion is defined here as a compound for which three of the variable s, p, q, r have the value 0 and the fourth is selected from {1, 2, 3, 4, 5, 6}. A secondary ammonium ion is defined as a compound for which two of the variables s, p, q, r have the value 0 and the other two are selected independently from one another from {1, 2, 3, 4, 5, 6}. A tertiary ammonium ion is defined as a compound for which one of the variables s, p, q, r has the value 0 and the other three are selected independently from one another from {1, 2, 3, 4, 5, 6}. The alkyl chains may, furthermore, also be poly- or perhalogenated alkyl chains.

Pyridinium ions, which are used as counterion for an anionic surfactant, may be either substituted or unsubstituted pyridinium ions.

Further conceivable heterocyclic cations are heterocyclic rings with a ring size of 3, 4, 5, 6, 7, 8 or 9 ring atoms, wherein the ring atoms are carbon atoms and wherein at least one of the carbon ring atoms is replaced by a hetero atom, which is selected from among nitrogen, oxygen, sulfur or phosphorus. Heterocyclic ring systems that consist of two such heterocyclic rings linked to one another are also conceivable. For example, it is conceivable that the heterocyclic cation is selected from the group containing aziridinium ions, oxiranium ions, thiiranium ions, azirinium ions, oxireneium ions, thiirenium ions, azetidinium ions, oxetanium ions, theitanium ions, azetium ions, oxetium ions, thietium ions, azolidninium ions, oxolanium ions, thiolanium ions, azolium ions, oxolium ions, thiolium ions, azinanium ions, oxanium ions, thianium ions, azinium ions, oxinium ions, thiinium ions, azepanium ions, oxepanium ions, thepanium ions, azepinium ions, oxepinium ions, thiepinium ions, pyrazolium ions, imidazolium ions, benzimidalium ions, imidazolinium ions, indolium ions, quinolinium ions, isoquinolinium ions, purinium ions, pyrimidinium ions, oxazolium ions, thiazolium ions, thiazinium ions, and preferably pyridinium ions. However, other counterions are, of course, also conceivable. If the additive contains a plurality of different surfactants, it is, of course, conceivable that all surfactants have the same counterion and also that the surfactants have different counterions.

It is conceivable in the sense of the present invention that at least one of the surfactants is an anionic surfactant. An anionic surfactant is, for example, a surfactant that has a negatively charged head group. For example, such a surfactant may contain a carbonate, sulfate, phosphate or sulfonate group as the head group. Typical representatives of such anionic surfactants are soaps, alkylbenzene sulfonates, alkyl sulfonates, alkyl sulfate as well as alkyl ether sulfates. It is also conceivable that the additive has a sulfonic acid, especially an alkylsulfonic acid, as a surfactant. It is conceivable in this connection, especially in an aqueous medium, that the sulfonic acid group forms the head group of the surfactant and is deprotonated in a suitable medium, so that it occurs as an anionic alkyl sulfonate with an $H^{\pm}$ ion as the counterion. It thus proved to be especially advantageous in this connection if at least one surfactant is an alkyl sulfonate. Alkyl sulfonates typically consist of a linear alkyl chain, with which a sulfonate group is terminally coupled. It is especially favorable in this connection if the alkyl chain of the alkyl sulfonate has a length of 1, 2, 3, 4, 5, 6, 7, 8, 9, 10, 11, 12, 13, 14, 15, 16, 17, 18 carbon atoms, preferably 4, 5, 6, 7, 8, 9, 10, 11, 12 carbon atoms. Furthermore, it is advantageous if at least one surfactant contains a counterion that is selected from among heterocyclic cations, $H^+$, $Na^+$ ions, $K^+$ ions, $Li^+$ ions or $((C_sH_{2s+1})(C_pH_{2p+1})(C_qH_{2q+1})(C_rH_{2r+1}))N^+$ ions, in which s={0, 1, 2, 3, 4, 5, 6}, q={0, 1, 2, 3, 4, 5, 6}, and r={0, 1, 2, 3, 4, 5, 6}.

Such an anionic surfactant may be both a fluorinated—poly- or perfluorinated—surfactant and a halogen-free—especially fluorine-free—surfactant. Perfluorinated compounds may be, for example, perfluorobutanesulfonic acid, perfluoropentanesulfonic acid, perfluorohexanesulfonic acid, perfluorooctane sulfone acid, perfluorononanesulfonic acid, perfluorodecanesulfonic acid, perfluoroundecanesulfonic acid, perfluorododecanesulfonic acid, or the corresponding sulfonates, i.e., salts of these acids.

At least one surfactant according to the present invention is therefore a surfactant corresponding to Formula I in one exemplary embodiment:

$$(C_nF_{(2n+1)-m}H_m—SO_3^-)R1 \qquad \text{Formula I}$$

in which n={1, 2, 3, 4, 5, 6, 7, 8, 9, 10, 11, 12}, m={0, 1, 2, 3, 4, 5, 6, 7, 8, 9, 10, 11, 12, 13, 14, 15, 16, 17, 18, 19, 20, 21, 22, 23, 24, 25}, R1 is selected from the group $H^+$, $Na^+$, $K^+$, $Li^+$, as well as $((C_sH_{2s+1})(C_pH_{2p+1})(C_qH_{2q+1})(C_rH_{2r+1}))N^+$ ions, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. Preferred are n={4, 5, 6, 7, 8, 9, 10, 11, 12} and m={0, 1, 2, 3, 4, 5, 6, 7, 8, 9, 10, 11, 12, 13}. Also preferred is s=p=q=r with s={0, 1, 2, 3, 4}, and especially preferred is s=p=q=r with s={1, 2, 3}.

If the anionic surfactant is a fluorinated surfactant, it proved to be advantageous if at least one surfactant is a polyfluoro-alkyl-sulfonic acid or the salt of a polyfluoro-alkyl-sulfonic acid. It is conceivable in any case that the surfactant is a surfactant containing 1, 2, 3, 4, 5, 6, 7, 8, 9, 10, 11, 12, 13, 14, 15, 16, 17, 18, 19, 20, 21, 22, 23, 24 or 25 fluorine atoms. Preferred is a polyfluoro-alkyl-sulfonic acid containing 1, 2, 3, 4, 5, 6, 7, 8, 9, 10, 11, 12, 13, 14, 15, 16 or 17 fluorine atoms. The alkyl chain of the polyfluoro-alkyl-sulfonic acid or of the polyfluoro-alkyl sulfonate may have a length of 1, 2, 3, 4, 5, 6, 7, 8, 9, 10, 11 or 12 carbon atoms. If the surfactant occurs as a salt, it is conceivable, for example, that at least one surfactant is a polyfluoro-alkyl sulfonate with a counterion that is selected from $H^+$, $Na^+$, $K^+$, $Li^+$, $NH_4^+$ and primary, secondary, tertiary or quaternary ammonium ions. The primary, secondary, tertiary or quaternary ammonium ions correspond here, as was already described above, to the formula $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. It is conceivable, for example, that the surfactant is a polyfluoro-alkyl-sulfonic acid containing 1, 2, 3, 4, 5 or 6 fluorine atoms, for example, hexafluoroalkyl-2-methylsulfonic acid.

It is also conceivable that the surfactant is a polyfluoro-alkyl-sulfonic acid containing 6, 7, 8, 9, 10, 11, 12, 13, 14 or 15 fluorine atoms, for example, tridecafluorooctylsulfonic acid. It is thus also conceivable that the surfactant is a polyfluorooctyl sulfonate with a counterion that is selected from among $H^+$, $Na^+$ ions, $K^+$ ions, $Li^+$ ions, tetraalkylammonium ions, trialkylammonium ions or dialkylammonium ions, especially selected from among $H^+$, $Na^+$ ions, $K^+$ ions, $Li^+$ ions or $(CH_3—CH_2)_4N^+$ ions.

Perfluorooctylsulfonic acid is also conceivable as a surfactant in yet another embodiment variant.

In any case, a poly- or perfluorinated anionic surfactant according to the present invention may be a compound corresponding to the formula $(C_nF_{(2n+1)-m}H_m—SO_3^-)Na^+$, in which n and m are defined as above, preferably n={4, 5, 6, 7, 8, 9, 10, 11, 12}, namely, a compound that is selected from the group containing: Sodium butylmonofluorobutyl sulfonate, sodium difluorobutyl sulfonate, sodium trifluorobutyl sulfonate, sodium tetrafluorobutyl sulfonate, sodium pentafluorobutyl sulfonate, sodium hexafluorobutyl sulfonate, sodium heptafluorobutyl sulfonate, sodium octafluorobutyl sulfonate, sodium nonafluorobutyl sulfonate, sodium monofluoropentyl sulfonate, sodium difluoropentyl sulfonate, sodium trifluoropentyl sulfonate, sodium tetrafluoropentyl sulfonate, sodium pentafluoropentyl sulfonate, sodium hexafluoropentyl sulfonate, sodium heptafluoropentyl sulfonate, sodium octafluoropentyl sulfonate, sodium nonafluoropentyl sulfonate, sodium decafluoropentyl sulfonate, sodium undecafluoropentyl sulfonate, sodium monofluorohexyl sulfonate, sodium difluorohexyl sulfonate, sodium trifluorohexyl sulfonate, sodium tetrafluorohexyl sulfonate, sodium pentafluorohexyl sulfonate, sodium hexafluorohexyl sulfonate, sodium heptafluorohexyl sulfonate, sodium octafluorohexyl sulfonate, sodium nonafluorohexyl sulfonate, sodium decafluorohexyl sulfonate, sodium undecafluorohexyl sulfonate, sodium dodecafluorohexyl sulfonate, sodium tridecafluorohexyl sulfonate, sodium monofluoroheptyl sulfonate, sodium difluoroheptyl sulfonate, sodium trifluoroheptyl sulfonate, sodium tetrafluoroheptyl sulfonate, sodium pentafluoroheptyl sulfonate, sodium hexafluoroheptyl sulfonate, sodium heptafluoroheptyl sulfonate, sodium octafluoroheptyl sulfonate, sodium nonafluoroheptyl sulfonate, sodium decafluoroheptyl sulfonate, sodium undecafluoroheptyl sulfonate, sodium dodecafluoroheptyl sulfonate, sodium tridecafluoroheptyl sulfonate, sodium tetradecafluoroheptyl sulfonate, sodium pentadecafluoroheptyl sulfonate, sodium monofluorooctyl sulfonate, sodium difluorooctyl sulfonate, sodium trifluorooctyl sulfonate, sodium tetrafluorooctyl sulfonate, sodium pentafluorooctyl sulfonate, sodium hexafluorooctyl sulfonate, sodium heptafluorooctyl sulfonate, sodium octafluorooctyl sulfonate, sodium nonafluorooctyl sulfonate, sodium decafluorooctyl sulfonate, sodium undecafluorooctyl sulfonate, sodium dodecafluorooctyl sulfonate, sodium tridecafluorooctyl sulfonate, sodium tetradecafluorooctyl sulfonate, sodium pentadecafluorooctyl sulfonate, sodium hexadecafluorooctyl sulfonate, sodium heptadecafluorooctyl sulfonate, sodium monofluorononyl sulfonate, sodium difluorononyl sulfonate, sodium trifluorononyl sulfonate, sodium tetrafluorononyl sulfonate, sodium pentafluorononyl sulfonate, sodium hexafluorononyl sulfonate, sodium heptafluorononyl sulfonate, sodium octafluorononyl sulfonate, sodium nonafluorononyl sulfonate, sodium decafluorononyl sulfonate, sodium undecafluorononyl sulfonate, sodium dodecafluorononyl sulfonate, sodium tridecafluorononyl sulfonate, sodium tetradecafluorononyl sulfonate, sodium pentadecafluorononyl sulfonate, sodium hexadecafluorononyl sulfonate, sodium heptadecafluorononyl sulfonate, sodium octadecafluorononyl sulfonate, sodium nonadecafluorononyl sulfonate, sodium monofluorodecyl sulfonate, sodium difluorodecyl sulfonate, sodium trifluorodecyl sulfonate, sodium tetrafluorodecyl sulfonate, sodium pentafluorodecyl sulfonate, sodium hexafluorodecyl sulfonate, sodium heptafluorodecyl sulfonate, sodium octafluorodecyl sulfonate, sodium nonafluorodecyl sulfonate, sodium decafluorodecyl sulfonate, sodium undecafluorodecyl sulfonate, sodium dodecafluorodecyl sulfonate, sodium tridecafluorodecyl sulfonate, sodium tetradecafluorodecyl sulfonate, sodium pentadecafluorodecyl sulfonate, sodium hexadecafluorodecyl sulfonate, sodium heptadecafluorodecyl sulfonate, sodium octadecafluorodecyl sulfonate, sodium nonadecafluorodecyl sulfonate, sodium eicosafluorodecyl sulfonate, sodium heneicosafluorodecyl sulfonate, sodium monofluoroundecyl sulfonate, sodium difluoroundecyl sulfonate, sodium trifluoroundecyl sulfonate, sodium tetrafluoroundecyl sulfonate, sodium pentafluoroundecyl sulfonate, sodium hexafluoroundecyl sulfonate, sodium heptafluoroundecyl sulfonate, sodium octafluoroundecyl sulfonate, sodium nonafluoroundecyl sulfonate, sodium decafluoroundecyl sulfonate, sodium undecafluoroundecyl sulfonate, sodium dodecafluoroundecyl sulfonate, sodium tridecafluoroundecyl sulfonate, sodium tetradecafluoroundecyl sulfonate, sodium pentadecafluoroundecyl sulfonate, sodium hexadecafluoroundecyl sulfonate, sodium heptadecafluoroundecyl sulfonate, sodium octadecafluoroundecyl sulfonate, sodium nonadecafluoroundecyl sulfonate, sodium eicosafluoroundecyl sulfonate, sodium heneicosafluoroundecyl sulfonate, sodium docosafluoroundecyl sulfonate, sodium tricosafluoroundecyl sulfonate, sodium monofluorododecyl sulfonate, sodium difluorododecyl sulfonate, sodium trifluorododecyl sulfonate, sodium tetrafluorododecyl sulfonate, sodium pentafluorododecyl sulfonate, sodium hexafluorododecyl sulfonate, sodium heptafluorododecyl sulfonate, sodium octafluorododecyl sulfonate, sodium nonafluorododecyl sulfonate, sodium decafluorododecyl sulfonate, sodium undecafluorododecyl sulfonate, sodium dodecafluorododecyl sulfonate, sodium tridecafluorododecyl sulfonate, sodium tetradecafluorododecyl sulfonate, sodium pentadecafluorododecyl sulfonate, sodium hexadecafluorododecyl sulfonate, sodium heptadecafluorododecyl sulfonate, sodium octadecafluorododecyl sulfonate, sodium nonadecafluorododecyl sulfonate, sodium eicosafluorododecyl sulfonate, sodium heneicosafluorododecyl sulfonate, sodium docosafluorododecyl sulfonate, sodium tricosafluorododecyl sulfonate, sodium tetracosafluorododecyl sulfonate, and sodium pentacosafluorodedecyl sulfonate.

It is also conceivable that a poly- or perfluorinated anionic surfactant according to the present invention is a compound corresponding to the formula $(C_nF_{(2n+1)-m}H_m—SO_3^-)K^+$, in which n and m are defined as above, preferably n={4, 5, 6, 7, 8, 9, 10, 11, 12}, namely, a compound that is selected from the group containing: Potassium monofluorobutyl sulfonate, potassium difluorobutyl sulfonate, potassium trifluorobutyl sulfonate, potassium tetrafluorobutyl sulfonate, potassium pentafluorobutyl sulfonate, potassium hexafluorobutyl sulfonate, potassium heptafluorobutyl sulfonate, potassium octafluorobutyl sulfonate, potassium nonafluorobutyl sulfonate, potassium monofluoropentyl sulfonate, potassium difluoropentyl sulfonate, potassium trifluoropentyl sulfonate, potassium tetrafluoropentyl sulfonate, potassium pentafluoropentyl sulfonate, potassium hexafluoropentyl sulfonate, potassium heptafluoropentyl sulfonate, potassium octafluoropentyl sulfonate, potassium nonafluoropentyl sulfonate, potassium decafluoropentyl sulfonate, potassium undecafluoropentyl sulfonate, potassium monofluorohexyl sulfonate, potassium difluorohexyl sulfonate, potassium trifluorohexyl sulfonate, potassium tetrafluorohexyl sulfonate, potassium pentafluorohexyl sulfonate, potassium hexafluorohexyl sulfonate, potassium heptafluorohexyl sulfonate, potassium octafluorohexyl sulfonate, potassium nonafluorohexyl sulfonate, potassium decafluorohexyl sulfonate, potassium undecafluorohexyl sulfonate, potassium dodecafluorohexyl sulfonate, potassium tridecafluorohexyl sulfonate, potassium monofluoroheptyl sulfonate, potassium difluoroheptyl sulfonate, potassium trifluoroheptyl sulfonate, potassium tetrafluoroheptyl sulfonate, potassium pentfluoroheptyl sulfonate, potassium hexafluoroheptyl sulfonate, potassium heptafluoroheptyl sulfonate, potassium octafluoroheptyl sulfonate, potassium nonafluoroheptyl sulfonate, potassium decafluoroheptyl sulfonate, potassium undecafluoroheptyl sulfonate, potassium dodecafluoroheptyl sulfonate, potassium tridecafluoroheptyl sulfonate, potassium tetradecafluoroheptyl sulfonate, potassium pentadecafluoroheptyl sulfonate, potassium monofluorooctyl sulfonate, potassium difluorooctyl sulfonate, potassium trifluorooctyl sulfonate, potassium tetrafluorooctyl sulfonate, potassium pentafluorooctyl sulfonate, potassium hexafluorooctyl sulfonate, potassium heptafluorooctyl sulfonate, potassium octafluorooctyl sulfonate, potassium nonafluorooctyl sulfonate, potassium decafluorooctyl sulfonate, potassium undecafluorooctyl sulfonate, potassium dodecafluorooctyl sulfonate, potassium tridecafluorooctyl sulfonate, potassium tetradecafluorooctyl sulfonate, potassium pentadecafluorooctyl sulfonate, potassium hexadecafluorooctyl sulfonate, potassium heptadecafluorooctyl sulfonate, potassium monofluorononyl sulfonate, potassium difluorononyl sulfonate, potassium trifluorononyl sulfonate, potassium tetrafluorononyl sulfonate, potassium pentafluorononyl sulfonate, potassium hexafluorononyl sulfonate, potassium heptafluorononyl sulfonate, potassium octafluorononyl sulfonate, potassium nonafluorononyl sulfonate, potassium decafluorononyl sulfonate, potassium undecafluorononyl sulfonate, potassium dodecafluorononyl sulfonate, potassium tridecafluorononyl sulfonate, potassium tetradecafluorononyl sulfonate, potassium pentadecafluorononyl sulfonate, potassium hexadecafluorononyl sulfonate, potassium heptadecafluorononyl sulfonate, potassium octadecafluorononyl sulfonate, potassium nonadecafluorononyl sulfonate, potassium monofluorodecyl sulfonate, potassium difluorodecyl sulfonate, potassium trifluorodecyl sulfonate, potassium tetrafluorodecyl sulfonate, potassium pentafluorodecyl sulfonate, potassium hexafluorodecyl sulfonate, potassium heptafluorodecyl sulfonate, potassium octafluorodecyl sulfonate, potassium nonafluorodecyl sulfonate, potassium decafluorodecyl sulfonate, potassium undecafluorodecyl sulfonate, potassium dodecafluorodecyl sulfonate, potassium tridecafluorodecyl sulfonate, potassium tetradecafluorodecyl sulfonate, potassium pentadecafluorodecyl sulfonate, potassium hexadecafluorodecyl sulfonate, potassium heptadecafluorodecyl sulfonate, potassium octadecylfluorodecyl sulfonate, potassium nonadecafluorodecyl sulfonate, potassium eicosafluorodecyl sulfonate, potassium heneicosafluorodecyl sulfonate, potassium monofluoroundecyl sulfonate, potassium difluoroundecyl sulfonate, potassium trifluoroundecyl sulfonate, potassium tetrafluoroundecyl sulfonate, potassium pentafluoroundecyl sulfonate, potassium hexafluoroundecyl sulfonate, potassium heptafluoroundecyl sulfonate, potassium octafluoroundecyl sulfonate, potassium nonafluoroundecyl sulfonate, potassium decafluoroundecyl sulfonate, potassium undecafluoroundecyl sulfonate, potassium dodecafluoroundecyl sulfonate, potassium tridecafluoroundecyl sulfonate, potassium tetradecafluoroundecyl sulfonate, potassium pentadecafluoroundecyl sulfonate, potassium hexadecafluoroundecyl sulfonate, potassium heptadecafluoroundecyl sulfonate, potassium octadecafluoroundecyl sulfonate, potassium nonadecafluoroundecyl sulfonate, potassium eicosafluoroundecyl sulfonate, potassium heneicosafluoroundecyl sulfonate, potassium docosafluoroundecyl sulfonate, potassium tricosafluoroundecyl sulfonate, potassium monofluorododecyl sulfonate, potassium difluorododecyl sulfonate, potassium trifluorododecyl sulfonate, potassium tetrafluorododecyl sulfonate, potassium pentafluorododecyl sulfonate, potassium hexafluorododecyl sulfonate, potassium heptafluorododecyl sulfonate, potassium octafluorododecyl sulfonate, potassium nonafluorododecyl sulfonate, potassium decafluorododecyl sulfonate, potassium undecafluorododecyl sulfonate, potassium dodecafluorododecyl sulfonate, potassium tridecafluorododecyl sulfonate, potassium tetradecafluorododecyl sulfonate, potassium pentadecafluorododecyl sulfonate, potassium hexadecafluorododecyl sulfonate, potassium heptadecafluorododecyl sulfonate, potassium octadecafluorododecyl sulfonate, potassium nonadecafluorododecyl sulfonate, potassium eicosafluorododecyl sulfonate, potassium heneicosafluorododecyl sulfonate, potassium docosafluorododecyl sulfonate, potassium tricosafluorododecyl sulfonate, potassium tetracosafluorododecyl sulfonate, and potassium pentacosafluorododecyl sulfonate.

Furthermore, it is conceivable that the poly- or perfluorinated anionic surfactant according to the present invention is a compound corresponding to the formula $(C_nF_{(2n+1)-m}H_m—SO_3^-)Li^+$, in which n and m are defined as above, preferably n={4, 5, 6, 7, 8, 9, 10, 11, 12}, namely, a compound that is selected from the group containing lithium monofluorobutyl sulfonate, lithium difluorobutyl sulfonate, lithium trifluorobutyl sulfonate, lithium tetrafluorobutyl sulfonate, lithium pentafluorobutyl sulfonate, lithium hexafluorobutyl sulfonate, lithium heptafluorobutyl sulfonate, lithium octafluorobutyl sulfonate, lithium nonafluorobutyl sulfonate, lithium monofluoropentyl sulfonate, lithium difluoropentyl sulfonate, lithium trifluoropentyl sulfonate, lithium tetrafluoropentyl sulfonate, lithium pentafluoropentyl sulfonate, lithium hexafluoropentyl sulfonate, lithium heptafluoropentyl sulfonate, lithium octafluoropentyl sulfonate, lithium nonafluoropentyl sulfonate, lithium decafluoropentyl sulfonate, lithium undecafluoropentyl sulfonate, lithium monofluorohexyl sulfonate, lithium difluorohexyl sulfonate, lithium trifluorohexyl sulfonate, lithium tetrafluorohexyl sulfonate, lithium pentafluorohexyl sulfonate, lithium hexafluorohexyl sulfonate, lithium heptafluorohexyl sulfonate, lithium octafluorohexyl sulfonate, lithium nonafluorohexyl sulfonate, lithium decafluorohexyl sulfonate, lithium undecafluorohexyl sulfonate, lithium dodecafluorohexyl sulfonate, lithium tridecafluorohexyl sulfonate, lithium monofluoroheptyl sulfonate, lithium difluoroheptyl sulfonate, lithium trifluoroheptyl sulfonate, lithium tetrafluoroheptyl sulfonate, lithium pentafluoroheptyl sulfonate, lithium hexafluoroheptyl sulfonate, lithium heptafluoroheptyl sulfonate, lithium octafluoroheptyl sulfonate, lithium nonafluoroheptyl sulfonate, lithium decafluoroheptyl sulfonate, lithium undecafluoroheptyl sulfonate, lithium dodecafluoroheptyl sulfonate, lithium tridecafluoroheptyl sulfonate, lithium tetradecafluoroheptyl sulfonate, lithium pentadecafluoroheptyl sulfonate, lithium monofluorooctyl sulfonate, lithium difluorooctyl sulfonate, lithium trifluorooctyl sulfonate, lithium tetrafluorooctyl sulfonate, lithium pentafluorooctyl sulfonate, lithium hexafluorooctyl sulfonate, lithium heptafluorooctyl sulfonate, lithium octafluorooctyl sulfonate, lithium nonafluorooctyl sulfonate, lithium decafluorooctyl sulfonate, lithium undecafluorooctyl sulfonate, lithium dodecafluorooctyl sulfonate, lithium tridecafluorooctyl sulfonate, lithium tetradecafluorooctyl sulfonate, lithium pentadecafluorooctyl sulfonate, lithium hexadecafluorooctyl sulfonate, lithium heptadecafluorooctyl sulfonate, lithium monofluorononyl sulfonate, lithium difluorononyl sulfonate, lithium trifluorononyl sulfonate, lithium tetrafluorononyl sulfonate, lithium pentafluorononyl sulfonate, lithium hexafluorononyl sulfonate, lithium heptafluorononyl sulfonate, lithium octafluorononyl sulfonate, lithium nonafluorononyl sulfonate, lithium decafluorononyl sulfonate, lithium undecafluorononyl sulfonate, lithium dodecafluorononyl sulfonate, lithium tridecafluorononyl sulfonate, lithium tetradecafluorononyl sulfonate, lithium pentadecafluorononyl sulfonate, lithium hexadecafluorononyl sulfonate, lithium heptadecafluorononyl sulfonate, lithium octadecafluorononyl sulfonate, lithium nonadecafluorononyl sulfonate, lithium monofluorodecyl sulfonate, lithium difluorodecyl sulfonate, lithium trifluorodecyl sulfonate, lithium tetrafluorodecyl sulfonate, lithium pentafluorodecyl sulfonate, lithium hexafluorodecyl sulfonate, lithium heptafluorodecyl sulfonate, lithium octafluorodecyl sulfonate, lithium nonafluorodecyl sulfonate, lithium decafluorodecyl sulfonate, lithium undecafluorodecyl sulfonate, lithium dodecafluorodecyl sulfonate, lithium tridecafluorodecyl sulfonate, lithium tetradecafluorodecyl sulfonate, lithium pentadecafluorodecyl sulfonate, lithium hexadecafluorodecyl sulfonate, lithium heptadecafluorodecyl sulfonate, lithium octadecafluorodecyl sulfonate, lithium nonadecafluorodecyl sulfonate, lithium eicosafluorodecyl sulfonate, lithium heniecosafluorodecyl sulfonate, lithium monofluoroundecyl sulfonate, lithium difluoroundecyl sulfonate, lithium trifluoroundecyl sulfonate, lithium tetrafluoroundecyl sulfonate, lithium pentafluoroundecyl sulfonate, lithium hexafluoroundecyl sulfonate, lithium heptafluoroundecyl sulfonate, lithium octafluoroundecyl sulfonate, lithium nonafluoroundecyl sulfonate, lithium decafluoroundecyl sulfonate, lithium undecafluoroundecyl sulfonate, lithium dodecafluoroundecyl sulfonate, lithium tridecafluoroundecyl sulfonate, lithium tetradecafluoroundecyl sulfonate, lithium pentadecafluoroundecyl sulfonate, lithium hexadecafluoroundecyl sulfonate, lithium heptadecafluoroundecyl sulfonate, lithium octadecafluoroundecyl sulfonate, lithium nonadecaundecyl sulfonate, lithium nonadecafluoroundecyl sulfonate, lithium eicosafluoroundecyl sulfonate, lithium heneicosafluoroundecyl sulfonate, lithium docosafluoroundecyl sulfonate, lithium tricosafluoroundecyl sulfonate, lithium monofluorododecyl sulfonate, lithium difluorododecyl sulfonate, lithium trifluorododecyl sulfonate, lithium tetrafluorododecyl sulfonate, lithium pentafluorododecyl sulfonate, lithium hexafluorododecyl sulfonate, lithium heptafluorododecyl sulfonate, lithium octafluorododecyl sulfonate, lithium nonafluorododecyl sulfonate, lithium decafluorododecyl sulfonate, lithium undecafluorododecyl sulfonate, lithium dodecafluorododecyl sulfonate, lithium tridecafluorododecyl sulfonate, lithium tetradecafluorododecyl sulfonate, lithium pentadecafluorododecyl sulfonate, lithium hexadecafluorododecyl sulfonate, lithium heptadecafluorododecyl sulfonate, lithium octadecafluorododecyl sulfonate, lithium nonadecafluorododecyl sulfonate, lithium eicosafluorododecyl sulfonate, lithium heneicosafluorododecyl sulfonate, lithium docosafluorododecyl sulfonate, lithium tricosafluorododecyl sulfonate, lithium tetracosafluorododecyl sulfonate, and lithium pentacosafluorododecyl sulfonate.

It is, furthermore, conceivable that the poly- or perfluorinated anionic surfactant according to the present invention is a compound corresponding to the formula $(C_nF_{(2n+1)-m}H_m—SO_3^+)((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, in which n and m are defined as above, preferably n={4, 5, 6, 7, 8, 9, 10, 11, 12}, for example, a compound that is selected from the group containing ammonium monofluorobutyl sulfonate, ammonium difluorobutyl sulfonate, ammonium trifluorobutyl sulfonate, ammonium tetrafluorobutyl sulfonate, ammonium pentafluorobutyl sulfonate, ammonium hexafluorobutyl sulfonate, ammonium heptafluorobutyl sulfonate, ammonium octafluorobutyl sulfonate, ammonium nonafluorobutyl sulfonate, ammonium monofluoropentyl sulfonate, ammonium difluoropentyl sulfonate, ammonium trifluoropentyl sulfonate, ammonium tetrafluoropentyl sulfonate, ammonium pentafluoropentyl sulfonate, ammonium hexafluoropentyl sulfonate, ammonium heptafluoropentyl sulfonate, ammonium octafluoropentyl sulfonate, ammonium nonafluoropentyl sulfonate, ammonium decafluoropentyl sulfonate, ammonium undecafluoropentyl sulfonate, ammonium monofluorohexyl sulfonate, ammonium difluorohexyl sulfonate, ammonium trifluorohexyl sulfonate, ammonium tetrafluorohexyl sulfonate, ammonium pentafluorohexyl sulfonate, ammonium hexafluorohexyl sulfonate, ammonium heptafluorohexyl sulfonate, ammonium octafluorohexyl sulfonate, ammonium nonafluorohexyl sulfonate, ammonium decafluorohexyl sulfonate, ammonium undecafluorohexyl sulfonate, ammonium dodecafluorohexyl sulfonate, ammonium tridecafluorohexyl sulfonate, ammonium monofluoroheptyl sulfonate, ammonium difluroheptyl sulfonate, ammonium trifluoroheptyl sulfonate, ammonium tetrafluoroheptyl sulfonate, ammonium pentafluoroheptyl sulfonate, ammonium hexafluroheptyl sulfonate, ammonium heptafluoroheptyl sulfonate, ammonium octafluoroheptyl sulfonate, ammonium nonafluoroheptyl sulfonate, ammonium decafluoroheptyl sulfonate, ammonium undecafluoroheptyl sulfonate, ammonium dodecafluoroheptyl sulfonate, ammonium tridecafluoroheptyl sulfonate, ammonium tetradecafluoroheptyl sulfonate, ammonium pentadecafluoroheptyl sulfonate, ammonium monofluorooctyl sulfonate, ammonium difluorooocty1 sulfonate, ammonium trifluorooctyl sulfonate, ammonium tetrafluorooctyl sulfonate, ammonium pentafluorooctyl sulfonate, ammonium hexafluorooctyl sulfonate, ammonium heptafluorooctyl sulfonate, ammonium octafluorooctyl sulfonate, ammonium nonafluorooctyl sulfonate, ammonium decafluorooctyl sulfonate, ammonium undecafluorooctyl sulfonate, ammonium dodecafluorooctyl sulfonate, ammonium tridecafluorooctyl sulfonate, ammonium tetradecafluorooctyl sulfonate, ammonium pentadecafluorooctyl sulfonate, ammonium hexadecafluorooctyl sulfonate, ammonium heptadecafluorooctyl sulfonate, ammonium monofluorononyl sulfonate, ammonium difluorononyl sulfonate, ammonium trifluorononyl sulfonate, ammonium tetrafluorononyl sulfonate, ammonium pentafluorononyl sulfonate, ammonium hexafluorononyl sulfonate, ammonium heptafluorononyl sulfonate, ammonium octafluorononyl sulfonate, ammonium nonafluorononyl sulfonate, ammonium decafluorononyl sulfonate, ammonium undecafluorononyl sulfonate, ammonium dodecafluorononyl sulfonate, ammonium tridecafluorononyl sulfonate, ammonium tetradecafluorononyl sulfonate, ammonium pentadecafluorononyl sulfonate, ammonium hexadecafluorononyl sulfonate, ammonium heptadecafluorononyl sulfonate, ammonium octadecafluorononyl sulfonate, ammonium nonadecafluorononyl sulfonate, ammonium monofluorodecyl sulfonate, ammonium difluorodecyl sulfonate, ammonium trifluorodecyl sulfonate, ammonium tetrafluorodecyl sulfonate, ammonium pentafluorodecyl sulfonate, ammonium hexafluorodecyl sulfonate, ammonium heptafluorodecyl sulfonate, ammonium octafluorodecyl sulfonate, ammonium nonafluorodecyl sulfonate, ammonium decafluorodecyl sulfonate, ammonium undecafluorodecyl sulfonate, ammonium dodecafluorodecyl sulfonate, ammonium tridecafluorodecyl sulfonate, ammonium tetradecafluorodecyl sulfonate, ammonium pentadecafluorodecyl sulfonate, ammonium hexadecafluorodecyl sulfonate, ammonium heptadecafluorodecyl sulfonate, ammonium octadecafluorodecyl sulfonate, ammonium nonadecafluorodecyl sulfonate, ammonium eicosafluorodecyl sulfonate, ammonium heneicosafluorodecyl sulfonate, ammonium monofluoroundecyl sulfonate, ammonium difluoroundecyl sulfonate, ammonium trifluoroundecyl sulfonate, ammonium tetrafluoroundecyl sulfonate, ammonium pentafluoroundecyl sulfonate, ammonium hexafluoroundecyl sulfonate, ammonium heptafluoroundecyl sulfonate, ammonium octafluoroundecyl sulfonate, ammonium nonafluoroundecyl sulfonate, ammonium decafluoroundecyl sulfonate, ammonium undecafluoroundecyl sulfonate, ammonium dodecafluoroundecyl sulfonate, ammonium tridecafluoroundecyl sulfonate, ammonium tetradecafluoroundecyl sulfonate, ammonium pentadecafluoroundecyl sulfonate, ammonium hexadecafluoroundecyl sulfonate, ammonium heptadecafluoroundecyl sulfonate, ammonium octadecafluoroundecyl sulfonate, ammonium nonadecafluoroundecyl sulfonate, ammonium eicosafluoroundecyl sulfonate, ammonium heneicosafluoroundecyl sulfonate, ammonium docosafluoroundecyl sulfonate, ammonium tricosafluoroundecyl sulfonate, ammonium monofluorododecyl sulfonate, ammonium difluorododecyl sulfonate, ammonium trifluorododecyl sulfonate, ammonium tetrafluorododecyl sulfonate, ammonium pentafluorododecyl sulfonate, ammonium hexafluorododecyl sulfonate, ammonium heptafluorododecyl sulfonate, ammonium octafluorododecyl sulfonate, ammonium nonafluorododecyl sulfonate, ammonium decafluorododecyl sulfonate, ammonium undecafluorododecyl sulfonate, ammonium dodecafluorododecyl sulfonate, ammonium tridecafluorododecyl sulfonate, ammonium tetradecafluorododecyl sulfonate, ammonium pentadecafluorododecyl sulfonate, ammonium hexadecafluorododecyl sulfonate, ammonium heptadecafluorododecyl sulfonate, ammonium octadecafluorododecyl sulfonate, ammonium nonadecafluorododecyl sulfonate, ammonium eicosafluorododecyl sulfonate, ammonium heneicosafluorododecyl sulfonate, ammonium docosafluorododecyl sulfonate, ammonium tricosafluorododecyl sulfonate, ammonium tetracosafluorododecyl sulfonate, ammonium pentacosafluorododecyl sulfonate, alkylammonium monofluorobutyl sulfonate, alkylammonium difluorobutyl sulfonate, alkylammonium trifluorobutyl sulfonate, alkylammonium tetrafluorobutyl sulfonate, alkylammonium pentafluorobutyl sulfonate, alkylammonium hexafluorobutyl sulfonate, alkylammonium heptafluorobutyl sulfonate, alkylammonium octafluorobutyl sulfonate, alkylammonium nonafluorobutyl sulfonate, alkylammonium monofluoropentyl sulfonate, alkylammonium difluoropentyl sulfonate, alkylammonium trifluoropentyl sulfonate, alkylammonium tetrafluoropentyl sulfonate, alkylammonium pentafluoropentyl sulfonate, alkylammonium hexafluoropentyl sulfonate, alkylammonium heptafluoropentyl sulfonate, alkylammonium octafluoropentyl sulfonate, alkylammonium nonafluoropentyl sulfonate, alkylammonium decafluoropentyl sulfonate, alkylammonium undecafluoropentyl sulfonate, alkylammonium monofluorohexyl sulfonate, alkylammonium difluorohexyl sulfonate, alkylammonium trifluorohexyl sulfonate, alkylammonium tetrafluorohexyl sulfonate, alkylammonium pentafluorohexyl sulfonate, alkylammonium hexafluorohexyl sulfonate, alkylammonium heptafluorohexyl sulfonate, alkylammonium octafluorohexyl sulfonate, alkylammonium nonafluorohexyl sulfonate, alkylammonium decafluorohexyl sulfonate, alkylammonium undecafluorohexyl sulfonate, alkylammonium dodecafluorohexyl sulfonate, alkylammonium tridecafluorohexyl sulfonate, alkylammonium monofluoroheptyl sulfonate, alkylammonium difluoroheptyl sulfonate, alkylammonium trifluoroheptyl sulfonate, alkylammonium tetrafluoroheptyl sulfonate, alkylammonium pentafluoroheptyl sulfonate, alkylammonium hexafluoroheptyl sulfonate, alkylammonium heptafluoroheptyl sulfonate, alkylammonium octafluoroheptyl sulfonate, alkylammonium nonafluoroheptyl sulfonate, alkylammonium decafluoroheptyl sulfonate, alkylammonium undecafluoroheptyl sulfonate, alkylammonium dodecafluoroheptyl sulfonate, alkylammonium tridecafluoroheptyl sulfonate, alkylammonium tetradecafluoroheptyl sulfonate, alkylammonium pentadecafluoroheptyl sulfonate, alkylammonium monofluorooctyl sulfonate, alkylammonium difluorooctyl sulfonate, alkylammonium trifluorooctyl sulfonate, alkylammonium tetrafluorooctyl sulfonate, alkylammonium pentafluorooctyl sulfonate, alkylammonium hexafluorooctyl sulfonate, alkylammonium heptafluorooctyl sulfonate, alkylammonium octafluorooctyl sulfonate, alkylammonium nonafluorooctyl sulfonate, alkylammonium decafluorooctyl sulfonate, alkylammonium undecafluorooctyl sulfonate, alkylammonium dodecafluorooctyl sulfonate, alkylammonium tridecafluorooctyl sulfonate, alkylammonium tetradecafluorooctyl sulfonate, alkylammonium pentadecafluorooctyl sulfonate, alkylammonium hexadecafluorooctyl sulfonate, alkylammonium heptadecafluorooctyl sulfonate, alkylammonium monofluorononyl sulfonate, alkylammonium difluorononyl sulfonate, alkylammonium trifluorononyl sulfonate, alkylammonium tetrafluorononyl sulfonate, alkylammonium pentafluorononyl sulfonate, alkylammonium hexafluorononyl sulfonate, alkylammonium heptafluorononyl sulfonate, alkylammonium octafluorononyl sulfonate, alkylammonium nonafluorononyl sulfonate, alkylammonium decafluorononyl sulfonate, alkylammonium undecafluorononyl sulfonate, alkylammonium dodecafluorononyl sulfonate, alkylammonium tridecafluorononyl sulfonate, alkylammonium tetradecafluorononyl sulfonate, alkylammonium pentadecafluorononyl sulfonate, alkylammonium hexadecafluorononyl sulfonate, alkylammonium heptadecafluorononyl sulfonate, alkylammonium octadecafluorononyl sulfonate, ammonium nonadecafluorononyl sulfonate, alkylammonium monofluorodecyl sulfonate, alkylammonium difluorodecyl sulfonate, alkylammonium trifluorodecyl sulfonate, alkylammonium tetrafluorodecyl sulfonate, alkylammonium pentafluorodecyl sulfonate, alkylammonium hexafluorodecyl sulfonate, alkylammonium heptafluorodecyl sulfonate, alkylammonium octafluorodecyl sulfonate, alkylammonium nonafluorodecyl sulfonate, alkylammonium decafluorodecyl sulfonate, alkylammonium undecafluorodecyl sulfonate, alkylammonium dodecafluorodecyl sulfonate, alkylammonium tridecafluorodecyl sulfonate, alkylammonium tetradecafluorodecyl sulfonate, alkylammonium pentadecafluorodecyl sulfonate, alkylammonium hexadecafluorodecyl sulfonate, alkylammonium heptadecafluorodecyl sulfonate, alkylammonium octadecafluorodecyl sulfonate, alkylammonium nonadecafluorodecyl sulfonate, alkylammonium eicosafluorodecyl sulfonate, alkylammonium heneicosafluorodecyl sulfonate, alkylammonium monofluoroundecyl sulfonate, alkylammonium difluoroundecyl sulfonate, alkylammonium trifluoroundecyl sulfonate, alkylammonium tetrafluoroundecyl sulfonate, alkylammonium pentafluoroundecyl sulfonate, alkylammonium hexafluoroundecyl sulfonate, alkylammonium heptafluoroundecyl sulfonate, alkylammonium octafluoroundecyl sulfonate, alkylammonium nonafluoroundecyl sulfonate, alkylammonium decafluoroundecyl sulfonate, alkylammonium undecafluoroundecyl sulfonate, alkylammonium dodecafluoroundecyl sulfonate, alkylammonium tridecafluoroundecyl sulfonate, alkylammonium tetradecafluoroundecyl sulfonate, alkylammonium pentadecafluoroundecyl sulfonate, alkylammonium hexadecafluoroundecyl sulfonate, alkylammonium heptadecafluoroundecyl sulfonate, alkylammonium octadecafluoroundecyl sulfonate, alkylammonium nonadecafluoroundecyl sulfonate, alkylammonium eicosafluoroundecyl sulfonate, alkylammonium heneicosafluoroundecyl sulfonate, alkylammonium docosafluoroundecyl sulfonate, alkylammonium tricosafluoroundecyl sulfonate, alkylammonium monofluorododecyl sulfonate, alkylammonium difluorododecyl sulfonate, alkylammonium trifluorododecyl sulfonate, alkylammonium tetrafluorododecyl sulfonate, alkylammonium pentafluorododecyl sulfonate, alkylammonium hexafluorododecyl sulfonate, alkylammonium heptafluorododecyl sulfonate, alkylammonium octafluorododecyl sulfonate, alkylammonium nonafluorododecyl sulfonate, alkylammonium decafluorododecyl sulfonate, alkylammonium undecafluorododecyl sulfonate, alkylammonium dodecafluorododecyl sulfonate, alkylammonium tridecafluorododecyl sulfonate, alkylammonium tetradecafluorododecyl sulfonate, alkylammonium pentadecafluorododecyl sulfonate, alkylammonium hexadecafluorododecyl sulfonate, alkylammonium heptadecafluorododecyl sulfonate, alkylammonium octadecafluorododecyl sulfonate, alkylammonium nonadecafluorododecyl sulfonate, alkylammonium eicosafluorododecyl sulfonate, alkylammonium heneicosafluorododecyl sulfonate, alkylammonium docosafluorododecyl sulfonate, alkylammonium tricosafluorododecyl sulfonate, alkylammonium tetracosafluorododecyl sulfonate, alkylammonium pentacosafluorododecyl sulfonate, dialkylammonium monofluorobutyl sulfonate, dialkylammonium difluorobutyl sulfonate, dialkylammonium trifluorobutyl sulfonate, dialkylammonium tetrafluorobutyl sulfonate, dialkylammonium pentafluorobutyl sulfonate, dialkylammonium hexafluorobutyl sulfonate, dialkylammonium heptafluorobutyl sulfonate, dialkylammonium octafluorobutyl sulfonate, dialkylammonium nonafluorobutyl sulfonate, dialkylammonium monofluoropentyl sulfonate, dialkylammonium difluoropentyl sulfonate, dialkylammonium trifluoropentyl sulfonate, dialkylammonium tetrafluoropentyl sulfonate, dialkylammonium pentafluoropentyl sulfonate, dialkylammonium hexafluoropentyl sulfonate, dialkylammonium heptafluoropentyl sulfonate, dialkylammonium octafluoropentyl sulfonate, dialkylammonium nonafluoropentyl sulfonate, dialkylammonium decafluoropentyl sulfonate, dialkylammonium undecafluoropentyl sulfonate, dialkylammonium monofluorohexyl sulfonate, dialkylammonium difluorohexyl sulfonate, dialkylammonium trifluorohexyl sulfonate, dialkylammonium tetrafluorohexyl sulfonate, dialkylammonium pentafluorohexyl sulfonate, dialkylammonium hexafluorohexyl sulfonate, dialkylammonium heptafluorohexyl sulfonate, dialkylammonium octafluorohexyl sulfonate, dialkylammonium nonafluorohexyl sulfonate, dialkylammonium decafluorohexyl sulfonate, dialkylammonium undecafluorohexyl sulfonate, dialkylammonium dodecafluorohexyl sulfonate, dialkylammonium tridecafluorohexyl sulfonate, dialkylammonium monofluoroheptyl sulfonate, dialkylammonium difluoroheptyl sulfonate, dialkylammonium trifluoroheptyl sulfonate, dialkylammonium tetrafluoroheptyl sulfonate, dialkylammonium pentafluoroheptyl sulfonate, dialkylammonium hexafluoroheptyl sulfonate, dialkylammonium heptafluoroheptyl sulfonate, dialkylammonium octafluoroheptyl sulfonate, dialkylammonium nonafluoroheptyl sulfonate, dialkylammonium decafluoroheptyl sulfonate, dialkylammonium undecafluoroheptyl sulfonate, dialkylammonium dodecafluoroheptyl sulfonate, dialkylammonium tridecafluoroheptyl sulfonate, dialkylammonium tetradecafluoroheptyl sulfonate, dialkylammonium pentadecafluoroheptyl sulfonate, dialkylammonium monofluorooctyl sulfonate, dialkylammonium difluorooctyl sulfonate, dialkylammonium trifluorooctyl sulfonate, dialkylammonium tetrafluorooctyl sulfonate, dialkylammonium pentafluorooctyl sulfonate, dialkylammonium hexafluorooctyl sulfonate, dialkylammonium heptafluorooctyl sulfonate, dialkylammonium octafluorooctyl sulfonate, dialkylammonium nonafluorooctyl sulfonate, dialkylammonium decafluorooctyl sulfonate, dialkylammonium undecafluorooctyl sulfonate, dialkylammonium dodecafluorooctyl sulfonate, dialkylammonium tridecafluorooctyl sulfonate, dialkylammonium tetradecafluorooctyl sulfonate, dialkylammonium pentadecafluorooctyl sulfonate, dialkylammonium hexadecafluorooctyl sulfonate, dialkylammonium heptadecafluorooctyl sulfonate, dialkylammonium monofluorononyl sulfonate, dialkylammonium difluorononyl sulfonate, dialkylammonium trifluorononyl sulfonate, dialkylammonium tetrafluorononyl sulfonate, dialkylammonium pentafluorononyl sulfonate, dialkylammonium hexafluorononyl sulfonate, dialkylammonium heptafluorononyl sulfonate, dialkylammonium octafluorononyl sulfonate, dialkylammonium nonafluorononyl sulfonate, dialkylammonium decafluorononyl sulfonate, dialkylammonium undecafluorononyl sulfonate, dialkylammonium dodecafluorononyl sulfonate, dialkylammonium tridecafluorononyl sulfonate, dialkylammonium tetradecafluorononyl sulfonate, dialkylammonium pentadecafluorononyl sulfonate, dialkylammonium hexadecafluorononyl sulfonate, dialkylammonium heptadecafluorononyl sulfonate, dialkylammonium octadecafluorononyl sulfonate, dialkylammonium nonadecafluorononyl sulfonate, dialkylammonium monofluorodecyl sulfonate, dialkylammonium difluorodecyl sulfonate, dialkylammonium trifluorodecyl sulfonate, dialkylammonium tetrafluorodecyl sulfonate, dialkylammonium pentafluorodecyl sulfonate, dialkylammonium hexafluorodecyl sulfonate, dialkylammonium heptafluorodecyl sulfonate, dialkylammonium octafluorodecyl sulfonate, dialkylammonium nonafluorodecyl sulfonate, dialkylammonium decafluorodecyl sulfonate, dialkylammonium undecafluorodecyl sulfonate, dialkylammonium dodecafluorodecyl sulfonate, dialkylammonium tridecafluorodecyl sulfonate, dialkylammonium tetradecafluorodecyl sulfonate, dialkylammonium pentadecafluorodecyl sulfonate, dialkylammonium hexadecafluorodecyl sulfonate, dialkylammonium heptadecafluorodecyl sulfonate, dialkylammonium octadecafluorodecyl sulfonate, dialkylammonium nonadecafluorodecyl sulfonate, dialkylammonium eicosafluorodecyl sulfonate, dialkylammonium heneicosafluorodecyl sulfonate, dialkylammonium monofluoroundecyl sulfonate, dialkylammonium difluoroundecyl sulfonate, dialkylammonium trifluoroundecyl sulfonate, dialkylammonium tetrafluoroundecyl sulfonate, dialkylammonium pentafluoroundecyl sulfonate, dialkylammonium hexafluoroundecyl sulfonate, dialkylammonium heptafluoroundecyl sulfonate, dialkylammonium octafluoroundecyl sulfonate, dialkylammonium nonafluoroundecyl sulfonate, dialkylammonium decafluoroundecyl sulfonate, dialkylammonium undecafluoroundecyl sulfonate, dialkylammonium dodecafluoroundecyl sulfonate, dialkylammonium tridecafluoroundecyl sulfonate, dialkylammonium tetradecafluoroundecyl sulfonate, dialkylammonium pentadecafluoroundecyl sulfonate, dialkylammonium hexadecafluoroundecyl sulfonate, dialkylammonium heptadecafluoroundecyl sulfonate, dialkylammonium octadecafluoroundecyl sulfonate, dialkylammonium nonadecafluoroundecyl sulfonate, dialkylammonium eicosafluoroundecyl sulfonate, dialkylammonium heneicosafluoroundecyl sulfonate, dialkylammonium docosafluoroundecyl sulfonate, dialkylammonium tricosafluoroundecyl sulfonate, dialkylammonium monofluorododecyl sulfonate, dialkylammonium difluorododecyl sulfonate, dialkylammonium trifluorododecyl sulfonate, dialkylammonium tetrafluorododecyl sulfonate, dialkylammonium pentafluorododecyl sulfonate, dialkylammonium hexafluorododecyl sulfonate, dialkylammonium heptafluorododecyl sulfonate, dialkylammonium octafluorododecyl sulfonate, dialkylammonium nonafluorododecyl sulfonate, dialkylammonium decafluorododecyl sulfonate, dialkylammonium undecafluorododecyl sulfonate, dialkylammonium dodecafluorododecyl sulfonate, dialkylammonium tridecafluorododecyl sulfonate, dialkylammonium tetradecafluorododecyl sulfonate, dialkylammonium pentadecafluorododecyl sulfonate, dialkylammonium hexadecafluorododecyl sulfonate, dialkylammonium heptadecafluorododecyl sulfonate, dialkylammonium octadecafluorododecyl sulfonate, dialkylammonium nonadecafluorododecyl sulfonate, dialkylammonium eicosafluorododecyl sulfonate, dialkylammonium heneicosafluorododecyl sulfonate, dialkylammonium docosafluorododecyl sulfonate, dialkylammonium tricosafluorododecyl sulfonate, dialkylammonium tetracosafluorododecyl sulfonate, dialkylammonium pentacosafluorododecyl sulfonate, trialkylammonium monofluorobutyl sulfonate, trialkylammonium difluorobutyl sulfonate, trialkylammonium trifluorobutyl sulfonate, trialkylammonium tetrafluorobutyl sulfonate, trialkylammonium pentafluorobutyl sulfonate, trialkylammonium hexafluorobutyl sulfonate, trialkylammonium heptafluorobutyl sulfonate, trialkylammonium octafluorobutyl sulfonate, trialkylammonium nonafluorobutyl sulfonate, trialkylammonium monofluoropentyl sulfonate, trialkylammonium difluoropentyl sulfonate, trialkylammonium trifluoropentyl sulfonate, trialkylammonium tetrafluoropentyl sulfonate, trialkylammonium pentafluoropentyl sulfonate, trialkylammonium hexafluoropentyl sulfonate, trialkylammonium heptafluoropentyl sulfonate, trialkylammonium octafluoropentyl sulfonate, trialkylammonium nonafluoropentyl sulfonate, trialkylammonium decafluoropentyl sulfonate, trialkylammonium undecafluoropentyl sulfonate, trialkylammonium monofluorohexyl sulfonate, trialkylammonium difluorohexyl sulfonate, trialkylammonium trifluorohexyl sulfonate, trialkylammonium tetrafluorohexyl sulfonate, trialkylammonium pentafluorohexyl sulfonate, trialkylammonium hexafluorohexyl sulfonate, trialkylammonium heptafluorohexyl sulfonate, trialkylammonium octafluorohexyl sulfonate, trialkylammonium nonafluorohexyl sulfonate, trialkylammonium decafluorohexyl sulfonate, trialkylammonium undecafluorohexyl sulfonate, trialkylammonium dodecafluorohexyl sulfonate, trialkylammonium tridecafluorohexyl sulfonate, trialkylammonium monofluoroheptyl sulfonate, trialkylammonium difluoroheptyl sulfonate, trialkylammonium trifluoroheptyl sulfonate, trialkylammonium tetrafluoroheptyl sulfonate, trialkylammonium pentafluoroheptyl sulfonate, trialkylammonium hexafluoroheptyl sulfonate, trialkylammonium heptafluoroheptyl sulfonate, trialkylammonium octafluoroheptyl sulfonate, trialkylammonium nonafluoroheptyl sulfonate, trialkylammonium decafluoroheptyl sulfonate, trialkylammonium undecafluoroheptyl sulfonate, trialkylammonium dodecafluoroheptyl sulfonate, trialkylammonium tridecafluoroheptyl sulfonate, trialkylammonium tetradecafluoroheptyl sulfonate, trialkylammonium pentadecafluoroheptyl sulfonate, trialkylammonium monofluorooctyl sulfonate, trialkylammonium difluorooctyl sulfonate, trialkylammonium trifluorooctyl sulfonate, trialkylammonium tetrafluorooctyl sulfonate, trialkylammonium pentafluorooctyl sulfonate, trialkylammonium hexafluorooctyl sulfonate, trialkylammonium heptafluorooctyl sulfonate, trialkylammonium octafluorooctyl sulfonate, trialkylammonium nonafluorooctyl sulfonate, trialkylammonium decafluorooctyl sulfonate, trialkylammonium undecafluorooctyl sulfonate, trialkylammonium dodecafluorooctyl sulfonate, trialkylammonium tridecafluorooctyl sulfonate, trialkylammonium tetradecafluorooctyl sulfonate, trialkylammonium pentadecafluorooctyl sulfonate, trialkylammonium hexadecafluorooctyl sulfonate, trialkylammonium heptadecafluorooctyl sulfonate, trialkylammonium monofluorononyl sulfonate, trialkylammonium difluorononyl sulfonate, trialkylammonium trifluorononyl sulfonate, trialkylammonium tetrafluorononyl sulfonate, trialkylammonium pentafluorononyl sulfonate, trialkylammonium hexafluorononyl sulfonate, trialkylammonium heptafluorononyl sulfonate, trialkylammonium octafluorononyl sulfonate, trialkylammonium nonafluorononyl sulfonate, trialkylammonium decafluorononyl sulfonate, trialkylammonium undecafluorononyl sulfonate, trialkylammonium dodecafluorononyl sulfonate, trialkylammonium tridecafluorononyl sulfonate, trialkylammonium tetradecafluorononyl sulfonate, trialkylammonium pentadecafluorononyl sulfonate, trialkylammonium hexadecafluorononyl sulfonate, trialkylammonium heptadecafluorononyl sulfonate, trialkylammonium octadecafluorononyl sulfonate, trialkylammonium nonadecafluorononyl sulfonate, trialkylammonium monofluorodecyl sulfonate, trialkylammonium difluorodecyl sulfonate, trialkylammonium trifluorodecyl sulfonate, trialkylammonium tetrafluorodecyl sulfonate, trialkylammonium pentafluorodecyl sulfonate, trialkylammonium hexafluorodecyl sulfonate, trialkylammonium heptafluorodecyl sulfonate, trialkylammonium octafluorodecyl sulfonate, trialkylammonium nonafluorodecyl sulfonate, trialkylammonium decafluorodecyl sulfonate, trialkylammonium undecafluorodecyl sulfonate, trialkylammonium dodecafluorodecyl sulfonate, trialkylammonium tridecafluorodecyl sulfonate, trialkylammonium tetradecafluorodecyl sulfonate, trialkylammonium pentadecafluorodecyl sulfonate, trialkylammonium hexadecafluorodecyl sulfonate, trialkylammonium heptadecafluorodecyl sulfonate, trialkylammonium octadecafluorodecyl sulfonate, trialkylammonium nonadecafluorodecyl sulfonate, trialkylammonium eicosafluorodecyl sulfonate, trialkylammonium heneicosafluorodecyl sulfonate, trialkylammonium monofluoroundecyl sulfonate, trialkylammonium difluoroundecyl sulfonate, trialkylammonium trifluoroundecyl sulfonate, trialkylammonium tetrafluoroundecyl sulfonate, trialkylammonium pentafluoroundecyl sulfonate, trialkylammonium hexafluoroundecyl sulfonate, trialkylammonium heptafluoroundecyl sulfonate, trialkylammonium octafluoroundecyl sulfonate, trialkylammonium nonafluoroundecyl sulfonate, trialkylammonium decafluoroundecyl sulfonate, trialkylammonium undecafluoroundecyl sulfonate, trialkylammonium dodecafluoroundecyl sulfonate, trialkylammonium tridecafluoroundecyl sulfonate, trialkylammonium tetradecafluoroundecyl sulfonate, trialkylammonium pentadecafluoroundecyl sulfonate, trialkylammonium hexadecafluoroundecyl sulfonate, trialkylammonium heptadecafluoroundecyl sulfonate, trialkylammonium octadecafluoroundecyl sulfonate, trialkylammonium nonadecafluoroundecyl sulfonate, trialkylammonium eicosafluoroundecyl sulfonate, trialkylammonium heneicosafluoroundecyl sulfonate, trialkylammonium docosafluoroundecyl sulfonate, trialkylammonium tricosafluoroundecyl sulfonate, trialkylammonium monofluorododecyl sulfonate, trialkylammonium difluorododecyl sulfonate, trialkylammonium trifluorododecyl sulfonate, trialkylammonium tetrafluorododecyl sulfonate, trialkylammonium pentafluorododecyl sulfonate, trialkylammonium hexafluorododecyl sulfonate, trialkylammonium heptafluorododecyl sulfonate, trialkylammonium octafluorododecyl sulfonate, trialkylammonium nonafluorododecyl sulfonate, trialkylammonium decafluorododecyl sulfonate, trialkylammonium undecafluorododecyl sulfonate, trialkylammonium dodecafluorododecyl sulfonate, trialkylammonium tridecafluorododecyl sulfonate, trialkylammonium tetradecafluorododecyl sulfonate, trialkylammonium pentadecafluorododecyl sulfonate, trialkylammonium hexadecafluorododecyl sulfonate, trialkylammonium heptadecafluorododecyl sulfonate, trialkylammonium octadecafluorododecyl sulfonate, trialkylammonium nonadecafluorododecyl sulfonate, trialkylammonium eicosafluorododecyl sulfonate, trialkylammonium heneicosafluorododecyl sulfonate, trialkylammonium docosafluorododecyl sulfonate, trialkylammonium tricosafluorododecyl sulfonate, trialkylammonium tetracosafluorododecyl sulfonate, trialkylammonium pentacosafluorododecyl sulfonate, tetraalkylammonium monofluorobutyl sulfonate, tetraalkylammonium difluorobutyl sulfonate, tetraalkylammonium trifluorobutyl sulfonate, tetraalkylammonium tetrafluorobutyl sulfonate, tetraalkylammonium pentafluorobutyl sulfonate, tetraalkylammonium hexafluorobutyl sulfonate, tetraalkylammonium heptafluorobutyl sulfonate, tetraalkylammonium octafluorobutyl sulfonate, tetraalkylammonium nonafluorobutyl sulfonate, tetraalkylammonium monofluoropentyl sulfonate, tetraalkylammonium difluoropentyl sulfonate, tetraalkylammonium trifluoropentyl sulfonate, tetraalkylammonium tetrafluoropentyl sulfonate, tetraalkylammonium pentafluoropentyl sulfonate, tetraalkylammonium hexafluoropentyl sulfonate, tetraalkylammonium heptafluoropentyl sulfonate, tetraalkylammonium octafluoropentyl sulfonate, tetraalkylammonium nonafluoropentyl sulfonate, tetraalkylammonium decafluoropentyl sulfonate, tetraalkylammonium undecafluoropentyl sulfonate, tetraalkylammonium monofluorohexyl sulfonate, tetraalkylammonium difluorohexyl sulfonate, tetraalkylammonium trifluorohexyl sulfonate, tetraalkylammonium tetrafluorohexyl sulfonate, tetraalkylammonium pentafluorohexyl sulfonate, tetraalkylammonium hexafluorohexyl sulfonate, tetraalkylammonium heptafluorohexyl sulfonate, tetraalkylammonium octafluorohexyl sulfonate, tetraalkylammonium nonafluorohexyl sulfonate, tetraalkylammonium decafluorohexyl sulfonate, tetraalkylammonium undecafluorohexyl sulfonate, tetraalkylammonium dodecafluorohexyl sulfonate, tetraalkylammonium tridecafluorohexyl sulfonate, tetraalkylammonium monofluoroheptyl sulfonate, tetraalkylammonium difluoroheptyl sulfonate, tetraalkylammonium trifluoroheptyl sulfonate, tetraalkylammonium tetrafluoroheptyl sulfonate, tetraalkylammonium pentafluoroheptyl sulfonate, tetraalkylammonium hexafluoroheptyl sulfonate, tetraalkylammonium heptafluoroheptyl sulfonate, tetraalkylammonium octafluoroheptyl sulfonate, tetraalkylammonium nonafluoroheptyl sulfonate, tetraalkylammonium decafluoroheptyl sulfonate, tetraalkylammonium undecafluoroheptyl sulfonate, tetraalkylammonium dodecafluoroheptyl sulfonate, tetraalkylammonium tridecafluoroheptyl sulfonate, tetraalkylammonium tetradecafluoroheptyl sulfonate, tetraalkylammonium pentadecafluoroheptyl sulfonate, tetraalkylammonium monofluorooctyl sulfonate, tetraalkylammonium difluorooctyl sulfonate, tetraalkylammonium trifluorooctyl sulfonate, tetraalkylammonium tetrafluorooctyl sulfonate, tetraalkylammonium pentafluorooctyl sulfonate, tetraalkylammonium hexafluorooctyl sulfonate, tetraalkylammonium heptafluorooctyl sulfonate, tetraalkylammonium octafluorooctyl sulfonate, tetraalkylammonium nonafluorooctyl sulfonate, tetraalkylammonium decafluorooctyl sulfonate, tetraalkylammonium undecafluorooctyl sulfonate, tetraalkylammonium dodecafluorooctyl sulfonate, tetraalkylammonium tridecafluorooctyl sulfonate, tetraalkylammonium tetradecafluorooctyl sulfonate, tetraalkylammonium pentadecafluorooctyl sulfonate, tetraalkylammonium hexadecafluorooctyl sulfonate, tetraalkylammonium heptadecafluorooctyl sulfonate, tetraalkylammonium monofluorononyl sulfonate, tetraalkylammonium difluorononyl sulfonate, tetraalkylammonium trifluorononyl sulfonate, tetraalkylammonium tetrafluorononyl sulfonate, tetraalkylammonium pentafluorononyl sulfonate, tetraalkylammonium hexafluorononyl sulfonate, tetraalkylammonium heptafluorononyl sulfonate, tetraalkylammonium octafluorononyl sulfonate, tetraalkylammonium nonafluorononyl sulfonate, tetraalkylammonium decafluorononyl sulfonate, tetraalkylammonium undecafluorononyl sulfonate, tetraalkylammonium dodecafluorononyl sulfonate, tetraalkylammonium tridecafluorononyl sulfonate, tetraalkylammonium tetradecafluorononyl sulfonate, tetraalkylammonium pentadecafluorononyl sulfonate, tetraalkylammonium hexadecafluorononyl sulfonate, tetraalkylammonium heptadecafluorononyl sulfonate, tetraalkylammonium octadecafluorononyl sulfonate, tetraalkylammonium nonadecafluorononyl sulfonate, tetraalkylammonium monofluorodecyl sulfonate, tetraalkylammonium difluorodecyl sulfonate, tetraalkylammonium trifluorodecyl sulfonate, tetraalkylammonium tetrafluorodecyl sulfonate, tetraalkylammonium pentafluorodecyl sulfonate, tetraalkylammonium hexafluorodecyl sulfonate, tetraalkylammonium heptafluorodecyl sulfonate, tetraalkylammonium octafluorodecyl sulfonate, tetraalkylammonium nonafluorodecyl sulfonate, tetraalkylammonium decafluorodecyl sulfonate, tetraalkylammonium undecafluorodecyl sulfonate, tetraalkylammonium dodecafluorodecyl sulfonate, tetraalkylammonium tridecafluorodecyl sulfonate, tetraalkylammonium tetradecafluorodecyl sulfonate, tetraalkylammonium pentadecafluorodecyl sulfonate, tetraalkylammonium hexadecafluorodecyl sulfonate, tetraalkylammonium heptadecafluorodecyl sulfonate, tetraalkylammonium octadecafluorodecyl sulfonate, tetraalkylammonium nonadecafluorodecyl sulfonate, tetraalkylammonium eicosafluorodecyl sulfonate, tetraalkylammonium heneicosafluorodecyl sulfonate, tetraalkylammonium monofluoroundecyl sulfonate, tetraalkylammonium difluoroundecyl sulfonate, tetraalkylammonium trifluoroundecyl sulfonate, tetraalkylammonium tetrafluoroundecyl sulfonate, tetraalkylammonium pentafluoroundecyl sulfonate, tetraalkylammonium hexafluoroundecyl sulfonate, tetraalkylammonium heptafluoroundecyl sulfonate, tetraalkylammonium octafluoroundecyl sulfonate, tetraalkylammonium nonafluoroundecyl sulfonate, tetraalkylammonium decafluoroundecyl sulfonate, tetraalkylammonium undecafluoroundecyl sulfonate, tetraalkylammonium dodecafluoroundecyl sulfonate, tetraalkylammonium tridecafluoroundecyl sulfonate, tetraalkylammonium tetradecafluoroundecyl sulfonate, tetraalkylammonium pentadecafluoroundecyl sulfonate, tetraalkylammonium hexadecafluoroundecyl sulfonate, tetraalkylammonium heptadecafluoroundecyl sulfonate, tetraalkylammonium octadecafluoroundecyl sulfonate, tetraalkylammonium nonadecafluoroundecyl sulfonate, tetraalkylammonium eicosafluoroundecyl sulfonate, tetraalkylammonium heneicosafluoroundecyl sulfonate, tetraalkylammonium docosafluoroundecyl sulfonate, tetraalkylammonium tricosafluoroundecyl sulfonate, tetraalkylammonium monofluorododecyl sulfonate, tetraalkylammonium difluorododecyl sulfonate, tetraalkylammonium trifluorododecyl sulfonate, tetraalkylammonium tetrafluorododecyl sulfonate, tetraalkylammonium pentafluorododecyl sulfonate, tetraalkylammonium hexafluorododecyl sulfonate, tetraalkylammonium heptafluorododecyl sulfonate, tetraalkylammonium octafluorododecyl sulfonate, tetraalkylammonium nonafluorododecyl sulfonate, tetraalkylammonium decafluorododecyl sulfonate, tetraalkylammonium undecafluorododecyl sulfonate, tetraalkylammonium dodecafluorododecyl sulfonate, tetraalkylammonium tridecafluorododecyl sulfonate, tetraalkylammonium tetradecafluorododecyl sulfonate, tetraalkylammonium pentadecafluorododecyl sulfonate, tetraalkylammonium hexadecafluorododecyl sulfonate, tetraalkylammonium heptadecafluorododecyl sulfonate, tetraalkylammonium octadecafluorododecyl sulfonate, tetraalkylammonium nonadecafluorododecyl sulfonate, tetraalkylammonium eicosafluorododecyl sulfonate, tetraalkylammonium heneicosafluorododecyl sulfonate, tetraalkylammonium docosafluorododecyl sulfonate, tetraalkylammonium tricosafluorododecyl sulfonate, tetraalkylammonium tetracosafluorododecyl sulfonate, tetraalkylammonium pentacosafluorododecyl sulfonate, especially from the group containing ammonium monofluorobutyl sulfonate, ammonium difluorobutyl sulfonate, ammonium trifluorobutyl sulfonate, ammonium tetrafluorobutyl sulfonate, ammonium pentafluorobutyl sulfonate, ammonium hexafluorobutyl sulfonate, ammonium heptafluorobutyl sulfonate, ammonium octafluorobutyl sulfonate, ammonium nonafluorobutyl sulfonate, ammonium monofluoropentyl sulfonate, ammonium difluoropentyl sulfonate, ammonium trifluoropentyl sulfonate, ammonium tetrafluoropentyl sulfonate, ammonium pentafluoropentyl sulfonate, ammonium hexafluoropentyl sulfonate, ammonium heptafluoropentyl sulfonate, ammonium octafluoropentyl sulfonate, ammonium nonafluoropentyl sulfonate, ammonium decafluoropentyl sulfonate, ammonium undecafluoropentyl sulfonate, ammonium monofluorohexyl sulfonate, ammonium difluorohexyl sulfonate, ammonium trifluorohexyl sulfonate, ammonium tetrafluorohexyl sulfonate, ammonium pentafluorohexyl sulfonate, ammonium hexafluorohexyl sulfonate, ammonium heptafluorohexyl sulfonate, ammonium octafluorohexyl sulfonate, ammonium nonafluorohexyl sulfonate, ammonium decafluorohexyl sulfonate, ammonium undecafluorohexyl sulfonate, ammonium dodecafluorohexyl sulfonate, ammonium tridecafluorohexyl sulfonate, ammonium monofluoroheptyl sulfonate, ammonium difluoroheptyl sulfonate, ammonium trifluoroheptyl sulfonate, ammonium tetrafluoroheptyl sulfonate, ammonium pentafluoroheptyl sulfonate, ammonium hexafluoroheptyl sulfonate, ammonium heptafluoroheptyl sulfonate, ammonium octafluoroheptyl sulfonate, ammonium nonafluoroheptyl sulfonate, ammonium decafluoroheptyl sulfonate, ammonium undecafluoroheptyl sulfonate, ammonium dodecafluoroheptyl sulfonate, ammonium tridecafluoroheptyl sulfonate, ammonium tetradecafluoroheptyl sulfonate, ammonium pentadecafluoroheptyl sulfonate, ammonium monofluorooctyl sulfonate, ammonium difluorooctyl sulfonate, ammonium trifluorooctyl sulfonate, ammonium tetrafluorooctyl sulfonate, ammonium pentafluorooctyl sulfonate, ammonium hexafluorooctyl sulfonate, ammonium heptafluorooctyl sulfonate, ammonium octafluorooctyl sulfonate, ammonium nonafluorooctyl sulfonate, ammonium decafluorooctyl sulfonate, ammonium undecafluorooctyl sulfonate, ammonium dodecafluorooctyl sulfonate, ammonium tridecafluorooctyl sulfonate, ammonium tetradecafluorooctyl sulfonate, ammonium pentadecafluorooctyl sulfonate, ammonium hexadecafluorooctyl sulfonate, ammonium heptadecafluorooctyl sulfonate, ammonium monofluorononyl sulfonate, ammonium difluorononyl sulfonate, ammonium trifluorononyl sulfonate, ammonium tetrafluorononyl sulfonate, ammonium pentafluorononyl sulfonate, ammonium hexafluorononyl sulfonate, ammonium heptafluorononyl sulfonate, ammonium octafluorononyl sulfonate, ammonium nonafluorononyl sulfonate, ammonium decafluorononyl sulfonate, ammonium undecafluorononyl sulfonate, ammonium dodecafluorononyl sulfonate, ammonium tridecafluorononyl sulfonate, ammonium tetradecafluorononyl sulfonate, ammonium pentadecafluorononyl sulfonate, ammonium hexadecafluorononyl sulfonate, ammonium heptadecafluorononyl sulfonate, ammonium octadecafluorononyl sulfonate, ammonium nonadecafluorononyl sulfonate, ammonium monofluorodecyl sulfonate, ammonium difluorodecyl sulfonate, ammonium trifluorodecyl sulfonate, ammonium tetrafluorodecyl sulfonate, ammonium pentafluorodecyl sulfonate, ammonium hexafluorodecyl sulfonate, ammonium heptafluorodecyl sulfonate, ammonium octafluorodecyl sulfonate, ammonium nonafluorodecyl sulfonate, ammonium decafluorodecyl sulfonate, ammonium undecafluorodecyl sulfonate, ammonium dodecafluorodecyl sulfonate, ammonium tridecafluorodecyl sulfonate, ammonium tetradecafluorodecyl sulfonate, ammonium pentadecafluorodecyl sulfonate, ammonium hexadecafluorodecyl sulfonate, ammonium heptadecafluorodecyl sulfonate, ammonium octadecafluorodecyl sulfonate, ammonium nonadecafluorodecyl sulfonate, ammonium eicosafluorodecyl sulfonate, ammonium heneicosafluorodecyl sulfonate, ammonium monofluoroundecyl sulfonate, ammonium difluoroundecyl sulfonate, ammonium trifluoroundecyl sulfonate, ammonium tetrafluoroundecyl sulfonate, ammonium pentafluoroundecyl sulfonate, ammonium hexafluoroundecyl sulfonate, ammonium heptafluoroundecyl sulfonate, ammonium octafluoroundecyl sulfonate, ammonium nonafluoroundecyl sulfonate, ammonium decafluoroundecyl sulfonate, ammonium undecafluorundecyl sulfonate, ammonium dodecafluoroundecyl sulfonate, ammonium tridecafluoroundecyl sulfonate, ammonium tetradecafluoroundecyl sulfonate, ammonium pentadecafluoroundecyl sulfonate, ammonium hexadecafluoroundecyl sulfonate, ammonium heptadecafluoroundecyl sulfonate, ammonium octadecafluoroundecyl sulfonate, ammonium nonadecafluoroundecyl sulfonate, ammonium eicosafluoroundecyl sulfonate, ammonium heneicosafluoroundecyl sulfonate, ammonium docosafluoroundecyl sulfonate, ammonium tricosafluoroundecyl sulfonate, ammonium monofluorododecyl sulfonate, ammonium difluorododecyl sulfonate, ammonium trifluorododecyl sulfonate, ammonium tetrafluorododecyl sulfonate, ammonium pentafluorododecyl sulfonate, ammonium hexafluorododecyl sulfonate, ammonium heptafluorododecyl sulfonate, ammonium octafluorododecyl sulfonate, ammonium nonafluorododecyl sulfonate, ammonium decafluorododecyl sulfonate, ammonium undecafluorododecyl sulfonate, ammonium dodecafluorododecyl sulfonate, ammonium tridecafluorododecyl sulfonate, ammonium tetradecafluorododecyl sulfonate, ammonium pentadecafluorododecyl sulfonate, ammonium hexadecafluorododecyl sulfonate, ammonium heptadecafluorododecyl sulfonate, ammonium octadecafluorododecyl sulfonate, ammonium nonadecafluorododecyl sulfonate, ammonium eicosafluorododecyl sulfonate, ammonium heneicosafluorododecyl sulfonate, ammonium docosafluorododecyl sulfonate, ammonium tricosafluorododecyl sulfonate, ammonium tetracosafluorododecyl sulfonate, ammonium pentacosafluorododecyl sulfonate, dimethylammonium monofluorobutyl sulfonate, dimethylammonium difluorobutyl sulfonate, dimethylammonium trifluorobutyl sulfonate, dimethylammonium tetrafluorobutyl sulfonate, dimethylammonium pentafluorobutyl sulfonate, dimethylammonium hexafluorobutyl sulfonate, dimethylammonium heptafluorobutyl sulfonate, dimethylammonium octafluorobutyl sulfonate, dimethylammonium nonafluorobutyl sulfonate, dimethylammonium monofluoropentyl sulfonate, dimethylammonium difluoropentyl sulfonate, dimethylammonium trifluoropentyl sulfonate, dimethylammonium tetrafluoropentyl sulfonate, dimethylammonium pentafluoropentyl sulfonate, dimethylammonium hexafluoropentyl sulfonate, dimethylammonium heptafluoropentyl sulfonate, dimethylammonium octafluoropentyl sulfonate, dimethylammonium nonafluoropentyl sulfonate, dimethylammonium decafluoropentyl sulfonate, dimethylammonium undecafluoropentyl sulfonate, dimethylammonium monofluorohexyl sulfonate, dimethylammonium difluorohexyl sulfonate, dimethylammonium trifluorohexyl sulfonate, dimethylammonium tetrafluorohexyl sulfonate, dimethylammonium pentafluorohexyl sulfonate, dimethylammonium hexafluorohexyl sulfonate, dimethylammonium heptafluorohexyl sulfonate, dimethylammonium octafluorohexyl sulfonate, dimethylammonium nonafluorohexyl sulfonate, dimethylammonium decafluorohexyl sulfonate, dimethylammonium undecafluorohexyl sulfonate, dimethylammonium dodecafluorohexyl sulfonate, dimethylammonium tridecafluorohexyl sulfonate, dimethylammonium monofluoroheptyl sulfonate, dimethylammonium difluoroheptyl sulfonate, dimethylammonium trifluoroheptyl sulfonate, dimethylammonium tetrafluoroheptyl sulfonate, dimethylammonium pentafluoroheptyl sulfonate, dimethylammonium hexafluoroheptyl sulfonate, dimethylammonium heptafluoroheptyl sulfonate, dimethylammonium octafluoroheptyl sulfonate, dimethylammonium nonafluoroheptyl sulfonate, dimethylammonium decafluoroheptyl sulfonate, dimethylammonium undecafluoroheptyl sulfonate, dimethylammonium dodecafluoroheptyl sulfonate, dimethylammonium tridecafluoroheptyl sulfonate, dimethylammonium tetradecafluoroheptyl sulfonate, dimethylammonium pentadecafluoroheptyl sulfonate, dimethylammonium monofluorooctyl sulfonate, dimethylammonium difluorooctyl sulfonate, dimethylammonium trifluorooctyl sulfonate, dimethylammonium tetrafluorooctyl sulfonate, dimethylammonium pentafluorooctyl sulfonate, dimethylammonium hexafluorooctyl sulfonate, dimethylammonium heptafluorooctyl sulfonate, dimethylammonium octafluorooctyl sulfonate, dimethylammonium nonafluorooctyl sulfonate, dimethylammonium decafluorooctyl sulfonate, dimethylammonium undecafluorooctyl sulfonate, dimethylammonium dodecafluorooctyl sulfonate, dimethylammonium tridecafluorooctyl sulfonate, dimethylammonium tetradecafluorooctyl sulfonate, dimethylammonium pentadecafluorooctyl sulfonate, dimethylammonium hexadecafluorooctyl sulfonate, dimethylammonium heptadecafluorooctyl sulfonate, dimethylammonium monofluorononyl sulfonate, dimethylammonium difluorononyl sulfonate, dimethylammonium trifluorononyl sulfonate, dimethylammonium tetrafluorononyl sulfonate, dimethylammonium pentafluorononyl sulfonate, dimethylammonium hexafluorononyl sulfonate, dimethylammonium heptafluorononyl sulfonate, dimethylammonium octafluorononyl sulfonate, dimethylammonium nonafluorononyl sulfonate, dimethylammonium decafluorononyl sulfonate, dimethylammonium undecafluorononyl sulfonate, dimethylammonium dodecafluorononyl sulfonate, dimethylammonium tridecafluorononyl sulfonate, dimethylammonium tetradecafluorononyl sulfonate, dimethylammonium pentadecafluorononyl sulfonate, dimethylammonium hexadecafluorononyl sulfonate, dimethylammonium heptadecafluorononyl sulfonate, dimethylammonium octadecafluorononyl sulfonate, dimethylammonium nonadecafluorononyl sulfonate, dimethylammonium monofluorodecyl sulfonate, dimethylammonium difluorodecyl sulfonate, dimethylammonium trifluorodecyl sulfonate, dimethylammonium tetrafluorodecyl sulfonate, dimethylammonium pentafluorodecyl sulfonate, dimethylammonium hexafluorodecyl sulfonate, dimethylammonium heptafluorodecyl sulfonate, dimethylammonium octafluorodecyl sulfonate, dimethylammonium nonafluorodecyl sulfonate, dimethylammonium decafluorodecyl sulfonate, dimethylammonium undecafluorodecyl sulfonate, dimethylammonium dodecafluorodecyl sulfonate, dimethylammonium tridecafluorodecyl sulfonate, dimethylammonium tetradecafluorodecyl sulfonate, dimethylammonium pentadecafluorodecyl sulfonate, dimethylammonium hexadecafluorodecyl sulfonate, dimethylammonium heptadecafluorodecyl sulfonate, dimethylammonium octadecafluorodecyl sulfonate, dimethylammonium nonadecafluorodecyl sulfonate, dimethylammonium eicosafluorodecyl sulfonate, dimethylammonium heneicosafluorodecyl sulfonate, dimethylammonium monofluoroundecyl sulfonate, dimethylammonium difluoroundecyl sulfonate, dimethylammonium trifluoroundecyl sulfonate, dimethylammonium tetrafluoroundecyl sulfonate, dimethylammonium pentafluoroundecyl sulfonate, dimethylammonium hexafluoroundecyl sulfonate, dimethylammonium heptafluoroundecyl sulfonate, dimethylammonium octafluoroundecyl sulfonate, dimethylammonium nonafluoroundecyl sulfonate, dimethylammonium decafluoroundecyl sulfonate, dimethylammonium undecafluorundecyl sulfonate, dimethylammonium dodecafluoroundecyl sulfonate, dimethylammonium tridecafluorundecyl sulfonate, dimethylammonium tetradecafluoroundecyl sulfonate, dimethylammonium pentadecafluoroundecyl sulfonate, dimethylammonium hexadecafluoroundecyl sulfonate, dimethylammonium heptadecafluoroundecyl sulfonate, dimethylammonium octadecafluoroundecyl sulfonate, dimethylammonium nonadecafluoroundecyl sulfonate, dimethylammonium eicosafluoroundecyl sulfonate, dimethylammonium heneicosafluoroundecyl sulfonate, dimethylammonium docosafluoroundecyl sulfonate, dimethylammonium tricosafluoroundecyl sulfonate, dimethylammonium monofluorododecyl sulfonate, dimethylammonium difluorododecyl sulfonate, dimethylammonium trifluorododecyl sulfonate, dimethylammonium tetrafluorododecyl sulfonate, dimethylammonium pentafluorododecyl sulfonate, dimethylammonium hexafluorododecyl sulfonate, dimethylammonium heptafluorododecyl sulfonate, dimethylammonium octafluorododecyl sulfonate, dimethylammonium nonafluorododecyl sulfonate, dimethylammonium decafluorododecyl sulfonate, dimethylammonium undecafluorododecyl sulfonate, dimethylammonium dodecafluorododecyl sulfonate, dimethylammonium tridecafluorododecyl sulfonate, dimethylammonium tetradecafluorododecyl sulfonate, dimethylammonium pentadecafluorododecyl sulfonate, dimethylammonium hexadecafluorododecyl sulfonate, dimethylammonium heptadecafluorododecyl sulfonate, dimethylammonium octadecafluorododecyl sulfonate, dimethylammonium nonadecafluorododecyl sulfonate, dimethylammonium eicosafluorododecyl sulfonate, dimethylammonium heneicosafluorododecyl sulfonate, dimethylammonium docosafluorododecyl sulfonate, dimethylammonium tricosafluorododecyl sulfonate, dimethylammonium tetracosafluorododecyl sulfonate, dimethylammonium pentacosafluorododecyl sulfonate, tetraethylammonium monofluorobutyl sulfonate, tetraethylammonium difluorobutyl sulfonate, tetraethylammonium trifluorobutyl sulfonate, tetraethylammonium tetrafluorobutyl sulfonate, tetraethylammonium pentafluorobutyl sulfonate, tetraethylammonium hexafluorobutyl sulfonate, tetraethylammonium heptafluorobutyl sulfonate, tetraethylammonium octafluorobutyl sulfonate, tetraethylammonium nonafluorobutyl sulfonate, tetraethylammonium monofluoropentyl sulfonate, tetraethylammonium difluoropentyl sulfonate, tetraethylammonium trifluoropentyl sulfonate, tetraethylammonium tetrafluoropentyl sulfonate, tetraethylammonium pentafluoropentyl sulfonate, tetraethylammonium hexafluoropentyl sulfonate, tetraethylammonium heptafluoropentyl sulfonate, tetraethylammonium octafluoropentyl sulfonate, tetraethylammonium nonafluoropentyl sulfonate, tetraethylammonium decafluoropentyl sulfonate, tetraethylammonium undecafluoropentyl sulfonate, tetraethylammonium monofluorohexyl sulfonate, tetraethylammonium difluorohexyl sulfonate, tetraethylammonium trifluorohexyl sulfonate, tetraethylammonium tetrafluorohexyl sulfonate, tetraethylammonium pentafluorohexyl sulfonate, tetraethylammonium hexafluorohexyl sulfonate, tetraethylammonium heptafluorohexyl sulfonate, tetraethylammonium octafluorohexyl sulfonate, tetraethylammonium nonafluorohexyl sulfonate, tetraethylammonium decafluorohexyl sulfonate, tetraethylammonium undecafluorohexyl sulfonate, tetraethylammonium dodecafluorohexyl sulfonate, tetraethylammonium tridecafluorohexyl sulfonate, tetraethylammonium monofluoroheptyl sulfonate, tetraethylammonium difluoroheptyl sulfonate, tetraethylammonium trifluoroheptyl sulfonate, tetraethylammonium tetrafluoroheptyl sulfonate, tetraethylammonium pentafluoroheptyl sulfonate, tetraethylammonium hexafluoroheptyl sulfonate, tetraethylammonium heptafluoroheptyl sulfonate, tetraethylammonium octafluoroheptyl sulfonate, tetraethylammonium nonafluoroheptyl sulfonate, tetraethylammonium decafluoroheptyl sulfonate, tetraethylammonium undecafluoroheptyl sulfonate, tetraethylammonium dodecafluoroheptyl sulfonate, tetraethylammonium tridecafluoroheptyl sulfonate, tetraethylammonium tetradecafluoroheptyl sulfonate, tetraethylammonium pentadecafluoroheptyl sulfonate, tetraethylammonium monofluorooctyl sulfonate, tetraethylammonium difluorooctyl sulfonate, tetraethylammonium trifluorooctyl sulfonate, tetraethylammonium tetrafluorooctyl sulfonate, tetraethylammonium pentafluorooctyl sulfonate, tetraethylammonium hexafluorooctyl sulfonate, tetraethylammonium heptafluorooctyl sulfonate, tetraethylammonium octafluorooctyl sulfonate, tetraethylammonium nonafluorooctyl sulfonate, tetraethylammonium decafluorooctyl sulfonate, tetraethylammonium undecafluorooctyl sulfonate, tetraethylammonium dodecafluorooctyl sulfonate, tetraethylammonium tridecafluorooctyl sulfonate, tetraethylammonium tetradecafluorooctyl sulfonate, tetraethylammonium pentadecafluorooctyl sulfonate, tetraethylammonium hexadecafluorooctyl sulfonate, tetraethylammonium heptadecafluorooctyl sulfonate, tetraethylammonium monofluorononyl sulfonate, tetraethylammonium difluorononyl sulfonate, tetraethylammonium trifluorononyl sulfonate, tetraethylammonium tetrafluorononyl sulfonate, tetraethylammonium pentafluorononyl sulfonate, tetraethylammonium hexafluorononyl sulfonate, tetraethylammonium heptafluorononyl sulfonate, tetraethylammonium octafluorononyl sulfonate, tetraethylammonium nonafluorononyl sulfonate, tetraethylammonium decafluorononyl sulfonate, tetraethylammonium undecafluorononyl sulfonate, tetraethylammonium dodecafluorononyl sulfonate, tetraethylammonium tridecafluorononyl sulfonate, tetraethylammonium tetradecafluorononyl sulfonate, tetraethylammonium pentadecafluorononyl sulfonate, tetraethylammonium hexadecafluorononyl sulfonate, tetraethylammonium heptadecafluorononyl sulfonate, tetraethylammonium octadecafluorononyl sulfonate, tetraethylammonium nonadecafluorononyl sulfonate, tetraethylammonium monofluorodecyl sulfonate, tetraethylammonium difluorodecyl sulfonate, tetraethylammonium trifluorodecyl sulfonate, tetraethylammonium tetrafluorodecyl sulfonate, tetraethylammonium pentafluorodecyl sulfonate, tetraethylammonium hexafluorodecyl sulfonate, tetraethylammonium heptafluorodecyl sulfonate, tetraethylammonium octafluorodecyl sulfonate, tetraethylammonium nonafluorodecyl sulfonate, tetraethylammonium decafluorodecyl sulfonate, tetraethylammonium undecafluorodecyl sulfonate, tetraethylammonium dodecafluorodecyl sulfonate, tetraethylammonium tridecafluorodecyl sulfonate, tetraethylammonium tetradecafluorodecyl sulfonate, tetraethylammonium pentadecafluorodecyl sulfonate, tetraethylammonium hexadecafluorodecyl sulfonate, tetraethylammonium heptadecafluorodecyl sulfonate, tetraethylammonium octadecafluorodecyl sulfonate, tetraethylammonium nonadecafluorodecyl sulfonate, tetraethylammonium eicosafluorodecyl sulfonate, tetraethylammonium heneicosafluorodecyl sulfonate, tetraethylammonium monofluoroundecyl sulfonate, tetraethylammonium difluoroundecyl sulfonate, tetraethylammonium trifluoroundecyl sulfonate, tetraethylammonium tetrafluoroundecyl sulfonate, tetraethylammonium pentafluoroundecyl sulfonate, tetraethylammonium hexafluoroundecyl sulfonate, tetraethylammonium heptafluoroundecyl sulfonate, tetraethylammonium octafluoroundecyl sulfonate, tetraethylammonium nonafluoroundecyl sulfonate, tetraethylammonium decafluoroundecyl sulfonate, tetraethylammonium undecafluorundecyl sulfonate, tetraethylammonium dodecafluoroundecyl sulfonate, tetraethylammonium tridecafluorundecyl sulfonate, tetraethylammonium tetradecafluoroundecyl sulfonate, tetraethylammonium pentadecafluoroundecyl sulfonate, tetraethylammonium hexadecafluoroundecyl sulfonate, tetraethylammonium heptadecafluoroundecyl sulfonate, tetraethylammonium octadecafluoroundecyl sulfonate, tetraethylammonium nonadecafluoroundecyl sulfonate, tetraethylammonium eicosafluoroundecyl sulfonate, tetraethylammonium heneicosafluoroundecyl sulfonate, tetraethylammonium docosafluoroundecyl sulfonate, tetraethylammonium tricosafluoroundecyl sulfonate, tetraethylammonium monofluorododecyl sulfonate, tetraethylammonium difluorododecyl sulfonate, tetraethylammonium trifluorododecyl sulfonate, tetraethylammonium tetrafluorododecyl sulfonate, tetraethylammonium pentafluorododecyl sulfonate, tetraethylammonium hexafluorododecyl sulfonate, tetraethylammonium heptafluorododecyl sulfonate, tetraethylammonium octafluorododecyl sulfonate, tetraethylammonium nonafluorododecyl sulfonate, tetraethylammonium decafluorododecyl sulfonate, tetraethylammonium undecafluorododecyl sulfonate, tetraethylammonium dodecafluorododecyl sulfonate, tetraethylammonium tridecafluorododecyl sulfonate, tetraethylammonium tetradecafluorododecyl sulfonate, tetraethylammonium pentadecafluorododecyl sulfonate, tetraethylammonium hexadecafluorododecyl sulfonate, tetraethylammonium heptadecafluorododecyl sulfonate, tetraethylammonium octadecafluorododecyl sulfonate, tetraethylammonium nonadecafluorododecyl sulfonate, tetraethylammonium eicosafluorododecyl sulfonate, tetraethylammonium heneicosafluorododecyl sulfonate, tetraethylammonium docosafluorododecyl sulfonate, tetraethylammonium tricosafluorododecyl sulfonate, tetraethylammonium tetracosafluorododecyl sulfonate, and tetraethylammonium pentacosafluorododecyl sulfonate.

It is obvious that corresponding to the statements made above, the respective corresponding polyfluorosulfonic acids for the polyfluorosulfonates mentioned may also be a component of the additive, namely, especially if the counterion is $H^+$.

It is also conceivable in this connection that at least one surfactant is an anionic, fluorinated surfactant, which has a perfluorinated hexylene or octylene group, an ethylene spacer and a sulfonate group as a head group. The surfactant thus may also be a perfluoroalkylsulfonic acid or a perfluoroalkyl sulfonate with a spacer, preferably with an ethylene spacer. In particular, it is conceivable in this connection that the surfactant is one of the above-mentioned surfactants corresponding to one of the formulas $(C_nF_{(2n+1)-m}H_m—SO_3^-)Na^+$, $(C_nF_{(2n+1)-m}H_m—SO_3^-)K^+$, $(C_nF_{(2n+1)-m}H_m—SO_3^-)Li^+$ or $(C_nF_{(2n+1)-m}H_m—SO_3^-)((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, with n and m defined as above, preferably n={4, 5, 6, 7, 8, 9, 10, 11, 12}, wherein an ethylene spacer is arranged between the fluorinated alkyl chain and the sulfonate head of the surfactant.

Polyfluorinated surfactants corresponding to one of the formulas $(C_nF_{(2n+1)-m}H_m—SO_3^-)Na^+$, $(C_nF_{(2n+1)-m}H_m—SO_3^-)K^+$, $(C_nF_{(2n+1)-m}H_m—SO_3^-)Li^+$ or $(C_nF_{(2n+1)-m}H_m—SO_3—)$ $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, in which n={4, 5, 6, 7, 8, 9, 10, 11, 12} and m={1, 2, 3, 4, 5, 6, 7, 8, 9, 10, 11, 12, 13, 14, 15, 16, 17, 18, 19, 20, 21, 22, 23, 24}, proved to be especially favorable. It is especially favorable in this connection if, in addition, (2n+1−m)={3, 4, 5, 6, 7, 8, 9, 10, 11, 12, 13, 14, 15, 16, 17). The position of the H and F atoms on the alkyl chain of the respective surfactant is freely selectable.

Furthermore, it may also be advantageous if the additive is a mixture of an anionic surfactant and at least one additional component. For example, the additive may have a nonionic surfactant in addition to the anionic surfactant. It is conceivable, e.g., that the additive contains a fluorinated surfactant, which contains a perfluorinated hexylene group, an ethylene spacer and a sulfonic acid as a head group, as well as polyethylene glycol (PEG) as another component. In any case, it is conceivable here as well that the polyfluoroalkylsulfonic acid occurs as polyfluoroalkyl sulfonate. A counterion that is selected from $H^+$, $Na^+$, $K^+$, $Li^+$ or $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, may likewise be used as a counterion here.

In another exemplary embodiment, at least one surfactant is a halogen-free anionic corresponding to Formula II:

$$(C_nH_{2+1}—SO_3)R1 \qquad \text{Formula II}$$

in which n={1, 2, 3, 4, 5, 6, 7, 8, 9, 10, 11, 12}. R1 is selected from the group comprising $H^+$, $Na^+$, $K^+$, $Li^+$ or $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. It is preferred in this connection if n={4, 5, 6, 7, 8, 9, 10, 11, 12}.

It is thus seen that it is advantageous if at least one surfactant is selected from among sodium 1-butyl sulfonate, sodium 1-pentyl sulfonate, sodium 1-hexyl sulfonate, sodium 1-heptyl sulfonate, sodium 1-octyl sulfonate, sodium 1-nonyl sulfonate, sodium 1-decyl sulfonate, sodium 1-undecyl sulfonate, sodium 1-dodecyl sulfonate, sodium isobutyl sulfonate, sodium isopentyl sulfonate, sodium isohexyl sulfonate, sodium isoheptyl sulfonate, sodium isooctyl sulfonate, sodium isononyl sulfonate, sodium isodecyl sulfonate, sodium isoundecyl sulfonate, sodium isododecyl sulfonate, potassium 1-butyl sulfonate, potassium 1-pentyl sulfonate, potassium 1-hexyl sulfonate, potassium 1-heptyl sulfonate, potassium 1-octyl sulfonate, potassium 1-nonyl sulfonate, potassium 1-decyl sulfonate, potassium 1-undecyl sulfonate, potassium 1-dodecyl sulfonate, potassium isobutyl sulfonate, potassium isopentyl sulfonate, potassium isohexyl sulfonate, potassium isoheptyl sulfonate, potassium isooctyl sulfonate, potassium isononyl sulfonate, potassium isodecyl sulfonate, potassium isoundecyl sulfonate, potassium isododecyl sulfonate, preferably from among sodium 1-butyl sulfonate, sodium 1-dodecyl sulfonate, sodium 1-isobutyl sulfonate, sodium 1-isododecyl sulfonate, potassium 1-butyl sulfonate, potassium 1-dodecyl sulfonate, potassium 1-isobutyl sulfonate, potassium 1-isododecyl sulfonate, especially preferably from among sodium 1-butyl sulfonate, sodium 1-dodecyl sulfonate, potassium 1-butyl sulfonate, potassium 1-dodecyl sulfonate or the corresponding lithium, ammonium as well as di-, tri- or tetraalkylammonium compounds of the compounds mentioned.

It is thus seen that the anionic surfactant is preferably an alkane sulfonate, which has a chain length of 4-12 carbon atoms and which has a sodium or potassium ion as a counterion.

Halogen-free surfactants with an $Li^+$ ion or with an ion corresponding to the formula $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, are, of course also conceivable as counterions. A halogen-free, anionic surfactant according to the present invention may therefore also be selected from the group containing lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium isobutyl sulfonate, lithium isopentyl sulfonate, lithium isohexyl sulfonate, lithium isoheptyl sulfonate, lithium isooctyl sulfonate, lithium isononyl sulfonate, lithium isodecyl sulfonate, lithium isoundecyl sulfonate, lithium isododecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium isobutyl sulfonate, lithium isopentyl sulfonate, lithium isohexyl sulfonate, lithium isoheptyl sulfonate, lithium isooctyl sulfonate, lithium isononyl sulfonate, lithium isodecyl sulfonate, lithium isoundecyl sulfonate, lithium isododecyl sulfonate, preferably from among lithium 1-butyl sulfonate, lithium 1-dodecyl sulfonate, lithium 1-isobutyl sulfonate, lithium 1-isododecyl sulfonate, lithium 1-butyl sulfonate, lithium 1-dodecyl sulfonate, lithium 1-isobutyl sulfonate, lithium 1-isododecyl sulfonate, especially preferably from among lithium 1-butyl sulfonate, lithium 1-dodecyl sulfonate, lithium 1-butyl sulfonate, lithium 1-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium isobutyl sulfonate, ammonium isopentyl sulfonate, ammonium isohexyl sulfonate, ammonium isoheptyl sulfonate, ammonium isooctyl sulfonate, ammonium isononyl sulfonate, ammonium isodecyl sulfonate, ammonium isoundecyl sulfonate, ammonium isododecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium isobutyl sulfonate, ammonium isopentyl sulfonate, ammonium isohexyl sulfonate, ammonium isoheptyl sulfonate, ammonium isooctyl sulfonate, ammonium isononyl sulfonate, ammonium isodecyl sulfonate, ammonium isoundecyl sulfonate, ammonium isododecyl sulfonate, preferably from among ammonium 1-butyl sulfonate, ammonium 1-dodecyl sulfonate, ammonium 1-isobutyl sulfonate, ammonium 1-isododecyl sulfonate, ammonium 1-butyl sulfonate, ammonium 1-dodecyl sulfonate, ammonium 1-isobutyl sulfonate, ammonium 1-isododecyl sulfonate, especially preferably from among ammonium 1-butyl sulfonate, ammonium 1-dodecyl sulfonate, ammonium 1-butyl sulfonate, ammonium 1-dodecyl sulfonate, dialkylammonium 1-butyl sulfonate, dialkylammonium 1-pentyl sulfonate, dialkylammonium 1-hexyl sulfonate, dialkylammonium 1-heptyl sulfonate, dialkylammonium 1-octyl sulfonate, dialkylammonium 1-nonyl sulfonate, dialkylammonium 1-decyl sulfonate, dialkylammonium 1-undecyl sulfonate, dialkylammonium 1-dodecyl sulfonate, dialkylammonium isobutyl sulfonate, dialkylammonium isopentyl sulfonate, dialkylammonium isohexyl sulfonate, dialkylammonium isoheptyl sulfonate, dialkylammonium isooctyl sulfonate, dialkylammonium isononyl sulfonate, dialkylammonium isodecyl sulfonate, dialkylammonium isoundecyl sulfonate, dialkylammonium isododecyl sulfonate, dialkylammonium 1-butyl sulfonate, dialkylammonium 1-pentyl sulfonate, dialkylammonium 1-hexyl sulfonate, dialkylammonium 1-heptyl sulfonate, dialkylammonium 1-octyl sulfonate, dialkylammonium 1-nonyl sulfonate, dialkylammonium 1-decyl sulfonate, dialkylammonium 1-undecyl sulfonate, dialkylammonium 1-dodecyl sulfonate, dialkylammonium isobutyl sulfonate, dialkylammonium isopentyl sulfonate, dialkylammonium isohexyl sulfonate, dialkylammonium isoheptyl sulfonate, dialkylammonium isooctyl sulfonate, dialkylammonium isononyl sulfonate, dialkylammonium isodecyl sulfonate, dialkylammonium isoundecyl sulfonate, dialkylammonium isododecyl sulfonate, preferably from among dialkylammonium 1-butyl sulfonate, dialkylammonium 1-dodecyl sulfonate, dialkylammonium 1-isobutyl sulfonate, dialkylammonium 1-isododecyl sulfonate, dialkylammonium 1-butyl sulfonate, dialkylammonium 1-dodecyl sulfonate, dialkylammonium 1-isobutyl sulfonate, dialkylammonium 1-isododecyl sulfonate, especially preferably from among dialkylammonium 1-butyl sulfonate, dialkylammonium 1-dodecyl sulfonate, dialkylammonium 1-butyl sulfonate, dialkylammonium 1-dodecyl sulfonate, trialkylammonium 1-butyl sulfonate, trialkylammonium 1-pentyl sulfonate, trialkylammonium 1-hexyl sulfonate, trialkylammonium 1-heptyl sulfonate, trialkylammonium 1-octyl sulfonate, trialkylammonium 1-nonyl sulfonate, trialkylammonium 1-decyl sulfonate, trialkylammonium 1-undecyl sulfonate, trialkylammonium 1-dodecyl sulfonate, trialkylammonium isobutyl sulfonate, trialkylammonium isopentyl sulfonate, trialkylammonium isohexyl sulfonate, trialkylammonium isoheptyl sulfonate, trialkylammonium isooctyl sulfonate, trialkylammonium isononyl sulfonate, trialkylammonium isodecyl sulfonate, trialkylammonium isoundecyl sulfonate, trialkylammonium isododecyl sulfonate, trialkylammonium 1-butyl sulfonate, trialkylammonium 1-pentyl sulfonate, trialkylammonium 1-hexyl sulfonate, trialkylammonium i-heptyl sulfonate, trialkylammonium 1-octyl sulfonate, trialkylammonium 1-nonyl sulfonate, trialkylammonium 1-decyl sulfonate, trialkylammonium 1-undecyl sulfonate, trialkylammonium 1-dodecyl sulfonate, trialkylammonium isobutyl sulfonate, trialkylammonium isopentyl sulfonate, trialkylammonium isohexyl sulfonate, trialkylammonium isoheptyl sulfonate, trialkylammonium isooctyl sulfonate, trialkylammonium isononyl sulfonate, trialkylammonium isodecyl sulfonate, trialkylammonium isoundecyl sulfonate, trialkylammonium isododecyl sulfonate, preferably from among trialkylammonium 1-butyl sulfonate, trialkylammonium 1-dodecyl sulfonate, trialkylammonium 1-isobutyl sulfonate, trialkylammonium 1-isododecyl sulfonate, trialkylammonium 1-butyl sulfonate, trialkylammonium 1-dodecyl sulfonate, trialkylammonium 1-isobutyl sulfonate, trialkylammonium 1-isododecyl sulfonate, especially preferably from among trialkylammonium 1-butyl sulfonate, trialkylammonium 1-dodecyl sulfonate, trialkylammonium 1-butyl sulfonate, trialkylammonium 1-dodecyl sulfonate, tetraalkylammonium 1-butyl sulfonate, tetraalkylammonium 1-pentyl sulfonate, tetraalkylammonium 1-hexyl sulfonate, tetraalkylammonium 1-heptyl sulfonate, tetraalkylammonium 1-octyl sulfonate, tetraalkylammonium 1-nonyl sulfonate, tetraalkylammonium 1-decyl sulfonate, tetraalkylammonium 1-undecyl sulfonate, tetraalkylammonium 1-dodecyl sulfonate, tetraalkylammonium isobutyl sulfonate, tetraalkylammonium isopentyl sulfonate, tetraalkylammonium isohexyl sulfonate, tetraalkylammonium isoheptyl sulfonate, tetraalkylammonium isooctyl sulfonate, tetraalkylammonium isononyl sulfonate, tetraalkylammonium isodecyl sulfonate, tetraalkylammonium isoundecyl sulfonate, tetraalkylammonium isododecyl sulfonate, tetraalkylammonium 1-butyl sulfonate, tetraalkylammonium 1-pentyl sulfonate, tetraalkylammonium 1-hexyl sulfonate, tetraalkylammonium 1-heptyl sulfonate, tetraalkylammonium 1-octyl sulfonate, tetraalkylammonium 1-nonyl sulfonate, tetraalkylammonium 1-decyl sulfonate, tetraalkylammonium 1-undecyl sulfonate, tetraalkylammonium 1-dodecyl sulfonate, tetraalkylammonium isobutyl sulfonate, tetraalkylammonium isopentyl sulfonate, tetraalkylammonium isohexyl sulfonate, tetraalkylammonium isoheptyl sulfonate, tetraalkylammonium isooctyl sulfonate, tetraalkylammonium isononyl sulfonate, tetraalkylammonium isodecyl sulfonate, tetraalkylammonium isoundecyl sulfonate, tetraalkylammonium isododecyl sulfonate, preferably from among tetraalkylammonium 1-butyl sulfonate, tetraalkylammonium 1-dodecyl sulfonate, tetraalkylammonium 1-isobutyl sulfonate, tetraalkylammonium 1-isododecyl sulfonate, tetraalkylammonium 1-butyl sulfonate, tetraalkylammonium 1-dodecyl sulfonate, tetraalkylammonium 1-isobutyl sulfonate, and tetraalkylammonium 1-isododecyl sulfonate, especially from the group containing lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium isobutyl sulfonate, lithium isopentyl sulfonate, lithium isohexyl sulfonate, lithium isoheptyl sulfonate, lithium isooctyl sulfonate, lithium isononyl sulfonate, lithium isodecyl sulfonate, lithium isoundecyl sulfonate, lithium isododecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium isobutyl sulfonate, lithium isopentyl sulfonate, lithium isohexyl sulfonate, lithium isoheptyl sulfonate, lithium isooctyl sulfonate, lithium isononyl sulfonate, lithium isodecyl sulfonate, lithium isoundecyl sulfonate, lithium isododecyl sulfonate, preferably from among lithium 1-butyl sulfonate, lithium 1-dodecyl sulfonate, lithium 1-isobutyl sulfonate, lithium 1-isododecyl sulfonate, lithium 1-butyl sulfonate, lithium 1-dodecyl sulfonate, lithium 1-isobutyl sulfonate, lithium 1-isododecyl sulfonate, especially preferably from among lithium 1-butyl sulfonate, lithium 1-dodecyl sulfonate, lithium 1-butyl sulfonate, lithium 1-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium isobutyl sulfonate, ammonium isopentyl sulfonate, ammonium isohexyl sulfonate, ammonium isoheptyl sulfonate, ammonium isooctyl sulfonate, ammonium isononyl sulfonate, ammonium isodecyl sulfonate, ammonium isoundecyl sulfonate, ammonium isododecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium isobutyl sulfonate, ammonium isopentyl sulfonate, ammonium isohexyl sulfonate, ammonium isoheptyl sulfonate, ammonium isooctyl sulfonate, ammonium isononyl sulfonate, ammonium isodecyl sulfonate, ammonium isoundecyl sulfonate, ammonium isododecyl sulfonate, preferably from among ammonium 1-butyl sulfonate, ammonium 1-dodecyl sulfonate, ammonium 1-isobutyl sulfonate, ammonium 1-isododecyl sulfonate, ammonium 1-butyl sulfonate, ammonium 1-dodecyl sulfonate, ammonium 1-isobutyl sulfonate, ammonium 1-isododecyl sulfonate, especially preferably from among ammonium 1-butyl sulfonate, ammonium 1-dodecyl sulfonate, ammonium 1-butyl sulfonate, ammonium 1-dodecyl sulfonate, dimethylammonium 1-butyl sulfonate, dimethylammonium 1-pentyl sulfonate, dimethylammonium 1-hexyl sulfonate, dimethylammonium 1-heptyl sulfonate, dimethylammonium 1-octyl sulfonate, dimethylammonium 1-nonyl sulfonate, dimethylammonium 1-decyl sulfonate, dimethylammonium 1-undecyl sulfonate, dimethylammonium 1-dodecyl sulfonate, dimethylammonium isobutyl sulfonate, dimethylammonium isopentyl sulfonate, dimethylammonium isohexyl sulfonate, dimethylammonium isoheptyl sulfonate, dimethylammonium isooctyl sulfonate, dimethylammonium isononyl sulfonate, dimethylammonium isodecyl sulfonate, dimethylammonium isoundecyl sulfonate, dimethylammonium isododecyl sulfonate, dimethylammonium 1-butyl sulfonate, dimethylammonium 1-pentyl sulfonate, dimethylammonium 1-hexyl sulfonate, dimethylammonium 1-heptyl sulfonate, dimethylammonium 1-octyl sulfonate, dimethylammonium 1-nonyl sulfonate, dimethylammonium 1-decyl sulfonate, dimethylammonium 1-undecyl sulfonate, dimethylammonium 1-dodecyl sulfonate, dimethylammonium isobutyl sulfonate, dimethylammonium isopentyl sulfonate, dimethylammonium isohexyl sulfonate, dimethylammonium isoheptyl sulfonate, dimethylammonium isooctyl sulfonate, dimethylammonium isononyl sulfonate, dimethylammonium isodecyl sulfonate, dimethylammonium isoundecyl sulfonate, dimethylammonium isododecyl sulfonate, preferably from among dimethylammonium 1-butyl sulfonate, dimethylammonium 1-dodecyl sulfonate, dimethylammonium 1-isobutyl sulfonate, dimethylammonium 1-isododecyl sulfonate, dimethylammonium 1-butyl sulfonate, dimethylammonium 1-dodecyl sulfonate, dimethylammonium 1-isobutyl sulfonate, dimethylammonium 1-isododecyl sulfonate, especially preferably from among dimethylammonium 1-butyl sulfonate, dimethylammonium 1-dodecyl sulfonate, dimethylammonium 1-butyl sulfonate, dimethylammonium 1-dodecyl sulfonate, tetraethylammonium 1-butyl sulfonate, tetraethylammonium 1-pentyl sulfonate, tetraethylammonium 1-hexyl sulfonate, tetraethylammonium 1-heptyl sulfonate, tetraethylammonium 1-octyl sulfonate, tetraethylammonium 1-nonyl sulfonate, tetraethylammonium 1-decyl sulfonate, tetraethylammonium 1-undecyl sulfonate, tetraethylammonium 1-dodecyl sulfonate, tetraethylammonium isobutyl sulfonate, tetraethylammonium isopentyl sulfonate, tetraethylammonium isohexyl sulfonate, tetraethylammonium isoheptyl sulfonate, tetraethylammonium isooctyl sulfonate, tetraethylammonium isononyl sulfonate, tetraethylammonium isodecyl sulfonate, tetraethylammonium isoundecyl sulfonate, tetraethylammonium isododecyl sulfonate, tetraethylammonium 1-butyl sulfonate, tetraethylammonium 1-pentyl sulfonate, tetraethylammonium 1-hexyl sulfonate, tetraethylammonium 1-heptyl sulfonate, tetraethylammonium 1-octyl sulfonate, tetraethylammonium 1-nonyl sulfonate, tetraethylammonium 1-decyl sulfonate, tetraethylammonium 1-undecyl sulfonate, tetraethylammonium 1-dodecyl sulfonate, tetraethylammonium isobutyl sulfonate, tetraethylammonium isopentyl sulfonate, tetraethylammonium isohexyl sulfonate, tetraethylammonium isoheptyl sulfonate, tetraethylammonium isooctyl sulfonate, tetraethylammonium isononyl sulfonate, tetraethylammonium isodecyl sulfonate, tetraethylammonium isoundecyl sulfonate, tetraethylammonium isododecyl sulfonate, preferably from among tetraethylammonium 1-butyl sulfonate, tetraethylammonium 1-dodecyl sulfonate, tetraethylammonium 1-isobutyl sulfonate, tetraethylammonium 1-isododecyl sulfonate, tetraethylammonium 1-butyl sulfonate, tetraethylammonium 1-dodecyl sulfonate, tetraethylammonium 1-isobutyl sulfonate, tetraethylammonium 1-isododecyl sulfonate, especially preferably from among tetraethylammonium isobutyl sulfonate, tetraethylammonium isododecyl sulfonate, tetraethylammonium 1-butyl sulfonate, and tetraethylammonium 1-dodecyl sulfonate.

In other aspects, an anionic surfactant according to the present invention may be an alkylbenzene sulfonate, an alkyl sulfate or an alkyl ether sulfate.

It is conceivable in another embodiment that at least one surfactant is a cationic surfactant. Typical representatives of cationic surfactants are quaternary ammonium compounds. Salts of long-chain primary amines may also represent such cationic surfactants. It is especially favorable in the course of the present invention if the cationic surfactant is an ammonium compound, preferably a quaternary ammonium compound, especially preferably a tetraalkylammonium compound. The alkyl chains of such a tetraalkylammonium compound are preferably linear alkyl groups. It is especially favorable here if at least one alkyl group has a length of 1, 2, 3, 4, 5, 6, 7, 8, 9, 10, 11, 12, 13, 14, 15, 16, 17, 18, 19 or 20 carbon atoms. For example, at least one surfactant according to the present invention may be a surfactant corresponding to Formula III $$[((C_sH_{2s+1})(C_pH_{2p+1})(C_qH_{2q+1})(C_rH_{2r+1}))N^+]R2 \qquad \text{(Formula III)}$$

in which s={0, 1, 2, 3, 4, 5, 6, 7, 8, 9, 10, 11, 12, 13, 14, 15, 16, 17, 18, 19, 20}, p={0, 1, 2, 3, 4, 5, 6, 7, 8, 9, 10, 11, 12, 13, 14, 15, 16, 17, 18, 19, 20}, q={0, 1, 2, 3, 4, 5, 6, 7, 8, 9, 10, 11, 12, 13, 14, 15, 16, 17, 18, 19, 20}, and r={0, 1, 2, 3, 4, 5, 6, 7, 8, 9, 10, 11, 12, 13, 14, 15, 16, 17, 18, 19, 20}, wherein R2 is selected from the group containing $HSO_4^-$, $H_2PO_4^-$, $CF_3$—$SO_3^-$, $C_2F_2HSO_3^-$, $CF_3$—$COO^-$. R2 is preferably selected from among $HSO_4^-$ and $H_2PO_4^-$, and is preferably $HSO_4^-$.

It is thus seen that a cationic surfactant, which is a cationic ammonium compound, may be a primary, secondary, tertiary or quaternary ammonium compound. A primary ammonium compound is defined here as a compound for which three of the variables s, p, q, r have the value 0 and the fourth one is selected from {1, 2, 3, 4, 5, 6, 7, 8, 9, 10, 11, 12, 13, 14, 15, 16, 17, 18, 19, 20}. A secondary ammonium compound is defined as a compound for which two of the variables s, p, q, r have the value 0 and the other two are selected, independently from one another, from {1, 2, 3, 4, 5, 6, 7, 8, 9, 10, 11, 12, 13, 14, 15, 16, 17, 18, 19, 20}. A tertiary ammonium compound is defined as a compound for which one of the variables s, p, q, r has the value 0 and the other three are selected, independently from one another, from {1, 2, 3, 4, 5, 6, 7, 8, 9, 10, 11, 12, 13, 14, 15, 16, 17, 18, 19, 20}. t is seen that it is especially favorable if such a cationic surfactant is an ammonium compound in which at least one of the alkyl chains is markedly longer than the other groups that are bound to the nitrogen. The long alkyl chain forms the hydrophobic moiety of the surfactant, while the nitrogen atom with the short chains forms the hydrophilic moiety of the surfactant. It is thus favorable if at least one of the following conditions applies to a compound corresponding to Formula III or to a compound corresponding to the following Formulas IIIa, IIIb, IIIc, IIId, IIId', IIIe, IIIe':

a) s+p+q+1≤r, and/or b) at least two of the values s, p, q, r are selected from {0, 1, 2} and at least one of the values s, p, q, r is selected from {5, 6, 7, 8, 9, 10, 11, 12, 13, 14, 15, 16, 17, 18, 19, 20}.

In any case, it is especially favorable if the ammonium compound has at least two alkyl groups. It is especially favorable in this connection if these two alkyl groups have a length of at least two carbon atoms. At least one of the alkyl groups especially preferably has a length of at least five carbon atoms. An ammonium compound according to the present invention is thus preferably a compound corresponding to Formula IIIa $$[((C_sH_{2s+1})(C_pH_{2p+1})(C_qH_{2q+1})(C_rH_{2r+1}))N^+]R2 \qquad \text{(Formula IIIa)}$$

in which s={0, 1, 2}, p={0, 1, 2}, q={2, 3, 4, 5, 6, 7, 8, 9, 10, 11, 12, 13, 14, 15, 16, 17, 18, 19, 20}, r={5, 6, 7, 8, 9, 10, 11, 12, 13, 14, 15, 16, 17, 18, 19, 20} and wherein R2 is selected from the group containing $HSO_4^-$, $H_2PO_4^-$, $CF_3$—$SO_3^-$, $C_2F_4HSO_3^-$, $CF_3$—$COO^-$, and $(CF_3$—$SO_2)_2N^-$.

It is especially favorable if the alkyl groups are, independently from one another, linear carbon chains with a length of 1, 2, 3, 4, 5, 6, 7, 8, 9, 10, 11, 12, 13, 14, 15, 16, 17 or 18 carbon atoms, and preferably with a length of 1, 2, 3, 4, 5, 6, 7, 8, 9, 10, 11 or 12 carbon atoms. It is, of course, also conceivable that the ammonium compound has three or more alkyl groups with a corresponding length. In other words, an ammonium compound according to the present invention is, for example, a secondary, tertiary or quaternary ammonium compound corresponding to Formula IIIb $$[((C_sH_{2s+1})(C_pH_{2p+1})(C_qH_{2q+1})(C_rH_{2r+1}))N^+]R2 \quad \text{(Formula IIIb)},$$

in which s={2, 3, 4, 5, 6, 7, 8, 9, 10, 11, 12}, p={2, 3, 4, 5, 6, 7, 8, 9, 10, 11, 12}, q={0, 1, 2, 3, 4, 5, 6, 7, 8, 9, 10, 11, 12}, r={0, 1, 2, 3, 4, 5, 6, 7, 8, 9, 10, 11, 12} and wherein R2 is selected from the group containing $HSO_4^-$, $H_2PO_4^-$, $CF_3$—$SO_3^-$, $C_2F_2HSO_3^-$, and $CF_3^-COO^-$.

It was, however, surprisingly found to be especially advantageous if the ammonium compound has at least two methyl groups. It is especially favorable in this connection if the ammonium compound has a quaternary ammonium compound that contains at least two methyl groups. In other words, if the quaternary ammonium compound is a tetraalkylammonium compound, at least two of the alkyl groups of the tetraalkylammonium compound have a length of only one carbon atom. It is especially preferred in this connection if the ammonium compound has even three methyl groups and if the fourth alkyl group has a length of two or more, preferably at least four or more carbon atoms. Such a tetraalkylammonium compound according to the present invention corresponds to the Formula IIIc $$[((C_sH_{2s+1})(C_pH_{2p+1})(C_qH_{2q+1})(C_rH_{2r+1}))N^+]R2 \quad \text{(Formula IIIc)},$$

in which s={2, 3, 4, 5, 6, 7, 8, 9, 10, 11, 12}, p={1, 2, 3, 4, 5, 6, 7, 8, 9, 10, 11, 12}, q={1}, r={1}, and wherein R2 is selected from the group containing $HSO_4^-$, $H_2PO_4^-$, $CF_3$—$SO_3^-$, $C_2F_2HSO_3^-$, and $CF_3^-COO^-$.

If at least one surfactant of the additive according to the present invention is a cationic surfactant, it is advantageous if a hydrogen sulfate is used as the counterion for this surfactant. It is seen that it is especially favorable if the cationic surfactant is a hydrogen sulfate salt of a quaternary ammonium compound. A typical example of such a surfactant is, e.g., dodecyltrimethylammonium hydrogen sulfate. The use of hydrogen sulfate salts is especially advantageous if the liquid medium is sulfuric acid or perchloric acid and preferably sulfuric acid. A surfactant according to the present invention now corresponds, for example, to Formula IIId $$[((C_sH_{2s+1})(C_pH_{2p+1})(C_qH_{2q+1})(C_rH_{2r+1}))N^+]HSO_4^- \quad \text{(Formula IIId)},$$

in which s={2, 3, 4, 5, 6, 7, 8, 9, 10, 11, 12}, p={1, 2, 3, 4, 5, 6, 7, 8, 9, 10, 11, 12}, q={1}, and r={1}. Or, written in another form, $$[((C_sH_{2s+1})(C_pH_{2p+1})(CH_3)_2)N^+]HSO_4^- \quad \text{(Formula IIId')},$$

with s and p as above.

It is also conceivable that dihydrogen phosphate is used as the counterion. Another preferred example of a surfactant according to the present invention in this connection is dodecyltrimethylammonium dihydrogen phosphate. It is therefore likewise conceivable that the cationic surfactant is a phosphate salt, especially a dihydrogen phosphate salt, of a quaternary ammonium compound, e.g., a tetraalkylammonium dihydrogen phosphate. A surfactant according to the present invention now corresponds, for example, to Formula IIIe $$[((C_sH_{2s+1})(C_pH_{2p+1})(C_qH_{2q+1})(C_rH_{2r+1}))N^+]H_2PO_4^- \quad \text{(Formula IIIe)},$$

in which s={2, 3, 4, 5, 6, 7, 8, 9, 10, 11, 12}, p={1, 2, 3, 4, 5, 6, 7, 8, 9, 10, 11, 12}, q={1}, and r={1}. Or, written in another form, $$[((C_sH_{2s+1})(C_pH_{2p+1})(CH_3)_2)N^+]H_2PO_4^- \quad \text{(Formula IIIe)},$$

in which s and p are as above.

It is thus seen that a cationic surfactant according to the present invention, which has hydrogen sulfate as the counterion, may be selected from the group containing ethyltrimethylammonium hydrogen sulfate, diethydimethylammonium hydrogen sulfate, butylethyldimethylammonium hydrogen sulfate, pentylethyldimethylammonium hydrogen sulfate, hexylethyldimethylammonium hydrogen sulfate, heptylethyldimethylammonium hydrogen sulfate, octylethyldimethylammonium hydrogen sulfate, nonylethyldimethylammonium hydrogen sulfate, decylethyldimethylammonium hydrogen sulfate, undecylethyldimethylammonium hydrogen sulfate, dodecylethyldimethylammonium hydrogen sulfate, butyltrimethylammonium hydrogen sulfate, dibutyldimethylammonium hydrogen sulfate, pentylbutyldimethylammonium hydrogen sulfate, hexylbutyldimethylammonium hydrogen sulfate, heptylbutyldimethylammonium hydrogen sulfate, octylbutyldimethylammonium hydrogen sulfate, nonylbutyldimethylammonium hydrogen sulfate, decylbutyldimethylammonium hydrogen sulfate, undecylbutyldimethylammonium hydrogen sulfate, dodecylbutyldimethylammonium hydrogen sulfate, pentyltrimethylammonium hydrogen sulfate, dipentyldimethylammonium hydrogen sulfate, hexylpentyldimethylammonium hydrogen sulfate, heptylpentyldimethylammonium hydrogen sulfate, octylpentyldimethylammonium hydrogen sulfate, nonylpentyldimethylammonium hydrogen sulfate, decylpentyldimethylammonium hydrogen sulfate, undecylpentyldimethylammonium hydrogen sulfate, dodecylpentyldimethylammonium hydrogen sulfate, hexyltrimethylammonium hydrogen sulfate, dihexyldimethylammonium hydrogen sulfate, heptylhexyldimethylammonium hydrogen sulfate, octylhexyldimethylammonium hydrogen sulfate, nonylhexyldimethylammonium hydrogen sulfate, decylhexyldimethylammonium hydrogen sulfate, undecylhexyldimethylammonium hydrogen sulfate, dodecylhexyldimethylammonium hydrogen sulfate, heptyltrimethylammonium hydrogen sulfate, diheptyldimethylammonium hydrogen sulfate, octylheptyldimethylammonium hydrogen sulfate, nonylheptyldimethylammonium hydrogen sulfate, decylheptyldimethylammonium hydrogen sulfate, undecylheptyldimethylammonium hydrogen sulfate, dodecylheptyldimethylammonium hydrogen sulfate, octyltrimethylammonium hydrogen sulfate, dioctyldimethylammonium hydrogen sulfate, nonyloctyldimethylammonium hydrogen sulfate, decyloctyldimethylammonium hydrogen sulfate, undecyloctyldimethylammonium hydrogen sulfate, dodecyloctyldimethylammonium hydrogen sulfate, nonyltrimethylammonium hydrogen sulfate, dinonyldimethylammonium hydrogen sulfate, decylnonyldimethylammonium hydrogen sulfate, undecylnonyldimethylammonium hydrogen sulfate, dodecylnonyldimethylammonium hydrogen sulfate, decyltrimethylammonium hydrogen sulfate, didecyldimethylammonium hydrogen sulfate, undecyldecyldimethylammonium hydrogen sulfate, dodecyldecyldimethylammonium hydrogen sulfate, undecyltrimethylammonium hydrogen sulfate, diundecyldimethylammonium hydrogen sulfate, dodecylundecyldimethylammonium hydrogen sulfate, dodecyltrimethylammonium hydrogen sulfate, and didodecyldimethylammonium hydrogen sulfate.

Especially preferred here are, for example, ethyltrimethylammonium hydrogen sulfate, butyltrimethylammonium hydrogen sulfate, pentyltrimethylammonium hydrogen sulfate, hexyltrimethylammonium hydrogen sulfate, heptyltrimethylammonium hydrogen sulfate, octyltrimethylammonium hydrogen sulfate, nonyltrimethylammonium hydrogen sulfate, decyltrimethylammonium hydrogen sulfate, undecyltrimethylammonium hydrogen sulfate, and dodecyltrimethylammonium hydrogen sulfate.

Further, it is seen that a cationic surfactant according to the present invention, which has dihydrogen phosphate as the counterion, may be selected from the group containing ethyltrimethylammonium dihydrogen phosphate, diethyldimethylammonium dihydrogen phosphate, butylethyldimethylammonium dihydrogen phosphate, pentylethyldimethylammonium dihydrogen phosphate, hexylethyldimethylammonium dihydrogen phosphate, heptylethyldimethylammonium dihydrogen phosphate, octylethyldimethylammonium dihydrogen phosphate, nonylethyldimethylammonium dihydrogen phosphate, decylethyldimethylammonium dihydrogen phosphate, undecylethyldimethylammonium dihydrogen phosphate, dodecylethyldimethylammonium dihydrogen phosphate, butyltrimethylammonium dihydrogen phosphate, dibutyldimethylammonium dihydrogen phosphate, pentylbutyldimethylammonium dihydrogen phosphate, hexylbutyldimethylammonium dihydrogen phosphate, heptylbutyldimethylammonium dihydrogen phosphate, octylbutyldimethylammonium dihydrogen phosphate, nonylbutyldimethylammonium dihydrogen phosphate, decylbutyldimethylammonium dihydrogen phosphate, undecylbutyldimethylammonium dihydrogen phosphate, dodecylbutyldimethylammonium dihydrogen phosphate, pentyltrimethylammonium dihydrogen phosphate, dipentyldimethylammonium dihydrogen phosphate, hexylpentyldimethylammonium dihydrogen phosphate, heptylpentyldimethylammonium dihydrogen phosphate, octylpentyldimethylammonium dihydrogen phosphate, nonylpentyldimethylammonium dihydrogen phosphate, decylpentyldimethylammonium dihydrogen phosphate, undecylpentyldimethylammonium dihydrogen phosphate, dodecylpentyldimethylammonium dihydrogen phosphate, hexyltrimethylammonium dihydrogen phosphate, dihexyldimethylammonium dihydrogen phosphate, heptylhexyldimethylammonium dihydrogen phosphate, octylhexylmethylammonium dihydrogen phosphate, nonylhexyldimethylammonium dihydrogen phosphate, decylhexyldimethylammonium dihydrogen phosphate, undecylhexyldimethylammonium dihydrogen phosphate, dodecylhexyldimethylammonium dihydrogen phosphate, heptyltrimethylammonium dihydrogen phosphate, diheptyldimethylammonium dihydrogen phosphate, octylheptyldimethylammonium dihydrogen phosphate, nonylheptyldimethylammonium dihydrogen phosphate, decylheptyldimethylammonium dihydrogen phosphate, undecylheptyldimethylammonium dihydrogen phosphate, dodecylheptyldimethylammonium dihydrogen phosphate, octyltrimethylammonium dihydrogen phosphate, dioctyldimethylammonium dihydrogen phosphate, nonyloctyldimethylammonium dihydrogen phosphate, decyloctyldimethylammonium dihydrogen phosphate, undecyloctyldimethylammonium dihydrogen phosphate, dodecyloctyldimethylammonium dihydrogen phosphate, nonyltrimethylammonium dihydrogen phosphate, dinonyldimethylammonium dihydrogen phosphate, decylnonyldimethylammonium dihydrogen phosphate, undecylnonyldimethylammonium dihydrogen phosphate, dodecylnonyldimethylammonium dihydrogen phosphate, decyltrimethylammonium dihydrogen phosphate, didecyldimethylammonium dihydrogen phosphate, undecyldecyldimethylammonium dihydrogen phosphate, dodecyldecyldimethylammonium dihydrogen phosphate, undecyltrimethylammonium dihydrogen phosphate, diundecyldimethylammonium dihydrogen phosphate, dodecylundecyldimethylammonium dihydrogen phosphate, dodecyltrimethylammonium dihydrogen phosphate, and didodecyldimethylammonium dihydrogen phosphate. Especially preferred here are ethyltrimethylammonium dihydrogen phosphate, butyltrimethylammonium dihydrogen phosphate, pentyltrimethylammonium dihydrogen phosphate, hexyltrimethylammonium dihydrogen phosphate, heptyltrimethylammonium dihydrogen phosphate, octyltrimethylammonium dihydrogen phosphate, nonyltrimethylammonium dihydrogen phosphate, decyltrimethylammonium dihydrogen phosphate, undecyltrimethylammonium dihydrogen phosphate, and dodecyltrimethylammonium dihydrogen phosphate.

If the additive is a mixture of a plurality of surfactants, it is also conceivable that one of the surfactants is a nonionic surfactant. For example, such a nonionic surfactant may be selected from the group containing fatty alcohol ethoxylates, alkyl phenol ethoxylates, as well as sorbitan fatty acid esters, alkyl polyglucosides (APG) and N-methylglucamides (GA). Typical representatives of the fatty alcohol ethoxylates are, for example, polyethylene glycol (PEG) and polypropylene glycol. It is, of course, also conceivable that such a fatty alcohol ethoxylate is a polyalkylene glycol with a longer alkyl chain. Block copolymers from different fatty alcohol ethoxylates are also conceivable. Furthermore, it is also conceivable that the additive contains glycol as an additional component.

It is conceivable corresponding to the present invention for all the above-described embodiments that the additive contains either one or a plurality of these surfactants. It is thus conceivable, for example, that the additive is a mixture of nonionic surfactant and an anionic surfactant, where the nonionic surfactant is an isoalkyl PEG and wherein the anionic surfactant is an alkyl sulfonate.

Further, it is advantageous for all embodiment variants if the surfactant of the additive and/or the additive is contained in the electrolyte at a concentration of at least and including 0.01 mmol/L and at most and including 2 mol/L, preferably at a concentration of at least and including 0.1 mmol/L and at most and including 1 mol/L, especially preferably at a concentration of at least and including 2 mmol/L and at most and including 500 mmol/L, especially preferably at a concentration of at least and including 15 mmol/L and at most and including 50 mmol/L, and especially preferably at a concentration of 20 mmol/L+5 mmol/L. A surfactant according to the present invention may therefore be contained in the electrolyte of the gas sensor at a concentration of at least and including 0.01 mmol/L, at least and including 0.1 mmol/L, at least and including 2 mmol/L, at least and including 15 mmol/L or at least and including 20 mmol/L. Furthermore, the surfactant according to the present invention may be contained in the electrolyte of the gas sensor at a concentration of at most and including 2 mol/L, at most and including 1 mol/L, at most and including 500 mmol/L, at most and including 50 mmol/L or at most 20 mmol/L.

It is thus seen that it is also conceivable that the surfactant of the additive and/or the additive may be present in the electrolyte at a concentration of at least and including 0.01 mmol/L and at most and including 1 mol/L, at least and including 0.01 mmol/L and at most and including 500 mol/L, at least and including 0.01 mmol/L and at most and including 50 mmol/L, at least and including 0.01 mmol/L and at most and including 20 mmol/L, at least and including 0.1 mmol/L and at most and including 2 mol/L, at least and including 0.1 mmol/L and at most and including 500 mol/L, at least and including 0.1 mmol/L and at most and including 50 mmol/L, at least and including 0.1 mmol/L and most and including 20 mmol/L, at least and including 2 mmol/L and at most and including 2 mol/L, at least and including 2 mmol/L and at most and including 1 mol/L, at least and including 2 mmol/L and at most and including 50 mmol/L, at least and including 2 mmol/L and at most and including 20 mmol/L, at least and including 15 mmol/L and at most and including 2 mol/L, at least and including 15 mmol/L and at most and including 1 mol/L, at least and including 15 mmol/L and at most and including 500 mmol/L, at least and including 15 mmol/L and at most and including 20 mmol/L, at least and including 20 mmol/L and at most and including 2 mol/L, at least and including 20 mmol/L and at most and including 1 mol/L, at least and including 20 mmol/L and at most and including 500 mol/L, at least and including 20 mmol/L and at most and including 50 mmol/L or at least and including 20 mmol/L and at most and including 25 mmol/L.

If the additive according to the present invention consists entirely of the surfactant, it is correspondingly advantageous if the additive is contained in the electrolyte at a concentration of at least and including 0.01 mmol/L and at most and including 2 mol/L, preferably at a concentration of at least and including 0.1 mmol/L and at most and including 1 mol/L, especially preferably at a concentration of at least and including 2 mmol/L and at most and including 500 mmol/L, especially preferably at a concentration of at least and including 15 mmol/L and at most and including 50 mmol/L, and especially preferably at a concentration of 20 mmol/L±5 mmol/L.

If the additive contains a mixture of a plurality of surfactants, it is conceivable both that each of the surfactants is present at the above-mentioned concentration and that the mixture itself is present at the above-mentioned concentration. It is, of course, also conceivable that an additive, which has a mixture of a plurality of surfactants, is present at the above-mentioned concentration. The additive may now consist entirely of this mixture or have additional components.

In another aspect, the present invention pertains to an electrolyte for use in an electrochemical gas sensor corresponding to one of the above claims, wherein the electrolyte has a mixture of an acidic, liquid medium, which has an electrical conductivity, and of an additive, and wherein the additive has at least one surfactant.

Typical components of the electrolyte are, as was already described, a solvent and a conductive salt. It is especially favorable if the electrolyte is an acidic liquid, i.e., an acidic, liquid medium. The electrolyte may be both a strongly acidic, liquid medium and a very strongly acidic, liquid medium. The electrolyte may be selected, for example, from the group containing $HClO_4$, HCl, $H_2SO_4$, $HNO_3$, $H_3PO_4$, HCOOH, preferably $HClO_4$ or $H_2SO_4$. It is also conceivable that the electrolyte is selected from the group containing sulfurous acid, nitric acid and nitrous acid. Mixtures of different acids are, of course, conceivable as well. In other words, the electrolyte may be selected from the group containing sulfuric acid, perchloric acid, sulfurous acid, hydrochloric acid, nitric acid, nitrous acid, phosphoric acid, as well as mixtures of the aforementioned acids. Provisions are made in a preferred embodiment variant for the liquid medium to be a strong acid, a very strong acid, sulfuric acid or perchloric acid. It is especially preferred if the liquid medium is a very strong acid, especially sulfuric acid. It is also conceivable that the liquid medium is an organic acid.

In a first variant, the present invention provides for an electrolyte for use in an electrochemical gas sensor corresponding to one of the above claims, wherein the electrolyte is a mixture of an at least strongly acidic, liquid medium, which has an electrical conductivity, and an additive, and wherein the additive contains at least one surfactant and wherein at least one surfactant is an anionic surfactant. Such a surfactant may be either a fluorinated surfactant or a halogen-free, anionic surfactant. It is conceivable, for example, that at least one surfactant is a fluorinated anionic surfactant, preferably a polyfluoroalkylsulfonic acid or the salt of a polyfluoroalkylsulfonic acid. For example, the fluorinated anionic surfactant may be a polyfluoroalkylsulfonic acid, which is selected from among perfluorobutanesulfonic acid, tridecafluorooctylsulfonic acid, and hexafluoroalkyl-2-methylsulfonic acid. As was already mentioned above, mono- or perfluoroalkylsulfonic acids or the corresponding salts of the mono-, poly- or perfluoroalkylsulfonic acids are, of course, also conceivable.

It is seen that such a surfactant of an electrolyte according to the present invention may be, as was described above, a compound corresponding to Formula I and may be selected, for example, from the group containing sodium monofluorobutyl sulfonate, sodium difluorobutyl sulfonate, sodium trifluorobutyl sulfonate, sodium tetrafluorobutyl sulfonate, sodium pentafluorobutyl sulfonate, sodium hexafluorobutyl sulfonate, sodium heptafluorobutyl sulfonate, sodium octafluorobutyl sulfonate, sodium nonafluorobutyl sulfonate, sodium monofluoropentyl sulfonate, sodium difluoropentyl sulfonate, sodium trifluoropentyl sulfonate, sodium tetrafluoropentyl sulfonate, sodium pentafluoropentyl sulfonate, sodium hexafluoropentyl sulfonate, sodium heptafluoropentyl sulfonate, sodium octafluoropentyl sulfonate, sodium nonafluoropentyl sulfonate, sodium decafluoropentyl sulfonate, sodium undecafluoropentyl sulfonate, sodium monofluorohexyl sulfonate, sodium difluorohexyl sulfonate, sodium trifluorohexyl sulfonate, sodium tetrafluorohexyl sulfonate, sodium pentafluorohexyl sulfonate, sodium hexafluorohexyl sulfonate, sodium heptafluorohexyl sulfonate, sodium octafluorohexyl sulfonate, sodium nonafluorohexyl sulfonate, sodium decafluorohexyl sulfonate, sodium undecafluorohexyl sulfonate, sodium dodecafluorohexyl sulfonate, sodium tridecafluorohexyl sulfonate, sodium monofluoroheptyl sulfonate, sodium difluoroheptyl sulfonate, sodium trifluoroheptyl sulfonate, sodium tetrafluoroheptyl sulfonate, sodium pentafluoroheptyl sulfonate, sodium hexafluoroheptyl sulfonate, sodium heptafluoroheptyl sulfonate, sodium octafluoroheptyl sulfonate, sodium nonafluoroheptyl sulfonate, sodium decafluoroheptyl sulfonate, sodium undecafluoroheptyl sulfonate, sodium dodecafluoroheptyl sulfonate, sodium tridecafluoroheptyl sulfonate, sodium tetradecafluoroheptyl sulfonate, sodium pentadecafluoroheptyl sulfonate, sodium monofluorooctyl sulfonate, sodium difluorooctyl sulfonate, sodium trifluorooctyl sulfonate, sodium tetrafluorooctyl sulfonate, sodium pentafluorooctyl sulfonate, sodium hexafluorooctyl sulfonate, sodium heptafluorooctyl sulfonate, sodium octafluorooctyl sulfonate, sodium nonafluorooctyl sulfonate, sodium decafluorooctyl sulfonate, sodium undecafluorooctyl sulfonate, sodium dodecafluorooctyl sulfonate, sodium tridecafluorooctyl sulfonate, sodium tetradecafluorooctyl sulfonate, sodium pentadecafluorooctyl sulfonate, sodium hexadecafluorooctyl sulfonate, sodium heptadecafluorooctyl sulfonate, sodium monofluorononyl sulfonate, sodium difluorononyl sulfonate, sodium trifluorononyl sulfonate, sodium tetrafluorononyl sulfonate, sodium pentafluorononyl sulfonate, sodium hexafluorononyl sulfonate, sodium heptafluorononyl sulfonate, sodium octafluorononyl sulfonate, sodium nonafluorononyl sulfonate, sodium decafluorononyl sulfonate, sodium undecafluorononyl sulfonate, sodium dodecafluorononyl sulfonate, sodium tridecafluorononyl sulfonate, sodium tetradecafluorononyl sulfonate, sodium pentadecafluorononyl sulfonate, sodium hexadecafluorononyl sulfonate, sodium heptadecafluorononyl sulfonate, sodium octadecafluorononyl sulfonate, sodium nonadecafluorononyl sulfonate, sodium monofluorodecyl sulfonate, sodium difluorodecyl sulfonate, sodium trifluorodecyl sulfonate, sodium tetrafluorodecyl sulfonate, sodium pentafluorodecyl sulfonate, sodium hexafluorodecyl sulfonate, sodium heptafluorodecyl sulfonate, sodium octafluorodecyl sulfonate, sodium nonafluorodecyl sulfonate, sodium decafluorodecyl sulfonate, sodium undecafluorodecyl sulfonate, sodium dodecafluorodecyl sulfonate, sodium tridecafluorodecyl sulfonate, sodium tetradecafluorodecyl sulfonate, sodium pentadecafluorodecyl sulfonate, sodium hexadecafluorodecyl sulfonate, sodium heptadecafluorodecyl sulfonate, sodium octadecafluorodecyl sulfonate, sodium nonadecafluorodecyl sulfonate, sodium eicosafluorodecyl sulfonate, sodium heneicosafluorodecyl sulfonate, sodium monofluoroundecyl sulfonate, sodium difluoroundecyl sulfonate, sodium trifluoroundecyl sulfonate, sodium tetrafluoroundecyl sulfonate, sodium pentafluoroundecyl sulfonate, sodium hexafluoroundecyl sulfonate, sodium heptafluoroundecyl sulfonate, sodium octafluoroundecyl sulfonate, sodium nonafluoroundecyl sulfonate, sodium decafluoroundecyl sulfonate, sodium undecafluoroundecyl sulfonate, sodium dodecafluoroundecyl sulfonate, sodium tridecafluoroundecyl sulfonate, sodium tetradecafluoroundecyl sulfonate, sodium pentadecafluoroundecyl sulfonate, sodium hexadecafluoroundecyl sulfonate, sodium heptadecafluoroundecyl sulfonate, sodium octadecafluoroundecyl sulfonate, sodium nonadecafluoroundecyl sulfonate, sodium eicosafluoroundecyl sulfonate, sodium heneicosafluoroundecyl sulfonate, sodium docosafluoroundecyl sulfonate, sodium tricosafluoroundecyl sulfonate, sodium monofluorododecyl sulfonate, sodium difluorododecyl sulfonate, sodium trifluorododecyl sulfonate, sodium tetrafluorododecyl sulfonate, sodium pentafluorododecyl sulfonate, sodium hexafluorododecyl sulfonate, sodium heptafluorododecyl sulfonate, sodium octafluorododecyl sulfonate, sodium nonafluorododecyl sulfonate, sodium decafluorododecyl sulfonate, sodium undecafluorododecyl sulfonate, sodium dodecafluorododecyl sulfonate, sodium tridecafluorododecyl sulfonate, sodium tetradecafluorododecyl sulfonate, sodium pentadecafluorododecyl sulfonate, sodium hexadecafluorododecyl sulfonate, sodium heptadecafluorododecyl sulfonate, sodium octadecafluorododecyl sulfonate, sodium nonadecafluorododecyl sulfonate, sodium eicosafluorododecyl sulfonate, sodium heneicosafluorododecyl sulfonate, sodium docosafluorododecyl sulfonate, sodium tricosafluorododecyl sulfonate, sodium tetracosafluorododecyl sulfonate, sodium pentacosafluorododecyl sulfonate, potassium monofluorobutyl sulfonate, potassium difluorobutyl sulfonate, potassium trifluorobutyl sulfonate, potassium tetrafluorobutyl sulfonate, potassium pentafluorobutyl sulfonate, potassium hexafluorobutyl sulfonate, potassium heptafluorobutyl sulfonate, potassium octafluorobutyl sulfonate, potassium nonafluorobutyl sulfonate, potassium monofluoropentyl sulfonate, potassium difluoropentyl sulfonate, potassium trifluoropentyl sulfonate, potassium tetrafluoropentyl sulfonate, potassium pentafluoropentyl sulfonate, potassium hexafluoropentyl sulfonate, potassium heptafluoropentyl sulfonate, potassium octafluoropentyl sulfonate, potassium nonafluoropentyl sulfonate, potassium decafluoropentyl sulfonate, potassium undecafluoropentyl sulfonate, potassium monofluorohexyl sulfonate, potassium difluorohexyl sulfonate, potassium trifluorohexyl sulfonate, potassium tetrafluorohexyl sulfonate, potassium pentafluorohexyl sulfonate, potassium hexafluorohexyl sulfonate, potassium heptafluorohexyl sulfonate, potassium octafluorohexyl sulfonate, potassium nonafluorohexyl sulfonate, potassium decafluorohexyl sulfonate, potassium undecafluorohexyl sulfonate, potassium dodecafluorohexyl sulfonate, potassium tridecafluorohexyl sulfonate, potassium monofluoroheptyl sulfonate, potassium difluoroheptyl sulfonate, potassium trifluoroheptyl sulfonate, potassium tetrafluoroheptyl sulfonate, potassium pentafluoroheptyl sulfonate, potassium hexafluoroheptyl sulfonate, potassium heptafluoroheptyl sulfonate, potassium octafluoroheptyl sulfonate, potassium nonafluoroheptyl sulfonate, potassium decafluoroheptyl sulfonate, potassium undecafluoroheptyl sulfonate, potassium dodecafluoroheptyl sulfonate, potassium tridecafluoroheptyl sulfonate, potassium tetradecafluoroheptyl sulfonate, potassium pentadecafluoroheptyl sulfonate, potassium monofluorooctyl sulfonate, potassium difluorooctyl sulfonate, potassium trifluorooctyl sulfonate, potassium tetrafluorooctyl sulfonate, potassium pentafluorooctyl sulfonate, potassium hexafluorooctyl sulfonate, potassium heptafluorooctyl sulfonate, potassium octafluorooctyl sulfonate, potassium nonafluorooctyl sulfonate, potassium decafluorooctyl sulfonate, potassium undecafluorooctyl sulfonate, potassium dodecafluorooctyl sulfonate, potassium tridecafluorooctyl sulfonate, potassium tetradecafluorooctyl sulfonate, potassium pentadecafluorooctyl sulfonate, potassium hexadecafluorooctyl sulfonate, potassium heptadecafluorooctyl sulfonate, potassium monofluorononyl sulfonate, potassium difluorononyl sulfonate, potassium trifluorononyl sulfonate, potassium tetrafluorononyl sulfonate, potassium pentafluorononyl sulfonate, potassium hexafluorononyl sulfonate, potassium heptafluorononyl sulfonate, potassium octafluorononyl sulfonate, potassium nonafluorononyl sulfonate, potassium decafluorononyl sulfonate, potassium undecafluorononyl sulfonate, potassium dodecafluorononyl sulfonate, potassium tridecafluorononyl sulfonate, potassium tetradecafluorononyl sulfonate, potassium pentadecafluorononyl sulfonate, potassium hexadecafluorononyl sulfonate, potassium heptadecafluorononyl sulfonate, potassium octadecafluorononyl sulfonate, potassium nonadecafluorononyl sulfonate, potassium monofluorodecyl sulfonate, potassium difluorodecyl sulfonate, potassium trifluorodecyl sulfonate, potassium tetrafluorodecyl sulfonate, potassium pentafluorodecyl sulfonate, potassium hexafluorodecyl sulfonate, potassium heptafluorodecyl sulfonate, potassium octafluorodecyl sulfonate, potassium nonafluorodecyl sulfonate, potassium decafluorodecyl sulfonate, potassium undecafluorodecyl sulfonate, potassium dodecafluorodecyl sulfonate, potassium tridecafluorodecyl sulfonate, potassium tetradecafluorodecyl sulfonate, potassium pentadecafluorodecyl sulfonate, potassium hexadecafluorodecyl sulfonate, potassium heptadecafluorodecyl sulfonate, potassium octadecafluorodecyl sulfonate, potassium nonadecafluorodecyl sulfonate, potassium eicosafluorodecyl sulfonate, potassium heneicosafluorodecyl sulfonate, potassium monofluoroundecyl sulfonate, potassium difluoroundecyl sulfonate, potassium trifluoroundecyl sulfonate, potassium tetrafluoroundecyl sulfonate, potassium pentafluoroundecyl sulfonate, potassium hexafluoroundecyl sulfonate, potassium heptafluoroundecyl sulfonate, potassium octafluoroundecyl sulfonate, potassium nonafluoroundecyl sulfonate, potassium decafluoroundecyl sulfonate, potassium undecafluoroundecyl sulfonate, potassium dodecafluoroundecyl sulfonate, potassium tridecafluoroundecyl sulfonate, potassium tetradecafluoroundecyl sulfonate, potassium pentadecafluoroundecyl sulfonate, potassium hexadecafluoroundecyl sulfonate, potassium heptadecafluoroundecyl sulfonate, potassium octadecafluoroundecyl sulfonate, potassium nonadecafluoroundecyl sulfonate, potassium eicosafluoroundecyl sulfonate, potassium heneicosafluoroundecyl sulfonate, potassium docosafluoroundecyl sulfonate, potassium tricosafluoroundecyl sulfonate, potassium monofluorododecyl sulfonate, potassium difluorododecyl sulfonate, potassium trifluorododecyl sulfonate, potassium tetrafluorododecyl sulfonate, potassium pentafluorododecyl sulfonate, potassium hexafluorododecyl sulfonate, potassium heptafluorododecyl sulfonate, potassium octafluorododecyl sulfonate, potassium nonafluorododecyl sulfonate, potassium decafluorododecyl sulfonate, potassium undecafluorododecyl sulfonate, potassium dodecafluorododecyl sulfonate, potassium tridecafluorododecyl sulfonate, potassium tetradecafluorododecyl sulfonate, potassium pentadecafluorododecyl sulfonate, potassium hexadecafluorododecyl sulfonate, potassium heptadecafluorododecyl sulfonate, potassium octadecafluorododecyl sulfonate, potassium nonadecafluorododecyl sulfonate, potassium eicosafluorododecyl sulfonate, potassium heneicosafluorododecyl sulfonate, potassium docosafluorododecyl sulfonate, potassium tricosafluorododecyl sulfonate, potassium tetracosafluorododecyl sulfonate, potassium pentacosafluorododecyl sulfonate, lithium monofluorobutyl sulfonate, lithium difluorobutyl sulfonate, lithium trifluorobutyl sulfonate, lithium tetrafluorobutyl sulfonate, lithium pentafluorobutyl sulfonate, lithium hexafluorobutyl sulfonate, lithium heptafluorobutyl sulfonate, lithium octafluorobutyl sulfonate, lithium nonafluorobutyl sulfonate, lithium monofluoropentyl sulfonate, lithium difluoropentyl sulfonate, lithium trifluoropentyl sulfonate, lithium tetrafluoropentyl sulfonate, lithium pentafluoropentyl sulfonate, lithium hexafluoropentyl sulfonate, lithium heptafluoropentyl sulfonate, lithium octafluoropentyl sulfonate, lithium nonafluoropentyl sulfonate, lithium decafluoropentyl sulfonate, lithium undecafluoropentyl sulfonate, lithium monofluorohexyl sulfonate, lithium difluorohexyl sulfonate, lithium trifluorohexyl sulfonate, lithium tetrafluorohexyl sulfonate, lithium pentafluorohexyl sulfonate, lithium hexafluorohexyl sulfonate, lithium heptafluorohexyl sulfonate, lithium octafluorohexyl sulfonate, lithium nonafluorohexyl sulfonate, lithium decafluorohexyl sulfonate, lithium undecafluorohexyl sulfonate, lithium dodecafluorohexyl sulfonate, lithium tridecafluorohexyl sulfonate, lithium monofluoroheptyl sulfonate, lithium difluoroheptyl sulfonate, lithium trifluoroheptyl sulfonate, lithium tetrafluoroheptyl sulfonate, lithium pentafluoroheptyl sulfonate, lithium hexafluoroheptyl sulfonate, lithium heptafluoroheptyl sulfonate, lithium octafluoroheptyl sulfonate, lithium nonafluoroheptyl sulfonate, lithium decafluoroheptyl sulfonate, lithium undecafluoroheptyl sulfonate, lithium dodecafluoroheptyl sulfonate, lithium tridecafluoroheptyl sulfonate, lithium tetradecafluoroheptyl sulfonate, lithium pentadecafluoroheptyl sulfonate, lithium monofluorooctyl sulfonate, lithium difluorooctyl sulfonate, lithium trifluorooctyl sulfonate, lithium tetrafluorooctyl sulfonate, lithium pentafluorooctyl sulfonate, lithium hexafluorooctyl sulfonate, lithium heptafluorooctyl sulfonate, lithium octafluorooctyl sulfonate, lithium nonafluorooctyl sulfonate, lithium decafluorooctyl sulfonate, lithium undecafluorooctyl sulfonate, lithium dodecafluorooctyl sulfonate, lithium tridecafluorooctyl sulfonate, lithium tetradecafluorooctyl sulfonate, lithium pentadecafluorooctyl sulfonate, lithium hexadecafluorooctyl sulfonate, lithium heptadecafluorooctyl sulfonate, lithium monofluorononyl sulfonate, lithium difluorononyl sulfonate, lithium trifluorononyl sulfonate, lithium tetrafluorononyl sulfonate, lithium pentafluorononyl sulfonate, lithium hexafluorononyl sulfonate, lithium heptafluorononyl sulfonate, lithium octafluorononyl sulfonate, lithium nonafluorononyl sulfonate, lithium decafluorononyl sulfonate, lithium undecafluorononyl sulfonate, lithium dodecafluorononyl sulfonate, lithium tridecafluorononyl sulfonate, lithium tetradecafluorononyl sulfonate, lithium pentadecafluorononyl sulfonate, lithium hexadecafluorononyl sulfonate, lithium heptadecafluorononyl sulfonate, lithium octadecafluorononyl sulfonate, lithium nonadecafluorononyl sulfonate, lithium monofluorodecyl sulfonate, lithium difluorodecyl sulfonate, lithium trifluorodecyl sulfonate, lithium tetrafluorodecyl sulfonate, lithium pentafluorodecyl sulfonate, lithium hexafluorodecyl sulfonate, lithium heptafluorodecyl sulfonate, lithium octafluorodecyl sulfonate, lithium nonafluorodecyl sulfonate, lithium decafluorodecyl sulfonate, lithium undecafluorodecyl sulfonate, lithium dodecafluorodecyl sulfonate, lithium tridecafluorodecyl sulfonate, lithium tetradecafluorodecyl sulfonate, lithium pentadecafluorodecyl sulfonate, lithium hexadecafluorodecyl sulfonate, lithium heptadecafluorodecyl sulfonate, lithium octadecafluorodecyl sulfonate, lithium nonadecafluorodecyl sulfonate, lithium eicosafluorodecyl sulfonate, lithium heneicosafluorodecyl sulfonate, lithium monofluoroundecyl sulfonate, lithium difluoroundecyl sulfonate, lithium trifluoroundecyl sulfonate, lithium tetrafluoroundecyl sulfonate, lithium pentafluoroundecyl sulfonate, lithium hexafluoroundecyl sulfonate, lithium heptafluoroundecyl sulfonate, lithium octafluoroundecyl sulfonate, lithium nonafluoroundecyl sulfonate, lithium decafluoroundecyl sulfonate, lithium undecafluoroundecyl sulfonate, lithium dodecafluoroundecyl sulfonate, lithium tridecafluoroundecyl sulfonate, lithium tetradecafluoroundecyl sulfonate, lithium pentadecafluoroundecyl sulfonate, lithium hexadecafluoroundecyl sulfonate, lithium heptadecafluoroundecyl sulfonate, lithium octadecafluoroundecyl sulfonate, lithium nonadecafluoroundecyl sulfonate, lithium eicosafluoroundecyl sulfonate, lithium heneicosafluoroundecyl sulfonate, lithium docosafluoroundecyl sulfonate, lithium tricosafluoroundecyl sulfonate, lithium monofluorododecyl sulfonate, lithium difluorododecyl sulfonate, lithium trifluorododecyl sulfonate, lithium tetrafluorododecyl sulfonate, lithium pentafluorododecyl sulfonate, lithium hexafluorododecyl sulfonate, lithium heptafluorododecyl sulfonate, lithium octafluorododecyl sulfonate, lithium nonafluorododecyl sulfonate, lithium decafluorododecyl sulfonate, lithium undecafluorododecyl sulfonate, lithium dodecafluorododecyl sulfonate, lithium tridecafluorododecyl sulfonate, lithium tetradecafluorododecyl sulfonate, lithium pentadecafluorododecyl sulfonate, lithium hexadecafluorododecyl sulfonate, lithium heptadecafluorododecyl sulfonate, lithium octadecafluorododecyl sulfonate, lithium nonadecafluorododecyl sulfonate, lithium eicosafluorododecyl sulfonate, lithium heneicosafluorododecyl sulfonate, lithium docosafluorododecyl sulfonate, lithium tricosafluorododecyl sulfonate, lithium tetracosafluorododecyl sulfonate, and lithium pentacosafluorododecyl sulfonate.

It is seen that such a surfactant of an electrolyte according to the present invention may be, as was described above, a compound corresponding to Formulas I and may be selected, for example, from the group containing ammonium monofluorobutyl sulfonate, ammonium difluorobutyl sulfonate, ammonium trifluorobutyl sulfonate, ammonium tetrafluorobutyl sulfonate, ammonium pentafluorobutyl sulfonate, ammonium hexafluorobutyl sulfonate, ammonium heptafluorobutyl sulfonate, ammonium octafluorobutyl sulfonate, ammonium nonafluorobutyl sulfonate, ammonium monofluoropentyl sulfonate, ammonium difluoropentyl sulfonate, ammonium trifluoropentyl sulfonate, ammonium tetrafluoropentyl sulfonate, ammonium pentafluoropentyl sulfonate, ammonium hexafluoropentyl sulfonate, ammonium heptafluoropentyl sulfonate, ammonium octafluoropentyl sulfonate, ammonium nonafluoropentyl sulfonate, ammonium decafluoropentyl sulfonate, ammonium undecafluoropentyl sulfonate, ammonium monofluorohexyl sulfonate, ammonium difluorohexyl sulfonate, ammonium trifluorohexyl sulfonate, ammonium tetrafluorohexyl sulfonate, ammonium pentafluorohexyl sulfonate, ammonium hexafluorohexyl sulfonate, ammonium heptafluorohexyl sulfonate, ammonium octafluorohexyl sulfonate, ammonium nonafluorohexyl sulfonate, ammonium decafluorohexyl sulfonate, ammonium undecafluorohexyl sulfonate, ammonium dodecafluorohexyl sulfonate, ammonium tridecafluorohexyl sulfonate, ammonium monofluoroheptyl sulfonate, ammonium difluoroheptyl sulfonate, ammonium trifluoroheptyl sulfonate, ammonium tetrafluoroheptyl sulfonate, ammonium pentafluoroheptyl sulfonate, ammonium hexafluoroheptyl sulfonate, ammonium heptafluoroheptyl sulfonate, ammonium octafluoroheptyl sulfonate, ammonium nonafluoroheptyl sulfonate, ammonium decafluoroheptyl sulfonate, ammonium undecafluoroheptyl sulfonate, ammonium dodecafluoroheptyl sulfonate, ammonium tridecafluoroheptyl sulfonate, ammonium tetradecafluoroheptyl sulfonate, ammonium pentadecafluoroheptyl sulfonate, ammonium monofluorooctyl sulfonate, ammonium difluorooctyl sulfonate, ammonium trifluorooctyl sulfonate, ammonium tetrafluorooctyl sulfonate, ammonium pentafluorooctyl sulfonate, ammonium hexafluorooctyl sulfonate, ammonium heptafluorooctyl sulfonate, ammonium octafluorooctyl sulfonate, ammonium nonafluorooctyl sulfonate, ammonium decafluorooctyl sulfonate, ammonium undecafluorooctyl sulfonate, ammonium dodecafluorooctyl sulfonate, ammonium tridecafluorooctyl sulfonate, ammonium tetradecafluorooctyl sulfonate, ammonium pentadecafluorooctyl sulfonate, ammonium hexadecafluorooctyl sulfonate, ammonium heptadecafluorooctyl sulfonate, ammonium monofluorononyl sulfonate, ammonium difluorononyl sulfonate, ammonium trifluorononyl sulfonate, ammonium tetrafluorononyl sulfonate, ammonium pentafluorononyl sulfonate, ammonium hexafluorononyl sulfonate, ammonium heptafluorononyl sulfonate, ammonium octafluorononyl sulfonate, ammonium nonafluorononyl sulfonate, ammonium decafluorononyl sulfonate, ammonium undecafluorononyl sulfonate, ammonium dodecafluorononyl sulfonate, ammonium tridecafluorononyl sulfonate, ammonium tetradecafluorononyl sulfonate, ammonium pentadecafluorononyl sulfonate, ammonium hexadecafluorononyl sulfonate, ammonium heptadecafluorononyl sulfonate, ammonium octadecafluorononyl sulfonate, ammonium nonadecafluorononyl sulfonate, ammonium monofluorodecyl sulfonate, ammonium difluorodecyl sulfonate, ammonium trifluorodecyl sulfonate, ammonium tetrafluorodecyl sulfonate, ammonium pentafluorodecyl sulfonate, ammonium hexafluorodecyl sulfonate, ammonium heptafluorodecyl sulfonate, ammonium octafluorodecyl sulfonate, ammonium nonafluorodecyl sulfonate, ammonium decafluorodecyl sulfonate, ammonium undecafluorodecyl sulfonate, ammonium dodecafluorodecyl sulfonate, ammonium tridecafluorodecyl sulfonate, ammonium tetradecafluorodecyl sulfonate, ammonium pentadecafluorodecyl sulfonate, ammonium hexadecafluorodecyl sulfonate, ammonium heptadecafluorodecyl sulfonate, ammonium octadecafluorodecyl sulfonate, ammonium nonadecafluorodecyl sulfonate, ammonium eicosafluorodecyl sulfonate, ammonium heneicosafluorodecyl sulfonate, ammonium monofluoroundecyl sulfonate, ammonium difluoroundecyl sulfonate, ammonium trifluoroundecyl sulfonate, ammonium tetrafluoroundecyl sulfonate, ammonium pentafluoroundecyl sulfonate, ammonium hexafluoroundecyl sulfonate, ammonium heptafluoroundecyl sulfonate, ammonium octafluoroundecyl sulfonate, ammonium nonafluoroundecyl sulfonate, ammonium decafluoroundecyl sulfonate, ammonium undecafluoroundecyl sulfonate, ammonium dodecafluoroundecyl sulfonate, ammonium tridecafluoroundecyl sulfonate, ammonium tetradecafluoroundecyl sulfonate, ammonium pentadecafluoroundecyl sulfonate, ammonium hexadecafluoroundecyl sulfonate, ammonium heptadecafluoroundecyl sulfonate, ammonium octadecafluoroundecyl sulfonate, ammonium nonadecafluoroundecyl sulfonate, ammonium eicosafluoroundecyl sulfonate, ammonium heneicosafluoroundecyl sulfonate, ammonium docosafluoroundecyl sulfonate, ammonium tricosafluoroundecyl sulfonate, ammonium monofluorododecyl sulfonate, ammonium difluorododecyl sulfonate, ammonium trifluorododecyl sulfonate, ammonium tetrafluorododecyl sulfonate, ammonium pentafluorododecyl sulfonate, ammonium hexafluorododecyl sulfonate, ammonium heptafluorododecyl sulfonate, ammonium octafluorododecyl sulfonate, ammonium nonafluorododecyl sulfonate, ammonium decafluorododecyl sulfonate, ammonium undecafluorododecyl sulfonate, ammonium dodecafluorododecyl sulfonate, ammonium tridecafluorododecyl sulfonate, ammonium tetradecafluorododecyl sulfonate, ammonium pentadecafluorododecyl sulfonate, ammonium hexadecafluorododecyl sulfonate, ammonium heptadecafluorododecyl sulfonate, ammonium octadecafluorododecyl sulfonate, ammonium nonadecafluorododecyl sulfonate, ammonium eicosafluorododecyl sulfonate, ammonium heneicosafluorododecyl sulfonate, ammonium docosafluorododecyl sulfonate, ammonium tricosafluorododecyl sulfonate, ammonium tetracosafluorododecyl sulfonate, ammonium pentacosafluorododecyl sulfonate, alkylammonium monofluorobutyl sulfonate, alkylammonium difluorobutyl sulfonate, alkylammonium trifluorobutyl sulfonate, alkylammonium tetrafluorobutyl sulfonate, alkylammonium pentafluorobutyl sulfonate, alkylammonium hexafluorobutyl sulfonate, alkylammonium heptafluorobutyl sulfonate, alkylammonium octafluorobutyl sulfonate, alkylammonium nonafluorobutyl sulfonate, alkylammonium monofluoropentyl sulfonate, alkylammonium difluoropentyl sulfonate, alkylammonium trifluoropentyl sulfonate, alkylammonium tetrafluoropentyl sulfonate, alkylammonium pentafluoropentyl sulfonate, alkylammonium hexafluoropentyl sulfonate, alkylammonium heptafluoropentyl sulfonate, alkylammonium octafluoropentyl sulfonate, alkylammonium nonafluoropentyl sulfonate, alkylammonium decafluoropentyl sulfonate, alkylammonium undecafluoropentyl sulfonate, alkylammonium monofluorohexyl sulfonate, alkylammonium difluorohexyl sulfonate, alkylammonium trifluorohexyl sulfonate, alkylammonium tetrafluorohexyl sulfonate, alkylammonium pentafluorohexyl sulfonate, alkylammonium hexafluorohexyl sulfonate, alkylammonium heptafluorohexyl sulfonate, alkylammonium octafluorohexyl sulfonate, alkylammonium nonafluorohexyl sulfonate, alkylammonium decafluorohexyl sulfonate, alkylammonium undecafluorohexyl sulfonate, alkylammonium dodecafluorohexyl sulfonate, alkylammonium tridecafluorohexyl sulfonate, alkylammonium monofluoroheptyl sulfonate, alkylammonium difluoroheptyl sulfonate, alkylammonium trifluoroheptyl sulfonate, alkylammonium tetrafluoroheptyl sulfonate, alkylammonium pentafluoroheptyl sulfonate, alkylammonium hexafluoroheptyl sulfonate, alkylammonium heptafluoroheptyl sulfonate, alkylammonium octafluoroheptyl sulfonate, alkylammonium nonafluoroheptyl sulfonate, alkylammonium decafluoroheptyl sulfonate, alkylammonium undecafluoroheptyl sulfonate, alkylammonium dodecafluoroheptyl sulfonate, alkylammonium tridecafluoroheptyl sulfonate, alkylammonium tetradecafluoroheptyl sulfonate, alkylammonium pentadecafluoroheptyl sulfonate, alkylammonium monofluorooctyl sulfonate, alkylammonium difluorooctyl sulfonate, alkylammonium trifluorooctyl sulfonate, alkylammonium tetrafluorooctyl sulfonate, alkylammonium pentafluorooctyl sulfonate, alkylammonium hexafluorooctyl sulfonate, alkylammonium heptafluorooctyl sulfonate, alkylammonium octafluorooctyl sulfonate, alkylammonium nonafluorooctyl sulfonate, alkylammonium decafluorooctyl sulfonate, alkylammonium undecafluorooctyl sulfonate, alkylammonium dodecafluorooctyl sulfonate, alkylammonium tridecafluorooctyl sulfonate, alkylammonium tetradecafluorooctyl sulfonate, alkylammonium pentadecafluorooctyl sulfonate, alkylammonium hexadecafluorooctyl sulfonate, alkylammonium heptadecafluorooctyl sulfonate, alkylammonium monofluorononyl sulfonate, alkylammonium difluorononyl sulfonate, alkylammonium trifluorononyl sulfonate, alkylammonium tetrafluorononyl sulfonate, alkylammonium pentafluorononyl sulfonate, alkylammonium hexafluorononyl sulfonate, alkylammonium heptafluorononyl sulfonate, alkylammonium octafluorononyl sulfonate, alkylammonium nonafluorononyl sulfonate, alkylammonium decafluorononyl sulfonate, alkylammonium undecafluorononyl sulfonate, alkylammonium dodecafluorononyl sulfonate, alkylammonium tridecafluorononyl sulfonate, alkylammonium tetradecafluorononyl sulfonate, alkylammonium pentadecafluorononyl sulfonate, alkylammonium hexadecafluorononyl sulfonate, alkylammonium heptadecafluorononyl sulfonate, alkylammonium octadecafluorononyl sulfonate, alkylammonium nonadecafluorononyl sulfonate, alkylammonium monofluorodecyl sulfonate, alkylammonium difluorodecyl sulfonate, alkylammonium trifluorodecyl sulfonate, alkylammonium tetrafluorodecyl sulfonate, alkylammonium pentafluorodecyl sulfonate, alkylammonium hexafluorodecyl sulfonate, alkylammonium heptafluorodecyl sulfonate, alkylammonium octafluorodecyl sulfonate, alkylammonium nonafluorodecyl sulfonate, alkylammonium decafluorodecyl sulfonate, alkylammonium undecafluorodecyl sulfonate, alkylammonium dodecafluorodecyl sulfonate, alkylammonium tridecafluorodecyl sulfonate, alkylammonium tetradecafluorodecyl sulfonate, alkylammonium pentadecafluorodecyl sulfonate, alkylammonium hexadecafluorodecyl sulfonate, alkylammonium heptadecafluorodecyl sulfonate, alkylammonium octadecafluorodecyl sulfonate, alkylammonium nonadecafluorodecyl sulfonate, alkylammonium eicosafluorodecyl sulfonate, alkylammonium heneicosafluorodecyl sulfonate, alkylammonium monofluoroundecyl sulfonate, alkylammonium difluoroundecyl sulfonate, alkylammonium trifluoroundecyl sulfonate, alkylammonium tetrafluoroundecyl sulfonate, alkylammonium pentafluoroundecyl sulfonate, alkylammonium hexafluoroundecyl sulfonate, alkylammonium heptafluoroundecyl sulfonate, alkylammonium octafluoroundecyl sulfonate, alkylammonium nonafluoroundecyl sulfonate, alkylammonium decafluoroundecyl sulfonate, alkylammonium undecafluoroundecyl sulfonate, alkylammonium dodecafluoroundecyl sulfonate, alkylammonium tridecafluoroundecyl sulfonate, alkylammonium tetradecafluoroundecyl sulfonate, alkylammonium pentadecafluoroundecyl sulfonate, alkylammonium hexadecafluoroundecyl sulfonate, alkylammonium heptadecafluoroundecyl sulfonate, alkylammonium octadecafluoroundecyl sulfonate, alkylammonium nonadecafluoroundecyl sulfonate, alkylammonium eicosafluoroundecyl sulfonate, alkylammonium heneicosafluoroundecyl sulfonate, alkylammonium docosafluoroundecyl sulfonate, alkylammonium tricosafluoroundecyl sulfonate, alkylammonium monofluorododecyl sulfonate, alkylammonium difluorododecyl sulfonate, alkylammonium trifluorododecyl sulfonate, alkylammonium tetrafluorododecyl sulfonate, alkylammonium pentafluorododecyl sulfonate, alkylammonium hexafluorododecyl sulfonate, alkylammonium heptafluorododecyl sulfonate, alkylammonium octafluorododecyl sulfonate, alkylammonium nonafluorododecyl sulfonate, alkylammonium decafluorododecyl sulfonate, alkylammonium undecafluorododecyl sulfonate, alkylammonium dodecafluorododecyl sulfonate, alkylammonium tridecafluorododecyl sulfonate, alkylammonium tetradecafluorododecyl sulfonate, alkylammonium pentadecafluorododecyl sulfonate, alkylammonium hexadecafluorododecyl sulfonate, alkylammonium heptadecafluorododecyl sulfonate, alkylammonium octadecafluorododecyl sulfonate, alkylammonium nonadecafluorododecyl sulfonate, alkylammonium eicosafluorododecyl sulfonate, alkylammonium heneicosafluorododecyl sulfonate, alkylammonium docosafluorododecyl sulfonate, alkylammonium tricosafluorododecyl sulfonate, alkylammonium tetracosafluorododecyl sulfonate, alkylammonium pentacosafluorododecyl sulfonate, dialkylammonium monofluorobutyl sulfonate, dialkylammonium difluorobutyl sulfonate, dialkylammonium trifluorobutyl sulfonate, dialkylammonium tetrafluorobutyl sulfonate, dialkylammonium pentafluorobutyl sulfonate, dialkylammonium hexafluorobutyl sulfonate, dialkylammonium heptafluorobutyl sulfonate, dialkylammonium octafluorobutyl sulfonate, dialkylammonium nonafluorobutyl sulfonate, dialkylammonium monofluoropentyl sulfonate, dialkylammonium difluoropentyl sulfonate, dialkylammonium trifluoropentyl sulfonate, dialkylammonium tetrafluoropentyl sulfonate, dialkylammonium pentafluoropentyl sulfonate, dialkylammonium hexafluoropentyl sulfonate, dialkylammonium heptafluoropentyl sulfonate, dialkylammonium octafluoropentyl sulfonate, dialkylammonium nonafluoropentyl sulfonate, dialkylammonium decafluoropentyl sulfonate, dialkylammonium undecafluoropentyl sulfonate, dialkylammonium monofluorohexyl sulfonate, dialkylammonium difluorohexyl sulfonate, dialkylammonium trifluorohexyl sulfonate, dialkylammonium tetrafluorohexyl sulfonate, dialkylammonium pentafluorohexyl sulfonate, dialkylammonium hexafluorohexyl sulfonate, dialkylammonium heptafluorohexyl sulfonate, dialkylammonium octafluorohexyl sulfonate, dialkylammonium nonafluorohexyl sulfonate, dialkylammonium decafluorohexyl sulfonate, dialkylammonium undecafluorohexyl sulfonate, dialkylammonium dodecafluorohexyl sulfonate, dialkylammonium tridecafluorohexyl sulfonate, dialkylammonium monofluoroheptyl sulfonate, dialkylammonium difluoroheptyl sulfonate, dialkylammonium trifluoroheptyl sulfonate, dialkylammonium tetrafluoroheptyl sulfonate, dialkylammonium pentafluoroheptyl sulfonate, dialkylammonium hexafluoroheptyl sulfonate, dialkylammonium heptafluoroheptyl sulfonate, dialkylammonium octafluoroheptyl sulfonate, dialkylammonium nonafluoroheptyl sulfonate, dialkylammonium decafluoroheptyl sulfonate, dialkylammonium undecafluoroheptyl sulfonate, dialkylammonium dodecafluoroheptyl sulfonate, dialkylammonium tridecafluoroheptyl sulfonate, dialkylammonium tetradecafluoroheptyl sulfonate, dialkylammonium pentadecafluoroheptyl sulfonate, dialkylammonium monofluorooctyl sulfonate, dialkylammonium difluorooctyl sulfonate, dialkylammonium trifluorooctyl sulfonate, dialkylammonium tetrafluorooctyl sulfonate, dialkylammonium pentafluorooctyl sulfonate, dialkylammonium hexafluorooctyl sulfonate, dialkylammonium heptafluorooctyl sulfonate, dialkylammonium octafluorooctyl sulfonate, dialkylammonium nonafluorooctyl sulfonate, dialkylammonium decafluorooctyl sulfonate, dialkylammonium undecafluorooctyl sulfonate, dialkylammonium dodecafluorooctyl sulfonate, dialkylammonium tridecafluorooctyl sulfonate, dialkylammonium tetradecafluorooctyl sulfonate, dialkylammonium pentadecafluorooctyl sulfonate, dialkylammonium hexadecafluorooctyl sulfonate, dialkylammonium heptadecafluorooctyl sulfonate, dialkylammonium monofluorononyl sulfonate, dialkylammonium difluorononyl sulfonate, dialkylammonium trifluorononyl sulfonate, dialkylammonium tetrafluorononyl sulfonate, dialkylammonium pentafluorononyl sulfonate, dialkylammonium hexafluorononyl sulfonate, dialkylammonium heptafluorononyl sulfonate, dialkylammonium octafluorononyl sulfonate, dialkylammonium nonafluorononyl sulfonate, dialkylammonium decafluorononyl sulfonate, dialkylammonium undecafluorononyl sulfonate, dialkylammonium dodecafluorononyl sulfonate, dialkylammonium tridecafluorononyl sulfonate, dialkylammonium tetradecafluorononyl sulfonate, dialkylammonium pentadecafluorononyl sulfonate, dialkylammonium hexadecafluorononyl sulfonate, dialkylammonium heptadecafluorononyl sulfonate, dialkylammonium octadecafluorononyl sulfonate, dialkylammonium nonadecafluorononyl sulfonate, dialkylammonium monofluorodecyl sulfonate, dialkylammonium difluorodecyl sulfonate, dialkylammonium trifluorodecyl sulfonate, dialkylammonium tetrafluorodecyl sulfonate, dialkylammonium pentafluorodecyl sulfonate, dialkylammonium hexafluorodecyl sulfonate, dialkylammonium heptafluorodecyl sulfonate, dialkylammonium octafluorodecyl sulfonate, dialkylammonium nonafluorodecyl sulfonate, dialkylammonium decafluorodecyl sulfonate, dialkylammonium undecafluorodecyl sulfonate, dialkylammonium dodecafluorodecyl sulfonate, dialkylammonium tridecafluorodecyl sulfonate, dialkylammonium tetradecafluorodecyl sulfonate, dialkylammonium pentadecafluorodecyl sulfonate, dialkylammonium hexadecafluorodecyl sulfonate, dialkylammonium heptadecafluorodecyl sulfonate, dialkylammonium octadecafluorodecyl sulfonate, dialkylammonium nonadecafluorodecyl sulfonate, dialkylammonium eicosafluorodecyl sulfonate, dialkylammonium heneicosafluorodecyl sulfonate, dialkylammonium monofluoroundecyl sulfonate, dialkylammonium difluoroundecyl sulfonate, dialkylammonium trifluoroundecyl sulfonate, dialkylammonium tetrafluoroundecyl sulfonate, dialkylammonium pentafluoroundecyl sulfonate, dialkylammonium hexafluoroundecyl sulfonate, dialkylammonium heptafluoroundecyl sulfonate, dialkylammonium octafluoroundecyl sulfonate, dialkylammonium nonafluoroundecyl sulfonate, dialkylammonium decafluoroundecyl sulfonate, dialkylammonium undecafluoroundecyl sulfonate, dialkylammonium dodecafluoroundecyl sulfonate, dialkylammonium tridecafluoroundecyl sulfonate, dialkylammonium tetradecafluoroundecyl sulfonate, dialkylammonium pentadecafluoroundecyl sulfonate, dialkylammonium hexadecafluoroundecyl sulfonate, dialkylammonium heptadecafluoroundecyl sulfonate, dialkylammonium octadecafluoroundecyl sulfonate, dialkylammonium nonadecafluoroundecyl sulfonate, dialkylammonium eicosafluoroundecyl sulfonate, dialkylammonium heneicosafluoroundecyl sulfonate, dialkylammonium docosafluoroundecyl sulfonate, dialkylammonium tricosafluoroundecyl sulfonate, dialkylammonium monofluorododecyl sulfonate, dialkylammonium difluorododecyl sulfonate, dialkylammonium trifluorododecyl sulfonate, dialkylammonium tetrafluorododecyl sulfonate, dialkylammonium pentafluorododecyl sulfonate, dialkylammonium hexafluorododecyl sulfonate, dialkylammonium heptafluorododecyl sulfonate, dialkylammonium octafluorododecyl sulfonate, dialkylammonium nonafluorododecyl sulfonate, dialkylammonium decafluorododecyl sulfonate, dialkylammonium undecafluorododecyl sulfonate, dialkylammonium dodecafluorododecyl sulfonate, dialkylammonium tridecafluorododecyl sulfonate, dialkylammonium tetradecafluorododecyl sulfonate, dialkylammonium pentadecafluorododecyl sulfonate, dialkylammonium hexadecafluorododecyl sulfonate, dialkylammonium heptadecafluorododecyl sulfonate, dialkylammonium octadecafluorododecyl sulfonate, dialkylammonium nonadecafluorododecyl sulfonate, dialkylammonium eicosafluorododecyl sulfonate, dialkylammonium heneicosafluorododecyl sulfonate, dialkylammonium docosafluorododecyl sulfonate, dialkylammonium tricosafluorododecyl sulfonate, dialkylammonium tetracosafluorododecyl sulfonate, dialkylammonium pentacosafluorododecyl sulfonate, trialkylammonium monofluorobutyl sulfonate, trialkylammonium difluorobutyl sulfonate, trialkylammonium trifluorobutyl sulfonate, trialkylammonium tetrafluorobutyl sulfonate, trialkylammonium pentafluorobutyl sulfonate, trialkylammonium hexafluorobutyl sulfonate, trialkylammonium heptafluorobutyl sulfonate, trialkylammonium octafluorobutyl sulfonate, trialkylammonium nonafluorobutyl sulfonate, trialkylammonium monofluoropentyl sulfonate, trialkylammonium difluoropentyl sulfonate, trialkylammonium trifluoropentyl sulfonate, trialkylammonium tetrafluoropentyl sulfonate, trialkylammonium pentafluoropentyl sulfonate, trialkylammonium hexafluoropentyl sulfonate, trialkylammonium heptafluoropentyl sulfonate, trialkylammonium octafluoropentyl sulfonate, trialkylammonium nonafluoropentyl sulfonate, trialkylammonium decafluoropentyl sulfonate, trialkylammonium undecafluoropentyl sulfonate, trialkylammonium monofluorohexyl sulfonate, trialkylammonium difluorohexyl sulfonate, trialkylammonium trifluorohexyl sulfonate, trialkylammonium tetrafluorohexyl sulfonate, trialkylammonium pentafluorohexyl sulfonate, trialkylammonium hexafluorohexyl sulfonate, trialkylammonium heptafluorohexyl sulfonate, trialkylammonium octafluorohexyl sulfonate, trialkylammonium nonafluorohexyl sulfonate, trialkylammonium decafluorohexyl sulfonate, trialkylammonium undecafluorohexyl sulfonate, trialkylammonium dodecafluorohexyl sulfonate, trialkylammonium tridecafluorohexyl sulfonate, trialkylammonium monofluoroheptyl sulfonate, trialkylammonium difluoroheptyl sulfonate, trialkylammonium trifluoroheptyl sulfonate, trialkylammonium tetrafluoroheptyl sulfonate, trialkylammonium pentafluoroheptyl sulfonate, trialkylammonium hexafluoroheptyl sulfonate, trialkylammonium heptafluoroheptyl sulfonate, trialkylammonium octafluoroheptyl sulfonate, trialkylammonium nonafluoroheptyl sulfonate, trialkylammonium decafluoroheptyl sulfonate, trialkylammonium undecafluoroheptyl sulfonate, trialkylammonium dodecafluoroheptyl sulfonate, trialkylammonium tridecafluoroheptyl sulfonate, trialkylammonium tetradecafluoroheptyl sulfonate, trialkylammonium pentadecafluoroheptyl sulfonate, trialkylammonium monofluorooctyl sulfonate, trialkylammonium difluorooctyl sulfonate, trialkylammonium trifluorooctyl sulfonate, trialkylammonium tetrafluorooctyl sulfonate, trialkylammonium pentafluorooctyl sulfonate, trialkylammonium hexafluorooctyl sulfonate, trialkylammonium heptafluorooctyl sulfonate, trialkylammonium octafluorooctyl sulfonate, trialkylammonium nonafluorooctyl sulfonate, trialkylammonium decafluorooctyl sulfonate, trialkylammonium undecafluorooctyl sulfonate, trialkylammonium dodecafluorooctyl sulfonate, trialkylammonium tridecafluorooctyl sulfonate, trialkylammonium tetradecafluorooctyl sulfonate, trialkylammonium pentadecafluorooctyl sulfonate, trialkylammonium hexadecafluorooctyl sulfonate, trialkylammonium heptadecafluorooctyl sulfonate, trialkylammonium monofluorononyl sulfonate, trialkylammonium difluorononyl sulfonate, trialkylammonium trifluorononyl sulfonate, trialkylammonium tetrafluorononyl sulfonate, trialkylammonium pentafluorononyl sulfonate, trialkylammonium hexafluorononyl sulfonate, trialkylammonium heptafluorononyl sulfonate, trialkylammonium octafluorononyl sulfonate, trialkylammonium nonafluorononyl sulfonate, trialkylammonium decafluorononyl sulfonate, trialkylammonium undecafluorononyl sulfonate, trialkylammonium dodecafluorononyl sulfonate, trialkylammonium tridecafluorononyl sulfonate, trialkylammonium tetradecafluorononyl sulfonate, trialkylammonium pentadecafluorononyl sulfonate, trialkylammonium hexadecafluorononyl sulfonate, trialkylammonium heptadecafluorononyl sulfonate, trialkylammonium octadecafluorononyl sulfonate, trialkylammonium nonadecafluorononyl sulfonate, trialkylammonium monofluorodecyl sulfonate, trialkylammonium difluorodecyl sulfonate, trialkylammonium trifluorodecyl sulfonate, trialkylammonium tetrafluorodecyl sulfonate, trialkylammonium pentafluorodecyl sulfonate, trialkylammonium hexafluorodecyl sulfonate, trialkylammonium heptafluorodecyl sulfonate, trialkylammonium octafluorodecyl sulfonate, trialkylammonium nonafluorodecyl sulfonate, trialkylammonium decafluorodecyl sulfonate, trialkylammonium undecafluorodecyl sulfonate, trialkylammonium dodecafluorodecyl sulfonate, trialkylammonium tridecafluorodecyl sulfonate, trialkylammonium tetradecafluorodecyl sulfonate, trialkylammonium pentadecafluorodecyl sulfonate, trialkylammonium hexadecafluorodecyl sulfonate, trialkylammonium heptadecafluorodecyl sulfonate, trialkylammonium octadecafluorodecyl sulfonate, trialkylammonium nonadecafluorodecyl sulfonate, trialkylammonium eicosafluorodecyl sulfonate, trialkylammonium heneicosafluorodecyl sulfonate, trialkylammonium monofluoroundecyl sulfonate, trialkylammonium difluoroundecyl sulfonate, trialkylammonium trifluoroundecyl sulfonate, trialkylammonium tetrafluoroundecyl sulfonate, trialkylammonium pentafluoroundecyl sulfonate, trialkylammonium hexafluoroundecyl sulfonate, trialkylammonium heptafluoroundecyl sulfonate, trialkylammonium octafluoroundecyl sulfonate, trialkylammonium nonafluoroundecyl sulfonate, trialkylammonium decafluoroundecyl sulfonate, trialkylammonium undecafluoroundecyl sulfonate, trialkylammonium dodecafluoroundecyl sulfonate, trialkylammonium tridecafluoroundecyl sulfonate, trialkylammonium tetradecafluoroundecyl sulfonate, trialkylammonium pentadecafluoroundecyl sulfonate, trialkylammonium hexadecafluoroundecyl sulfonate, trialkylammonium heptadecafluoroundecyl sulfonate, trialkylammonium octadecafluoroundecyl sulfonate, trialkylammonium nonadecafluoroundecyl sulfonate, trialkylammonium eicosafluoroundecyl sulfonate, trialkylammonium heneicosafluoroundecyl sulfonate, trialkylammonium docosafluoroundecyl sulfonate, trialkylammonium tricosafluoroundecyl sulfonate, trialkylammonium monofluorododecyl sulfonate, trialkylammonium difluorododecyl sulfonate, trialkylammonium trifluorododecyl sulfonate, trialkylammonium tetrafluorododecyl sulfonate, trialkylammonium pentafluorododecyl sulfonate, trialkylammonium hexafluorododecyl sulfonate, trialkylammonium heptafluorododecyl sulfonate, trialkylammonium octafluorododecyl sulfonate, trialkylammonium nonafluorododecyl sulfonate, trialkylammonium decafluorododecyl sulfonate, trialkylammonium undecafluorododecyl sulfonate, trialkylammonium dodecafluorododecyl sulfonate, trialkylammonium tridecafluorododecyl sulfonate, trialkylammonium tetradecafluorododecyl sulfonate, trialkylammonium pentadecafluorododecyl sulfonate, trialkylammonium hexadecafluorododecyl sulfonate, trialkylammonium heptadecafluorododecyl sulfonate, trialkylammonium octadecafluorododecyl sulfonate, trialkylammonium nonadecafluorododecyl sulfonate, trialkylammonium eicosafluorododecyl sulfonate, trialkylammonium heneicosafluorododecyl sulfonate, trialkylammonium docosafluorododecyl sulfonate, trialkylammonium tricosafluorododecyl sulfonate, trialkylammonium tetracosafluorododecyl sulfonate, trialkylammonium pentacosafluorododecyl sulfonate, tetraalkylammonium monofluorobutyl sulfonate, tetraalkylammonium difluorobutyl sulfonate, tetraalkylammonium trifluorobutyl sulfonate, tetraalkylammonium tetrafluorobutyl sulfonate, tetraalkylammonium pentafluorobutyl sulfonate, tetraalkylammonium hexafluorobutyl sulfonate, tetraalkylammonium heptafluorobutyl sulfonate, tetraalkylammonium octafluorobutyl sulfonate, tetraalkylammonium nonafluorobutyl sulfonate, tetraalkylammonium monofluoropentyl sulfonate, tetraalkylammonium difluoropentyl sulfonate, tetraalkylammonium trifluoropentyl sulfonate, tetraalkylammonium tetrafluoropentyl sulfonate, tetraalkylammonium pentafluoropentyl sulfonate, tetraalkylammonium hexafluoropentyl sulfonate, tetraalkylammonium heptafluoropentyl sulfonate, tetraalkylammonium octafluoropentyl sulfonate, tetraalkylammonium nonafluoropentyl sulfonate, tetraalkylammonium decafluoropentyl sulfonate, tetraalkylammonium undecafluoropentyl sulfonate, tetraalkylammonium monofluorohexyl sulfonate, tetraalkylammonium difluorohexyl sulfonate, tetraalkylammonium trifluorohexyl sulfonate, tetraalkylammonium tetrafluorohexyl sulfonate, tetraalkylammonium pentafluorohexyl sulfonate, tetraalkylammonium hexafluorohexyl sulfonate, tetraalkylammonium heptafluorohexyl sulfonate, tetraalkylammonium octafluorohexyl sulfonate, tetraalkylammonium nonafluorohexyl sulfonate, tetraalkylammonium decafluorohexyl sulfonate, tetraalkylammonium undecafluorohexyl sulfonate, tetraalkylammonium dodecafluorohexyl sulfonate, tetraalkylammonium tridecafluorohexyl sulfonate, tetraalkylammonium monofluoroheptyl sulfonate, tetraalkylammonium difluoroheptyl sulfonate, tetraalkylammonium trifluoroheptyl sulfonate, tetraalkylammonium tetrafluoroheptyl sulfonate, tetraalkylammonium pentafluoroheptyl sulfonate, tetraalkylammonium hexafluoroheptyl sulfonate, tetraalkylammonium heptafluoroheptyl sulfonate, tetraalkylammonium octafluoroheptyl sulfonate, tetraalkylammonium nonafluoroheptyl sulfonate, tetraalkylammonium decafluoroheptyl sulfonate, tetraalkylammonium undecafluoroheptyl sulfonate, tetraalkylammonium dodecafluoroheptyl sulfonate, tetraalkylammonium tridecafluoroheptyl sulfonate, tetraalkylammonium tetradecafluoroheptyl sulfonate, tetraalkylammonium pentadecafluoroheptyl sulfonate, tetraalkylammonium monofluorooctyl sulfonate, tetraalkylammonium difluorooctyl sulfonate, tetraalkylammonium trifluorooctyl sulfonate, tetraalkylammonium tetrafluorooctyl sulfonate, tetraalkylammonium pentafluorooctyl sulfonate, tetraalkylammonium hexafluorooctyl sulfonate, tetraalkylammonium heptafluorooctyl sulfonate, tetraalkylammonium octafluorooctyl sulfonate, tetraalkylammonium nonafluorooctyl sulfonate, tetraalkylammonium decafluorooctyl sulfonate, tetraalkylammonium undecafluorooctyl sulfonate, tetraalkylammonium dodecafluorooctyl sulfonate, tetraalkylammonium tridecafluorooctyl sulfonate, tetraalkylammonium tetradecafluorooctyl sulfonate, tetraalkylammonium pentadecafluorooctyl sulfonate, tetraalkylammonium hexadecafluorooctyl sulfonate, tetraalkylammonium heptadecafluorooctyl sulfonate, tetraalkylammonium monofluorononyl sulfonate, tetraalkylammonium difluorononyl sulfonate, tetraalkylammonium trifluorononyl sulfonate, tetraalkylammonium tetrafluorononyl sulfonate, tetraalkylammonium pentafluorononyl sulfonate, tetraalkylammonium hexafluorononyl sulfonate, tetraalkylammonium heptafluorononyl sulfonate, tetraalkylammonium octafluorononyl sulfonate, tetraalkylammonium nonafluorononyl sulfonate, tetraalkylammonium decafluorononyl sulfonate, tetraalkylammonium undecafluorononyl sulfonate, tetraalkylammonium dodecafluorononyl sulfonate, tetraalkylammonium tridecafluorononyl sulfonate, tetraalkylammonium tetradecafluorononyl sulfonate, tetraalkylammonium pentadecafluorononyl sulfonate, tetraalkylammonium hexadecafluorononyl sulfonate, tetraalkylammonium heptadecafluorononyl sulfonate, tetraalkylammonium octadecafluorononyl sulfonate, tetraalkylammonium nonadecafluorononyl sulfonate, tetraalkylammonium monofluorodecyl sulfonate, tetraalkylammonium difluorodecyl sulfonate, tetraalkylammonium trifluorodecyl sulfonate, tetraalkylammonium tetrafluorodecyl sulfonate, tetraalkylammonium pentafluorodecyl sulfonate, tetraalkylammonium hexafluorodecyl sulfonate, tetraalkylammonium heptafluorodecyl sulfonate, tetraalkylammonium octafluorodecyl sulfonate, tetraalkylammonium nonafluorodecyl sulfonate, tetraalkylammonium decafluorodecyl sulfonate, tetraalkylammonium undecafluorodecyl sulfonate, tetraalkylammonium dodecafluorodecyl sulfonate, tetraalkylammonium tridecafluorodecyl sulfonate, tetraalkylammonium tetradecafluorodecyl sulfonate, tetraalkylammonium pentadecafluorodecyl sulfonate, tetraalkylammonium hexadecafluorodecyl sulfonate, tetraalkylammonium heptadecafluorodecyl sulfonate, tetraalkylammonium octadecafluorodecyl sulfonate, tetraalkylammonium nonadecafluorodecyl sulfonate, tetraalkylammonium eicosafluorodecyl sulfonate, tetraalkylammonium heneicosafluorodecyl sulfonate, tetraalkylammonium monofluoroundecyl sulfonate, tetraalkylammonium difluoroundecyl sulfonate, tetraalkylammonium trifluoroundecyl sulfonate, tetraalkylammonium tetrafluoroundecyl sulfonate, tetraalkylammonium pentafluoroundecyl sulfonate, tetraalkylammonium hexafluoroundecyl sulfonate, tetraalkylammonium heptafluoroundecyl sulfonate, tetraalkylammonium octafluoroundecyl sulfonate, tetraalkylammonium nonafluoroundecyl sulfonate, tetraalkylammonium decafluoroundecyl sulfonate, tetraalkylammonium undecafluoroundecyl sulfonate, tetraalkylammonium dodecafluoroundecyl sulfonate, tetraalkylammonium tridecafluoroundecyl sulfonate, tetraalkylammonium tetradecafluoroundecyl sulfonate, tetraalkylammonium pentadecafluoroundecyl sulfonate, tetraalkylammonium hexadecafluoroundecyl sulfonate, tetraalkylammonium heptadecafluoroundecyl sulfonate, tetraalkylammonium octadecafluoroundecyl sulfonate, tetraalkylammonium nonadecafluoroundecyl sulfonate, tetraalkylammonium eicosafluoroundecyl sulfonate, tetraalkylammonium heneicosafluoroundecyl sulfonate, tetraalkylammonium docosafluoroundecyl sulfonate, tetraalkylammonium tricosafluoroundecyl sulfonate, tetraalkylammonium monofluorododecyl sulfonate, tetraalkylammonium difluorododecyl sulfonate, tetraalkylammonium trifluorododecyl sulfonate, tetraalkylammonium tetrafluorododecyl sulfonate, tetraalkylammonium pentafluorododecyl sulfonate, tetraalkylammonium hexafluorododecyl sulfonate, tetraalkylammonium heptafluorododecyl sulfonate, tetraalkylammonium octafluorododecyl sulfonate, tetraalkylammonium nonafluorododecyl sulfonate, tetraalkylammonium decafluorododecyl sulfonate, tetraalkylammonium undecafluorododecyl sulfonate, tetraalkylammonium dodecafluorododecyl sulfonate, tetraalkylammonium tridecafluorododecyl sulfonate, tetraalkylammonium tetradecafluorododecyl sulfonate, tetraalkylammonium pentadecafluorododecyl sulfonate, tetraalkylammonium hexadecafluorododecyl sulfonate, tetraalkylammonium heptadecafluorododecyl sulfonate, tetraalkylammonium octadecafluorododecyl sulfonate, tetraalkylammonium nonadecafluorododecyl sulfonate, tetraalkylammonium eicosafluorododecyl sulfonate, tetraalkylammonium heneicosafluorododecyl sulfonate, tetraalkylammonium docosafluorododecyl sulfonate, tetraalkylammonium tricosafluorododecyl sulfonate, tetraalkylammonium tetracosafluorododecyl sulfonate, tetraalkylammonium pentacosafluorododecyl sulfonate, especially from the group containing ammonium monofluorobutyl sulfonate, ammonium difluorobutyl sulfonate, ammonium trifluorobutyl sulfonate, ammonium tetrafluorobutyl sulfonate, ammonium pentafluorobutyl sulfonate, ammonium hexafluorobutyl sulfonate, ammonium heptafluorobutyl sulfonate, ammonium octafluorobutyl sulfonate, ammonium nonafluorobutyl sulfonate, ammonium monofluoropentyl sulfonate, ammonium difluoropentyl sulfonate, ammonium trifluoropentyl sulfonate, ammonium tetrafluoropentyl sulfonate, ammonium pentafluoropentyl sulfonate, ammonium hexafluoropentyl sulfonate, ammonium heptafluoropentyl sulfonate, ammonium octafluoropentyl sulfonate, ammonium nonafluoropentyl sulfonate, ammonium decafluoropentyl sulfonate, ammonium undecafluoropentyl sulfonate, ammonium monofluorohexyl sulfonate, ammonium difluorohexyl sulfonate, ammonium trifluorohexyl sulfonate, ammonium tetrafluorohexyl sulfonate, ammonium pentafluorohexyl sulfonate, ammonium hexafluorohexyl sulfonate, ammonium heptafluorohexyl sulfonate, ammonium octafluorohexyl sulfonate, ammonium nonafluorohexyl sulfonate, ammonium decafluorohexyl sulfonate, ammonium undecafluorohexyl sulfonate, ammonium dodecafluorohexyl sulfonate, ammonium tridecafluorohexyl sulfonate, ammonium monofluoroheptyl sulfonate, ammonium difluoroheptyl sulfonate, ammonium trifluoroheptyl sulfonate, ammonium tetrafluoroheptyl sulfonate, ammonium pentafluoroheptyl sulfonate, ammonium hexafluoroheptyl sulfonate, ammonium heptafluoroheptyl sulfonate, ammonium octafluoroheptyl sulfonate, ammonium nonafluoroheptyl sulfonate, ammonium decafluoroheptyl sulfonate, ammonium undecafluoroheptyl sulfonate, ammonium dodecafluoroheptyl sulfonate, ammonium tridecafluoroheptyl sulfonate, ammonium tetradecafluoroheptyl sulfonate, ammonium pentadecafluoroheptyl sulfonate, ammonium monofluorooctyl sulfonate, ammonium difluorooctyl sulfonate, ammonium trifluorooctyl sulfonate, ammonium tetrafluorooctyl sulfonate, ammonium pentafluorooctyl sulfonate, ammonium hexafluorooctyl sulfonate, ammonium heptafluorooctyl sulfonate, ammonium octafluorooctyl sulfonate, ammonium nonafluorooctyl sulfonate, ammonium decafluorooctyl sulfonate, ammonium undecafluorooctyl sulfonate, ammonium dodecafluorooctyl sulfonate, ammonium tridecafluorooctyl sulfonate, ammonium tetradecafluorooctyl sulfonate, ammonium pentadecafluorooctyl sulfonate, ammonium hexadecafluorooctyl sulfonate, ammonium heptadecafluorooctyl sulfonate, ammonium monofluorononyl sulfonate, ammonium difluorononyl sulfonate, ammonium trifluorononyl sulfonate, ammonium tetrafluorononyl sulfonate, ammonium pentafluorononyl sulfonate, ammonium hexafluorononyl sulfonate, ammonium heptafluorononyl sulfonate, ammonium octafluorononyl sulfonate, ammonium nonafluorononyl sulfonate, ammonium decafluorononyl sulfonate, ammonium undecafluorononyl sulfonate, ammonium dodecafluorononyl sulfonate, ammonium tridecafluorononyl sulfonate, ammonium tetradecafluorononyl sulfonate, ammonium pentadecafluorononyl sulfonate, ammonium hexadecafluorononyl sulfonate, ammonium heptadecafluorononyl sulfonate, ammonium octadecafluorononyl sulfonate, ammonium nonadecafluorononyl sulfonate, ammonium monofluorodecyl sulfonate, ammonium difluorodecyl sulfonate, ammonium trifluorodecyl sulfonate, ammonium tetrafluorodecyl sulfonate, ammonium pentafluorodecyl sulfonate, ammonium hexafluorodecyl sulfonate, ammonium heptafluorodecyl sulfonate, ammonium octafluorodecyl sulfonate, ammonium nonafluorodecyl sulfonate, ammonium decafluorodecyl sulfonate, ammonium undecafluorodecyl sulfonate, ammonium dodecafluorodecyl sulfonate, ammonium tridecafluorodecyl sulfonate, ammonium tetradecafluorodecyl sulfonate, ammonium pentadecafluorodecyl sulfonate, ammonium hexadecafluorodecyl sulfonate, ammonium heptadecafluorodecyl sulfonate, ammonium octadecafluorodecyl sulfonate, ammonium nonadecafluorodecyl sulfonate, ammonium eicosafluorodecyl sulfonate, ammonium heneicosafluorodecyl sulfonate, ammonium monofluoroundecyl sulfonate, ammonium difluoroundecyl sulfonate, ammonium trifluoroundecyl sulfonate, ammonium tetrafluoroundecyl sulfonate, ammonium pentafluoroundecyl sulfonate, ammonium hexafluoroundecyl sulfonate, ammonium heptafluoroundecyl sulfonate, ammonium octafluoroundecyl sulfonate, ammonium nonafluoroundecyl sulfonate, ammonium decafluoroundecyl sulfonate, ammonium undecafluoroundecyl sulfonate, ammonium dodecafluoroundecyl sulfonate, ammonium tridecafluoroundecyl sulfonate, ammonium tetradecafluoroundecyl sulfonate, ammonium pentadecafluoroundecyl sulfonate, ammonium hexadecafluoroundecyl sulfonate, ammonium heptadecafluoroundecyl sulfonate, ammonium octadecafluoroundecyl sulfonate, ammonium nonadecafluoroundecyl sulfonate, ammonium eicosafluoroundecyl sulfonate, ammonium heneicosafluoroundecyl sulfonate, ammonium docosafluoroundecyl sulfonate, ammonium tricosafluoroundecyl sulfonate, ammonium monofluorododecyl sulfonate, ammonium difluorododecyl sulfonate, ammonium trifluorododecyl sulfonate, ammonium tetrafluorododecyl sulfonate, ammonium pentafluorododecyl sulfonate, ammonium hexafluorododecyl sulfonate, ammonium heptafluorododecyl sulfonate, ammonium octafluorododecyl sulfonate, ammonium nonafluorododecyl sulfonate, ammonium decafluorododecyl sulfonate, ammonium undecafluorododecyl sulfonate, ammonium dodecafluorododecyl sulfonate, ammonium tridecafluorododecyl sulfonate, ammonium tetradecafluorododecyl sulfonate, ammonium pentadecafluorododecyl sulfonate, ammonium hexadecafluorododecyl sulfonate, ammonium heptadecafluorododecyl sulfonate, ammonium octadecafluorododecyl sulfonate, ammonium nonadecafluorododecyl sulfonate, ammonium eicosafluorododecyl sulfonate, ammonium heneicosafluorododecyl sulfonate, ammonium docosafluorododecyl sulfonate, ammonium tricosafluorododecyl sulfonate, ammonium tetracosafluorododecyl sulfonate, ammonium pentacosafluorododecyl sulfonate, dimethylammonium monofluorobutyl sulfonate, dimethylammonium difluorobutyl sulfonate, dimethylammonium trifluorobutyl sulfonate, dimethylammonium tetrafluorobutyl sulfonate, dimethylammonium pentafluorobutyl sulfonate, dimethylammonium hexafluorobutyl sulfonate, dimethylammonium heptafluorobutyl sulfonate, dimethylammonium octafluorobutyl sulfonate, dimethylammonium nonafluorobutyl sulfonate, dimethylammonium monofluoropentyl sulfonate, dimethylammonium difluoropentyl sulfonate, dimethylammonium trifluoropentyl sulfonate, dimethylammonium tetrafluoropentyl sulfonate, dimethylammonium pentafluoropentyl sulfonate, dimethylammonium hexafluoropentyl sulfonate, dimethylammonium heptafluoropentyl sulfonate, dimethylammonium octafluoropentyl sulfonate, dimethylammonium nonafluoropentyl sulfonate, dimethylammonium decafluoropentyl sulfonate, dimethylammonium undecafluoropentyl sulfonate, dimethylammonium monofluorohexyl sulfonate, dimethylammonium difluorohexyl sulfonate, dimethylammonium trifluorohexyl sulfonate, dimethylammonium tetrafluorohexyl sulfonate, dimethylammonium pentafluorohexyl sulfonate, dimethylammonium hexafluorohexyl sulfonate, dimethylammonium heptafluorohexyl sulfonate, dimethylammonium octafluorohexyl sulfonate, dimethylammonium nonafluorohexyl sulfonate, dimethylammonium decafluorohexyl sulfonate, dimethylammonium undecafluorohexyl sulfonate, dimethylammonium dodecafluorohexyl sulfonate, dimethylammonium tridecafluorohexyl sulfonate, dimethylammonium monofluoroheptyl sulfonate, dimethylammonium difluoroheptyl sulfonate, dimethylammonium trifluoroheptyl sulfonate, dimethylammonium tetrafluoroheptyl sulfonate, dimethylammonium pentafluoroheptyl sulfonate, dimethylammonium hexafluoroheptyl sulfonate, dimethylammonium heptafluoroheptyl sulfonate, dimethylammonium octafluoroheptyl sulfonate, dimethylammonium nonafluoroheptyl sulfonate, dimethylammonium decafluoroheptyl sulfonate, dimethylammonium undecafluoroheptyl sulfonate, dimethylammonium dodecafluoroheptyl sulfonate, dimethylammonium tridecafluoroheptyl sulfonate, dimethylammonium tetradecafluoroheptyl sulfonate, dimethylammonium pentadecafluoroheptyl sulfonate, dimethylammonium monofluorooctyl sulfonate, dimethylammonium difluorooctyl sulfonate, dimethylammonium trifluorooctyl sulfonate, dimethylammonium tetrafluorooctyl sulfonate, dimethylammonium pentafluorooctyl sulfonate, dimethylammonium hexafluorooctyl sulfonate, dimethylammonium heptafluorooctyl sulfonate, dimethylammonium octafluorooctyl sulfonate, dimethylammonium nonafluorooctyl sulfonate, dimethylammonium decafluorooctyl sulfonate, dimethylammonium undecafluorooctyl sulfonate, dimethylammonium dodecafluorooctyl sulfonate, dimethylammonium tridecafluorooctyl sulfonate, dimethylammonium tetradecafluorooctyl sulfonate, dimethylammonium pentadecafluorooctyl sulfonate, dimethylammonium hexadecafluorooctyl sulfonate, dimethylammonium heptadecafluorooctyl sulfonate, dimethylammonium monofluorononyl sulfonate, dimethylammonium difluorononyl sulfonate, dimethylammonium trifluorononyl sulfonate, dimethylammonium tetrafluorononyl sulfonate, dimethylammonium pentafluorononyl sulfonate, dimethylammonium hexafluorononyl sulfonate, dimethylammonium heptafluorononyl sulfonate, dimethylammonium octafluorononyl sulfonate, dimethylammonium nonafluorononyl sulfonate, dimethylammonium decafluorononyl sulfonate, dimethylammonium undecafluorononyl sulfonate, dimethylammonium dodecafluorononyl sulfonate, dimethylammonium tridecafluorononyl sulfonate, dimethylammonium tetradecafluorononyl sulfonate, dimethylammonium pentadecafluorononyl sulfonate, dimethylammonium hexadecafluorononyl sulfonate, dimethylammonium heptadecafluorononyl sulfonate, dimethylammonium octadecafluorononyl sulfonate, dimethylammonium nonadecafluorononyl sulfonate, dimethylammonium monofluorodecyl sulfonate, dimethylammonium difluorodecyl sulfonate, dimethylammonium trifluorodecyl sulfonate, dimethylammonium tetrafluorodecyl sulfonate, dimethylammonium pentafluorodecyl sulfonate, dimethylammonium hexafluorodecyl sulfonate, dimethylammonium heptafluorodecyl sulfonate, dimethylammonium octafluorodecyl sulfonate, dimethylammonium nonafluorodecyl sulfonate, dimethylammonium decafluorodecyl sulfonate, dimethylammonium undecafluorodecyl sulfonate, dimethylammonium dodecafluorodecyl sulfonate, dimethylammonium tridecafluorodecyl sulfonate, dimethylammonium tetradecafluorodecyl sulfonate, dimethylammonium pentadecafluorodecyl sulfonate, dimethylammonium hexadecafluorodecyl sulfonate, dimethylammonium heptadecafluorodecyl sulfonate, dimethylammonium octadecafluorodecyl sulfonate, dimethylammonium nonadecafluorodecyl sulfonate, dimethylammonium eicosafluorodecyl sulfonate, dimethylammonium heneicosafluorodecyl sulfonate, dimethylammonium monofluoroundecyl sulfonate, dimethylammonium difluoroundecyl sulfonate, dimethylammonium trifluoroundecyl sulfonate, dimethylammonium tetrafluoroundecyl sulfonate, dimethylammonium pentafluoroundecyl sulfonate, dimethylammonium hexafluoroundecyl sulfonate, dimethylammonium heptafluoroundecyl sulfonate, dimethylammonium octafluoroundecyl sulfonate, dimethylammonium nonafluoroundecyl sulfonate, dimethylammonium decafluoroundecyl sulfonate, dimethylammonium undecafluoroundecyl sulfonate, dimethylammonium dodecafluoroundecyl sulfonate, dimethylammonium tridecafluoroundecyl sulfonate, dimethylammonium tetradecafluoroundecyl sulfonate, dimethylammonium pentadecafluoroundecyl sulfonate, dimethylammonium hexadecafluoroundecyl sulfonate, dimethylammonium heptadecafluoroundecyl sulfonate, dimethylammonium octadecafluoroundecyl sulfonate, dimethylammonium nonadecafluoroundecyl sulfonate, dimethylammonium eicosafluoroundecyl sulfonate, dimethylammonium heneicosafluoroundecyl sulfonate, dimethylammonium docosafluoroundecyl sulfonate, dimethylammonium tricosafluoroundecyl sulfonate, dimethylammonium monofluorododecyl sulfonate, dimethylammonium difluorododecyl sulfonate, dimethylammonium trifluorododecyl sulfonate, dimethylammonium tetrafluorododecyl sulfonate, dimethylammonium pentafluorododecyl sulfonate, dimethylammonium hexafluorododecyl sulfonate, dimethylammonium heptafluorododecyl sulfonate, dimethylammonium octafluorododecyl sulfonate, dimethylammonium nonafluorododecyl sulfonate, dimethylammonium decafluorododecyl sulfonate, dimethylammonium undecafluorododecyl sulfonate, dimethylammonium dodecafluorododecyl sulfonate, dimethylammonium tridecafluorododecyl sulfonate, dimethylammonium tetradecafluorododecyl sulfonate, dimethylammonium pentadecafluorododecyl sulfonate, dimethylammonium hexadecafluorododecyl sulfonate, dimethylammonium heptadecafluorododecyl sulfonate, dimethylammonium octadecafluorododecyl sulfonate, dimethylammonium nonadecafluorododecyl sulfonate, dimethylammonium eicosafluorododecyl sulfonate, dimethylammonium heneicosafluorododecyl sulfonate, dimethylammonium docosafluorododecyl sulfonate, dimethylammonium tricosafluorododecyl sulfonate, dimethylammonium tetracosafluorododecyl sulfonate, dimethylammonium pentacosafluorododecyl sulfonate, tetraethylammonium monofluorobutyl sulfonate, tetraethylammonium difluorobutyl sulfonate, tetraethylammonium trifluorobutyl sulfonate, tetraethylammonium tetrafluorobutyl sulfonate, tetraethylammonium pentafluorobutyl sulfonate, tetraethylammonium hexafluorobutyl sulfonate, tetraethylammonium heptafluorobutyl sulfonate, tetraethylammonium octafluorobutyl sulfonate, tetraethylammonium nonafluorobutyl sulfonate, tetraethylammonium monofluoropentyl sulfonate, tetraethylammonium difluoropentyl sulfonate, tetraethylammonium trifluoropentyl sulfonate, tetraethylammonium tetrafluoropentyl sulfonate, tetraethylammonium pentafluoropentyl sulfonate, tetraethylammonium hexafluoropentyl sulfonate, tetraethylammonium heptafluoropentyl sulfonate, tetraethylammonium octafluoropentyl sulfonate, tetraethylammonium nonafluoropentyl sulfonate, tetraethylammonium decafluoropentyl sulfonate, tetraethylammonium undecafluoropentyl sulfonate, tetraethylammonium monofluorohexyl sulfonate, tetraethylammonium difluorohexyl sulfonate, tetraethylammonium trifluorohexyl sulfonate, tetraethylammonium tetrafluorohexyl sulfonate, tetraethylammonium pentafluorohexyl sulfonate, tetraethylammonium hexafluorohexyl sulfonate, tetraethylammonium heptafluorohexyl sulfonate, tetraethylammonium octafluorohexyl sulfonate, tetraethylammonium nonafluorohexyl sulfonate, tetraethylammonium decafluorohexyl sulfonate, tetraethylammonium undecafluorohexyl sulfonate, tetraethylammonium dodecafluorohexyl sulfonate, tetraethylammonium tridecafluorohexyl sulfonate, tetraethylammonium monofluoroheptyl sulfonate, tetraethylammonium difluoroheptyl sulfonate, tetraethylammonium trifluoroheptyl sulfonate, tetraethylammonium tetrafluoroheptyl sulfonate, tetraethylammonium pentafluoroheptyl sulfonate, tetraethylammonium hexafluoroheptyl sulfonate, tetraethylammonium heptafluoroheptyl sulfonate, tetraethylammonium octafluoroheptyl sulfonate, tetraethylammonium nonafluoroheptyl sulfonate, tetraethylammonium decafluoroheptyl sulfonate, tetraethylammonium undecafluoroheptyl sulfonate, tetraethylammonium dodecafluoroheptyl sulfonate, tetraethylammonium tridecafluoroheptyl sulfonate, tetraethylammonium tetradecafluoroheptyl sulfonate, tetraethylammonium pentadecafluoroheptyl sulfonate, tetraethylammonium monofluorooctyl sulfonate, tetraethylammonium difluorooctyl sulfonate, tetraethylammonium trifluorooctyl sulfonate, tetraethylammonium tetrafluorooctyl sulfonate, tetraethylammonium pentafluorooctyl sulfonate, tetraethylammonium hexafluorooctyl sulfonate, tetraethylammonium heptafluorooctyl sulfonate, tetraethylammonium octafluorooctyl sulfonate, tetraethylammonium nonafluorooctyl sulfonate, tetraethylammonium decafluorooctyl sulfonate, tetraethylammonium undecafluorooctyl sulfonate, tetraethylammonium dodecafluorooctyl sulfonate, tetraethylammonium tridecafluorooctyl sulfonate, tetraethylammonium tetradecafluorooctyl sulfonate, tetraethylammonium pentadecafluorooctyl sulfonate, tetraethylammonium hexadecafluorooctyl sulfonate, tetraethylammonium heptadecafluorooctyl sulfonate, tetraethylammonium monofluorononyl sulfonate, tetraethylammonium difluorononyl sulfonate, tetraethylammonium trifluorononyl sulfonate, tetraethylammonium tetrafluorononyl sulfonate, tetraethylammonium pentafluorononyl sulfonate, tetraethylammonium hexafluorononyl sulfonate, tetraethylammonium heptafluorononyl sulfonate, tetraethylammonium octafluorononyl sulfonate, tetraethylammonium nonafluorononyl sulfonate, tetraethylammonium decafluorononyl sulfonate, tetraethylammonium undecafluorononyl sulfonate, tetraethylammonium dodecafluorononyl sulfonate, tetraethylammonium tridecafluorononyl sulfonate, tetraethylammonium tetradecafluorononyl sulfonate, tetraethylammonium pentadecafluorononyl sulfonate, tetraethylammonium hexadecafluorononyl sulfonate, tetraethylammonium heptadecafluorononyl sulfonate, tetraethylammonium octadecafluorononyl sulfonate, tetraethylammonium nonadecafluorononyl sulfonate, tetraethylammonium monofluorodecyl sulfonate, tetraethylammonium difluorodecyl sulfonate, tetraethylammonium trifluorodecyl sulfonate, tetraethylammonium tetrafluorodecyl sulfonate, tetraethylammonium pentafluorodecyl sulfonate, tetraethylammonium hexafluorodecyl sulfonate, tetraethylammonium heptafluorodecyl sulfonate, tetraethylammonium octafluorodecyl sulfonate, tetraethylammonium nonafluorodecyl sulfonate, tetraethylammonium decafluorodecyl sulfonate, tetraethylammonium undecafluorodecyl sulfonate, tetraethylammonium dodecafluorodecyl sulfonate, tetraethylammonium tridecafluorodecyl sulfonate, tetraethylammonium tetradecafluorodecyl sulfonate, tetraethylammonium pentadecafluorodecyl sulfonate, tetraethylammonium hexadecafluorodecyl sulfonate, tetraethylammonium heptadecafluorodecyl sulfonate, tetraethylammonium octadecafluorodecyl sulfonate, tetraethylammonium nonadecafluorodecyl sulfonate, tetraethylammonium eicosafluorodecyl sulfonate, tetraethylammonium heneicosafluorodecyl sulfonate, tetraethylammonium monofluoroundecyl sulfonate, tetraethylammonium difluoroundecyl sulfonate, tetraethylammonium trifluoroundecyl sulfonate, tetraethylammonium tetrafluoroundecyl sulfonate, tetraethylammonium pentafluoroundecyl sulfonate, tetraethylammonium hexafluoroundecyl sulfonate, tetraethylammonium heptafluoroundecyl sulfonate, tetraethylammonium octafluoroundecyl sulfonate, tetraethylammonium nonafluoroundecyl sulfonate, tetraethylammonium decafluoroundecyl sulfonate, tetraethylammonium undecafluoroundecyl sulfonate, tetraethylammonium dodecafluoroundecyl sulfonate, tetraethylammonium tridecafluoroundecyl sulfonate, tetraethylammonium tetradecafluoroundecyl sulfonate, tetraethylammonium pentadecafluoroundecyl sulfonate, tetraethylammonium hexadecafluoroundecyl sulfonate, tetraethylammonium heptadecafluoroundecyl sulfonate, tetraethylammonium octadecafluoroundecyl sulfonate, tetraethylammonium nonadecafluoroundecyl sulfonate, tetraethylammonium eicosafluoroundecyl sulfonate, tetraethylammonium heneicosafluoroundecyl sulfonate, tetraethylammonium docosafluoroundecyl sulfonate, tetraethylammonium tricosafluoroundecyl sulfonate, tetraethylammonium monofluorododecyl sulfonate, tetraethylammonium difluorododecyl sulfonate, tetraethylammonium trifluorododecyl sulfonate, tetraethylammonium tetrafluorododecyl sulfonate, tetraethylammonium pentafluorododecyl sulfonate, tetraethylammonium hexafluorododecyl sulfonate, tetraethylammonium heptafluorododecyl sulfonate, tetraethylammonium octafluorododecyl sulfonate, tetraethylammonium nonafluorododecyl sulfonate, tetraethylammonium decafluorododecyl sulfonate, tetraethylammonium undecafluorododecyl sulfonate, tetraethylammonium dodecafluorododecyl sulfonate, tetraethylammonium tridecafluorododecyl sulfonate, tetraethylammonium tetradecafluorododecyl sulfonate, tetraethylammonium pentadecafluorododecyl sulfonate, tetraethylammonium hexadecafluorododecyl sulfonate, tetraethylammonium heptadecafluorododecyl sulfonate, tetraethylammonium octadecafluorododecyl sulfonate, tetraethylammonium nonadecafluorododecyl sulfonate, tetraethylammonium eicosafluorododecyl sulfonate, tetraethylammonium heneicosafluorododecyl sulfonate, tetraethylammonium docosafluorododecyl sulfonate, tetraethylammonium tricosafluorododecyl sulfonate, tetraethylammonium tetracosafluorododecyl sulfonate, and tetraethylammonium pentacosafluorododecyl sulfonate.

If the anionic surfactant of the electrolyte according to the present invention is a fluorine-free surfactant, it is conceivable that at least one surfactant is an alkyl sulfonate, preferably an alkyl sulfonate in which the alkyl group of the alkyl sulfonate has a length of 1, 2, 3, 4, 5, 6, 7, 8, 9, 10, 11, 12, 13, 14, 15, 16, 17, 18 carbon atoms and preferably 4, 5, 6, 7, 8, 9, 10, 11, 12 carbon atoms. It is favorable in any case in this connection if at least one surfactant is an alkyl sulfonate which has a counterion that is selected from among $Na^+$ or $K^+$. It is, of course, also conceivable that the counterion is a lithium ion or an ion corresponding to the formula $((C_sH_{2s+1})(C_pH_{2p+1})(C_rH_{2r+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, for example, a tetraethylammonium ion. As was described above, such a surfactant may be a compound corresponding to Formulas II and may be selected, for example, from the group containing sodium 1-butyl sulfonate, sodium 1-pentyl sulfonate, sodium 1-hexyl sulfonate, sodium 1-heptyl sulfonate, sodium 1-octyl sulfonate, sodium 1-nonyl sulfonate, sodium 1-decyl sulfonate, sodium 1-undecyl sulfonate, sodium 1-dodecyl sulfonate, sodium isobutyl sulfonate, sodium 1-undecyl sulfonate, sodium 1-dodecyl sulfonate, sodium isobutyl sulfonate, sodium isopentyl sulfonate, sodium isohexyl sulfonate, sodium isoheptyl sulfonate, sodium isooctyl sulfonate, sodium isononyl sulfonate, sodium isodecyl sulfonate, sodium iso-undecyl sulfonate, sodium iso-dodecyl sulfonate, potassium 1-butyl sulfonate, potassium 1-pentyl sulfonate, potassium 1-hexyl sulfonate, potassium 1-heptyl sulfonate, potassium 1-octyl sulfonate, potassium 1-nonyl sulfonate, potassium 1-decyl sulfonate, potassium 1-undecyl sulfonate, potassium 1-dodecyl sulfonate, potassium isobutyl sulfonate, potassium iso-pentyl sulfonate, potassium iso-hexyl sulfonate, potassium iso-heptyl sulfonate, potassium iso-octyl sulfonate, potassium iso-nonyl sulfonate, potassium iso-decyl sulfonate, potassium iso-undecyl sulfonate, potassium iso-dodecyl sulfonate, preferably from among sodium 1-butyl sulfonate, sodium 1-dodecyl sulfonate, sodium 1-isobutyl sulfonate, sodium 1-isododecyl sulfonate, potassium 1-butyl sulfonate, potassium 1-dodecyl sulfonate, potassium 1-iso-butyl sulfonate, potassium 1-isododecyl sulfonate, especially preferably from among sodium 1-butyl sulfonate, sodium 1-dodecyl sulfonate, potassium 1-butyl sulfonate, potassium 1-dodecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium iso-butyl sulfonate, lithium iso-pentyl sulfonate, lithium iso-hexyl sulfonate, lithium iso-heptyl sulfonate, lithium iso-octyl sulfonate, lithium iso-nonyl sulfonate, lithium iso-decyl sulfonate, lithium iso-undecyl sulfonate, lithium iso-dodecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium isobutyl sulfonate, lithium iso-pentyl sulfonate, lithium isohexyl sulfonate, lithium iso-heptyl sulfonate, lithium isooctyl sulfonate, lithium iso-nonyl sulfonate, lithium isodecyl sulfonate, lithium iso-undecyl sulfonate, lithium isododecyl sulfonate, preferably from among lithium 1-butyl sulfonate, lithium 1-dodecyl sulfonate, lithium 1-isobutyl sulfonate, lithium 1-isododecyl sulfonate, lithium 1-butyl sulfonate, lithium 1-dodecyl sulfonate, lithium 1-iso-butyl sulfonate, lithium 1-isododecyl sulfonate, especially preferably from among lithium 1-butyl sulfonate, lithium 1-dodecyl sulfonate, lithium 1-butyl sulfonate, lithium 1-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium iso-butyl sulfonate, ammonium iso-pentyl sulfonate, ammonium iso-hexyl sulfonate, ammonium iso-heptyl sulfonate, ammonium iso-octyl sulfonate, ammonium iso-nonyl sulfonate, ammonium iso-decyl sulfonate, ammonium iso-undecyl sulfonate, ammonium iso-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium iso-butyl sulfonate, ammonium iso-pentyl sulfonate, ammonium iso-hexyl sulfonate, ammonium iso-heptyl sulfonate, ammonium iso-octyl sulfonate, ammonium iso-nonyl sulfonate, ammonium iso-decyl sulfonate, ammonium iso-undecyl sulfonate, ammonium iso-dodecyl sulfonate, preferably from among ammonium 1-butyl sulfonate, ammonium 1-dodecyl sulfonate, ammonium 1-isobutyl sulfonate, ammonium 1-isododecyl sulfonate, ammonium 1-butyl sulfonate, ammonium 1-dodecyl sulfonate, ammonium 1-iso-butyl sulfonate, ammonium 1-isododecyl sulfonate, especially preferably from among ammonium 1-butyl sulfonate, ammonium 1-dodecyl sulfonate, ammonium 1-butyl sulfonate, ammonium 1-dodecyl sulfonate, dialkylammonium-1-butyl sulfonate, dialkylammonium-1-pentyl sulfonate, dialkylammonium-1-hexyl sulfonate, dialkylammonium-1-heptyl sulfonate, dialkylammonium-1-octyl sulfonate, dialkylammonium-1-nonyl sulfonate, dialkylammonium-1-decyl sulfonate, dialkylammonium-1-undecyl sulfonate, dialkylammonium-1-dodecyl sulfonate, dialkylammonium-iso-butyl sulfonate, dialkylammonium-iso-pentyl sulfonate, dialkylammonium-iso-hexyl sulfonate, dialkylammonium-iso-heptyl sulfonate, dialkylammonium-iso-octyl sulfonate, dialkylammonium-iso-nonyl sulfonate, dialkylammonium-iso-decyl sulfonate, dialkylammonium-iso-undecyl sulfonate, dialkylammonium-iso-dodecyl sulfonate, dialkylammonium-1-butyl sulfonate, dialkylammonium-1-pentyl sulfonate, dialkylammonium-1-hexyl sulfonate, dialkylammonium-1-heptyl sulfonate, dialkylammonium-1-octyl sulfonate, dialkylammonium-1-nonyl sulfonate, dialkylammonium-1-decyl sulfonate, dialkylammonium-1-undecyl sulfonate, dialkylammonium-1-dodecyl sulfonate, dialkylammonium-iso-butyl sulfonate, dialkylammonium-iso-pentyl sulfonate, dialkylammonium-iso-hexyl sulfonate, dialkylammonium-iso-heptyl sulfonate, dialkylammonium-iso-octyl sulfonate, dialkylammonium-iso-nonyl sulfonate, dialkylammonium-iso-decyl sulfonate, dialkylammonium-iso-undecyl sulfonate, dialkylammonium-iso-dodecyl sulfonate, preferably from among dialkylammonium-1-butyl sulfonate, dialkylammonium-1-dodecyl sulfonate, dialkylammonium-1-isobutyl sulfonate, dialkylammonium-1-isododecyl sulfonate, dialkylammonium-1-butyl sulfonate, dialkylammonium-1-dodecyl sulfonate, dialkylammonium-1-iso-butyl sulfonate, dialkylammonium-1-isododecyl sulfonate, especially preferably from among dialkylammonium-1-butyl sulfonate, dialkylammonium-1-dodecyl sulfonate, dialkylammonium-1-butyl sulfonate, dialkylammonium-1-dodecyl sulfonate, trialkylammonium-1-butyl sulfonate, trialkylammonium-1-pentyl sulfonate, trialkylammonium-1-hexyl sulfonate, trialkylammonium-1-heptyl sulfonate, trialkylammonium-1-octyl sulfonate, trialkylammonium-1-nonyl sulfonate, trialkylammonium-1-decyl sulfonate, trialkylammonium-1-undecyl sulfonate, trialkylammonium-1-dodecyl sulfonate, trialkylammonium-iso-butyl sulfonate, trialkylammonium-iso-pentyl sulfonate, trialkylammonium-iso-hexyl sulfonate, trialkylammonium-iso-heptyl sulfonate, trialkylammonium-iso-octyl sulfonate, trialkylammonium-iso-nonyl sulfonate, trialkylammonium-iso-decyl sulfonate, trialkylammonium-iso-undecyl sulfonate, trialkylammonium-iso-dodecyl sulfonate, trialkylammonium-1-butyl sulfonate, trialkylammonium-1-pentyl sulfonate, trialkylammonium-1-hexyl sulfonate, trialkylammonium-1-heptyl sulfonate, trialkylammonium-1-octyl sulfonate, trialkylammonium-1-nonyl sulfonate, trialkylammonium-1-decyl sulfonate, trialkylammonium-1-undecyl sulfonate, trialkylammonium-1-dodecyl sulfonate, trialkylammonium-iso-butyl sulfonate, trialkylammonium-iso-pentyl sulfonate, trialkylammonium-iso-hexyl sulfonate, trialkylammonium-iso-heptyl sulfonate, trialkylammonium-iso-octyl sulfonate, trialkylammonium-iso-nonyl sulfonate, trialkylammonium-iso-decyl sulfonate, trialkylammonium-iso-undecyl sulfonate, trialkylammonium-iso-dodecyl sulfonate, preferably from among trialkylammonium-1-butyl sulfonate, trialkylammonium-1-dodecyl sulfonate, trialkylammonium-1-isobutyl sulfonate, trialkylammonium-1-isododecyl sulfonate, trialkylammonium-1-butyl sulfonate, trialkylammonium-1-dodecyl sulfonate, trialkylammonium-1-iso-butyl sulfonate, trialkylammonium-1-isododecyl sulfonate, especially preferably from among trialkylammonium-1-butyl sulfonate, trialkylammonium-1-dodecyl sulfonate, trialkylammonium-1-butyl sulfonate, trialkylammonium-1-dodecyl sulfonate, tetraalkylammonium-1-butyl sulfonate, tetraalkylammonium-1-pentyl sulfonate, tetraalkylammonium-1-hexyl sulfonate, tetraalkylammonium-1-heptyl sulfonate, tetraalkylammonium-1-octyl sulfonate, tetraalkylammonium-1-nonyl sulfonate, tetraalkylammonium-1-decyl sulfonate, tetraalkylammonium-1-undecyl sulfonate, tetraalkylammonium-1-dodecyl sulfonate, tetraalkylammonium-iso-butyl sulfonate, tetraalkylammonium-iso-pentyl sulfonate, tetraalkylammonium-iso-hexyl sulfonate, tetraalkylammonium-iso-heptyl sulfonate, tetraalkylammonium-iso-octyl sulfonate, tetraalkylammonium-iso-nonyl sulfonate, tetraalkylammonium-iso-decyl sulfonate, tetraalkylammonium-iso-undecyl sulfonate, tetraalkylammonium-iso-dodecyl sulfonate, tetraalkylammonium-1-butyl sulfonate, tetraalkylammonium-1-pentyl sulfonate, tetraalkylammonium-1-hexyl sulfonate, tetraalkylammonium-1-heptyl sulfonate, tetraalkylammonium-1-octyl sulfonate, tetraalkylammonium-1-nonyl sulfonate, tetraalkylammonium-1-decyl sulfonate, tetraalkylammonium-1-undecyl sulfonate, tetraalkylammonium-1-dodecyl sulfonate, tetraalkylammonium-iso-butyl sulfonate, tetraalkylammonium-iso-pentyl sulfonate, tetraalkylammonium-iso-hexyl sulfonate, tetraalkylammonium-iso-heptyl sulfonate, tetraalkylammonium-iso-octyl sulfonate, tetraalkylammonium-iso-nonyl sulfonate, tetraalkylammonium-iso-decyl sulfonate, tetraalkylammonium-iso-undecyl sulfonate, tetraalkylammonium-iso-dodecyl sulfonate, preferably from among tetraalkylammonium-1-butyl sulfonate, tetraalkylammonium-1-dodecyl sulfonate, tetraalkylammonium-1-isobutyl sulfonate, tetraalkylammonium-1-isododecyl sulfonate, tetraalkylammonium-1-butyl sulfonate, tetraalkylammonium-1-dodecyl sulfonate, tetraalkylammonium-1-iso-butyl sulfonate, tetraalkylammonium-1-isododecyl sulfonate, especially from the group containing sodium 1-butyl sulfonate, sodium 1-pentyl sulfonate, sodium 1-hexyl sulfonate, sodium 1-heptyl sulfonate, sodium 1-octyl sulfonate, sodium 1-nonyl sulfonate, sodium 1-decyl sulfonate, sodium 1-undecyl sulfonate, sodium 1-dodecyl sulfonate, sodium iso-butyl sulfonate, sodium iso-pentyl sulfonate, sodium iso-hexyl sulfonate, sodium iso-heptyl sulfonate, sodium iso-octyl sulfonate, sodium iso-nonyl sulfonate, sodium iso-decyl sulfonate, sodium iso-undecyl sulfonate, sodium iso-dodecyl sulfonate, potassium 1-butyl sulfonate, potassium 1-pentyl sulfonate, potassium 1-hexyl sulfonate, potassium 1-heptyl sulfonate, potassium 1-octyl sulfonate, potassium 1-nonyl sulfonate, potassium 1-decyl sulfonate, potassium 1-undecyl sulfonate, potassium 1-dodecyl sulfonate, potassium iso-butyl sulfonate, potassium iso-pentyl sulfonate, potassium iso-hexyl sulfonate, potassium iso-heptylsulfonate, potassium iso-octyl sulfonate, potassium iso-nonyl sulfonate, potassium iso-decyl sulfonate, potassium iso-undecyl sulfonate, potassium iso-dodecyl sulfonate, preferably from among sodium 1-butyl sulfonate, sodium 1-dodecyl sulfonate, sodium 1-isobutyl sulfonate, sodium 1-isododecyl sulfonate, potassium 1-butyl sulfonate, potassium 1-dodecyl sulfonate, potassium 1-iso-butyl sulfonate, potassium 1-isododecyl sulfonate, especially preferably from among sodium 1-butyl sulfonate, sodium 1-dodecyl sulfonate, potassium 1-butyl sulfonate, potassium 1-dodecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium iso-butyl sulfonate, lithium iso-pentyl sulfonate, lithium iso-hexyl sulfonate, lithium iso-heptyl sulfonate, lithium iso-octyl sulfonate, lithium iso-nonyl sulfonate, lithium iso-decyl sulfonate, lithium iso-undecyl sulfonate, lithium iso-dodecyl sulfonate, lithium 1-butyl sulfonate, lithium 1-pentyl sulfonate, lithium 1-hexyl sulfonate, lithium 1-heptyl sulfonate, lithium 1-octyl sulfonate, lithium 1-nonyl sulfonate, lithium 1-decyl sulfonate, lithium 1-undecyl sulfonate, lithium 1-dodecyl sulfonate, lithium iso-butyl sulfonate, lithium iso-pentyl sulfonate, lithium iso-hexyl sulfonate, lithium iso-heptyl sulfonate, lithium iso-octyl sulfonate, lithium iso-nonyl sulfonate, lithium iso-decyl sulfonate, lithium iso-undecyl sulfonate, lithium iso-dodecyl sulfonate, preferably from among lithium 1-butyl sulfonate, lithium 1-dodecyl sulfonate, lithium 1-isobutyl sulfonate, lithium 1-isododecyl sulfonate, lithium 1-butyl sulfonate, lithium 1-dodecyl sulfonate, lithium 1-iso-butyl sulfonate, lithium 1-isododecyl sulfonate, especially preferably from among lithium 1-butyl sulfonate, lithium 1-dodecyl sulfonate, lithium 1-butyl sulfonate, lithium 1-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium iso-butyl sulfonate, ammonium iso-pentyl sulfonate, ammonium iso-hexyl sulfonate, ammonium iso-heptyl sulfonate, ammonium iso-octyl sulfonate, ammonium iso-nonyl sulfonate, ammonium iso-decyl sulfonate, ammonium iso-undecyl sulfonate, ammonium iso-dodecyl sulfonate, ammonium 1-butyl sulfonate, ammonium 1-pentyl sulfonate, ammonium 1-hexyl sulfonate, ammonium 1-heptyl sulfonate, ammonium 1-octyl sulfonate, ammonium 1-nonyl sulfonate, ammonium 1-decyl sulfonate, ammonium 1-undecyl sulfonate, ammonium 1-dodecyl sulfonate, ammonium iso-butyl sulfonate, ammonium iso-pentyl sulfonate, ammonium iso-hexyl sulfonate, ammonium iso-heptyl sulfonate, ammonium iso-octyl sulfonate, ammonium iso-nonyl sulfonate, ammonium iso-decyl sulfonate, ammonium iso-undecyl sulfonate, ammonium iso-dodecyl sulfonate, preferably from among ammonium 1-butyl sulfonate, ammonium 1-dodecyl sulfonate, ammonium 1-isobutyl sulfonate, ammonium 1-isododecyl sulfonate, ammonium 1-butyl sulfonate, ammonium 1-dodecyl sulfonate, ammonium 1-iso-butyl sulfonate, ammonium 1-isododecyl sulfonate, especially preferably from among ammonium 1-butyl sulfonate, ammonium 1-dodecyl sulfonate, ammonium 1-butyl sulfonate, ammonium 1-dodecyl sulfonate, tetraethylammonium-1-butyl sulfonate, tetraethylammonium-1-pentyl sulfonate, tetraethylammonium-1-hexyl sulfonate, tetraethylammonium-1-heptyl sulfonate, tetraethylammonium-1-octyl sulfonate, tetraethylammonium-1-nonyl sulfonate, tetraethylammonium-1-decyl sulfonate, tetraethylammonium-1-undecyl sulfonate, tetraethylammonium-1-dodecyl sulfonate, tetraethylammonium-iso-butyl sulfonate, tetraethylammonium-iso-pentyl sulfonate, tetraethylammonium-iso-hexyl sulfonate, tetraethylammonium-iso-heptyl sulfonate, tetraethylammonium-iso-octyl sulfonate, tetraethylammonium-iso-nonyl sulfonate, tetraethylammonium-iso-decyl sulfonate, tetraethylammonium-iso-undecyl sulfonate, tetraethylammonium-iso-dodecyl sulfonate, tetraethylammonium-1-butyl sulfonate, tetraethylammonium-1-pentyl sulfonate, tetraethylammonium-1-hexyl sulfonate, tetraethylammonium-1-heptyl sulfonate, tetraethylammonium-1-octyl sulfonate, tetraethylammonium-1-nonyl sulfonate, tetraethylammonium-1-decyl sulfonate, tetraethylammonium-1-undecyl sulfonate, tetraethylammonium-1-dodecyl sulfonate, tetraethylammonium-iso-butyl sulfonate, tetraethylammonium-iso-pentyl sulfonate, tetraethylammonium-iso-hexyl sulfonate, tetraethylammonium-iso-heptyl sulfonate, tetraethylammonium-iso-octyl sulfonate, tetraethylammonium-iso-nonyl sulfonate, tetraethylammonium-iso-decyl sulfonate, tetraethylammonium-iso-undecyl sulfonate, tetraethylammonium-iso-dodecyl sulfonate, preferably from among tetraethylammonium-1-butyl sulfonate, tetraethylammonium-1-dodecyl sulfonate, tetraethylammonium-1-isobutyl sulfonate, tetraethylammonium-1-isododecyl sulfonate, tetraethylammonium-1-butyl sulfonate, tetraethylammonium-1-dodecyl sulfonate, tetraethylammonium-1-iso-butyl sulfonate, tetraethylammonium-1-isododecyl sulfonate, especially preferably from among tetraethylammonium-iso-butyl sulfonate, tetraethylammonium-iso-dodecyl sulfonate, tetraethylammonium-1-butyl sulfonate, and tetraethylammonium-1-dodecyl sulfonate.

In another variant, the present invention provides for an electrolyte for use in an electrochemical gas sensor corresponding to one of the above claims, wherein the electrolyte has a mixture of an at least strongly acidic, liquid medium, which has electrical conductivity, and of an additive, and wherein the additive contains at least one surfactant and wherein at least one surfactant is a cationic surfactant. It is, of course, also conceivable in this connection that the additive contains a mixture of an anionic surfactant, as was described above, and a cationic surfactant. It is especially favorable if at least one surfactant is an ammonium compound, preferably a quaternary ammonium compound, especially preferably a tetraalkylammonium compound. It is especially advantageous if the cationic surfactant is, as was described above, a surfactant corresponding to Formula III:

$$[((C_sH_{2s+1})(C_pH_{2p+1})(C_qH_{2q+1})(C_rH_{2r+1}))N^+]R2 \quad \text{(Formula III)},$$

in which s={0, 1, 2, 3, 4, 5, 6, 7, 8, 9, 10, 11, 12, 13, 14, 15, 16, 17, 18, 19, 20}, p={0, 1, 2, 3, 4, 5, 6, 7, 8, 9, 10, 11, 12, 13, 14, 15, 16, 17, 18, 19, 20}, q={0, 1, 2, 3, 4, 5, 6, 7, 8, 9, 10, 11, 12, 13, 14, 15, 16, 17, 18, 19, 20}, and r={0, 1, 2, 3, 4, 5, 6, 7, 8, 9, 10, 11, 12, 13, 14, 15, 16, 17, 18, 19, 20}, wherein R2 is selected from the group containing $HSO_4^-$, $H_2PO_4^-$, $CF_3$—$SO_3^-$, $C_2F_2SO_3^-$, and $CF_3$—$COO^-$. R2 is preferably selected from among $HSO_4^-$ and $H_2PO_4^-$ and is preferably $HSO_4^-$.

In any case, a cationic surfactant, which is contained in an additive of an electrolyte according to the present invention, may be an ammonium compound, which has two alkyl groups. The alkyl groups may be, independently from one another, linear carbon chains with a length of 1, 2, 3, 4, 5, 6, 7, 8, 9, 10, 11, 12, 13, 14, 15, 16, 17 or 18 carbon atoms, preferably with a length of 1, 2, 3, 4, 5, 6, 7, 8, 9, 10, 11 or 12 carbon atoms. It is also favorable, in particular, if the ammonium compound has at least two methyl groups.

As was described above, such a surfactant may be a compound corresponding to one of the Formulas III, Ma, IIIb, IIIc, IIId, IIId', IIIe or IIIe' and may be selected, for example, from the group containing ethyltrimethylammonium hydrogen sulfate, diethyldimethyl ammonium hydrogen sulfate, butylethyldimethyl ammonium hydrogen sulfate, pentylethyldimethyl ammonium hydrogen sulfate, hexylethyldimethyl ammonium hydrogen sulfate, heptylethyldimethyl ammonium hydrogen sulfate, octylethyldimethyl ammonium hydrogen sulfate, nonylethyldimethyl ammonium hydrogen sulfate, decylethyldimethyl ammonium hydrogen sulfate, undecylethyldimethyl ammonium hydrogen sulfate, dodecylethyldimethyl ammonium hydrogen sulfate, butyltrimethyl ammonium hydrogen sulfate, dibutyldimethyl ammonium hydrogen sulfate, pentylbutyldimethyl ammonium hydrogen sulfate, hexylbutyldimethyl ammonium hydrogen sulfate, heptylbutyldimethyl ammonium hydrogen sulfate, octylbutyldimethyl ammonium hydrogen sulfate, nonylbutyldimethyl ammonium hydrogen sulfate, decylbutyldimethyl ammonium hydrogen sulfate, undecylbutyldimethyl ammonium hydrogen sulfate, dodecylbutyldimethyl ammonium hydrogen sulfate, pentyltrimethyl ammonium hydrogen sulfate, dipentyldimethyl ammonium hydrogen sulfate, hexylpentyldimethyl ammonium hydrogen sulfate, heptylpentyldimethyl ammonium hydrogen sulfate, octylpentyldimethyl ammonium hydrogen sulfate, nonylpentyldimethyl ammonium hydrogen sulfate, decylpentyldimethyl ammonium hydrogen sulfate, undecylpentyldimethyl ammonium hydrogen sulfate, dodecylpentyldimethyl ammonium hydrogen sulfate, hexyltrimethyl ammonium hydrogen sulfate, dihexyldimethyl ammonium hydrogen sulfate, heptylhexyldimethyl ammonium hydrogen sulfate, octylhexyldimethyl ammonium hydrogen sulfate, nonylhexyldimethyl ammonium hydrogen sulfate, decylhexyldimethyl ammonium hydrogen sulfate, undecylhexyldimethyl ammonium hydrogen sulfate, dodecylhexyldimethyl ammonium hydrogen sulfate, heptyltrimethyl ammonium hydrogen sulfate, diheptyldimethyl ammonium hydrogen sulfate, octylheptyldimethyl ammonium hydrogen sulfate, nonylheptyldimethyl ammonium hydrogen sulfate, decylheptyldimethyl ammonium hydrogen sulfate, undecylheptyldimethyl ammonium hydrogen sulfate, dodecylheptyldimethyl ammonium hydrogen sulfate, octyltrimethyl ammonium hydrogen sulfate, dioctyldimethyl ammonium hydrogen sulfate, nonyloctyldimethyl ammonium hydrogen sulfate, decyloctyldimethyl ammonium hydrogen sulfate, undecyloctyldimethyl ammonium hydrogen sulfate, dodecyloctyldimethyl ammonium hydrogen sulfate, nonyltrimethyl ammonium hydrogen sulfate, dinonyldimethyl ammonium hydrogen sulfate, decylnonyldimethyl ammonium hydrogen sulfate, undecylnonyldimethyl ammonium hydrogen sulfate, dodecylnonyldimethyl ammonium hydrogen sulfate, decyltrimethyl ammonium hydrogen sulfate, didecyldimethyl ammonium hydrogen sulfate, undecyldecyldimethyl ammonium hydrogen sulfate, dodecyldecyldimethyl ammonium hydrogen sulfate, undecyltrimethyl ammonium hydrogen sulfate, diundecyldimethyl ammonium hydrogen sulfate, dodecylundecyldimethyl ammonium hydrogen sulfate, dodecyltrimethyl ammonium hydrogen sulfate, didodecyldimethyl ammonium hydrogen sulfate, ethyltrimethylammonium dihydrogen phosphate, diethyldimethylammonium dihydrogen phosphate, butylethyldimethylammonium dihydrogen phosphate, pentylethyldimethylammonium dihydrogen phosphate, hexylethyldimethylammonium dihydrogen phosphate, heptylethyldimethylammonium dihydrogen phosphate, octylethyldimethylammonium dihydrogen phosphate, nonylethyldimethylammonium dihydrogen phosphate, decylethyldimethylammonium dihydrogen phosphate, undecylethyldimethylammonium dihydrogen phosphate, dodecylethyldimethylammonium dihydrogen phosphate, butyltrimethylammonium dihydrogen phosphate, dibutyldimethylammonium dihydrogen phosphate, pentylbutyldimethylammonium dihydrogen phosphate, hexylbutyldimethylammonium dihydrogen phosphate, heptylbutyldimethylammonium dihydrogen phosphate, octylbutyldimethylammonium dihydrogen phosphate, nonylbutyldimethylammonium dihydrogen phosphate, decylbutyldimethylammonium dihydrogen phosphate, undecylbutyldimethylammonium dihydrogen phosphate, dodecylbutyldimethylammonium dihydrogen phosphate, pentyltrimethylammonium dihydrogen phosphate, dipentyldimethylammonium dihydrogen phosphate, hexylpentyldimethylammonium dihydrogen phosphate, heptylpentyldimethylammonium dihydrogen phosphate, octylpentyldimethylammonium dihydrogen phosphate, nonylpentyldimethylammonium dihydrogen phosphate, decylpentyldimethylammonium dihydrogen phosphate, undecylpentyldimethylammonium dihydrogen phosphate, dodecylpentyldimethylammonium dihydrogen phosphate, hexyltrimethylammonium dihydrogen phosphate, dihexyldimethylammonium dihydrogen phosphate, heptylhexyldimethylammonium dihydrogen phosphate, octylhexyldimethylammonium dihydrogen phosphate, nonylhexyldimethylammonium dihydrogen phosphate, decylhexyldimethylammonium dihydrogen phosphate, undecylhexyldimethylammonium dihydrogen phosphate, dodecylhexyldimethylammonium dihydrogen phosphate, heptyltrimethylammonium dihydrogen phosphate, diheptyldimethylammonium dihydrogen phosphate, octylheptyldimethylammonium dihydrogen phosphate, nonylheptyldimethylammonium dihydrogen phosphate, decylheptyldimethylammonium dihydrogen phosphate, undecylheptyldimethylammonium dihydrogen phosphate, dodecylheptyldimethylammonium dihydrogen phosphate, octyltrimethylammonium dihydrogen phosphate, dioctyldimethylammonium dihydrogen phosphate, nonyloctyldimethylammonium dihydrogen phosphate, decyloctyldimethylammonium dihydrogen phosphate, undecyloctyldimethylammonium dihydrogen phosphate, dodecyloctyldimethylammonium dihydrogen phosphate, nonyltrimethylammonium dihydrogen phosphate, dinonyldimethylammonium dihydrogen phosphate, decylnonyldimethylammonium dihydrogen phosphate, undecylnonyldimethylammonium dihydrogen phosphate, dodecylnonyldimethylammonium dihydrogen phosphate, decyltrimethylammonium dihydrogen phosphate, didecyldimethylammonium dihydrogen phosphate, undecyldecyldimethylammonium dihydrogen phosphate, dodecyldecyldimethylammonium dihydrogen phosphate, undecyltrimethylammonium dihydrogen phosphate, diundecyldimethylammonium dihydrogen phosphate, dodecylundecyldimethylammonium dihydrogen phosphate, dodecyltrimethylammonium dihydrogen phosphate, didodecyldimethylammonium dihydrogen phosphate.

In any case, it is advantageous if the sulfonate of the additive and/or the additive is contained in the electrolyte at a concentration of at least and including 0.01 mmol/L and at most and including 2 mol/L, preferably at a concentration of at least and including 0.1 mmol/L and at most and including 1 mol/L, especially preferably at a concentration of at least and including 2 mmol/L and at most and including 500 mmol/L, especially preferably at a concentration of at least and including 15 mmol/L and at most and including 50 mmol/L, and especially preferably at a concentration of 20 mmol/L±5 mmol/L. Concentration ranges as already described above are, of course, also conceivable.

Further features, details and advantages of the present invention appear from the text of the claims as well as from the following description of exemplary embodiments on the basis of the drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
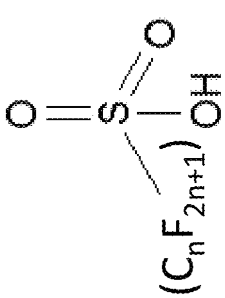
FIG. 1*a* is a view showing one of different examples of anionic surfactants according to the present invention.

Referring to the drawings, FIGS. 1*a* through 1*h*, 2*a* through 2*f*, 3*a* through 3*e*, 4*a* through 4*h*, 5*a* through 5*h* and 6*a* through 6*l* show different examples of surfactants according to the present invention, which may be contained in the additive. The additive is contained in an electrolyte 30. The electrolyte 30 is contained in one embodiment variant, as can be seen in FIGS. 8, 9*a* and 9*b*, in a gas sensor 10 according to the present invention.

It is seen in FIGS. 1*a* through 1*h*, 2*a* through 2*f*, 3*a* through 3*e*, 4*a* through 4*h* and 6*a* through 6*l* that the surfactant is an anionic surfactant. Corresponding to the exemplary embodiments shown in FIGS. 1*a*, 1*c*, 1*e*, 1*g*, 2*a*, 2*b* and 3*a*, the surfactants are sulfonic acids. The surfactants corresponding to the exemplary embodiments shown in FIGS. 1*b*, 1*d*, 1*f*, 1*h*, 2*c* through 2*f*, 3*b* through 3*e*, 4*a* through 4*h* as well as 6*a* through 6*d* are sulfonates, i.e., salts of sulfonic acid. The surfactants corresponding to the exemplary embodiments shown in FIGS. 6*e* through 6*l* are sulfates, i.e., salts of sulfuric acid esters.

It is further seen that the surfactants corresponding to the embodiments shown in FIGS. 1*a* through 1*d*, 2*a* through 2*f* and 3*a* through 3*e* are all halogenated surfactants, i.e., surfactants that have at least one fluorine atom on a carbon chain. The surfactants shown in FIGS. 1*a*, 1*b* and 2*a* through 2*f* are perfluorinated surfactants, i.e., surfactants with an alkyl chain, in which all hydrogen atoms are replaced by fluorine atoms. The surfactants shown in FIGS. 1*c*, 1*d* and 3*a* through 3*e* are polyfluorinated surfactants, i.e., surfactants with an alkyl chain in which some but not all hydrogen atoms are replaced by fluorine atoms. The surfactants in the embodiments shown in FIGS. 1*e* through 1*h* and 4*a* through 4*h* as well as 6*a* through 6*l* are halogen-free.

It is seen in FIGS. 1*a* through 1*h* that the length of the alkyl chain of the surfactants according to the present invention is variable. Here, n is always selected from among 4, 5, 6, 7, 8, 9, 10, 11 or 12.

In the exemplary embodiment according to FIG. 1*a*, the surfactant according to the present invention is a perfluorinated alkylsulfonic acid. Here, n is selected from among 4, 5, 6, 7, 8, 9, 10, 11 or 12. It is thus seen that the surfactant according to FIG. 1*a* is selected from the group comprising perfluorobutylsulfonic acid, perfluoropentylsulfonic acid, perfluorohexylsulfonic acid, perfluorooctylsulfonic acid, perfluorononylsulfonic acid, perfluorodecylsulfonic acid, perfluoroundecylsulfonic acid, and perfluorododecylsulfonic acid.

Figure 1B:
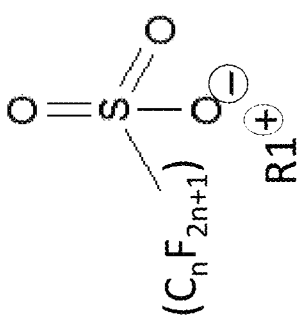
FIG. 1*b* is a view showing another of different examples of anionic surfactants according to the present invention.

In the exemplary embodiment according to FIG. 1*b*, the surfactant according to the present invention is a perfluorinated alkyl sulfonate. Here, n is selected from the group containing heterocyclic cations, quaternary ammonium ions, alkali or alkaline earth ions. In one embodiment variant, the counterion R1 is a heterocyclic cation, namely, a pyridinium, ion. In another embodiment variant, the counterion R1 is an ammonium compound, namely, an ammonium ion. In another embodiment variant, the counterion R1 is a quaternary ammonium ion, namely, tetramethyl ammonium. In yet another embodiment variant, the counterion R1 is an alkali ion, namely, $Na^+$, $K^+$ or $Li^+$. It is thus seen that the surfactant according to FIG. 1*b* is selected from the group containing sodium perfluorobutyl sulfonate, sodium perfluoropentyl sulfonate, sodium perfluorohexyl sulfonate, sodium perfluorooctyl sulfonate, sodium perfluorononyl sulfonate, sodium perfluorodecyl sulfonate, sodium perfluoroundecyl sulfonate, sodium perfluorododecyl sulfonate,' potassium perfluorobutyl sulfonate, potassium perfluoropentyl sulfonate, potassium perfluorohexyl sulfonate, potassium perfluorooctyl sulfonate, potassium perfluorononyl sulfonate, potassium perfluorodecyl sulfonate, potassium perfluoroundecyl sulfonate, potassium perfluorododecyl sulfonate, tetraethylammonium perfluorobutyl sulfonate, tetraethylammonium perfluoropentyl sulfonate, tetraethylammonium perfluorohexyl sulfonate, tetraethylammonium perfluorooctyl sulfonate, tetraethylammonium perfluorononyl sulfonate, tetraethylammonium perfluorodecyl sulfonate, tetraethylammonium perfluoroundecyl sulfonate, tetraethylammonium perfluorododecyl sulfonate, tetraethylammonium perfluorobutyl sulfonate, tetraethylammonium perfluoropentyl sulfonate, tetraethylammonium perfluorohexyl sulfonate, tetraethylammonium perfluorooctyl sulfonate, tetraethylammonium perfluorononyl sulfonate, tetraethylammonium perfluorodecyl sulfonate, tetraethylammonium perfluoroundecyl sulfonate, tetraethylammonium perfluorododecyl sulfonate, ammonium perfluorobutyl sulfonate, ammonium perfluoropentyl sulfonate, ammonium perfluorohexyl sulfonate, ammonium perfluorooctyl sulfonate, ammonium perfluorononyl sulfonate, ammonium perfluorodecyl sulfonate, ammonium perfluoundecyl sulfonate, ammonium perfluorododecyl sulfonate, ammonium perfluorobutyl sulfonate, ammonium perfluoropentyl sulfonate, ammonium perfluorohexyl sulfonate, ammonium perfluorooctyl sulfonate, ammonium perfluorononyl sulfonate, ammonium perfluorodecyl sulfonate, ammonium perfluoroundecyl sulfonate, ammonium perfluorododecyl sulfonate, dimethylammonium perfluorobutyl sulfonate, dimethylammonium perfluoropentyl sulfonate, dimethylammonium perfluorohexyl sulfonate, dimethylammonium perfluorooctyl sulfonate, dimethylammonium perfluorononyl sulfonate, dimethylammonium perfluorodecyl sulfonate, dimethylammonium perfluoundecyl sulfonate, dimethylammonium perfluorododecyl sulfonate, dimethylammonium perfluorobutyl sulfonate, dimethylammonium perfluoropentyl sulfonate, dimethylammonium perfluorohexyl sulfonate, dimethylammonium perfluorooctyl sulfonate, dimethylammonium perfluorononyl sulfonate, dimethylammonium perfluorodecyl sulfonate, dimethylammonium perfluoundecyl sulfonate, dimethylammonium perfluorododecyl sulfonate, pyridinium perfluorobutyl sulfonate, pyridinium perfluoropentyl sulfonate, pyridinium perfluorohexyl sulfonate, pyridinium perfluorooctyl sulfonate, pyridinium perfluorononyl sulfonate, pyridinium perfluorodecyl sulfonate, pyridinium perfluoundecyl sulfonate, and pyridinium perfluorododecyl sulfonate.

Figure 2B:
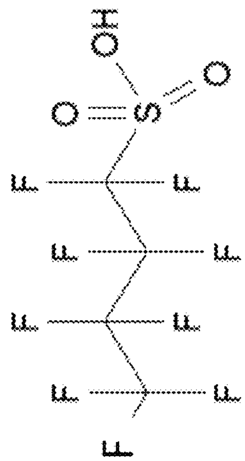
FIG. 2*b* is a view showing another of different examples of perfluorinated anionic surfactants according to the present invention.
Figure 2D:
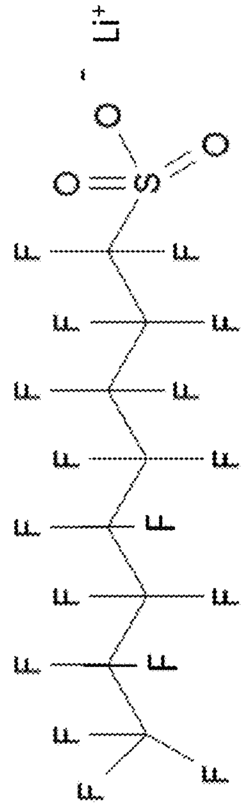
FIG. 2*d* is a view showing another of different examples of perfluorinated anionic surfactants according to the present invention.
Figure 2F:
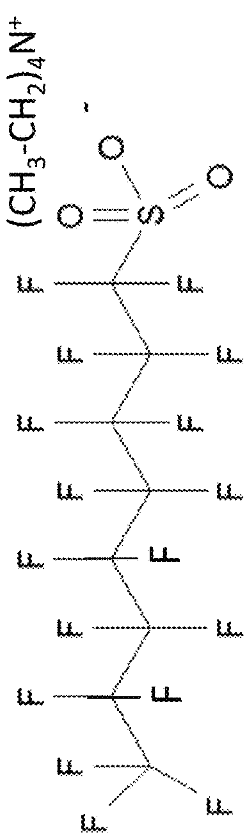
FIG. 2*f* is a view showing another of different examples of perfluorinated anionic surfactants according to the present invention.
Figure 2A:
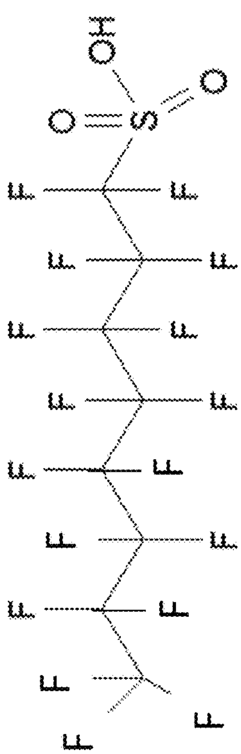
FIG. 2*a* is a view showing one of different examples of perfluorinated anionic surfactants according to the present invention.
Figure 2C:
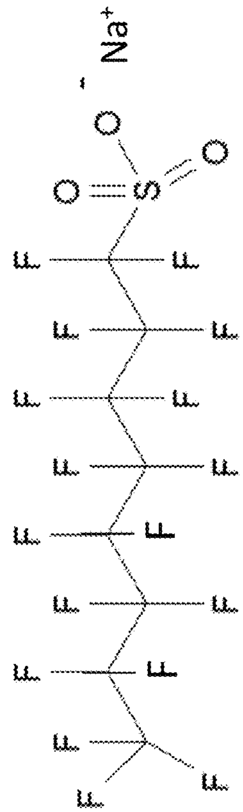
FIG. 2*c* is a view showing another of different examples of perfluorinated anionic surfactants according to the present invention.
Figure 2E:
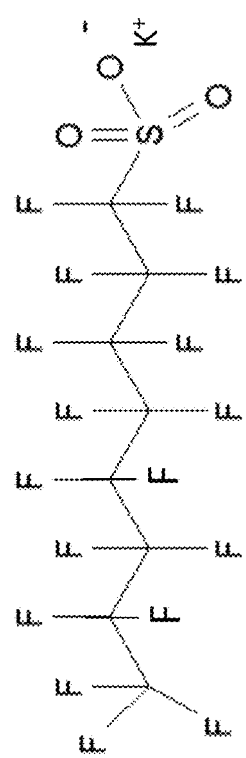
FIG. 2*e* is a view showing another of different examples of perfluorinated anionic surfactants according to the present invention.

FIGS. 2*a* through 2*f* show especially preferred embodiment variants of the perfluorinated alkylsulfonic acids according to FIG. 1*a* and of the perfluorinated alkyl sulfonates according to FIG. 1*b*. FIG. 2*a* shows perfluorooctylsulfonic acid and FIG. 2*b* shows perfluorobutylsulfonic acid as preferred variants of the exemplary embodiments shown in FIG. 1*a*. FIGS. 2*c*, 2*d*, 2*e* and 2*f* show as preferred variants of the exemplary embodiments from FIG. 1*b* sodium perfluorooctyl sulfonate (FIG. 2*c*), lithium perfluorooctyl sulfonate (FIG. 2*d*), potassium perfluorooctyl sulfonate (FIG. 2*e*) and tetraethylammonium perfluorooctyl sulfonate (FIG. 20.

Figure 1C:
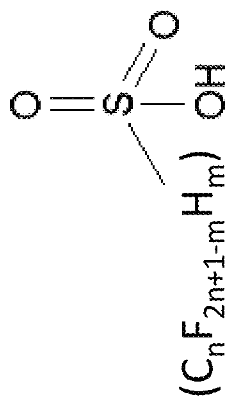
FIG. 1*c* is a view showing another of different examples of anionic surfactants according to the present invention.

The surfactant according to the present invention is a mono- or polyfluorinated alkylsulfonic acid in the exemplary embodiment according to FIG. 1*c*. Here, n is selected from among 4, 5, 6, 7, 8, 9, 10, 11 or 12. It is thus seen that the surfactant is selected from the group containing monofluorobutylsulfonic acid, difluorobutylsulfonic acid, trifluorobutylsulfonic acid, tetrafluorobutylsulfonic acid, pentafluorobutylsulfonic acid, hexafluorobutylsulfonic acid, heptafluorobutylsulfonic acid, octafluorobutylsulfonic acid, nonafluorobutylsulfonic acid, monofluoropoentylsulfonic acid, difluoropentylsulfonic acid, trifluoropentylsulfonic acid, tetrafluoropentylsulfonic acid, pentafluoropentylsulfonic acid, hexafluoropentylsulfonic acid, heptafluoropentylsulfonic acid, octafluoropentylsulfonic acid, nonafluoropentylsulfonic acid, decafluoropentylsulfonic acid, undecafluoropentylsulfonic acid, monofluorohexylsulfonic acid, difluorohexylsulfonic acid, trifluorohexylsulfonic acid, tetrafluorohexylsulfonic acid, pentafluorohexylsulfonic acid, hexafluorohexylsulfonic acid, heptafluorohexylsulfonic acid, octafluorohexylsulfonic acid, nonafluorohexylsulfonic acid, decafluorohexylsulfonic acid, undecafluorohexylsulfonic acid, dodecafluorohexylsulfonic acid, tridecafluorohexylsulfonic acid, monofluoroheptylsulfonic acid, difluoroheptylsulfonic acid, trifluoroheptypsulfonic acid, tetrafluoroheptylsulfonic acid, pentafluoroheptylsulfonic acid, hexafluoroheptylsulfonic acid, heptafluoroheptylsulfonic acid, octafluoroheptylsulfonic acid, nonafluoroheptylsulfonic acid, decafluoroheptylsulfonic acid, undecafluoroheptylsulfonic acid, dodecafluoroheptylsulfonic acid, tricedafluoroheptylsulfonic acid, tetradecafluoroheptylsulfonic acid, pentadecafluoroheptylsulfonic acid, monofluorooctylsulfonic acid, difluorooctylsulfonic acid, trifluorooctgylsulfonic acid, tetrafluorooctylsulfonic acid, pentafluorooctylsulfonic acid, hexafluorooctylsulfonic acid, heptafluorooctylsulfonic acid, octafluorooctylsulfonic acid, nonafluorooctylsulfonic acid, decafluorooctylsulfonic acid, undecafluorooctylsulfonic acid, dodecafluorooctylsulfonic acid, tridecafluorooctylsulfonic acid, tetradecafluorooctylsulfonic acid, pentadecafluorooctylsulfonic acid, hexadecafluorooctylsulfonic acid, heptadecafluorooctylsulfonic acid, monofluorononylsulfonic acid, difluorononylsulfonic acid, trifluorononylsulfonic acid, tetrafluorononylsulfonic acid, pentafluorononylsulfonic acid, hexafluorononylsulfonic acid, heptafluorononylsulfonic acid, octafluorononylsulfonic acid, nonafluorononylsulfonic acid, decafluorononylsulfonic acid, undecafluorononylsulfonic acid, dodecafluorononylsulfonic acid, tridecafluorononylsulfonic acid, tetradecafluorononylsulfonic acid, pentadecafluorononylsulfonic acid, hexadecafluorononylsulfonic acid, heptadecafluorononylsulfonic acid, octadecafluorononylsulfonic acid, nonadecafluorononylsulfonic acid, monofluorodecylsulfonic acid, difluorodecylsulfonic acid, trifluorodecylsulfonic acid, tetrafluorodecylsulfonic acid, pentafluorodecylsulfonic acid, hexafluorodecylsulfonic acid, heptafluorodecylsulfonic acid, octafluorodecylsulfonic acid, nonafluorodecylsulfonic acid, decafluorodecyllsulfonic acid, undecafluor5odecylsulfonic acid, dodecafluorodecylsulfonic acid, tridecafluorodecylsulfonic acid, tetradecafluorodecylsulfonic acid, pentadecafluooorodecylsulfonic acid, hexadecafluorodecylsulfonic acid, heptadecafluorodecylsulfonic acid, octadecaflorodecylsulfonic acid, nonadecafluorodecylsulfonic acid, eicosafluorodecylsulfonic acid, hjeneicosafluorodecylsulfonic acid, monofluoroundecylsulfonic acid, difluoroundecylsulfonic acid, trifluoroundecylsulfonic acid, tetrafluoroundecylsulfonic acid, pentafluoroundecylsulfonic acid, hexafluoroundecylsulfonic acid, heptafluoroundecylsulfonic acid, octafluoroundecylsulfonic acid, nonafluoroundecylsulfonic acid, decafluoroundecylsulfonic acid, undecafluoroundecylsulfonic acid, dodecafluoroundecylsulfonic acid, tridecafluoroundecylsulfonic acid, tetradecafluoroundecylsulfonic acid, pentadecafluoroundecylsulfonic acid, hexsadecafluoroundecylsulfonic acid, heptadecafluoroundecylsulfonic acid, octadecafluoroundecylsulfonic acid, nonadecafluoroundecylsulfonic acid, eicosafluoroundecylsulfonic acid, heneicosafluoroundecylsulfonic acid, docosafluoroundecylsulfonic acid, tricosafluoroundecylsulfonic acid, monofluorododecylsulfonic acid, difluorododecylsulfonic acid, trifluorododecylsulfonic acid, tetrafluorododecylsulfonic acid, pentafluorododecylsulfonic acid, hexafluorododecylsulfonic acid, heptafluorododecylsulfonic acid, octafluorododecylsulfonic acid, nonafluorododecylsulfonic acid, decafluorododecylsulfonic acid, undecafluorododecylsulfonic acid, dodecafluorododecylsulfonic acid, tridecafluorododecylsulfonic acid, tetradecafluorododecylsulfonic acid, pentadecafluorododecylsulfonic acid, hexadecafluorododecylsulfonic acid, heptadecafluorododecylsulfonic acid, octadecafluorododecylsulfonic acid, nonadecafluorododecylsulfonic acid, eicosafluorododecylsulfonic acid, heneicosafluorododecylsulfonic acid, docosafluorododecylsulfonic acid, tricosafluorododecylsulfonic acid, tetracosafluorododecylsulfonic acid, and pentacosafluorododecylsulfonic acid.

Figure 1D:
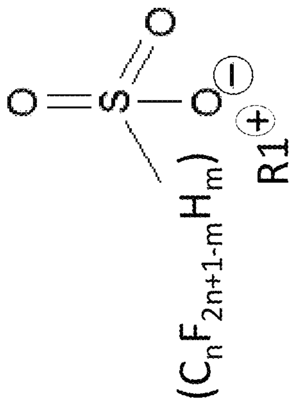
FIG. 1*d* is a view showing another of different examples of anionic surfactants according to the present invention.

The surfactant according to the present invention is a mono- or polyfluorinated alkyl sulfonate in the exemplary embodiment according to FIG. 1*d*. Here, n is selected from among 4, 5, 6, 7, 8, 9, 10, 11 or 12. R1 is the positively charged counterion and is selected from the group containing heterocyclic cations, quaternary ammonium ions, alkali or alkaline earth ions. In one embodiment variant, the counterion R1 is a heterocyclic cation, namely, a pyridinium ion. In another embodiment variant, the counterion R1 is a quaternary ammonium ion, namely, tetraethylammonium. It yet another embodiment variant, the counterion R1 is an alkali ion, namely, $Na^+$, $K^+$ or $Li^+$. It is thus seen that the surfactant according to FIG. 1*d* is selected from the group containing sodium monofluorobutyl sulfonate, sodium difluorobutyl sulfonate, sodium trifluorobutyl sulfonate, sodium tetrafluorobutyl sulfonate, sodium pentafluorobutyl sulfonate, sodium hexafluorobutyl sulfonate, sodium heptafluorobutyl sulfonate, sodium octafluorobutyl sulfonate, sodium nonafluorobutyl sulfonate, sodium monofluoropentyl sulfonate, sodium difluoropentyl sulfonate, sodium trifluoropentyl sulfonate, sodium tetrafluoropentyl sulfonate, sodium pentafluoropentyl sulfonate, sodium hexafluoropentyl sulfonate, sodium heptafluoropentyl sulfonate, sodium octafluoropentyl sulfonate, sodium nonafluoropentyl sulfonate, sodium decafluoropentyl sulfonate, sodium undecafluoropentyl sulfonate, sodium monofluorohexyl sulfonate, sodium difluorohexyl sulfonate, sodium trifluorohexyl sulfonate, sodium tetrafluorohexyl sulfonate, sodium pentafluorohexyl sulfonate, sodium hexafluorohexyl sulfonate, sodium heptafluorohexyl sulfonate, sodium octafluorohexyl sulfonate, sodium nonafluorohexyl sulfonate, sodium decafluorohexyl sulfonate, sodium undecafluorohexyl sulfonate, sodium dodecafluorohexyl sulfonate, sodium tridecafluorohexyl sulfonate, sodium monofluoroheptyl sulfonate, sodium difluoroheptyl sulfonate, sodium trifluoroheptyl sulfonate, sodium tetrafluoroheptyl sulfonate, sodium pentafluoroheptyl sulfonate, sodium hexafluoroheptyl sulfonate, sodium heptafluoroheptyl sulfonate, sodium octafluoroheptyl sulfonate, sodium nonafluoroheptyl sulfonate, sodium decafluoroheptyl sulfonate, sodium undecafluoroheptyl sulfonate, sodium dodecafluoroheptyl sulfonate, sodium tridecafluoroheptyl sulfonate, sodium tetradecafluoroheptyl sulfonate, sodium pentadecafluoroheptyl sulfonate, sodium monofluorooctyl sulfonate, sodium difluorooctyl sulfonate, sodium trifluorooctyl sulfonate, sodium tetrafluorooctyl sulfonate, sodium pentafluorooctyl sulfonate, sodium hexafluorooctyl sulfonate, sodium heptafluorooctyl sulfonate, sodium octafluorooctyl sulfonate, sodium nonafluorooctyl sulfonate, sodium decafluorooctyl sulfonate, sodium undecafluorooctyl sulfonate, sodium dodecafluorooctyl sulfonate, sodium tridecafluorooctyl sulfonate, sodium tetradecafluorooctyl sulfonate, sodium pentadecafluorooctyl sulfonate, sodium hexadecafluorooctyl sulfonate, sodium heptadecafluorooctyl sulfonate, sodium monofluorononyl sulfonate, sodium difluorononyl sulfonate, sodium trifluorononyl sulfonate, sodium tetrafluorononyl sulfonate, sodium pentafluorononyl sulfonate, sodium hexafluorononyl sulfonate, sodium heptafluorononyl sulfonate, sodium octafluorononyl sulfonate, sodium nonafluorononyl sulfonate, sodium decafluorononyl sulfonate, sodium undecafluorononyl sulfonate, sodium dodecafluorononyl sulfonate, sodium tridecafluorononyl sulfonate, sodium tetradecafluorononyl sulfonate, sodium pentadecafluorononyl sulfonate, sodium hexadecafluorononyl sulfonate, sodium heptadecafluorononyl sulfonate, sodium octadecafluorononyl sulfonate, sodium nonadecafluorononyl sulfonate, sodium monofluorodecyl sulfonate, sodium difluorodecyl sulfonate, sodium trifluorodecyl sulfonate, sodium tetrafluorodecyl sulfonate, sodium pentafluorodecyl sulfonate, sodium hexafluorodecyl sulfonate, sodium heptafluorodecyl sulfonate, sodium octafluorodecyl sulfonate, sodium nonafluorodecyl sulfonate, sodium decafluorodecyl sulfonate, sodium undecafluorodecyl sulfonate, sodium dodecafluorodecyl sulfonate, sodium tridecafluorodecyl sulfonate, sodium tetradecafluorodecyl sulfonate, sodium pentadecafluorodecyl sulfonate, sodium hexadecafluorodecyl sulfonate, sodium heptadecafluorodecyl sulfonate, sodium octadecafluorodecyl sulfonate, sodium nonadecafluorodecyl sulfonate, sodium eicosafluorodecyl sulfonate, sodium heneicosafluorodecyl sulfonate, sodium monofluoroundecyl sulfonate, sodium difluoroundecyl sulfonate, sodium trifluoroundecyl sulfonate, sodium tetrafluoroundecyl sulfonate, sodium pentafluoroundecyl sulfonate, sodium hexafluoroundecyl sulfonate, sodium heptafluoroundecyl sulfonate, sodium octafluoroundecyl sulfonate, sodium nonafluoroundecyl sulfonate, sodium decafluoroundecyl sulfonate, sodium undecafluoroundecyl sulfonate, sodium dodecafluoroundecyl sulfonate, sodium tridecafluoroundecyl sulfonate, sodium tetradecafluoroundecyl sulfonate, sodium pentadecafluoroundecyl sulfonate, sodium hexadecafluoroundecyl sulfonate, sodium heptadecafluoroundecyl sulfonate, sodium octadecafluoroundecyl sulfonate, sodium nonadecafluoroundecyl sulfonate, sodium eicosafluoroundecyl sulfonate, sodium heneicosafluoroundecyl sulfonate, sodium docosafluoroundecyl sulfonate, sodium tricosafluoroundecyl sulfonate, sodium monofluorododecyl sulfonate, sodium difluorododecyl sulfonate, sodium trifluorododecyl sulfonate, sodium tetrafluorododecyl sulfonate, sodium pentafluorododecyl sulfonate, sodium hexafluorododecyl sulfonate, sodium heptafluorododecyl sulfonate, sodium octafluorododecyl sulfonate, sodium nonafluorododecyl sulfonate, sodium decafluorododecyl sulfonate, sodium undecafluorododecyl sulfonate, sodium dodecafluorododecyl sulfonate, sodium tridecafluorododecyl sulfonate, sodium tetradecafluorododecyl sulfonate, sodium pentadecafluorododecyl sulfonate, sodium hexadecafluorododecyl sulfonate, sodium heptadecafluorododecyl sulfonate, sodium octadecafluorododecyl sulfonate, sodium nonadecafluorododecyl sulfonate, sodium eicosafluorododecyl sulfonate, sodium heneicosafluorododecyl sulfonate, sodium docosafluorododecyl sulfonate, sodium tricosafluorododecyl sulfonate, sodium tetracosafluorododecyl sulfonate, sodium pentacosafluorododecyl sulfonate, potassium monofluorobutyl sulfonate, potassium difluorobutyl sulfonate, potassium trifluorobutyl sulfonate, potassium tetrafluorobutyl sulfonate, potassium pentafluorobutyl sulfonate, potassium hexafluorobutyl sulfonate, potassium heptafluorobutyl sulfonate, potassium octafluorobutyl sulfonate, potassium nonafluorobutyl sulfonate, potassium monofluoropentyl sulfonate, potassium difluoropentyl sulfonate, potassium trifluoropentyl sulfonate, potassium tetrafluoropentyl sulfonate, potassium pentafluoropentyl sulfonate, potassium hexafluoropentyl sulfonate, potassium heptafluoropentyl sulfonate, potassium octafluoropentyl sulfonate, potassium nonafluoropentyl sulfonate, potassium decafluoropentyl sulfonate, potassium undecafluoropentyl sulfonate, potassium monofluorohexyl sulfonate, potassium difluorohexyl sulfonate, potassium trifluorohexyl sulfonate, potassium tetrafluorohexyl sulfonate, potassium pentafluorohexyl sulfonate, potassium hexafluorohexyl sulfonate, potassium heptafluorohexyl sulfonate, potassium octafluorohexyl sulfonate, potassium nonafluorohexyl sulfonate, potassium decafluorohexyl sulfonate, potassium undecafluorohexyl sulfonate, potassium dodecafluorohexyl sulfonate, potassium tridecafluorohexyl sulfonate, potassium monofluoroheptyl sulfonate, potassium difluoroheptyl sulfonate, potassium trifluoroheptyl sulfonate, potassium tetrafluoroheptyl sulfonate, potassium pentafluoroheptyl sulfonate, potassium hexafluoroheptyl sulfonate, potassium heptafluoroheptyl sulfonate, potassium octafluoroheptyl sulfonate, potassium nonafluoroheptyl sulfonate, potassium decafluoroheptyl sulfonate, potassium undecafluoroheptyl sulfonate, potassium dodecafluoroheptyl sulfonate, potassium tridecafluoroheptyl sulfonate, potassium tetradecafluoroheptyl sulfonate, potassium pentadecafluoroheptyl sulfonate, potassium monofluorooctyl sulfonate, potassium difluorooctyl sulfonate, potassium trifluorooctyl sulfonate, potassium tetrafluorooctyl sulfonate, potassium pentafluorooctyl sulfonate, potassium hexafluorooctyl sulfonate, potassium heptafluorooctyl sulfonate, potassium octafluorooctyl sulfonate, potassium nonafluorooctyl sulfonate, potassium decafluorooctyl sulfonate, potassium undecafluorooctyl sulfonate, potassium dodecafluorooctyl sulfonate, potassium tridecafluorooctyl sulfonate, potassium tetradecafluorooctyl sulfonate, potassium pentadecafluorooctyl sulfonate, potassium hexadecafluorooctyl sulfonate, potassium heptadecafluorooctyl sulfonate, potassium monofluorononyl sulfonate, potassium difluorononyl sulfonate, potassium trifluorononyl sulfonate, potassium tetrafluorononyl sulfonate, potassium pentafluorononyl sulfonate, potassium hexafluorononyl sulfonate, potassium heptafluorononyl sulfonate, potassium octafluorononyl sulfonate, potassium nonafluorononyl sulfonate, potassium decafluorononyl sulfonate, potassium undecafluorononyl sulfonate, potassium dodecafluorononyl sulfonate, potassium tridecafluorononyl sulfonate, potassium tetradecafluorononyl sulfonate, potassium pentadecafluorononyl sulfonate, potassium hexadecafluorononyl sulfonate, potassium heptadecafluorononyl sulfonate, potassium octadecafluorononyl sulfonate, potassium nonadecafluorononyl sulfonate, potassium monofluorodecyl sulfonate, potassium difluorodecyl sulfonate, potassium trifluorodecyl sulfonate, potassium tetrafluorodecyl sulfonate, potassium pentafluorodecyl sulfonate, potassium hexafluorodecyl sulfonate, potassium heptafluorodecyl sulfonate, potassium octafluorodecyl sulfonate, potassium nonafluorodecyl sulfonate, potassium decafluorodecyl sulfonate, potassium undecafluorodecyl sulfonate, potassium dodecafluorodecyl sulfonate, potassium tridecafluorodecyl sulfonate, potassium tetradecafluorodecyl sulfonate, potassium pentadecafluorodecyl sulfonate, potassium hexadecafluorodecyl sulfonate, potassium heptadecafluorodecyl sulfonate, potassium octadecafluorodecyl sulfonate, potassium nonadecafluorodecyl sulfonate, potassium eicosafluorodecyl sulfonate, potassium heneicosafluorodecyl sulfonate, potassium monofluoroundecyl sulfonate, potassium difluoroundecyl sulfonate, potassium trifluoroundecyl sulfonate, potassium tetrafluoroundecyl sulfonate, potassium pentafluoroundecyl sulfonate, potassium hexafluoroundecyl sulfonate, potassium heptafluoroundecyl sulfonate, potassium octafluoroundecyl sulfonate, potassium nonafluoroundecyl sulfonate, potassium decafluoroundecyl sulfonate, potassium undecafluoroundecyl sulfonate, potassium dodecafluoroundecyl sulfonate, potassium tridecafluoroundecyl sulfonate, potassium tetradecafluoroundecyl sulfonate, potassium pentadecafluoroundecyl sulfonate, potassium hexadecafluoroundecyl sulfonate, potassium heptadecafluoroundecyl sulfonate, potassium octadecafluoroundecyl sulfonate, potassium nonadecafluoroundecyl sulfonate, potassium eicosafluoroundecyl sulfonate, potassium heneicosafluoroundecyl sulfonate, potassium docosafluoroundecyl sulfonate, potassium tricosafluoroundecyl sulfonate, potassium monofluorododecyl sulfonate, potassium difluorododecyl sulfonate, potassium trifluorododecyl sulfonate, potassium tetrafluorododecyl sulfonate, potassium pentafluorododecyl sulfonate, potassium hexafluorododecyl sulfonate, potassium heptafluorododecyl sulfonate, potassium octafluorododecyl sulfonate, potassium nonafluorododecyl sulfonate, potassium decafluorododecyl sulfonate, potassium undecafluorododecyl sulfonate, potassium dodecafluorododecyl sulfonate, potassium tridecafluorododecyl sulfonate, potassium tetradecafluorododecyl sulfonate, potassium pentadecafluorododecyl sulfonate, potassium hexadecafluorododecyl sulfonate, potassium heptadecafluorododecyl sulfonate, potassium octadecafluorododecyl sulfonate, potassium nonadecafluorododecyl sulfonate, potassium eicosafluorododecyl sulfonate, potassium heneicosafluorododecyl sulfonate, potassium docosafluorododecyl sulfonate, potassium tricosafluorododecyl sulfonate, potassium tetracosafluorododecyl sulfonate, potassium pentacosafluorododecyl sulfonate, tetraethylammonium monofluorobutyl sulfonate, tetraethylammonium difluorobutyl sulfonate, tetraethylammonium trifluorobutyl sulfonate, tetraethylammonium tetrafluorobutyl sulfonate, tetraethylammonium pentafluorobutyl sulfonate, tetraethylammonium hexafluorobutyl sulfonate, tetraethylammonium heptafluorobutyl sulfonate, tetraethylammonium octafluorobutyl sulfonate, tetraethylammonium nonafluorobutyl sulfonate, tetraethylammonium monofluoropentyl sulfonate, tetraethylammonium difluoropentyl sulfonate, tetraethylammonium trifluoropentyl sulfonate, tetraethylammonium tetrafluoropentyl sulfonate, tetraethylammonium pentafluoropentyl sulfonate, tetraethylammonium hexafluoropentyl sulfonate, tetraethylammonium heptafluoropentyl sulfonate, tetraethylammonium octafluoropentyl sulfonate, tetraethylammonium nonafluoropentyl sulfonate, tetraethylammonium decafluoropentyl sulfonate, tetraethylammonium undecafluoropentyl sulfonate, tetraethylammonium monofluorohexyl sulfonate, tetraethylammonium difluorohexyl sulfonate, tetraethylammonium trifluorohexyl sulfonate, tetraethylammonium tetrafluorohexyl sulfonate, tetraethylammonium pentafluorohexyl sulfonate, tetraethylammonium hexafluorohexyl sulfonate, tetraethylammonium heptafluorohexyl sulfonate, tetraethylammonium octafluorohexyl sulfonate, tetraethylammonium nonafluorohexyl sulfonate, tetraethylammonium decafluorohexyl sulfonate, tetraethylammonium undecafluorohexyl sulfonate, tetraethylammonium dodecafluorohexyl sulfonate, tetraethylammonium tridecafluorohexyl sulfonate, tetraethylammonium monofluoroheptyl sulfonate, tetraethylammonium difluoroheptyl sulfonate, tetraethylammonium trifluoroheptyl sulfonate, tetraethylammonium tetrafluoroheptyl sulfonate, tetraethylammonium pentafluoroheptyl sulfonate, tetraethylammonium hexafluoroheptyl sulfonate, tetraethylammonium heptafluoroheptyl sulfonate, tetraethylammonium octafluoroheptyl sulfonate, tetraethylammonium nonafluoroheptyl sulfonate, tetraethylammonium decafluoroheptyl sulfonate, tetraethylammonium undecafluoroheptyl sulfonate, tetraethylammonium dodecafluoroheptyl sulfonate, tetraethylammonium tridecafluoroheptyl sulfonate, tetraethylammonium tetradecafluoroheptyl sulfonate, tetraethylammonium pentadecafluoroheptyl sulfonate, tetraethylammonium monofluorooctyl sulfonate, tetraethylammonium difluorooctyl sulfonate, tetraethylammonium trifluorooctyl sulfonate, tetraethylammonium tetrafluorooctyl sulfonate, tetraethylammonium pentafluorooctyl sulfonate, tetraethylammonium hexafluorooctyl sulfonate, tetraethylammonium heptafluorooctyl sulfonate, tetraethylammonium octafluorooctyl sulfonate, tetraethylammonium nonafluorooctyl sulfonate, tetraethylammonium decafluorooctyl sulfonate, tetraethylammonium undecafluorooctyl sulfonate, tetraethylammonium dodecafluorooctyl sulfonate, tetraethylammonium tridecafluorooctyl sulfonate, tetraethylammonium tetradecafluorooctyl sulfonate, tetraethylammonium pentadecafluorooctyl sulfonate, tetraethylammonium hexadecafluorooctyl sulfonate, tetraethylammonium heptadecafluorooctyl sulfonate, tetraethylammonium monofluorononyl sulfonate, tetraethylammonium difluorononyl sulfonate, tetraethylammonium trifluorononyl sulfonate, tetraethylammonium tetrafluorononyl sulfonate, tetraethylammonium pentafluorononyl sulfonate, tetraethylammonium hexafluorononyl sulfonate, tetraethylammonium heptafluorononyl sulfonate, tetraethylammonium octafluorononyl sulfonate, tetraethylammonium nonafluorononyl sulfonate, tetraethylammonium decafluorononyl sulfonate, tetraethylammonium undecafluorononyl sulfonate, tetraethylammonium dodecafluorononyl sulfonate, tetraethylammonium tridecafluorononyl sulfonate, tetraethylammonium tetradecafluorononyl sulfonate, tetraethylammonium pentadecafluorononyl sulfonate, tetraethylammonium hexadecafluorononyl sulfonate, tetraethylammonium heptadecafluorononyl sulfonate, tetraethylammonium octadecafluorononyl sulfonate, tetraethylammonium nonadecafluorononyl sulfonate, tetraethylammonium monofluorodecyl sulfonate, tetraethylammonium difluorodecyl sulfonate, tetraethylammonium trifluorodecyl sulfonate, tetraethylammonium tetrafluorodecyl sulfonate, tetraethylammonium pentafluorodecyl sulfonate, tetraethylammonium hexafluorodecyl sulfonate, tetraethylammonium heptafluorodecyl sulfonate, tetraethylammonium octafluorodecyl sulfonate, tetraethylammonium nonafluorodecyl sulfonate, tetraethylammonium decafluorodecyl sulfonate, tetraethylammonium undecafluorodecyl sulfonate, tetraethylammonium dodecafluorodecyl sulfonate, tetraethylammonium tridecafluorodecyl sulfonate, tetraethylammonium tetradecafluorodecyl sulfonate, tetraethylammonium pentadecafluorodecyl sulfonate, tetraethylammonium hexadecafluorodecyl sulfonate, tetraethylammonium heptadecafluorodecyl sulfonate, tetraethylammonium octadecafluorodecyl sulfonate, tetraethylammonium nonadecafluorodecyl sulfonate, tetraethylammonium eicosafluorodecyl sulfonate, tetraethylammonium heneicosafluorodecyl sulfonate, tetraethylammonium monofluoroundecyl sulfonate, tetraethylammonium difluoroundecyl sulfonate, tetraethylammonium trifluoroundecyl sulfonate, tetraethylammonium tetrafluoroundecyl sulfonate, tetraethylammonium pentafluoroundecyl sulfonate, tetraethylammonium hexafluoroundecyl sulfonate, tetraethylammonium heptafluoroundecyl sulfonate, tetraethylammonium octafluoroundecyl sulfonate, tetraethylammonium nonafluoroundecyl sulfonate, tetraethylammonium decafluoroundecyl sulfonate, tetraethylammonium undecafluoroundecyl sulfonate, tetraethylammonium dodecafluoroundecyl sulfonate, tetraethylammonium tridecafluoroundecyl sulfonate, tetraethylammonium tetradecafluoroundecyl sulfonate, tetraethylammonium pentadecafluoroundecyl sulfonate, tetraethylammonium hexadecafluoroundecyl sulfonate, tetraethylammonium heptadecafluoroundecyl sulfonate, tetraethylammonium octadecafluoroundecyl sulfonate, tetraethylammonium nonadecafluoroundecyl sulfonate, tetraethylammonium eicosafluoroundecyl sulfonate, tetraethylammonium heneicosafluoroundecyl sulfonate, tetraethylammonium docosafluoroundecyl sulfonate, tetraethylammonium tricosafluoroundecyl sulfonate, tetraethylammonium monofluorododecyl sulfonate, tetraethylammonium difluorododecyl sulfonate, tetraethylammonium trifluorododecyl sulfonate, tetraethylammonium tetrafluorododecyl sulfonate, tetraethylammonium pentafluorododecyl sulfonate, tetraethylammonium hexafluorododecyl sulfonate, tetraethylammonium heptafluorododecyl sulfonate, tetraethylammonium octafluorododecyl sulfonate, tetraethylammonium nonafluorododecyl sulfonate, tetraethylammonium decafluorododecyl sulfonate, tetraethylammonium undecafluorododecyl sulfonate, tetraethylammonium dodecafluorododecyl sulfonate, tetraethylammonium tridecafluorododecyl sulfonate, tetraethylammonium tetradecafluorododecyl sulfonate, tetraethylammonium pentadecafluorododecyl sulfonate, tetraethylammonium hexadecafluorododecyl sulfonate, tetraethylammonium heptadecafluorododecyl sulfonate, tetraethylammonium octadecafluorododecyl sulfonate, tetraethylammonium nonadecafluorododecyl sulfonate, tetraethylammonium eicosafluorododecyl sulfonate, tetraethylammonium heneicosafluorododecyl sulfonate, tetraethylammonium docosafluorododecyl sulfonate, tetraethylammonium tricosafluorododecyl sulfonate, tetraethylammonium tetracosafluorododecyl sulfonate, tetraethylammonium pentacosafluorododecyl sulfonate, tetraethylammonium monofluorobutyl sulfonate, tetraethylammonium difluorobutyl sulfonate, tetraethylammonium trifluorobutyl sulfonate, tetraethylammonium tetrafluorobutyl sulfonate, tetraethylammonium pentafluorobutyl sulfonate, tetraethylammonium hexafluorobutyl sulfonate, tetraethylammonium heptafluorobutyl sulfonate, tetraethylammonium octafluorobutyl sulfonate, tetraethylammonium nonafluorobutyl sulfonate, tetraethylammonium monofluoropentyl sulfonate, tetraethylammonium difluoropentyl sulfonate, tetraethylammonium trifluoropentyl sulfonate, tetraethylammonium tetrafluoropentyl sulfonate, tetraethylammonium pentafluoropentyl sulfonate, tetraethylammonium hexafluoropentyl sulfonate, tetraethylammonium heptafluoropentyl sulfonate, tetraethylammonium octafluoropentyl sulfonate, tetraethylammonium nonafluoropentyl sulfonate, tetraethylammonium decafluoropentyl sulfonate, tetraethylammonium undecafluoropentyl sulfonate, tetraethylammonium monofluorohexyl sulfonate, tetraethylammonium difluorohexyl sulfonate, tetraethylammonium trifluorohexyl sulfonate, tetraethylammonium tetrafluorohexyl sulfonate, tetraethylammonium pentafluorohexyl sulfonate, tetraethylammonium hexafluorohexyl sulfonate, tetraethylammonium heptafluorohexyl sulfonate, tetraethylammonium octafluorohexyl sulfonate, tetraethylammonium nonafluorohexyl sulfonate, tetraethylammonium decafluorohexyl sulfonate, tetraethylammonium undecafluorohexyl sulfonate, tetraethylammonium dodecafluorohexyl sulfonate, tetraethylammonium tridecafluorohexyl sulfonate, tetraethylammonium monofluoroheptyl sulfonate, tetraethylammonium difluoroheptyl sulfonate, tetraethylammonium trifluoroheptyl sulfonate, tetraethylammonium tetrafluoroheptyl sulfonate, tetraethylammonium pentafluoroheptyl sulfonate, tetraethylammonium hexafluoroheptyl sulfonate, tetraethylammonium heptafluoroheptyl sulfonate, tetraethylammonium octafluoroheptyl sulfonate, tetraethylammonium nonafluoroheptyl sulfonate, tetraethylammonium decafluoroheptyl sulfonate, tetraethylammonium undecafluoroheptyl sulfonate, tetraethylammonium dodecafluoroheptyl sulfonate, tetraethylammonium tridecafluoroheptyl sulfonate, tetraethylammonium tetradecafluoroheptyl sulfonate, tetraethylammonium pentadecafluoroheptyl sulfonate, tetraethylammonium monofluorooctyl sulfonate, tetraethylammonium difluorooctyl sulfonate, tetraethylammonium trifluorooctyl sulfonate, tetraethylammonium tetrafluorooctyl sulfonate, tetraethylammonium pentafluorooctyl sulfonate, tetraethylammonium hexafluorooctyl sulfonate, tetraethylammonium heptafluorooctyl sulfonate, tetraethylammonium octafluorooctyl sulfonate, tetraethylammonium nonafluorooctyl sulfonate, tetraethylammonium decafluorooctyl sulfonate, tetraethylammonium undecafluorooctyl sulfonate, tetraethylammonium dodecafluorooctyl sulfonate, tetraethylammonium tridecafluorooctyl sulfonate, tetraethylammonium tetradecafluorooctyl sulfonate, tetraethylammonium pentadecafluorooctyl sulfonate, tetraethylammonium hexadecafluorooctyl sulfonate, tetraethylammonium heptadecafluorooctyl sulfonate, tetraethylammonium monofluorononyl sulfonate, tetraethylammonium difluorononyl sulfonate, tetraethylammonium trifluorononyl sulfonate, tetraethylammonium tetrafluorononyl sulfonate, tetraethylammonium pentafluorononyl sulfonate, tetraethylammonium hexafluorononyl sulfonate, tetraethylammonium heptafluorononyl sulfonate, tetraethylammonium octafluorononyl sulfonate, tetraethylammonium nonafluorononyl sulfonate, tetraethylammonium decafluorononyl sulfonate, tetraethylammonium undecafluorononyl sulfonate, tetraethylammonium dodecafluorononyl sulfonate, tetraethylammonium tridecafluorononyl sulfonate, tetraethylammonium tetradecafluorononyl sulfonate, tetraethylammonium pentadecafluorononyl sulfonate, tetraethylammonium hexadecafluorononyl sulfonate, tetraethylammonium heptadecafluorononyl sulfonate, tetraethylammonium octadecafluorononyl sulfonate, tetraethylammonium nonadecafluorononyl sulfonate, tetraethylammonium monofluorodecyl sulfonate, tetraethylammonium difluorodecyl sulfonate, tetraethylammonium trifluorodecyl sulfonate, tetraethylammonium tetrafluorodecyl sulfonate, tetraethylammonium pentafluorodecyl sulfonate, tetraethylammonium hexafluorodecyl sulfonate, tetraethylammonium heptafluorodecyl sulfonate, tetraethylammonium octafluorodecyl sulfonate, tetraethylammonium nonafluorodecyl sulfonate, tetraethylammonium decafluorodecyl sulfonate, tetraethylammonium undecafluorodecyl sulfonate, tetraethylammonium dodecafluorodecyl sulfonate, tetraethylammonium tridecafluorodecyl sulfonate, tetraethylammonium tetradecafluorodecyl sulfonate, tetraethylammonium pentadecafluorodecyl sulfonate, tetraethylammonium hexadecafluorodecyl sulfonate, tetraethylammonium heptadecafluorodecyl sulfonate, tetraethylammonium octadecafluorodecyl sulfonate, tetraethylammonium nonadecafluorodecyl sulfonate, tetraethylammonium eicosafluorodecyl sulfonate, tetraethylammonium heneicosafluorodecyl sulfonate, tetraethylammonium monofluoroundecyl sulfonate, tetraethylammonium difluoroundecyl sulfonate, tetraethylammonium trifluoroundecyl sulfonate, tetraethylammonium tetrafluoroundecyl sulfonate, tetraethylammonium pentafluoroundecyl sulfonate, tetraethylammonium hexafluoroundecyl sulfonate, tetraethylammonium heptafluoroundecyl sulfonate, tetraethylammonium octafluoroundecyl sulfonate, tetraethylammonium nonafluoroundecyl sulfonate, tetraethylammonium decafluoroundecyl sulfonate, tetraethylammonium undecafluoroundecyl sulfonate, tetraethylammonium dodecafluoroundecyl sulfonate, tetraethylammonium tridecafluoroundecyl sulfonate, tetraethylammonium tetradecafluoroundecyl sulfonate, tetraethylammonium pentadecafluoroundecyl sulfonate, tetraethylammonium hexadecafluoroundecyl sulfonate, tetraethylammonium heptadecafluoroundecyl sulfonate, tetraethylammonium octadecafluoroundecyl sulfonate, tetraethylammonium nonadecafluoroundecyl sulfonate, tetraethylammonium eicosafluoroundecyl sulfonate, tetraethylammonium heneicosafluoroundecyl sulfonate, tetraethylammonium docosafluoroundecyl sulfonate, tetraethylammonium tricosafluoroundecyl sulfonate, tetraethylammonium monofluorododecyl sulfonate, tetraethylammonium difluorododecyl sulfonate, tetraethylammonium trifluorododecyl sulfonate, tetraethylammonium tetrafluorododecyl sulfonate, tetraethylammonium pentafluorododecyl sulfonate, tetraethylammonium hexafluorododecyl sulfonate, tetraethylammonium heptafluorododecyl sulfonate, tetraethylammonium octafluorododecyl sulfonate, tetraethylammonium nonafluorododecyl sulfonate, tetraethylammonium decafluorododecyl sulfonate, tetraethylammonium undecafluorododecyl sulfonate, tetraethylammonium dodecafluorododecyl sulfonate, tetraethylammonium tridecafluorododecyl sulfonate, tetraethylammonium tetradecafluorododecyl sulfonate, tetraethylammonium pentadecafluorododecyl sulfonate, tetraethylammonium hexadecafluorododecyl sulfonate, tetraethylammonium heptadecafluorododecyl sulfonate, tetraethylammonium octadecafluorododecyl sulfonate, tetraethylammonium nonadecafluorododecyl sulfonate, tetraethylammonium eicosafluorododecyl sulfonate, tetraethylammonium heneicosafluorododecyl sulfonate, tetraethylammonium docosafluorododecyl sulfonate, tetraethylammonium tricosafluorododecyl sulfonate, tetraethylammonium tetracosafluorododecyl sulfonate, tetraethylammonium pentacosafluorododecyl sulfonate, pyridinium monofluorobutyl sulfonate, pyridinium difluorobutyl sulfonate, pyridinium trifluorobutyl sulfonate, pyridinium tetrafluorobutyl sulfonate, pyridinium pentafluorobutyl sulfonate, pyridinium hexafluorobutyl sulfonate, pyridinium heptafluorobutyl sulfonate, pyridinium octafluorobutyl sulfonate, pyridinium nonafluorobutyl sulfonate, pyridinium monofluoropentyl sulfonate, pyridinium difluoropentyl sulfonate, pyridinium trifluoropentyl sulfonate, pyridinium tetrafluoropentyl sulfonate, pyridinium pentafluoropentyl sulfonate, pyridinium hexafluoropentyl sulfonate, pyridinium heptafluoropentyl sulfonate, pyridinium octafluoropentyl sulfonate, pyridinium nonafluoropentyl sulfonate, pyridinium decafluoropentyl sulfonate, pyridinium undecafluoropentyl sulfonate, pyridinium monofluorohexyl sulfonate, pyridinium difluorohexyl sulfonate, pyridinium trifluorohexyl sulfonate, pyridinium tetrafluorohexyl sulfonate, pyridinium pentafluorohexyl sulfonate, pyridinium hexafluorohexyl sulfonate, pyridinium heptafluorohexyl sulfonate, pyridinium octafluorohexyl sulfonate, pyridinium nonafluorohexyl sulfonate, pyridinium decafluorohexyl sulfonate, pyridinium undecafluorohexyl sulfonate, pyridinium dodecafluorohexyl sulfonate, pyridinium tridecafluorohexyl sulfonate, pyridinium monofluoroheptyl sulfonate, pyridinium difluoroheptyl sulfonate, pyridinium trifluoroheptyl sulfonate, pyridinium tetrafluoroheptyl sulfonate, pyridinium pentafluoroheptyl sulfonate, pyridinium hexafluoroheptyl sulfonate, pyridinium heptafluoroheptyl sulfonate, pyridinium octafluoroheptyl sulfonate, pyridinium nonafluoroheptyl sulfonate, pyridinium decafluoroheptyl sulfonate, pyridinium undecafluoroheptyl sulfonate, pyridinium dodecafluoroheptyl sulfonate, pyridinium tridecafluoroheptyl sulfonate, pyridinium tetradecafluoroheptyl sulfonate, pyridinium pentadecafluoroheptyl sulfonate, pyridinium monofluorooctyl sulfonate, pyridinium difluorooctyl sulfonate, pyridinium trifluorooctyl sulfonate, pyridinium tetrafluorooctyl sulfonate, pyridinium pentafluorooctyl sulfonate, pyridinium hexafluorooctyl sulfonate, pyridinium heptafluorooctyl sulfonate, pyridinium octafluorooctyl sulfonate, pyridinium nonafluorooctyl sulfonate, pyridinium decafluorooctyl sulfonate, pyridinium undecafluorooctyl sulfonate, pyridinium dodecafluorooctyl sulfonate, pyridinium tridecafluorooctyl sulfonate, pyridinium tetradecafluorooctyl sulfonate, pyridinium pentadecafluorooctyl sulfonate, pyridinium hexadecafluorooctyl sulfonate, pyridinium heptadecafluorooctyl sulfonate, pyridinium monofluorononyl sulfonate, pyridinium difluorononyl sulfonate, pyridinium trifluorononyl sulfonate, pyridinium tetrafluorononyl sulfonate, pyridinium pentafluorononyl sulfonate, pyridinium hexafluorononyl sulfonate, pyridinium heptafluorononyl sulfonate, pyridinium octafluorononyl sulfonate, pyridinium nonafluorononyl sulfonate, pyridinium decafluorononyl sulfonate, pyridinium undecafluorononyl sulfonate, pyridinium dodecafluorononyl sulfonate, pyridinium tridecafluorononyl sulfonate, pyridinium tetradecafluorononyl sulfonate, pyridinium pentadecafluorononyl sulfonate, pyridinium hexadecafluorononyl sulfonate, pyridinium heptadecafluorononyl sulfonate, pyridinium octadecafluorononyl sulfonate, pyridinium nonadecafluorononyl sulfonate, pyridinium monofluorodecyl sulfonate, pyridinium difluorodecyl sulfonate, pyridinium trifluorodecyl sulfonate, pyridinium tetrafluorodecyl sulfonate, pyridinium pentafluorodecyl sulfonate, pyridinium hexafluorodecyl sulfonate, pyridinium heptafluorodecyl sulfonate, pyridinium octafluorodecyl sulfonate, pyridinium nonafluorodecyl sulfonate, pyridinium decafluorodecyl sulfonate, pyridinium undecafluorodecyl sulfonate, pyridinium dodecafluorodecyl sulfonate, pyridinium tridecafluorodecyl sulfonate, pyridinium tetradecafluorodecyl sulfonate, pyridinium pentadecafluorodecyl sulfonate, pyridinium hexadecafluorodecyl sulfonate, pyridinium heptadecafluorodecyl sulfonate, pyridinium octadecafluorodecyl sulfonate, pyridinium nonadecafluorodecyl sulfonate, pyridinium eicosafluorodecyl sulfonate, pyridinium heneicosafluorodecyl sulfonate, pyridinium monofluoroundecyl sulfonate, pyridinium difluoroundecyl sulfonate, pyridinium trifluoroundecyl sulfonate, pyridinium tetrafluoroundecyl sulfonate, pyridinium pentafluoroundecyl sulfonate, pyridinium hexafluoroundecyl sulfonate, pyridinium heptafluoroundecyl sulfonate, pyridinium octafluoroundecyl sulfonate, pyridinium nonafluoroundecyl sulfonate, pyridinium decafluoroundecyl sulfonate, pyridinium undecafluoroundecyl sulfonate, pyridinium dodecafluoroundecyl sulfonate, pyridinium tridecafluoroundecyl sulfonate, pyridinium tetradecafluoroundecyl sulfonate, pyridinium pentadecafluoroundecyl sulfonate, pyridinium hexadecafluoroundecyl sulfonate, pyridinium heptadecafluoroundecyl sulfonate, pyridinium octadecafluoroundecyl sulfonate, pyridinium nonadecafluoroundecyl sulfonate, pyridinium eicosafluoroundecyl sulfonate, pyridinium heneicosafluoroundecyl sulfonate, pyridinium docosafluoroundecyl sulfonate, pyridinium tricosafluoroundecyl sulfonate, pyridinium monofluorododecyl sulfonate, pyridinium difluorododecyl sulfonate, pyridinium trifluorododecyl sulfonate, pyridinium tetrafluorododecyl sulfonate, pyridinium pentafluorododecyl sulfonate, pyridinium hexafluorododecyl sulfonate, pyridinium heptafluorododecyl sulfonate, pyridinium octafluorododecyl sulfonate, pyridinium nonafluorododecyl sulfonate, pyridinium decafluorododecyl sulfonate, pyridinium undecafluorododecyl sulfonate, pyridinium dodecafluorododecyl sulfonate, pyridinium tridecafluorododecyl sulfonate, pyridinium tetradecafluorododecyl sulfonate, pyridinium pentadecafluorododecyl sulfonate, pyridinium hexadecafluorododecyl sulfonate, pyridinium heptadecafluorododecyl sulfonate, pyridinium octadecafluorododecyl sulfonate, pyridinium nonadecafluorododecyl sulfonate, pyridinium eicosafluorododecyl sulfonate, pyridinium heneicosafluorododecyl sulfonate, pyridinium docosafluorododecyl sulfonate, pyridinium tricosafluorododecyl sulfonate, pyridinium tetracosafluorododecyl sulfonate, and pyridinium pentacosafluorododecyl sulfonate.

Figure 3A:
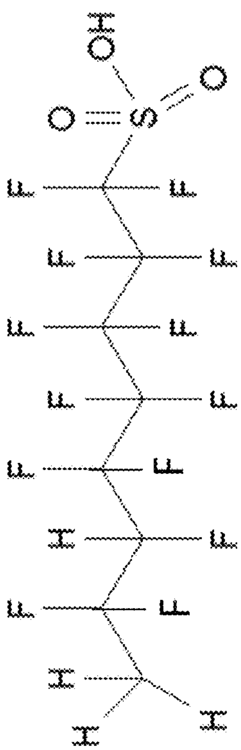
FIG. 3*a* is a view showing one of different examples of polyfluorinated anionic surfactants according to the present invention.
Figure 3B:
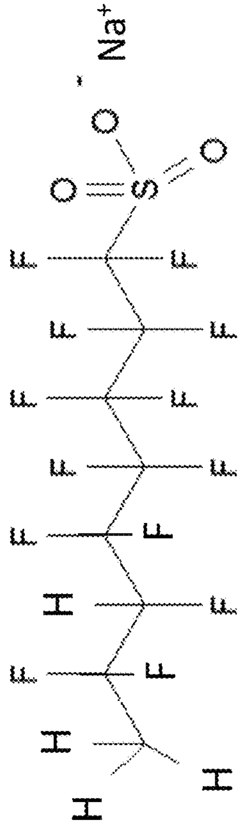
FIG. 3*b* is a view showing another of different examples of polyfluorinated anionic surfactants according to the present invention.
Figure 3C:
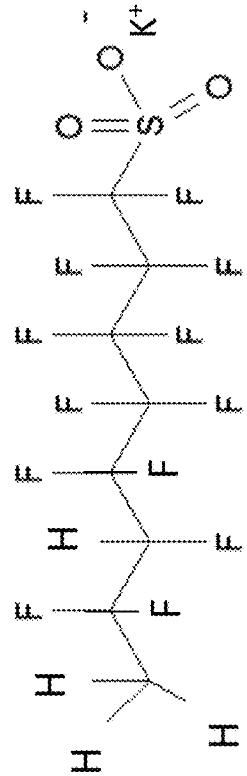
FIG. 3*c* is a view showing another of different examples of polyfluorinated anionic surfactants according to the present invention.
Figure 3D:
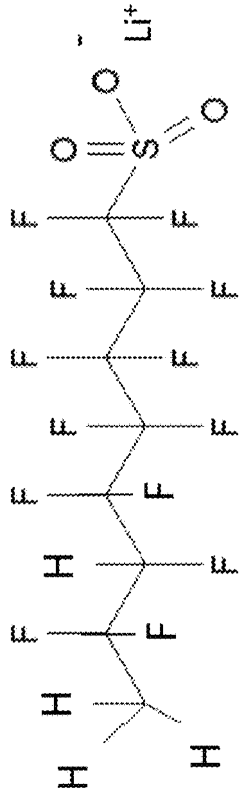
FIG. 3*d* is a view showing another of different examples of polyfluorinated anionic surfactants according to the present invention.
Figure 3E:
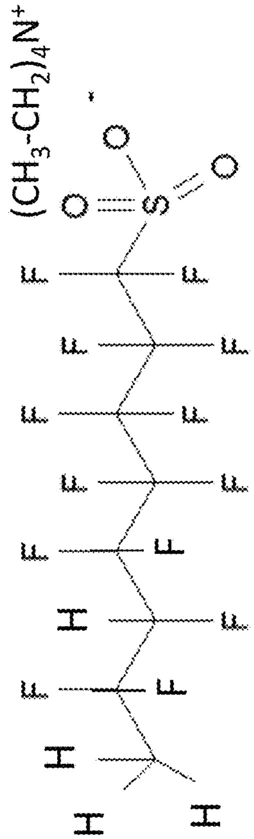
FIG. 3*e* is a view showing another of different examples of polyfluorinated anionic surfactants according to the present invention.

FIGS. 3*a* through 3*e* show especially preferred embodiment variants of the polyfluorinated alkylsulfonic acids according to FIG. 1*c* and of the polyfluorinated alkyl sulfonates according to FIG. 1*d*. FIG. 3*a* shows a polyfluorooctylsulfonic acid, namely, tridecafluorooctylsulfonic acid as preferred variants of the exemplary embodiment from FIG. 1*c*. FIGS. 3*b*, 3*c*, 3*d* and 3*e* show as preferred variants of the exemplary embodiments from FIG. 1*d* sodium tridecafluorooctyl sulfonate (FIG. 3*b*), potassium tridecafluorooctyl sulfonate (FIG. 3*c*), lithium tridecafluorooctyl sulfonate (FIG. 3*d*) and tetraethylammonium tridecafluorooctyl sulfonate (FIG. 3*e*).

The embodiment variants shown in FIGS. 1*a*, 1*b*, 1*c* and 1*d* as well as 2*a* through 2*f* and 3*a* through 3*e* are all compounds corresponding to the following formula:

$$(C_nF_{(2n+1)-m}H_m—SO_3^-)R1 \qquad \text{Formula I,}$$

in which n={1, 2, 3, 4, 5, 6, 7, 8, 9, 10, 11, 12}, m={0, 1, 2, 3, 4, 5, 6, 7, 8, 9, 10, 11, 12, 13, 14, 15, 16, 17, 18, 19, 20, 21, 22, 23, 24, 25}, R1 is selected from the group comprising $H^+$, $Na^+$, $K^+$, $Li^+$, as well as $((C_sH_{2s+1})(C_pH_{2p+1})(C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. Here, m=0 and n={4, 5, 6, 7, 8, 9, 10, 11, 12} applies to the compounds corresponding to FIGS. 1*a*, 1*b* and 2*a* through 2*f*. Now, m={1, 2, 3, 4, 5, 6, 7, 8, 9, 10, 11, 12, 13, 14, 15, 16, 17, 18, 19, 20, 21, 22, 23, 24, 25} and (2n+1-m)={1, 2, 3, 4, 5, 6, 7, 8, 9, 10, 11, 12, 13, 14, 15, 16, 17, 18, 19, 20, 21, 22, 23, 24, 25}, in which n={4, 5, 6, 7, 8, 9, 10, 11, 12}, apply to the compounds corresponding to FIGS. 1*c*, 1*d* and 3*a* through 3*e*.

Figure 1E:
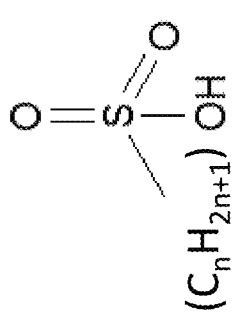
FIG. 1*e* is a view showing another of different examples of anionic surfactants according to the present invention.

In the exemplary embodiment according to FIG. 1*e*, the surfactant according to the present invention is an n-alkylsulfonic acid. Here, n is selected from among 4, 5, 6, 7, 8, 9, 10, 11 or 12. It is thus seen that a compound according to FIG. 1*a* is selected from the group comprising n-butylsulfonic acid, n-pentylsulfonic acid, n-hexylsulfonic acid, n-octylsulfonic acid, n-nonylsulfonic acid, n-decylsulfonic acid, n-undecylsulfonic acid, and n-dodecylsulfonic acid.

Figure 1F:
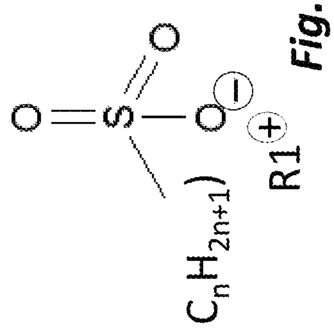
FIG. 1*f* is a view showing another of different examples of anionic surfactants according to the present invention.

In the exemplary embodiment according to FIG. 1*f*, the surfactant according to the present invention is an n-alkyl sulfonate. Here, n is selected from among 4, 5, 6, 7, 8, 9, 10, 11 or 12. R1 is the positively charged counterion and is selected from the group containing heterocyclic cations, quaternary ammonium ions, and alkali or alkaline earth ions. In one embodiment variant, the counterion R1 is a heterocyclic cation, namely, a pyridinium ion. In another embodiment variant, the counterion R1 is a quaternary ammonium ion, namely, tetraethylammonium. It yet another embodiment variant, the counterion R1 is an alkali ion, namely, $Na^+$, $K^+$, $Li^+$. It is thus seen that the surfactant according to Figure if is selected from the group containing sodium-n-butyl sulfonate, sodium n-pentyl sulfonate, sodium n-hexyl sulfonate, sodium n-octyl sulfonate, sodium n-nonyl sulfonate, sodium n-decyl sulfonate, sodium n-undecyl sulfonate, sodium n-dodecyl sulfonate, potassium n-butyl sulfonate, potassium n-pentyl sulfonate, potassium n-hexyl sulfonate, potassium n-octyl sulfonate, potassium n-nonyl sulfonate, potassium n-decyl sulfonate, potassium n-undecyl sulfonate, potassium n-dodecyl sulfonate, lithium n-butyl sulfonate, lithium n-pentyl sulfonate, lithium n-hexyl sulfonate, lithium n-octyl sulfonate, lithium n-nonyl sulfonate, lithium n-decyl sulfonate, lithium n-undecyl sulfonate, lithium n-dodecyl sulfonate, tetraethylammonium n-butyl sulfonate, tetraethylammonium n-pentyl sulfonate, tetraethylammonium n-hexyl sulfonate, tetraethylammonium n-octyl sulfonate, tetraethylammonium n-nonyl sulfonate, tetraethylammonium n-decyl sulfonate, tetraethylammonium n-undecyl sulfonate, tetraethylammonium n-dodecyl sulfonate, pyridinium n-butyl sulfonate, pyridinium n-pentyl sulfonate, pyridinium n-hexyl sulfonate, pyridinium n-octyl sulfonate, pyridinium n-nonyl sulfonate, pyridinium n-decyl sulfonate, pyridinium n-undecyl sulfonate, and pyridinium n-dodecyl sulfonate.

Figure 1G:
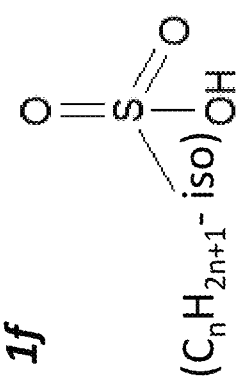
FIG. 1*g* is a view showing another of different examples of anionic surfactants according to the present invention.

The surfactant according to the present invention is an iso-alkylsulfonic acid in the exemplary embodiment according to FIG. 1*g*. Here, n is selected from among 4, 5, 6, 7, 8, 9, 10, 11 or 12. It is thus seen that a compound according to FIG. 1*a* is selected from the group comprising isobutylsulfonic acid, isopentylsulfonic acid, isohexylsulfonic acid, isooctylsulfonic acid, isononylsulfonic acid, isodecylsulfonic acid, isoundecylsulfonic acid, and isododecylsulfonic acid.

Figure 1H:
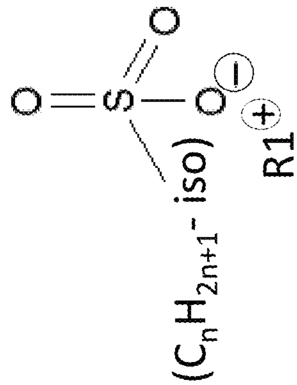
FIG. 1*h* is a view showing another of different examples of anionic surfactants according to the present invention.

In the exemplary embodiment according to FIG. 1*h*, the surfactant according to the present invention is an iso-alkyl sulfonate. Here, n is selected from among 4, 5, 6, 7, 8, 9, 10, 11 or 12. R1 is the positively charged counterion and is selected from the group containing heterocyclic cations, quaternary ammonium ions, alkali or alkaline earth ions. In one embodiment variant, the counterion R1 is a heterocyclic cation, namely, a pyridinium ion. In another embodiment variant, the counterion R1 is a quaternary ammonium ion, namely, tetraethylammonium. In yet another embodiment variant, the counterion R1 is an alkali ion, namely, $Na^+$, $K^+$ or $Li^+$. It is thus seen that the surfactant according to Figure if is selected from the group containing sodium isobutyl sulfonate, sodium isopentyl sulfonate, sodium isohexyl sulfonate, sodium isooctyl sulfonate, sodium isononyl sulfonate, sodium isodecyl sulfonate, sodium isoundecyl sulfonate, sodium isododecyl sulfonate, potassium isobutyl sulfonate, potassium isopentyl sulfonate, potassium isohexyl sulfonate, potassium isooctyl sulfonate, potassium isononyl sulfonate, potassium isodecyl sulfonate, potassium isoundecyl sulfonate, potassium dodecyl sulfonate, lithium isobutyl sulfonate, lithium isopentyl sulfonate, lithium isohexyl sulfonate, lithium isooctyl sulfonate, lithium isononyl sulfonate, lithium isodecyl sulfonate, lithium isoundecyl sulfonate, lithium isododecyl sulfonate, tetraethylammonium isobutyl sulfonate, tetraethylammonium isopentyl sulfonate, tetraethylammonium isohexyl sulfonate, tetraethylammonium isooctyl sulfonate, tetraethylammonium isononyl sulfonate, tetraethylammonium isodecyl sulfonate, tetraethylammonium isoundecyl sulfonate, tetraethylammonium isododecyl sulfonate, pyridinium isobutyl sulfonate, pyridinium isopentyl sulfonate, pyridinium isohexyl sulfonate, pyridinium isooctyl sulfonate, pyridinium isononyl sulfonate, pyridinium isodecyl sulfonate, pyridinium isoundecyl sulfonate, and pyridinium isododecyl sulfonate.

Figure 4A:
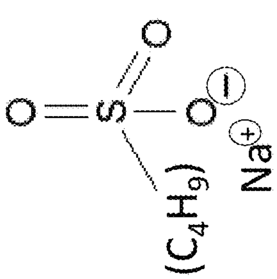
FIG. 4*a* is a view showing one of different examples of halogen-free anionic surfactants according to the present invention.
Figure 4B:
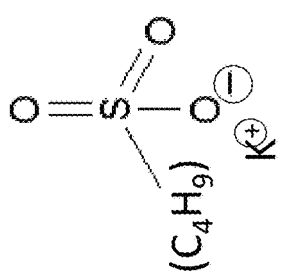
FIG. 4*b* is a view showing another of different examples of halogen-free anionic surfactants according to the present invention.
Figure 4C:
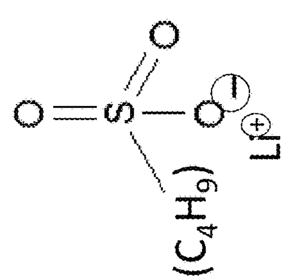
FIG. 4*c* is a view showing another of different examples of halogen-free anionic surfactants according to the present invention.
Figure 4D:
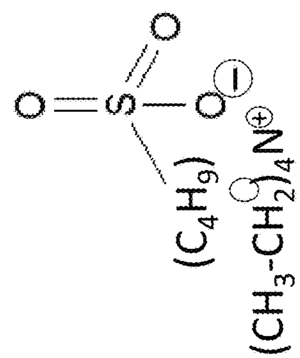
FIG. 4*d* is a view showing another of different examples of halogen-free anionic surfactants according to the present invention.
Figure 4E:
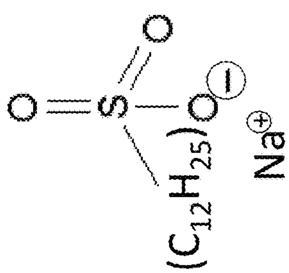
FIG. 4*e* is a view showing another of different examples of halogen-free anionic surfactants according to the present invention.
Figure 4F:
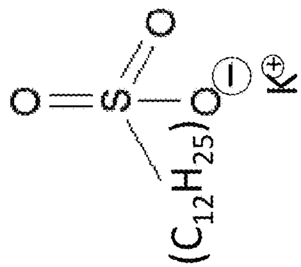
FIG. 4*f* is a view showing another of different examples of halogen-free anionic surfactants according to the present invention.
Figure 4G:
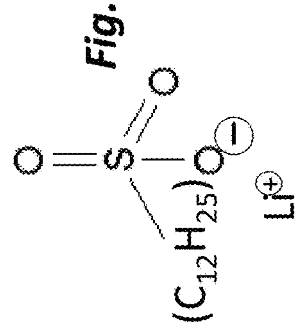
FIG. 4*g* is a view showing another of different examples of halogen-free anionic surfactants according to the present invention.
Figure 4H:
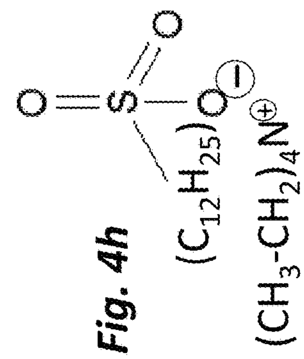
FIG. 4*h* is a view showing another of different examples of halogen-free anionic surfactants according to the present invention.

FIGS. 4*a* through 4*h* show especially preferred embodiment variants of the halogen-free alkyl sulfonates according to FIGS. 1*f* and 1*h*. FIGS. 4*a* through 4*d* show a preferred butyl sulfonate each, namely, sodium butyl sulfonate (FIG. 4*a*), potassium butyl sulfonate (FIG. 4*b*), lithium butyl sulfonate (FIG. 4*c*), and tetraethylammonium butyl sulfonate (FIG. 4*d*). FIGS. 4*e* through 4*h* show each a preferred dodecyl sulfonate, namely, sodium dodecyl sulfonate (FIG. 4*e*), potassium dodecyl sulfonate (FIG. 4*f*), lithium dodecyl sulfonate (FIG. 4*g*), and tetraethylammonium dodecyl sulfonate (FIG. 4*h*).

The embodiment variants shown in FIG. 1*e*, if as well as 4*a* through 4*f* are also all compounds corresponding to the following formula:

$$(C_nF_{(2n+1)-m}H_m{-}SO_3^-)R1 \qquad \text{Formula I}$$

in which n={1, 2, 3, 4, 5, 6, 7, 8, 9, 10, 11, 12}, m={0, 1, 2, 3, 4, 5, 6, 7, 8, 9, 10, 11, 12, 13, 14, 15, 16, 17, 18, 19, 20, 21, 22, 23, 24, 25}, R1 is selected from the group $H^+$, $Na^+$, $K^+$, $Li^+$, as well as $((C_sH_{2s+1})(C_pH_{2p+1})((C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}. Here, (2n+1)=m, in which n={4, 5, 6, 7, 8, 9, 10, 11, 12), for the compounds corresponding to FIG. 1*e*, if as well as 4*a* through 4*f*. It is thus seen that the embodiment variants shown in FIG. 1*e*, if as well as 4*a* through 4*f* are halogen-free anionic surfactants corresponding to the following formula:

$$(C_nH_{2n+1}{-}SO_3)R1 \qquad \text{Formula II,}$$

in which n={1, 2, 3, 4, 5, 6, 7, 8, 9, 10, 11, 12}, R1 is selected from the group $H^+$, $Na^+$, $K^+$, $Li^+$ or $((C_sH_{2s+1})(C_pH_{2p+1})((C_qH_{2q+1})(C_rH_{2r+1}))N^+$, in which s={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}.

Figure 6A:
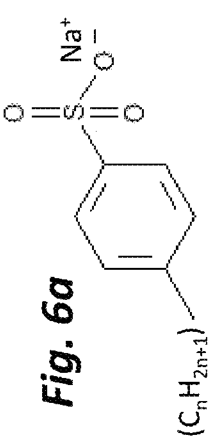
FIG. 6*a* is a view showing one of different alternative examples of halogen-free anionic surfactants.
Figure 6B:
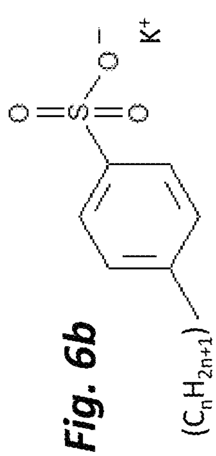
FIG. 6*b* is a view showing another of different alternative examples of halogen-free anionic surfactants.
Figure 6C:
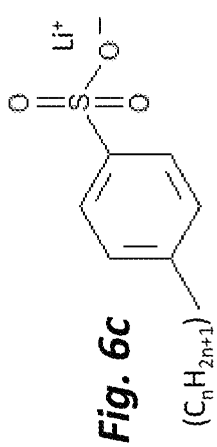
FIG. 6*c* is a view showing another of different alternative examples of halogen-free anionic surfactants.
Figure 6D:
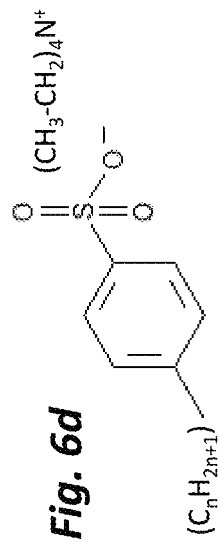
FIG. 6*d* is a view showing another of different alternative examples of halogen-free anionic surfactants.
Figure 6E:
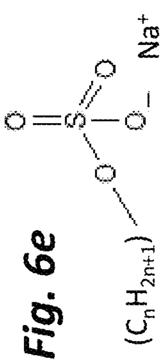
FIG. 6*e* is a view showing another of different alternative examples of halogen-free anionic surfactants.
Figure 6F:
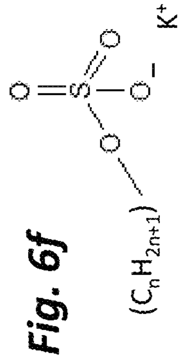
FIG. 6*f* is a view showing another of different alternative examples of halogen-free anionic surfactants.
Figure 6G:
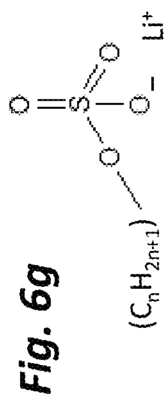
FIG. 6*g* is a view showing another of different alternative examples of halogen-free anionic surfactants.

Other embodiment variants of anionic, halogen-free surfactants are shown in FIGS. 6*a* through 6*l*. FIGS. 6*a* through 6*d* show each exemplary embodiments for iso- or n-alkylbenzene sulfonate compounds, namely, sodium alkylbenzene sulfonate (FIG. 6*a*), potassium alkylbenzene sulfonate (FIG. 6*b*), lithium alkylbenzene sulfonate (FIG. 6*c*), and tetraethylammonium alkylbenzene sulfonate (FIG. 6*d*). It is seen that the alkylbenzene sulfonates corresponding to FIGS. 6*a* through 6*d* may have a variable length of the alkyl chain. Here, n is always selected from among 1, 2, 3, 4, 5, 6, 7, 8, 9, 10, 12. The variants shown in FIGS. 6*a* through 6*d* are a para-alkylbenzene sulfonate compound each. It is obvious that the corresponding meta-alkylbenzene sulfonate and ortho-alkylbenzene sulfonate compounds are also embodiment variants of the present invention in other variants, not shown in the figures.

Figure 6H:
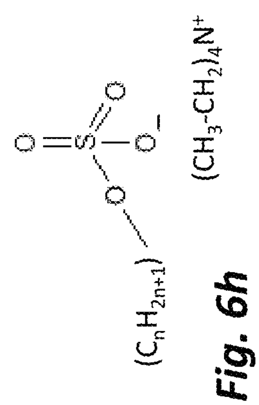
FIG. 6*h* is a view showing another of different alternative examples of halogen-free anionic surfactants.

FIGS. 6*e* through 6*h* show each exemplary embodiments for iso- or n-alkyl sulfate compounds, namely, sodium alkyl sulfate (FIG. 6*e*), potassium alkyl sulfate (FIG. 60, lithium alkyl sulfate (FIG. 6*g*), and tetraethylammonium alkyl sulfate (FIG. 6*h*). It is seen that the alkyl sulfates corresponding to FIGS. 6*e* through 6*h* may have a variable length of the alkyl chain. Here, n is always selected from among 1, 2, 3, 4, 5, 6, 7, 8, 9, 10, 12.

Figure 6I:
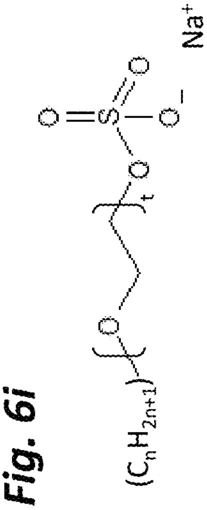
FIG. 6*i* is a view showing another of different alternative examples of halogen-free anionic surfactants.
Figure 6J:
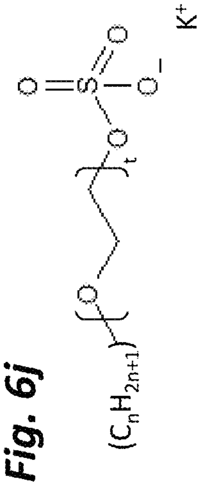
FIG. 6*j* is a view showing another of different alternative examples of halogen-free anionic surfactants.
Figure 6K:
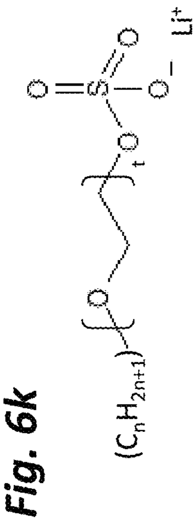
FIG. 6*k* is a view showing another of different alternative examples of halogen-free anionic surfactants.
Figure 6L:
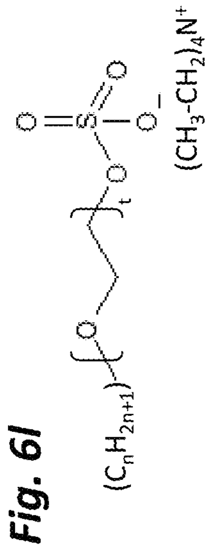
FIG. 6*l* is a view showing another of different alternative examples of halogen-free anionic surfactants.

FIGS. 6*i* and 6*l* show exemplary embodiments each for alkyl ether sulfate compounds, namely, sodium alkyl ether sulfate (FIG. 6*i*), potassium alkyl ether sulfate (FIG. 6*j*), lithium alkyl ether sulfate (FIG. 6*k*), and tetraethylammonium alkyl ether sulfate (FIG. 6*l*). It is seen that the terminal alkyl chain of the alkyl ether sulfates corresponding to FIGS. 6*i* through 6*l* may have a variable length. Here, n is always selected from among 1, 2, 3, 4, 5, 6, 7, 8, 9, 10, 12, and t is an integer between and including 1 and including 20.

It is thus seen. on the whole, that the exemplary embodiments corresponding to FIGS. 1*b*, 1*d*, 1*f*, 1*h*, 2*c*, 3*b*, 4*a*, 4*e*, 6*a*, 6*e* and 6*i* are sodium salts. It is also seen that the exemplary embodiments corresponding to FIGS. 1*b*, 1*d*, 1*f*, 1*h*, 2*e*, 3*c*, 4*b*, 4*f*, 6*b*, 6*f*, and 6*j* are potassium salts. In addition, it is seen that the exemplary embodiments corresponding to FIGS. 1*b*, 1*d*, 1*f*, 1*h*, 2*d*, 3*d*, 4*c*, 4*g*, 6*c*, 6*g* and 6*k* are lithium salts. It is further seen that the exemplary embodiments corresponding to FIGS. 1*b*, 1*d*, 1*f*, 1*h*, 2*f*, 3*e*, 4*d*, 4*h*, 6*d*, 6*h* and 6*l* are tetraethylammonium salts.

In another embodiment variant, the surfactant is a cationic surfactant, as can be seen in FIGS. 5*a* through 5*h*. It is seen, in particular, that the compounds shown in FIGS. 5*a* through 5*h* are quaternary ammonium compounds. A hydrogen sulfate ion ($HSO_4^-$) acts as a counterion in the compounds corresponding to FIGS. 5*a* through 5*d*. A dihydrogen phosphate ion ($H_2PO_4^-$) acts as a counterion in the compounds corresponding to FIGS. 5*e* through 5*h*. It is further seen that the exemplary embodiments shown in FIGS. 5*a* through 5*h* are each tetraalkylammonium compounds. The tetraalkylammonium compounds are each halogen-free compounds. In particular, the compounds are surfactants corresponding to the following formula $$[((C_sH_{2s+1})(C_pH_{2p+1})(C_qH_{2q+1})(C_rH_{2r+1}))N^+]R2 \qquad \text{(Formula III)}$$

in which s={0, 1, 2, 3, 4, 5, 6, 7, 8, 9, 10, 11, 12, 13, 14, 15, 16, 17, 18, 19, 20}, p={0, 1, 2, 3, 4, 5, 6, 7, 8, 9, 10, 11, 12, 13, 14, 15, 16, 17, 18, 19, 20}, q={0, 1, 2, 3, 4, 5, 6, 7, 8, 9, 10, 11, 12, 13, 14, 15, 16, 17, 18, 19, 20}, r={0, 1, 2, 3, 4, 5, 6, 7, 8, 9, 10, 11, 12, 13, 14, 15, 16, 17, 18, 19, 20}, wherein R2 is selected from the group containing $HSO_4^-$, $H_2PO_4^-$, $CF_3—CO_3^-$, $C_2F_4HSO_3^-$, $CF_3^-$ $COO^-$, $(CF_3—SO_2)_2N^-$.

Figure 5A:
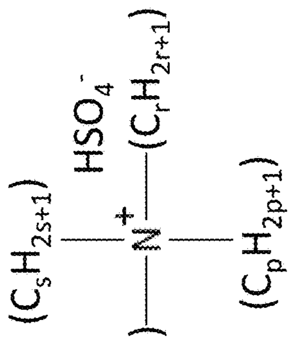
FIG. 5*a* is a view showing one of different examples of cationic surfactants according to the present invention.
Figure 5B:
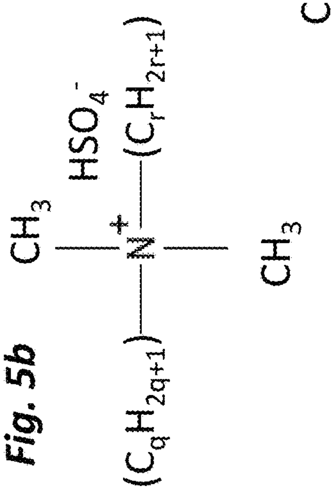
FIG. 5*b* is a view showing another of different examples of cationic surfactants according to the present invention.
Figure 5C:
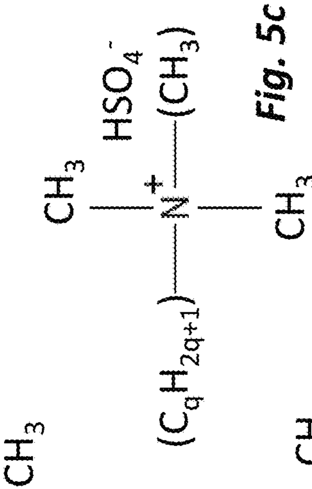
FIG. 5*c* is a view showing another of different examples of cationic surfactants according to the present invention.
Figure 5D:
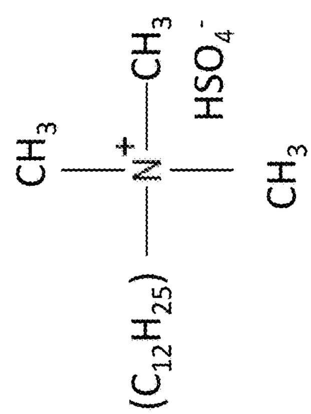
FIG. 5*d* is a view showing another of different examples of cationic surfactants according to the present invention.
Figure 5E:
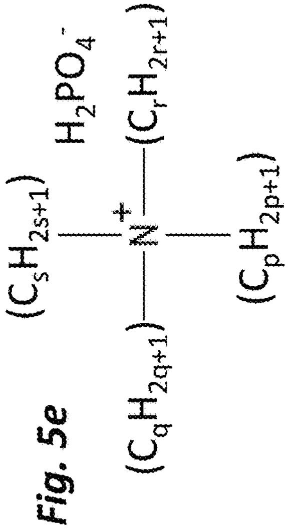
FIG. 5*e* is a view showing another of different examples of cationic surfactants according to the present invention.
Figure 5F:
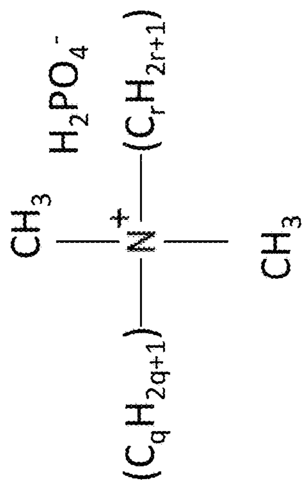
FIG. 5*f* is a view showing another of different examples of cationic surfactants according to the present invention.

The embodiment variants shown in FIGS. 5*b* and 5*f* are each dimethyldialkylammonium compounds. The two alkyl groups of the respective compound have at least a length of two carbon atoms. In other words, the embodiment variants corresponding to FIGS. 5*b* and 5*f* have at least two methyl groups each and correspond to one of the following two formulas:

$$[((C_sH_{2s+1})(C_pH_{2p+1})(C_qH_{2q+1})(C_rH_{2r+1}))N^+]\ HSO_4^- \quad \text{(Formula IIId),}$$

in which s={2, 3, 4, 5, 6, 7, 8, 9, 10, 11, 12}, p={2, 3, 4, 5, 6, 7, 8, 9, 10, 11, 12}, q={1}, and r={1}, or $$[((C_sH_{2s+1})(C_pH_{2p+1})(C_qH_{2q+1})(C_rH_{2r+1}))N^+]\ H_2PO_4^- \quad \text{(Formula IIIe),}$$

in which s={2, 3, 4, 5, 6, 7, 8, 9, 10, 11, 12}, p={2, 3, 4, 5, 6, 7, 8, 9, 10, 11, 12}, q={1}, and r={1}.

It is seen that the embodiment variants corresponding to FIG. 5*b* are selected from the group containing diethyldimethylammonium hydrogen sulfate, butylethyldimethylammonium hydrogen sulfate, pentylethyldimethylammonium hydrogen sulfate, hexylethyldimethylammonium hydrogen sulfate, heptylethyldimethylammonium hydrogen sulfate, octylethyldimethylammonium hydrogen sulfate, nonylethyldimethylammonium hydrogen sulfate, decylethyldimethylammonium hydrogen sulfate, undecylethyldimethylammonium hydrogen sulfate, dodecylethyldimethylammonium hydrogen sulfate, dibutyldimethylammonium hydrogen sulfate, pentylbutyldimethylammonium hydrogen sulfate, hexylbutyldimethylammonium hydrogen sulfate, heptylbutyldimethylammonium hydrogen sulfate, octylbutyldimethylammonium hydrogen sulfate, nonylbutyldimethylammonium hydrogen sulfate, decylbutyldimethylammonium hydrogen sulfate, undecylbutyldimethylammonium hydrogen sulfate, dodecylbutyldimethylammonium hydrogen sulfate, dipentyldimethylammonium hydrogen sulfate, hexylpentyldimethylammonium hydrogen sulfate, heptylpentyldimethylammonium hydrogen sulfate, octylpentyldimethylammonium hydrogen sulfate, nonylpentyldimethylammonium hydrogen sulfate, decylpentyldimethylammonium hydrogen sulfate, undecylpentyldimethylammonium hydrogen sulfate, dodecylpentyldimethylammonium hydrogen sulfate, dihexyldimethylammonium hydrogen sulfate, heptylhexyldimethylammonium hydrogen sulfate, octylhexyldimethylammonium hydrogen sulfate, nonylhexyldimethylammonium hydrogen sulfate, decylhexyldimethylammonium hydrogen sulfate, undecylhexyldimethylammonium hydrogen sulfate, dodecylhexyldimethylammonium hydrogen sulfate, diheptyldimethylammonium hydrogen sulfate, octylheptyldimethylammonium hydrogen sulfate, nonylheptyldimethylammonium hydrogen sulfate, decylheptyldimethylammonium hydrogen sulfate, undecylheptyldimethylammonium hydrogen sulfate, dodecylheptyldimethylammonium hydrogen sulfate, dioctyldimethylammonium hydrogen sulfate, nonyloctyldimethylammonium hydrogen sulfate, decyloctyldimethylammonium hydrogen sulfate, undecyloctyldimethylammonium hydrogen sulfate, dodecyloctyldimethylammonium hydrogen sulfate, dinonyldimethylammonium hydrogen sulfate, decylnonyldimethylammonium hydrogen sulfate, undecylnonyldimethylammonium hydrogen sulfate, dodecylnonyldimethylammonium hydrogen sulfate, didecyldimethylammonium hydrogen sulfate, undecyldecyldimethylammonium hydrogen sulfate, dodecyldecyldimethylammonium hydrogen sulfate, diundecyldimethylammonium hydrogen sulfate, dodecylundecyldimethylammonium hydrogen sulfate, didodecyldimethylammonium hydrogen sulfate.

The embodiment variants shown in FIGS. 5*c*, 5*d*, 5*g* and 5*h* are trimethylalkylammonium compounds. It is thus seen that the embodiment variants corresponding to FIG. 5*c* are selected from the group containing ethyltrimethylammonium hydrogen sulfate, butyltrimethylammonium hydrogen sulfate, pentyltrimethylammonium hydrogen sulfate, hexyltrimethylammonium hydrogen sulfate, heptyltrimethylammonium hydrogen sulfate, octyltrimethylammonium hydrogen sulfate, nonyltrimethylammonium hydrogen sulfate, decyltrimethylammonium hydrogen sulfate, undecyltrimethylammonium hydrogen sulfate, dodecyltrimethylammonium hydrogen sulfate. The especially preferred embodiment variant corresponding to FIG. 5*d* is dodecyltrimethylammonium hydrogen sulfate.

It is further seen that the embodiment variants corresponding to FIG. 5*f* are selected from the group containing diethyldimethylammonium dihydrogen phosphate, butylethyldimethylammonium dihydrogen phosphate, pentylethyldimethylammonium dihydrogen phosphate, hexylethyldimethylammonium dihydrogen phosphate, heptylethyldimethylammonium dihydrogen phosphate, octylethyldimethylammonium dihydrogen phosphate, nonylethyldimethylammonium dihydrogen phosphate, decylethyldimethylammonium dihydrogen phosphate, undecylethyldimethylammonium dihydrogen phosphate, dodecylethyldimethylammonium dihydrogen phosphate, dibutyldimethylammonium dihydrogen phosphate, pentylbutyldimethylammonium dihydrogen phosphate, hexylbutyldimethylammonium dihydrogen phosphate, heptylbutyldimethylammonium dihydrogen phosphate, octylbutyldimethylammonium dihydrogen phosphate, nonylbutyldimethylammonium dihydrogen phosphate, decylbutyldimethylammonium dihydrogen phosphate, undecylbutyldimethylammonium dihydrogen phosphate, dodecylbutyldimethylammonium dihydrogen phosphate, dipentyldimethylammonium dihydrogen phosphate, hexylpentyldimethylammonium dihydrogen phosphate, heptylpentyldimethylammonium dihydrogen phosphate, octylpentyldimethylammonium dihydrogen phosphate, nonylpentyldimethylammonium dihydrogen phosphate, decylpentyldimethylammonium dihydrogen phosphate, undecylpentyldimethylammonium dihydrogen phosphate, dodecylpentyldimethylammonium dihydrogen phosphate, dihexyldimethylammonium dihydrogen phosphate, heptylhexyldimethylammonium dihydrogen phosphate, octylhexyldimethylammonium dihydrogen phosphate, nonylhexyldimethylammonium dihydrogen phosphate, decylhexyldimethylammonium dihydrogen phosphate, undecylhexyldimethylammonium dihydrogen phosphate, dodecylhexyldimethylammonium dihydrogen phosphate, diheptyldimethylammonium dihydrogen phosphate, octylheptyldimethylammonium dihydrogen phosphate, nonylheptyldimethylammonium dihydrogen phosphate, decylheptyldimethylammonium dihydrogen phosphate, undecylheptyldimethylammonium dihydrogen phosphate, dodecylheptyldimethylammonium dihydrogen phosphate, dioctyldimethylammonium dihydrogen phosphate, nonyloctyldimethylammonium dihydrogen phosphate, decyloctyldimethylammonium dihydrogen phosphate, undecyloctyldimethylammonium dihydrogen phosphate, dodecyloctyldimethylammonium dihydrogen phosphate, dinonyldimethylammonium dihydrogen phosphate, decylnonyldimethylammonium dihydrogen phosphate, undecylnonyldimethylammonium dihydrogen phosphate, dodecylnonyldimethylammonium dihydrogen phosphate, didecyldimethylammonium dihydrogen phosphate, undecyldecyldimethylammonium dihydrogen phosphate, dodecyldecyldimethylammonium dihydrogen phosphate, diundecyldimethylammonium dihydrogen phosphate, dodecylundecyldimethylammonium dihydrogen phosphate, didodecyldimethylammonium dihydrogen phosphate.

Figure 5G:
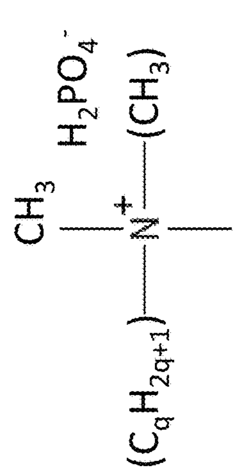
FIG. 5*g* is a view showing another of different examples of cationic surfactants according to the present invention.
Figure 5H:
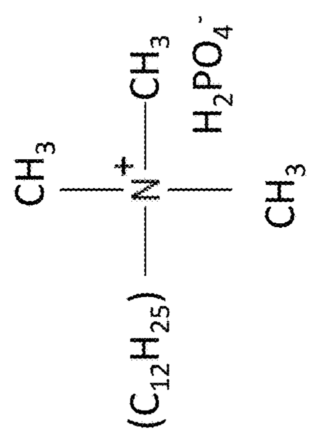
FIG. 5*h* is a view showing another of different examples of cationic surfactants according to the present invention.

The embodiment variants shown in FIGS. 5*c*, 5*d*, 5*g* and 5*h* are trimethylalkylammonium compounds. It is thus seen that the embodiment variants corresponding to FIG. 5*g* are selected from the group containing ethyltrimethylammonium dihydrogen phosphate, butyltrimethylammonium dihydrogen phosphate, pentyltrimethylammonium dihydrogen phosphate, hexyltrimethylammonium dihydrogen phosphate, heptyltrimethylammonium dihydrogen phosphate, octyltrimethylammonium dihydrogen phosphate, nonyltrimethylammonium dihydrogen phosphate, decyltrimethylammonium dihydrogen phosphate, undecyltrimethylammonium dihydrogen phosphate, dodecyltrimethylammonium dihydrogen phosphate. The especially preferred embodiment variant corresponding to FIG. 5*h* is dodecyltrimethylammonium dihydrogen phosphate.

In other words, the embodiment variants corresponding to FIGS. 5*c*, 5*d*, 5*g* and 5*h* have three methyl groups each and correspond to one of the following two formulas:

$$[((C_sH_{2s+1})(C_pH_{2p+1})(C_qH_{2q+1})(C_rH_{2r+}))N^+]\ HSO_4^- \quad \text{(Formula IIId)},$$

in which s={2, 3, 4, 5, 6, 7, 8, 9, 10, 11, 12}, p={1}, q={1}, and r={1}, or $$[((C_sH_{2s+1})(C_pH_{2p+1})(C_qH_{2q+1})(C_rH_{2r+1}))N^+]\ H_2PO_4^- \quad \text{(Formula IIIe)},$$

in which s={2, 3, 4, 5, 6, 7, 8, 9, 10, 11, 12}, p={1}, q={1}, and r={1}.

Each of the exemplary embodiments shown in FIGS. 1*a* through 1*h*, 2*a* through 2*f*, 3*a* through 3*e*, 4*a* through 4*h*, 5*a* through 5*h* and 6*a* through 6*l* for a surfactant according to the present invention may be contained in or form the additive according to the present invention alone or in combination with one or more other of the surfactants according to the present invention. It is thus seen that an electrolyte according to the present invention contains an additive, wherein the additive has at least one surfactant corresponding to one of the exemplary embodiments shown in FIGS. 1*a* through 1*h*, 2*a* through 2*f*, 3*a* through 3*e*, 4*a* through 4*h*, 5*a* through 5*h* and 6*a* through 6*l*. It is further seen that the additive consists entirely of one surfactant in one embodiment variant and is a mixture of a plurality of components in another embodiment variant, one component being a surfactant. In any case, at least one surfactant has, in at least one embodiment variant, a counterion, which is selected from among heterocyclic cations, ammonium ions, $H^{\pm}$ ions, alkali or alkaline earth ions, $HSO_4^-$ ions or $H_2PO_4^-$ ions, $CF_3$—$SO_3^-$ ions, $C_2F_4HSO_3^-$ ions, $CF_3$—$COO^-$ ions, and $(CF_3$—$SO_2)_2N^-$ ions. All surfactants may have the same counterion, or the surfactants may have different counterions. If the additive is a mixture of a plurality of components, it has, in one embodiment variant, both halogenated surfactants corresponding to the exemplary embodiments according to FIGS. 1*a* through 1*d*, 2*a* through 2*f* and 3*a* through 3*e* and halogen-free surfactants corresponding to the exemplary embodiments according to FIGS. 1*e* through 1*h*, 4*a* through 4*h*, 5*f* through 5*h* and 6*a* through 6*l*.

Figure 7:
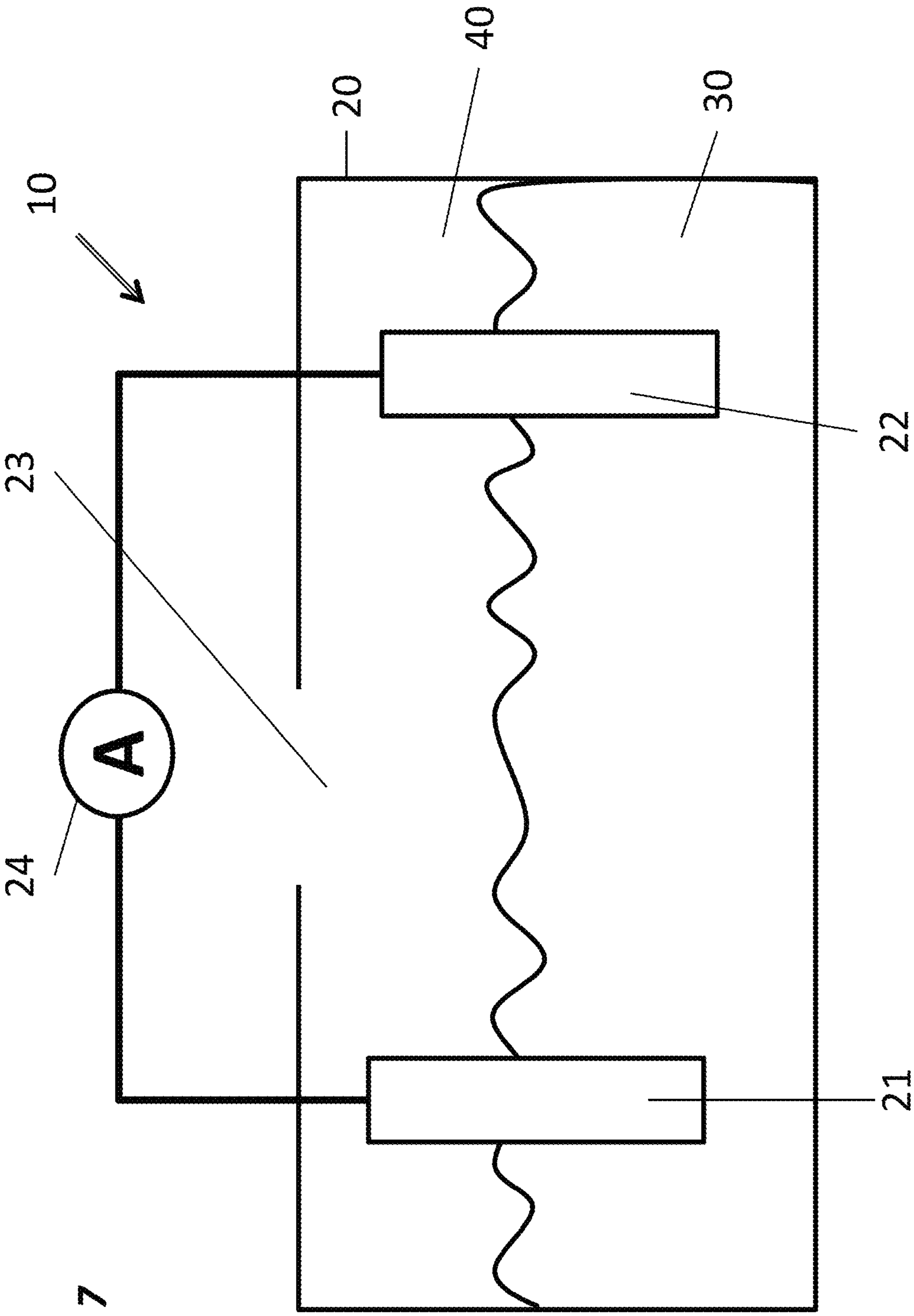
FIG. 7 is a schematic view of gas sensor according to the present invention.

FIG. 7 shows a first, very simple and schematic exemplary embodiment of an electrochemical gas sensor 10, which has an electrolyte 30 with an additive. The gas sensor 10 is an electrochemical cell. It has a housing 10 with a gas inlet 23. Two electrodes 21, 22, namely, a working electrode 21 and a counterelectrode 22, are arranged in the housing. The electrodes 21, 22 are coupled with one another via an electrically conductive analysis unit 24. The analysis unit is, e.g., an amperometer. The electrolyte 30 is arranged in the housing 10. The electrodes 21, 22 partly dip into the electrolyte 30. The electrolyte 30 therefore partly wets the electrodes 21, 22. A gas mixture 40 to be analyzed can enter and, if necessary, also leave the housing 10 through a gas inlet 23.

It is seen that the gaseous phase, which is formed by the gas mixture 40, the liquid phase, which is formed by the electrolyte 30, and the solid phase, which is formed by the respective electrodes 21, 22, form a three-phase boundary. The desired reaction of the gas to be detected with the electrode material and with the electrolyte takes place at this three-phase boundary.

The additive of the electrolyte 30 contains a surfactant corresponding to one of the above-described exemplary embodiments shown in FIGS. 1*a* through 1*e*, 2*a* through 2*f*, 3*a* through 3*e*, 4*a* through 4*h*, 5*f* through 5*h* and 6*a* through 6*l*. In one embodiment variant, the additive of the electrolyte 30 contains a plurality of these surfactants. In yet another embodiment variant, the additive additionally contains additional components.

Figure 8A:
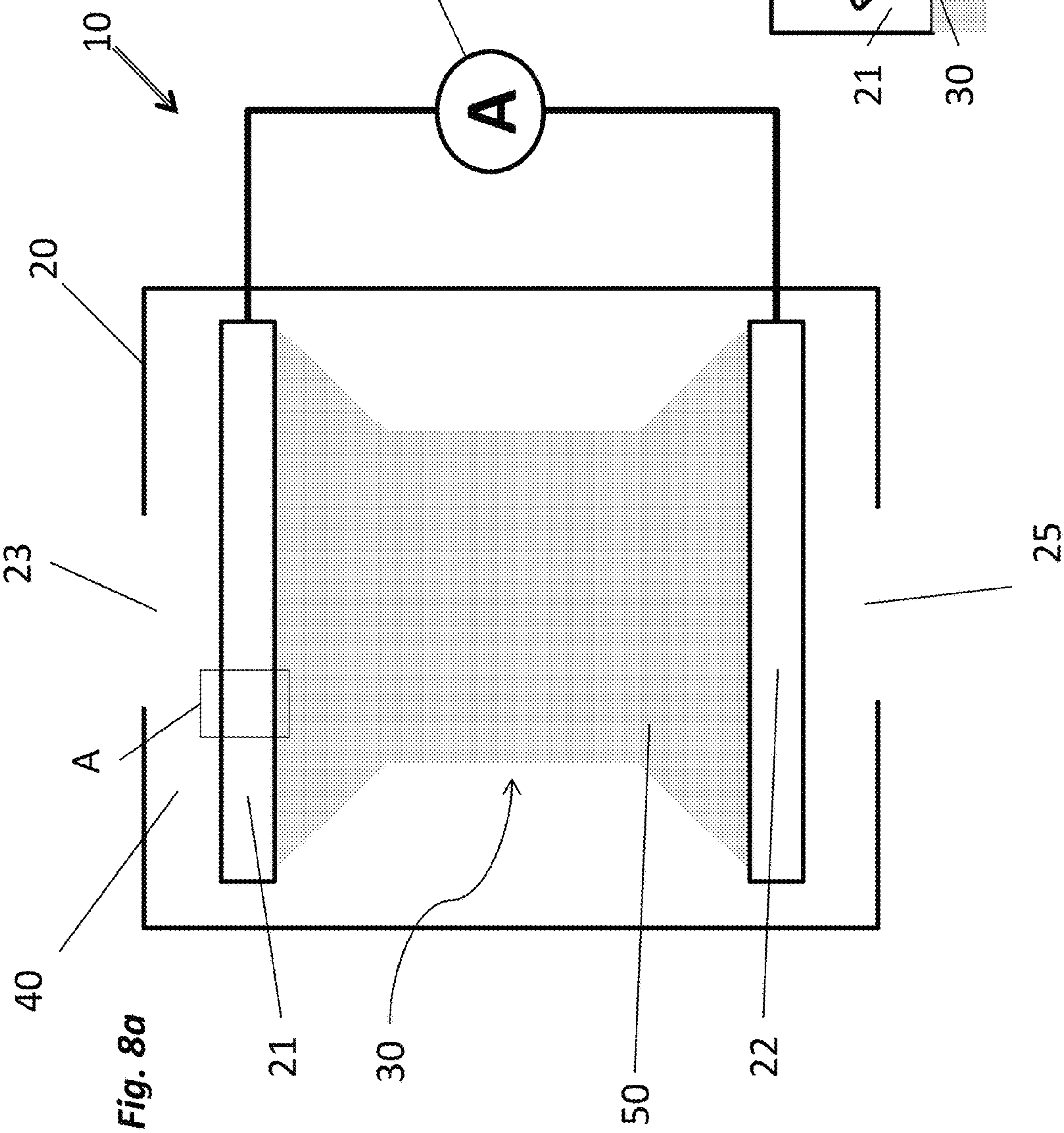
FIG. 8*a* is a schematic view of an alternative configuration of a gas sensor according to the present invention.

FIG. 8*a* schematically shows another embodiment variant for an electrochemical gas sensor 10. This gas sensor 10 also has a housing 20, in which a working electrode 21 and a counterelectrode 22 are arranged. The electrodes 21, 22 are also coupled here with one another via an analysis unit 24. The housing 20 has, in addition, a gas inlet 23 and a gas outlet 25. A gas mixture 40 to be analyzed can enter the housing 10 through the gas inlet 23 and form a gaseous phase there. The electrolyte 30 is arranged in the interior of a porous wick system (wick) 50. The wick system 50 is in contact with the electrodes 21, 22 such that a layer of the electrolyte (electrolyte layer) is formed between the wick system 50 and the surface of the electrodes 21, 22. This electrolyte layer wets the surface of the electrodes 21, 22 on the side of the electrodes 21, 22 facing the wick system 50. The electrodes 21, 22 consist of a porous material. The pores of the material enlarge the surface of the electrodes 21, 22.

Figure 8B:
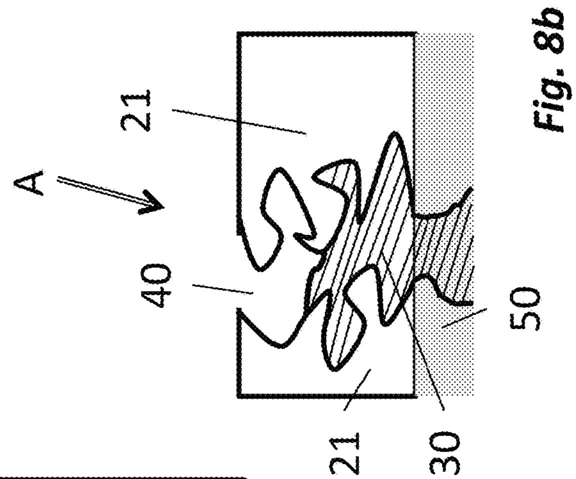
FIG. 8*b* is a detail view of detail A from FIG. 8*a*.

It is seen in the enlarged detail of area A, which is shown in FIG. 8*b*, that the electrolyte 30 enters the pores of the electron material. A three-phase boundary is formed from the electrode material 21, the gas mixture 40 and the electrolyte 30 within the respective pore. The wick system 50 ensures that a sufficient quantity of but not too much electrolyte 30 is always present in the pores of the electrodes 21, 22. This process is supported especially by the surfactant, which is present in the additive of the electrolyte 30.

Example 1

In an exemplary example of an electrolyte with a perfluorinated, anionic surfactant, the electrolyte consists of a liquid medium in the form of sulfuric acid. Perfluorosulfonic acid (=heptadecafluorooctylsulfonic acid) is present as an additive at a concentration of 20 mmol/L in this liquid medium.

Example 2

In another exemplary example of an electrolyte with a perfluorinated, anionic surfactant, the electrolyte consists of a liquid medium in the form of sulfuric acid. Perfluorooctylsulfonic acid is present as an additive at a concentration of 2 mmol/L in this liquid medium.

Example 3

In another exemplary embodiment of an electrolyte with a perfluorinated, anionic surfactant, the electrolyte consists of a liquid medium in the form of sulfuric acid. Perfluorooctylsulfonic acid is present as an additive at a concentration of 500 mmol/L in this liquid medium.

Example 4

In another exemplary example of an electrolyte with a perfluorinated, anionic surfactant, the electrolyte consists of a liquid medium in the form of sulfuric acid. Perfluorooctylsulfonic acid is contained as an additive at a concentration of 1 mol/L in this liquid medium.

Example 5

In an exemplary example of an electrolyte with a perfluorinated, anionic surfactant, the electrolyte consists of a liquid medium in the form of sulfuric acid. Perfluorooctylsulfonic acid is present as an additive at a concentration of 20 mmol/L in this liquid medium.

Example 6

In another exemplary example of an electrolyte with a perfluorinated, anionic surfactant, the electrolyte consists of a liquid medium in the form of sulfuric acid. Sodium 1-perfluorooctyl sulfonate is present as an additive at a concentration of 2 mmol/L in this liquid medium.

Example 7

In another exemplary example of an electrolyte a perfluorinated, anionic surfactant, the electrolyte consists of a liquid medium in the form of sulfuric acid. Sodium 1-perfluorooctyl sulfonate is present as an additive at a concentration of 500 mmol/L in this liquid medium.

Example 8

In another exemplary example of an electrolyte with a perfluorinated, anionic surfactant, the electrolyte consists of a liquid medium in the form of sulfuric acid. Sodium 1-perfluorooctyl sulfonate is contained as an additive at a concentration of 1 mol/L in this liquid medium.

Example 9

In an exemplary example of an electrolyte with a perfluorinated, anionic surfactant, the electrolyte consists of a liquid medium in the form of sulfuric acid. Sodium 1-perfluorooctyl sulfonate is contained as an additive at a concentration of 20 mmol/L in this liquid medium.

Example 10

In another exemplary example of an electrolyte with a perfluorinated, anionic surfactant, the electrolyte consists of a liquid medium in the form of sulfuric acid. Potassium 1-perfluorooctyl sulfonate is present as an additive at a concentration of 2 mmol/L in this liquid medium.

Example 11

In another exemplary example of an electrolyte with a perfluorinated, anionic surfactant, the electrolyte consists of a liquid medium in the form of sulfuric acid. Potassium 1-perfluorooctyl sulfonate is present as an additive at a concentration of 500 mmol/L in this liquid medium.

Example 12

In another exemplary example of an electrolyte with a perfluorinated, anionic surfactant, the electrolyte consists of a liquid medium in the form of sulfuric acid. Potassium 1-perfluorooctyl sulfonate is present as an additive at a concentration of 1 mol/L in this liquid medium.

Example 13

In an exemplary example of an electrolyte with a perfluorinated, anionic surfactant, the electrolyte consists of a liquid medium in the form of sulfuric acid. Potassium 1-perfluorooctyl sulfonate is present as an additive at a concentration of 20 mmol/L in this liquid medium.

Example 14

In another exemplary example of an electrolyte with a perfluorinated, anionic surfactant, the electrolyte consists of a liquid medium in the form of sulfuric acid. Lithium 1-perfluorooctyl sulfonate is contained as an additive at a concentration of 2 mmol/L in this liquid medium.

Example 15

In another exemplary example of an electrolyte with a perfluorinated, anionic surfactant, the electrolyte consists of a liquid medium in the form of sulfuric acid. Lithium 1-perfluorooctyl sulfonate is contained as an additive at a concentration of 500 mmol/L in this liquid medium.

Example 16

In another exemplary example of an electrolyte with a perfluorinated, an ionic surfactant, the electrolyte consists of a liquid medium in the form of sulfuric acid. Lithium 1-perfluorooctyl sulfonate is contained as an additive at a concentration of 1 mol/L in this liquid medium.

Example 17

In an exemplary example of an electrolyte with a perfluorinated, anionic surfactant, the electrolyte consists of a liquid medium in the form of sulfuric acid. Tetraethylammonium 1-perfluorooctyl sulfonate is contained as an additive at a concentration of 20 mmol/L in this liquid medium.

Example 18

In another exemplary examples of an electrolyte with a perfluorinated, anionic surfactant, the electrolyte consists of a liquid medium in the form of sulfuric acid. Tetraethylammonium 1-perfluorooctyl sulfonate is contained as an additive at a concentration of 2 mmol/L in this liquid medium.

Example 19

In another exemplary example of an electrolyte with a perfluorinated, anionic surfactant, the electrolyte consists of a liquid medium in the form of sulfuric acid. Tetraethylammonium 1-pefluorooctyl sulfonate is contained as an additive at a concentration of 500 mmol/L in this liquid medium.

Example 20

In another exemplary example of an electrolyte with a perfluorinated, anionic surfactant, the electrolyte consists of a liquid medium in the form of sulfuric acid. Tetraethylammonium 1-perfluorooctyl sulfonate is contained as an additive at a concentration of 1 mol/L in this liquid medium.

Example 21

In an exemplary example of an electrolyte with a polyfluorinated, anionic surfactant, the electrolyte consists of a liquid medium in the form of sulfuric acid. Tridecafluorooctylsulfonic acid is contained as an additive at a concentration of 20 mmol/L in this liquid medium.

Example 22

In an exemplary example of an electrolyte with a polyfluorinated, anionic surfactant, the electrolyte consists of a liquid medium in the form of sulfuric acid. Tridecafluorooctylsulfonic acid is contained as an additive at a concentration of 2 mmol/L in this liquid medium.

Example 23

In an exemplary example of an electrolyte with a polyfluorinated, anionic surfactant, the electrolyte consists of a liquid medium in the form of sulfuric acid. Tridecafluorooctylsulfonic acid is contained as an additive at a concentration of 500 mmol/L in this liquid medium.

Example 24

In an exemplary example of an electrolyte with a polyfluorinated, anionic surfactant, the electrolyte consists of a liquid medium in the form of sulfuric acid. Tridecafluorooctylsulfonic acid is contained as an additive at a concentration of 1 mol/L in this liquid medium.

Example 25

In an exemplary example of an electrolyte with a polyfluorinated, anionic surfactant, the electrolyte consists of a liquid medium in the form of sulfuric acid. Sodium tridecafluorooctyl sulfonate is contained as an additive at a concentration of 20 mmol/L in this liquid medium.

Example 26

In an exemplary example of an electrolyte with a polyfluorinated, anionic surfactant, the electrolyte consists of a liquid medium in the form of sulfuric acid. Sodium tridecafluorooctyl sulfonate is contained as an additive at a concentration of 2 mmol/L in this liquid medium.

Example 27

In an exemplary example of an electrolyte with a polyfluorinated, anionic surfactant, the electrolyte consists of a liquid medium in the form of sulfuric acid. Sodium tridecafluorooctyl sulfonate is contained as an additive at a concentration of 500 mmol/L in this liquid medium.

Example 28

In an exemplary example of an electrolyte with a polyfluorinated, anionic surfactant, the electrolyte consists of a liquid medium in the form of sulfuric acid. Sodium tridecafluorooctyl sulfonate is contained as an additive at a concentration of 1 mol/L in this liquid medium.

Example 29

In an exemplary example of an electrolyte with a polyfluorinated, anionic surfactant, the electrolyte consists of a liquid medium in the form of sulfuric acid. Potassium tridecafluorooctyl sulfonate is contained as an additive at a concentration of 20 mmol/L in this liquid medium.

Example 30

In an exemplary example of an electrolyte with a polyfluorinated, anionic surfactant, the electrolyte consists of a liquid medium in the form of sulfuric acid. Potassium tridecafluorooctyl sulfonate is contained as an additive at a concentration of 2 mmol/L in this liquid medium.

Example 31

In an exemplary example of an electrolyte with a polyfluorinated, anionic surfactant, the electrolyte consists of a liquid medium in the form of sulfuric acid. Potassium tridecafluorooctyl sulfonate is contained as an additive at a concentration of 500 mmol/L in this liquid medium.

Example 32

In an exemplary example of an electrolyte with a polyfluorinated, anionic surfactant, the electrolyte consists of a liquid medium in the form of sulfuric acid. Potassium tridecafluorooctyl sulfonate is contained as an additive at a concentration of 1 mol/L in this liquid medium.

Example 33

In an exemplary example of an electrolyte with a polyfluorinated, anionic surfactant, the electrolyte consists of a liquid medium in the form of sulfuric acid. Lithium tridecafluorooctyl sulfonate is contained as an additive at a concentration of 20 mmol/L in this liquid medium.

Example 34

In an exemplary example of an electrolyte with a polyfluorinated, anionic surfactant, the electrolyte consists of a liquid medium in the form of sulfuric acid. Lithium tridecafluorooctyl sulfonate is contained as an additive at a concentration of 2 mmol/L in this liquid medium.

Example 35

In an exemplary example of an electrolyte with a polyfluorinated, anionic surfactant, the electrolyte consists of a liquid medium in the form of sulfuric acid. Lithium tridecafluorooctyl sulfonate is contained as an additive at a concentration of 500 mmol/L in this liquid medium.

Example 36

In an exemplary example of an electrolyte with a polyfluorinated, anionic surfactant, the electrolyte consists of a liquid medium in the form of sulfuric acid. Lithium tridecafluorooctyl sulfonate is contained as an additive at a concentration of 1 mol/L in this liquid medium.

Example 37

In an exemplary example of an electrolyte with a polyfluorinated, anionic surfactant, the electrolyte consists of a liquid medium in the form of sulfuric acid. Tetraethylammonium tridecafluorooctyl sulfonate is contained as an additive at a concentration of 20 mmol/L in this liquid medium.

Example 38

In an exemplary example of an electrolyte with a polyfluorinated, anionic surfactant, the electrolyte consists of a liquid medium in the form of sulfuric acid. Tetraethylammonium tridecafluorooctyl sulfonate is contained as an additive at a concentration of 2 mmol/L in this liquid medium.

Example 39

In an exemplary example of an electrolyte with a polyfluorinated, anionic surfactant, the electrolyte consists of a liquid medium in the form of sulfuric acid. Tetraethylammonium tridecafluorooctyl sulfonate is contained as an additive at a concentration of 500 mmol/L in this liquid medium.

Example 40

In an exemplary example of an electrolyte with a polyfluorinated, anionic surfactant, the electrolyte consists of a liquid medium in the form of sulfuric acid. Tetraethylammonium tridecafluorooctyl sulfonate is contained as an additive at a concentration of 1 mol/L in this liquid medium.

Example 41

In an exemplary example of an electrolyte with a halogen-free, anionic surfactant, the electrolyte consists of a liquid medium in the form of sulfuric acid. Sodium 1-butyl sulfonate is contained as an additive at a concentration of 20 mmol/L in this liquid medium.

Example 42

In an exemplary example of an electrolyte with a halogen-free, anionic surfactant, the electrolyte consists of a liquid medium in the form of sulfuric acid. Sodium 1-butyl sulfonate is contained as an additive at a concentration of 2 mmol/L in this liquid medium.

Example 43

In an exemplary example of an electrolyte with a halogen-free, anionic surfactant, the electrolyte consists of a liquid medium in the form of sulfuric acid. Sodium 1-butyl sulfonate is contained as an additive at a concentration of 500 mmol/L in this liquid medium.

Example 44

In an exemplary example of an electrolyte with a halogen-free, anionic surfactant, the electrolyte consists of a liquid medium in the form of sulfuric acid. Sodium 1-butyl sulfonate is contained as an additive at a concentration of 1 mol/L in this liquid medium.

Example 45

In an exemplary example of an electrolyte with a halogen-free, anionic surfactant, the electrolyte consists of a liquid medium in the form of sulfuric acid. Sodium isobutyl sulfonate is contained as an additive at a concentration of 20 mmol/L in this liquid medium.

Example 46

In an exemplary example of an electrolyte with a halogen-free, anionic surfactant, the electrolyte consists of a liquid medium in the form of sulfuric acid. Sodium isobutyl sulfonate is contained as an additive at a concentration of 2 mmol/L in this liquid medium.

Example 47

In an exemplary example of an electrolyte with a halogen-free, anionic surfactant, the electrolyte consists of a liquid medium in the form of sulfuric acid. Sodium isobutyl sulfonate is contained as an additive at a concentration of 500 mmol/L in this liquid medium.

Example 48

In an exemplary example of an electrolyte with a halogen-free, anionic surfactant, the electrolyte consists of a liquid medium in the form of sulfuric acid. Sodium isobutyl sulfonate is contained as an additive at a concentration of 1 mol/L in this liquid medium.

Example 49

In an exemplary example of an electrolyte with a halogen-free, anionic surfactant, the electrolyte consists of a liquid medium in the form of sulfuric acid. Potassium 1-butyl sulfonate is contained as an additive at a concentration of 20 mmol/L in this liquid medium.

Example 50

In an exemplary example of an electrolyte with a halogen-free, anionic surfactant, the electrolyte consists of a liquid medium in the form of sulfuric acid. Potassium 1-butyl sulfonate is contained as an additive at a concentration of 2 mmol/L in this liquid medium.

Example 51

In an exemplary example of an electrolyte with a halogen-free, anionic surfactant, the electrolyte consists of a liquid medium in the form of sulfuric acid. Potassium 1-butyl sulfonate is contained as an additive at a concentration of 500 mmol/L in this liquid medium.

Example 52

In an exemplary example of an electrolyte with a halogen-free, anionic surfactant, the electrolyte consists of a liquid medium in the form of sulfuric acid. Potassium 1-butyl sulfonate is contained as an additive at a concentration of 1 mol/L in this liquid medium.

Example 53

In an exemplary example of an electrolyte with a halogen-free, anionic surfactant, the electrolyte consists of a liquid medium in the form of sulfuric acid. Potassium 1-butyl sulfonate is contained as an additive at a concentration of 20 mmol/L in this liquid medium.

Example 54

In an exemplary example of an electrolyte with a halogen-free, anionic surfactant, the electrolyte consists of a liquid medium in the form of sulfuric acid. Potassium 1-butyl sulfonate is contained as an additive at a concentration of 2 mmol/L in this liquid medium.

Example 55

In an exemplary example of an electrolyte with a halogen-free, anionic surfactant, the electrolyte consists of a liquid medium in the form of sulfuric acid. Potassium 1-butyl sulfonate is contained as an additive at a concentration of 500 mmol/L in this liquid medium.

Example 56

In an exemplary example of an electrolyte with a halogen-free, anionic surfactant, the electrolyte consists of a liquid medium in the form of sulfuric acid. Potassium 1-butyl sulfonate is contained as an additive at a concentration of 1 mol/L in this liquid medium.

Example 57

In an exemplary example of an electrolyte with a halogen-free, anionic surfactant, the electrolyte consists of a liquid medium in the form of sulfuric acid. Lithium 1-butyl sulfonate is contained as an additive at a concentration of 20 mmol/L in this liquid medium.

Example 58

In an exemplary example of an electrolyte with a halogen-free, anionic surfactant, the electrolyte consists of a liquid medium in the form of sulfuric acid. Lithium 1-butyl sulfonate is contained as an additive at a concentration of 2 mmol/L in this liquid medium.

Example 59

In an exemplary example of an electrolyte with a halogen-free, anionic surfactant, the electrolyte consists of a liquid medium in the form of sulfuric acid. Lithium 1-butyl sulfonate is contained as an additive at a concentration of 500 mmol/L in this liquid medium.

Example 60

In an exemplary example of an electrolyte with a halogen-free, anionic surfactant, the electrolyte consists of a liquid medium in the form of sulfuric acid. Lithium 1-butyl sulfonate is contained as an additive at a concentration of 1 mol/L in this liquid medium.

Example 61

In an exemplary example of an electrolyte with a halogen-free, anionic surfactant, the electrolyte consists of a liquid medium in the form of sulfuric acid. Lithium isobutyl sulfonate is contained as an additive at a concentration of 20 mmol/L in this liquid medium.

Example 62

In an exemplary example of an electrolyte with a halogen-free, anionic surfactant, the electrolyte consists of a liquid medium in the form of sulfuric acid. Lithium isobutyl sulfonate is contained as an additive at a concentration of 2 mmol/L in this liquid medium.

Example 63

In an exemplary example of an electrolyte with a halogen-free, anionic surfactant, the electrolyte consists of a liquid medium in the form of sulfuric acid. Lithium isobutyl sulfonate is contained as an additive at a concentration of 500 mmol/L in this liquid medium.

Example 64

In an exemplary example of an electrolyte with a halogen-free, anionic surfactant, the electrolyte consists of a liquid medium in the form of sulfuric acid. Lithium isobutyl sulfonate is contained as an additive at a concentration of 1 mol/L in this liquid medium.

Example 65

In an exemplary example of an electrolyte with a halogen-free, anionic surfactant, the electrolyte consists of a liquid medium in the form of sulfuric acid. Tetraethylammonium 1-butyl sulfonate is contained as an additive at a concentration of 20 mmol/L in this liquid medium.

Example 66

In an exemplary example of an electrolyte with a halogen-free, anionic surfactant, the electrolyte consists of a liquid medium in the form of sulfuric acid. Tetraethylammonium 1-butyl sulfonate is contained as an additive at a concentration of 2 mmol/L in this liquid medium.

Example 67

In an exemplary example of an electrolyte with a halogen-free, anionic surfactant, the electrolyte consists of a liquid medium in the form of sulfuric acid. Tetraethylammonium 1-butyl sulfonate is contained as an additive at a concentration of 500 mmol/L in this liquid medium.

Example 68

In an exemplary example of an electrolyte with a halogen-free, anionic surfactant, the electrolyte consists of a liquid medium in the form of sulfuric acid. Tetraethylammonium 1-butyl sulfonate is contained as an additive at a concentration of 1 mol/L in this liquid medium.

Example 69

In an exemplary example of an electrolyte with a halogen-free, anionic surfactant, the electrolyte consists of a liquid medium in the form of sulfuric acid. Tetraethylammonium isobutyl sulfonate is contained as an additive at a concentration of 20 mmol/L in this liquid medium.

Example 70

In an exemplary example of an electrolyte with a halogen-free, anionic surfactant, the electrolyte consists of a liquid medium in the form of sulfuric acid. Tetraethylammonium isobutyl sulfonate is contained as an additive at a concentration of 2 mmol/L in this liquid medium.

Example 71

In an exemplary example of an electrolyte with a halogen-free, anionic surfactant, the electrolyte consists of a liquid medium in the form of sulfuric acid. Tetraethylammonium isobutyl sulfonate is contained as an additive at a concentration of 500 mmol/L in this liquid medium.

Example 72

In an exemplary example of an electrolyte with a halogen-free, anionic surfactant, the electrolyte consists of a liquid medium in the form of sulfuric acid. Tetraethylammonium isobutyl sulfonate is contained as an additive at a concentration of 1 mol/L in this liquid medium.

Example 73

In an exemplary example of an electrolyte with a halogen-free, anionic surfactant, the electrolyte consists of a liquid medium in the form of sulfuric acid. Sodium 1-dodecyl sulfonate is contained as an additive at a concentration of 20 mmol/L in this liquid medium.

Example 74

In an exemplary example of an electrolyte with a halogen-free, anionic surfactant, the electrolyte consists of a liquid medium in the form of sulfuric acid. Sodium 1-dodecyl sulfonate is contained as an additive at a concentration of 2 mmol/L in this liquid medium.

Example 75

In an exemplary example of an electrolyte with a halogen-free, anionic surfactant, the electrolyte consists of a liquid medium in the form of sulfuric acid. Sodium 1-dodecyl sulfonate is contained as an additive at a concentration of 500 mmol/L in this liquid medium.

Example 76

In an exemplary example of an electrolyte with a halogen-free, anionic surfactant, the electrolyte consists of a liquid medium in the form of sulfuric acid. Sodium 1-dodecyl sulfonate is contained as an additive at a concentration of 1 mol/L in this liquid medium.

Example 77

In an exemplary example of an electrolyte with a halogen-free, anionic surfactant, the electrolyte consists of a liquid medium in the form of sulfuric acid. Sodium isododecyl sulfonate is contained as an additive at a concentration of 20 mmol/L in this liquid medium.

Example 78

In an exemplary example of an electrolyte with a halogen-free, anionic surfactant, the electrolyte consists of a liquid medium in the form of sulfuric acid. Sodium isododecyl sulfonate is contained as an additive at a concentration of 2 mmol/L in this liquid medium.

Example 79

In an exemplary example of an electrolyte with a halogen-free, anionic surfactant, the electrolyte consists of a liquid medium in the form of sulfuric acid. Sodium isododecyl sulfonate is contained as an additive at a concentration of 500 mmol/L in this liquid medium.

Example 80

In an exemplary example of an electrolyte with a halogen-free, anionic surfactant, the electrolyte consists of a liquid medium in the form of sulfuric acid. Sodium isododecyl sulfonate is contained as an additive at a concentration of 1 mol/L in this liquid medium.

Example 81

In an exemplary example of an electrolyte with a halogen-free, anionic surfactant, the electrolyte consists of a liquid medium in the form of sulfuric acid. Potassium 1-dodecyl sulfonate is contained as an additive at a concentration of 20 mmol/L in this liquid medium.

Example 82

In an exemplary example of an electrolyte with a halogen-free, anionic surfactant, the electrolyte consists of a liquid medium in the form of sulfuric acid. Potassium 1-dodecyl sulfonate is contained as an additive at a concentration of 2 mmol/L in this liquid medium.

Example 83

In an exemplary example of an electrolyte with a halogen-free, anionic surfactant, the electrolyte consists of a liquid medium in the form of sulfuric acid. Potassium 1-dodecyl sulfonate is contained as an additive at a concentration of 500 mmol/L in this liquid medium.

Example 84

In an exemplary example of an electrolyte with a halogen-free, anionic surfactant, the electrolyte consists of a liquid medium in the form of sulfuric acid. Potassium 1-dodecyl sulfonate is contained as an additive at a concentration of 1 mol/L in this liquid medium.

Example 85

In an exemplary example of an electrolyte with a halogen-free, anionic surfactant, the electrolyte consists of a liquid medium in the form of sulfuric acid. Potassium isododecyl sulfonate is contained as an additive at a concentration of 20 mmol/L in this liquid medium.

Example 86

In an exemplary example of an electrolyte with a halogen-free, anionic surfactant, the electrolyte consists of a liquid medium in the form of sulfuric acid. Potassium isododecyl sulfonate is contained as an additive at a concentration of 2 mmol/L in this liquid medium.

Example 87

In an exemplary example of an electrolyte with a halogen-free, anionic surfactant, the electrolyte consists of a liquid medium in the form of sulfuric acid. Potassium isododecyl sulfonate is contained as an additive at a concentration of 500 mmol/L in this liquid medium.

Example 88

In an exemplary example of an electrolyte with a halogen-free, anionic surfactant, the electrolyte consists of a liquid medium in the form of sulfuric acid. Potassium isododecyl sulfonate is contained as an additive at a concentration of 1 mol/L in this liquid medium.

Example 89

In an exemplary example of an electrolyte with a halogen-free, anionic surfactant, the electrolyte consists of a liquid medium in the form of sulfuric acid. Lithium 1-dodecyl sulfonate is contained as an additive at a concentration of 20 mmol/L in this liquid medium.

Example 90

In an exemplary example of an electrolyte with a halogen-free, anionic surfactant, the electrolyte consists of a liquid medium in the form of sulfuric acid. Lithium 1-dodecyl sulfonate is contained as an additive at a concentration of 2 mmol/L in this liquid medium.

Example 91

In an exemplary example of an electrolyte with a halogen-free, anionic surfactant, the electrolyte consists of a liquid medium in the form of sulfuric acid. Lithium 1-dodecyl sulfonate is contained as an additive at a concentration of 500 mmol/L in this liquid medium.

Example 92

In an exemplary example of an electrolyte with a halogen-free, anionic surfactant, the electrolyte consists of a liquid medium in the form of sulfuric acid. Lithium 1-dodecyl sulfonate is contained as an additive at a concentration of 1 mol/L in this liquid medium.

Example 93

In an exemplary example of an electrolyte with a halogen-free, anionic surfactant, the electrolyte consists of a liquid medium in the form of sulfuric acid. Lithium isododecyl sulfonate is contained as an additive at a concentration of 20 mmol/L in this liquid medium.

Example 94

In an exemplary example of an electrolyte with a halogen-free, anionic surfactant, the electrolyte consists of a liquid medium in the form of sulfuric acid. Lithium isododecyl sulfonate is contained as an additive at a concentration of 2 mmol/L in this liquid medium.

Example 95

In an exemplary example of an electrolyte with a halogen-free, anionic surfactant, the electrolyte consists of a liquid medium in the form of sulfuric acid. Lithium isododecyl sulfonate is contained as an additive at a concentration of 500 mmol/L in this liquid medium.

Example 96

In an exemplary example of an electrolyte with a halogen-free, anionic surfactant, the electrolyte consists of a liquid medium in the form of sulfuric acid. Lithium isododecyl sulfonate is contained as an additive at a concentration of 1 mol/L in this liquid medium.

Example 97

In an exemplary example of an electrolyte with a halogen-free, anionic surfactant, the electrolyte consists of a liquid medium in the form of sulfuric acid. Tetraethylammonium 1-dodecyl sulfonate is contained as an additive at a concentration of 20 mmol/L in this liquid medium.

Example 98

In an exemplary example of an electrolyte with a halogen-free, anionic surfactant, the electrolyte consists of a liquid medium in the form of sulfuric acid. Tetraethylammonium 1-dodecyl sulfonate is contained as an additive at a concentration of 2 mmol/L in this liquid medium.

Example 99

In an exemplary example of an electrolyte with a halogen-free, anionic surfactant, the electrolyte consists of a liquid medium in the form of sulfuric acid. Tetraethylammonium 1-dodecyl sulfonate is contained as an additive at a concentration of 500 mmol/L in this liquid medium.

Example 100

In an exemplary example of an electrolyte with a halogen-free, anionic surfactant, the electrolyte consists of a liquid medium in the form of sulfuric acid. Tetraethylammonium 1-dodecyl sulfonate is contained as an additive at a concentration of 1 mol/L in this liquid medium.

Example 101

In an exemplary example of an electrolyte with a halogen-free, anionic surfactant, the electrolyte consists of a liquid medium in the form of sulfuric acid. Tetraethylammonium isododecyl sulfonate is contained as an additive at a concentration of 20 mmol/L in this liquid medium.

Example 102

In an exemplary example of an electrolyte with a halogen-free, anionic surfactant, the electrolyte consists of a liquid medium in the form of sulfuric acid. Tetraethylammonium isododecyl sulfonate is contained as an additive at a concentration of 2 mmol/L in this liquid medium.

Example 103

In an exemplary example of an electrolyte with a halogen-free, anionic surfactant, the electrolyte consists of a liquid medium in the form of sulfuric acid. Tetraethylammonium isododecyl sulfonate is contained as an additive at a concentration of 500 mmol/L in this liquid medium.

Example 104

In an exemplary example of an electrolyte with a halogen-free, anionic surfactant, the electrolyte consists of a liquid medium in the form of sulfuric acid. Tetraethylammonium isododecyl sulfonate is contained as an additive at a concentration of 1 mol/L in this liquid medium.

Example 105

In an exemplary example of an electrolyte with a cationic surfactant, the electrolyte consists of a liquid medium in the form of sulfuric acid. Dodecyltrimethylammonium hydrogen sulfate is contained as an additive at a concentration of 20 mmol/L in this liquid medium.

Example 106

In an exemplary example of an electrolyte with a cationic surfactant, the electrolyte consists of a liquid medium in the form of sulfuric acid. Dodecyltrimethylammonium hydrogen sulfate is contained as an additive at a concentration of 2 mmol/L in this liquid medium.

Example 107

In an exemplary example of an electrolyte with a cationic surfactant, the electrolyte consists of a liquid medium in the form of sulfuric acid. Dodecyltrimethylammonium hydrogen sulfate is contained as an additive at a concentration of 500 mmol/L in this liquid medium.

Example 108

In an exemplary example of an electrolyte with a cationic surfactant, the electrolyte consists of a liquid medium in the form of sulfuric acid. Dodecyltrimethylammonium hydrogen sulfate is contained as an additive at a concentration of 1 mol/L in this liquid medium.

Example 109

In an exemplary example of an electrolyte with a cationic surfactant, the electrolyte consists of a liquid medium in the form of sulfuric acid. Dodecyltrimethylammonium dihydrogen phosphate is contained as an additive at a concentration of 20 mmol/L in this liquid medium.

Example 110

In an exemplary example of an electrolyte with a cationic surfactant, the electrolyte consists of a liquid medium in the form of sulfuric acid. Dodecyltrimethylammonium dihydrogen phosphate is contained as an additive at a concentration of 2 mmol/L in this liquid medium.

Example 111

In an exemplary example of an electrolyte with a cationic surfactant, the electrolyte consists of a liquid medium in the form of sulfuric acid. Dodecyltrimethylammonium dihydrogen phosphate is contained as an additive at a concentration of 500 mmol/L in this liquid medium.

Example 112

In an exemplary example of an electrolyte with a cationic surfactant, the electrolyte consists of a liquid medium in the form of sulfuric acid. Dodecyltrimethylammonium dihydrogen phosphate is contained as an additive at a concentration of 1 mol/L in this liquid medium.

Example 113

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 2 mmol/L in this liquid medium.

Example 114

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 20 mmol/L in this liquid medium.

Example 115

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 500 mmol/L in this liquid medium.

Example 116

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 1 mol/L in this liquid medium.

Example 117

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 20 mmol/L in this liquid medium.

Example 118

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 500 mmol/L in this liquid medium.

Example 119

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and polyethylene glycol is present as an additive at a total concentration of 1 mol/L in this liquid medium.

Example 120

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and glycol is present as an additive at a total concentration of 20 mmol/L in this liquid medium.

Example 121

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and glycol is present as an additive at a total concentration of 500 mmol/L in this liquid medium.

Example 122

In an exemplary example of an electrolyte with an additive, which has a mixture of a plurality of surfactants, the electrolyte consists of a liquid medium in the form of sulfuric acid. A mixture of dodecyltrimethylammonium hydrogen sulfate and glycol is present as an additive at a total concentration of 1 mol/L in this liquid medium.

Example 123

In an exemplary example of an electrolyte with an additive, which has a mixture of a plurality of surfactants, the electrolyte consists of a liquid medium in the form of sulfuric acid. A mixture of sodium 1-dodecyl sulfonate and polyethylene glycol is present as an additive at a total concentration of 2 mmol/L in this liquid medium.

Example 124

In an exemplary example of an electrolyte with an additive, which has a mixture of a plurality of surfactants, the electrolyte consists of a liquid medium in the form of sulfuric acid. A mixture of sodium 1-dodecyl sulfonate and polyethylene glycol is present as an additive at a total concentration of 20 mmol/L in this liquid medium.

Example 125

In an exemplary example of an electrolyte with an additive, which has a mixture of a plurality of surfactants, the electrolyte consists of a liquid medium in the form of sulfuric acid. A mixture of sodium 1-dodecyl sulfonate and polyethylene glycol is present as an additive at a total concentration of 500 mmol/L in this liquid medium.

Example 126

In an exemplary example of an electrolyte with an additive, which has a mixture of a plurality of surfactants, the electrolyte consists of a liquid medium in the form of sulfuric acid. A mixture of sodium 1-dodecyl sulfonate and polyethylene glycol is present as an additive at a total concentration of 1 mol/L in this liquid medium.

Example 127

In an exemplary example of an electrolyte with an additive, which has a mixture of a plurality of surfactants, the electrolyte consists of a liquid medium in the form of sulfuric acid. A mixture of sodium 1-dodecyl sulfonate and polypropylene glycol is present as an additive at a total concentration of 20 mmol/L in this liquid medium.

Example 128

In an exemplary example of an electrolyte with an additive, which has a mixture of a plurality of surfactants, the electrolyte consists of a liquid medium in the form of sulfuric acid. A mixture of sodium 1-dodecyl sulfonate and polypropylene glycol is present as an additive at a total concentration of 500 mmol/L in this liquid medium.

Example 129

In an exemplary example of an electrolyte with an additive, which has a mixture of a plurality of surfactants, the electrolyte consists of a liquid medium in the form of sulfuric acid. A mixture of sodium 1-dodecyl sulfonate and polypropylene glycol is present as an additive at a total concentration of 1 mol/L in this liquid medium.

Example 130

In an exemplary example of an electrolyte with an additive, which has a mixture of a plurality of surfactants, the electrolyte consists of a liquid medium in the form of sulfuric acid. A mixture of sodium 1-dodecyl sulfonate and glycol is present as an additive at a total concentration of 20 mmol/L in this liquid medium.

Example 131

In an exemplary example of an electrolyte with an additive, which has a mixture of a plurality of surfactants, the electrolyte consists of a liquid medium in the form of sulfuric acid. A mixture of sodium 1-dodecyl sulfonate and glycol is present as an additive at a total concentration of 500 mmol/L in this liquid medium.

Example 132

In an exemplary example of an electrolyte with an additive, which has a mixture of a plurality of surfactants, the electrolyte consists of a liquid medium in the form of sulfuric acid. A mixture of sodium 1-dodecyl sulfonate and glycol is present as an additive at a total concentration of 1 mol/L in this liquid medium.

Example 133

In an exemplary example of an electrolyte with an additive, which has a mixture of a plurality of surfactants, the electrolyte consists of a liquid medium in the form of sulfuric acid. A mixture of sodium 1-butane sulfonate and polyethylene glycol is present as an additive at a total concentration of 2 mmol/L in this liquid medium.

Example 134

In an exemplary example of an electrolyte with an additive, which has a mixture of a plurality of surfactants, the electrolyte consists of a liquid medium in the form of sulfuric acid. A mixture of sodium 1-butane sulfonate and polyethylene glycol is present as an additive at a total concentration of 20 mmol/L in this liquid medium.

Example 135

In an exemplary example of an electrolyte with an additive, which has a mixture of a plurality of surfactants, the electrolyte consists of a liquid medium in the form of sulfuric acid. A mixture of sodium 1-butane sulfonate and polyethylene glycol is present as an additive at a total concentration of 500 mmol/L in this liquid medium.

Example 136

In an exemplary example of an electrolyte with an additive, which has a mixture of a plurality of surfactants, the electrolyte consists of a liquid medium in the form of sulfuric acid. A mixture of sodium 1-butane sulfonate and polyethylene glycol is present as an additive at a total concentration of 1 mol/L in this liquid medium.

Example 137

In an exemplary example of an electrolyte with an additive, which has a mixture of a plurality of surfactants, the electrolyte consists of a liquid medium in the form of sulfuric acid. A mixture of sodium 1-butane sulfonate and polypropylene glycol is present as an additive at a total concentration of 20 mmol/L in this liquid medium.

Example 138

In an exemplary example of an electrolyte with an additive, which has a mixture of a plurality of surfactants, the electrolyte consists of a liquid medium in the form of sulfuric acid. A mixture of sodium 1-butane sulfonate and polypropylene glycol is present as an additive at a total concentration of 500 mmol/L in this liquid medium.

Example 139

In an exemplary example of an electrolyte with an additive, which has a mixture of a plurality of surfactants, the electrolyte consists of a liquid medium in the form of sulfuric acid. A mixture of sodium 1-butane sulfonate and polypropylene glycol is present as an additive at a total concentration of 1 mol/L in this liquid medium.

Example 140

In an exemplary example of an electrolyte with an additive, which has a mixture of a plurality of surfactants, the electrolyte consists of a liquid medium in the form of sulfuric acid. A mixture of sodium 1-butane sulfonate and glycol is present as an additive at a total concentration of 20 mmol/L in this liquid medium.

Example 141

In an exemplary example of an electrolyte with an additive, which has a mixture of a plurality of surfactants, the electrolyte consists of a liquid medium in the form of sulfuric acid. A mixture of sodium 1-butane sulfonate and glycol is present as an additive at a total concentration of 500 mmol/L in this liquid medium.

Example 142

In an exemplary example of an electrolyte with an additive, which has a mixture of a plurality of surfactants, the electrolyte consists of a liquid medium in the form of sulfuric acid. A mixture of sodium 1-butane sulfonate and glycol is present as an additive at a total concentration of 1 mol/L in this liquid medium.

Example 143

In an exemplary example of an electrolyte with an additive, which has a mixture of a plurality of surfactants, the electrolyte consists of a liquid medium in the form of sulfuric acid. A mixture of tridecafluorooctylsulfonic acid and polyethylene glycol is present as an additive at a total concentration of 2 mmol/L in this liquid medium.

Example 144

In an exemplary example of an electrolyte with an additive, which has a mixture of a plurality of surfactants, the electrolyte consists of a liquid medium in the form of sulfuric acid. A mixture of tridecafluorooctylsulfonic acid and polyethylene glycol is present as an additive at a total concentration of 20 mmol/L in this liquid medium.

Example 145

In an exemplary example of an electrolyte with an additive, which has a mixture of a plurality of surfactants, the electrolyte consists of a liquid medium in the form of sulfuric acid. A mixture of tridecafluorooctylsulfonic acid and polyethylene glycol is present as an additive at a total concentration of 500 mmol/L in this liquid medium.

Example 146

In an exemplary example of an electrolyte with an additive, which has a mixture of a plurality of surfactants, the electrolyte consists of a liquid medium in the form of sulfuric acid. A mixture of tridecafluorooctylsulfonic acid and polyethylene glycol is present as an additive at a total concentration of 1 mmol/L in this liquid medium.

Example 147

In an exemplary example of an electrolyte with an additive, which has a mixture of a plurality of surfactants, the electrolyte consists of a liquid medium in the form of sulfuric acid. A mixture of tridecafluorooctylsulfonic acid and polypropylene glycol is present as an additive at a total concentration of 20 mmol/L in this liquid medium.

Example 148

In an exemplary example of an electrolyte with an additive, which has a mixture of a plurality of surfactants, the electrolyte consists of a liquid medium in the form of sulfuric acid. A mixture of tridecafluorooctylsulfonic acid and polypropylene glycol is present as an additive at a total concentration of 500 mmol/L in this liquid medium.

Example 149

In an exemplary example of an electrolyte with an additive, which has a mixture of a plurality of surfactants, the electrolyte consists of a liquid medium in the form of sulfuric acid. A mixture of tridecafluorooctylsulfonic acid and polypropylene glycol is present as an additive at a total concentration of 1 mol/L in this liquid medium.

Example 150

In an exemplary example of an electrolyte with an additive, which has a mixture of a plurality of surfactants, the electrolyte consists of a liquid medium in the form of sulfuric acid. A mixture of tridecafluorooctylsulfonic acid and glycol is present as an additive at a total concentration of 20 mmol/L in this liquid medium.

Example 151

In an exemplary example of an electrolyte with an additive, which has a mixture of a plurality of surfactants, the electrolyte consists of a liquid medium in the form of sulfuric acid. A mixture of tridecafluorooctylsulfonic acid and glycol is present as an additive at a total concentration of 500 mmol/L in this liquid medium.

Example 152

In an exemplary example of an electrolyte with an additive, which has a mixture of a plurality of surfactants, the electrolyte consists of a liquid medium in the form of sulfuric acid. A mixture of tridecafluorooctylsulfonic acid and glycol is present as an additive at a total concentration of 1 mol/L in this liquid medium.

The present invention is not limited to one of the above-described embodiments but can be modified in many different ways.

Thus, the electrochemical gas sensor 10 has more than two electrodes 21, 22 in another embodiment variant (not shown).

Just as the gas outlet 25, the gas inlet 23 may be covered by a membrane in order to prevent dust and other foreign particles from entering the gas sensor 10.

All the features and advantages appearing from the claims, the description and the drawings, including design details, spatial arrangements and method steps, may be essential for the present invention both in themselves and in the many different combinations.

While specific embodiments of the invention have been shown and described in detail to illustrate the application of the principles of the invention, it will be understood that the invention may be embodied otherwise without departing from such principles.

The invention claimed is:

1. An electrochemical gas sensor comprising:

a housing comprising a gas inlet;

at least two electrodes;

a wick system; and an acidic, liquid electrolyte, wherein the electrolyte is in contact with the wick system and partly wets the at least two electrodes, the electrolyte comprising an additive having at least one surfactant, and an acid selected from the group consisting of sulfuric acid, perchloric acid, sulfurous acid, hydrochloric acid, nitric acid, nitrous acid, phosphoric acid and a mixture of at least two of sulfuric acid, perchloric acid, sulfurous acid, hydrochloric acid, nitric acid, nitrous acid, phosphoric acid, and combinations thereof, wherein the at least one surfactant comprises an anionic, fluorinated surfactant, the anionic, fluorinated surfactant comprising a perfluorinated hexylene or octylene group, and a head group comprising a sulfonate group.

2. The electrochemical gas sensor of claim 1, wherein the additive consists entirely of the surfactant.

3. The electrochemical gas sensor of claim 1, wherein the additive comprises a plurality of components, wherein at least one other of the plurality of components comprises the at least one surfactant.

4. The electrochemical gas sensor of claim 1, wherein the additive comprises halogenated and halogen-free surfactants.

5. The electrochemical gas sensor of claim 1, wherein the at least one surfactant comprises a counterion selected from the group consisting of heterocyclic cations, ammonium ions, H± ion, alkali or alkaline earth ions, $HSO_4-$ ions, $H_2PO_4-$ ions, $CF_3$—SO3− ions, $C_2F_4HSO_3-$ ions, $CF_3$—COO− ions, and $(F_3C—S0_2)_2N^-$ ions, and combinations thereof.

6. The electrochemical gas sensor of claim 5, wherein each of the at least one surfactant comprises the same counterion.

7. The electrochemical gas sensor of claim 1, wherein the at least one surfactant comprises a counterion, selected from the group consisting of heterocyclic cations, H+ ions, Na+ ions, K+ ions, Li+ ions, $((C_sH_{2s+1})(C_pH_{2p+1})(C_qH_{2q+1})(C_sH_{2r+1}))$N+ ions, in which S={0, 1, 2, 3, 4, 5, 6}, p={0, 1, 2, 3, 4, 5, 6}, q={0, 1, 2, 3, 4, 5, 6}, and r={0, 1, 2, 3, 4, 5, 6}, and combinations thereof.

8. The electrochemical gas sensor of claim 1, wherein the at least one surfactant comprises a concentration ranging from 0.01 mmol/L to 2 mol/L.

9. The electrochemical gas sensor of claim 1, wherein each of the at least two electrodes, the electrolyte, and a gas to be analyzed define a three-phase boundary.

* * * * *